US012297311B2

(12) United States Patent
Camelio et al.

(10) Patent No.: US 12,297,311 B2
(45) Date of Patent: *May 13, 2025

(54) BIARYL HYDROXYTHIOPHENE GROUP IV TRANSITION METAL POLYMERIZATION WITH CHAIN TRANSFER CAPABILITY

(71) Applicant: Dow Global Technologies LLC, Midland, MI (US)

(72) Inventors: Andrew M. Camelio, Midland, MI (US); Brad C. Bailey, Midland, MI (US); Matthew D. Christianson, Midland, MI (US); Robert DJ Froese, Midland, MI (US); David D. Devore, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 749 days.

This patent is subject to a terminal disclaimer.

(21) Appl. No.: 17/437,271

(22) PCT Filed: Mar. 5, 2020

(86) PCT No.: PCT/US2020/021121

§ 371 (c)(1),
(2) Date: Sep. 8, 2021

(87) PCT Pub. No.: WO2020/185494

PCT Pub. Date: Sep. 17, 2020

(65) Prior Publication Data

US 2022/0169756 A1 Jun. 2, 2022

Related U.S. Application Data

(60) Provisional application No. 62/815,567, filed on Mar. 8, 2019.

(51) Int. Cl.
*C08F 4/6592* (2006.01)
*C08F 2/04* (2006.01)
(Continued)

(52) U.S. Cl.
CPC ............ *C08F 4/65925* (2013.01); *C08F 2/04* (2013.01); *C08F 210/06* (2013.01); *C08F 210/16* (2013.01)

(58) Field of Classification Search
None
See application file for complete search history.

(56) References Cited

U.S. PATENT DOCUMENTS 11,168,161 B2 * 11/2021 Camelio ............... C08F 210/16
2007/0167315 A1 7/2007 Arriola et al.
(Continued)

FOREIGN PATENT DOCUMENTS

WO 2005/108406 A1 11/2005
WO 2013/013111 A1 1/2013
(Continued)

OTHER PUBLICATIONS

Communication pursuant to Article 94(3) EPC, date Mar. 3, 2023, pertaining to EP Patent Application No. 20715632.4 8 pages.
(Continued)

*Primary Examiner* — Catherine S Branch
(74) *Attorney, Agent, or Firm* — Dinsmore & Shohl LLP

(57) ABSTRACT

Embodiments of this disclosure include polymerization processes that include contacting propylene and/or one or more (C4-C12)α-olefins in a reactor including a catalyst system. The catalyst system comprises a metal-ligand complex according to formula (I).
(Continued)

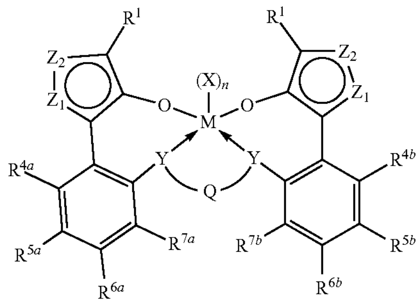

(I)

12 Claims, 5 Drawing Sheets

(51) Int. Cl.
*C08F 210/06* (2006.01)
*C08F 210/16* (2006.01)

(56) References Cited

U.S. PATENT DOCUMENTS

| | | | |
|---|---|---|---|
| 2012/0165486 | A1 | 6/2012 | Arriola et al. |
| 2014/0256893 | A1 | 9/2014 | Hagadorn et al. |
| 2014/0350189 | A1 | 11/2014 | Hustad |

FOREIGN PATENT DOCUMENTS

| | | | | |
|---|---|---|---|---|
| WO | 2013/036546 | A2 | 3/2013 | |
| WO | 2013/052585 | A2 | 4/2013 | |
| WO | 2018/022238 | A1 | 2/2018 | |
| WO | 20180022238 | A1 | 2/2018 | |
| WO | WO-2018064553 | A1 * | 4/2018 | ........... C07C 13/465 |
| WO | 2018/236996 | A1 | 12/2018 | |

OTHER PUBLICATIONS

International Search Report and Written Opinion issued by the European Patent Office acting as International Searching Authority for International Patent Application No. PCT/US2020/021121 dated Jun. 5, 2020 (13 pages total).
Communication pursuant to Article 94(3) EPC, dated Mar. 22, 2024, pertaining to EP Patent Application No. 20715632.4, 6 pgs.
Chinese Decision of Final Rejection, dated Jul. 29, 2023, pertaining to Chinese Patent Application No. 202080027797.8, 7 pgs.
Singapore Search Report and Written Opinion, dated Mar. 7, 2023 pertaining to Singapore Patent Application No. 11202109436X, 10 Pages.
Communication pursuant to Article 93(3) EPC dated Mar. 3, 2023, pertaining to EP Patent Application No. 20715632.4, 8 pages.
Chinese Search Report dated Jan. 10, 2023, pertaining to Chinese Patent Application No. 202080027797.8 2 pages.
Chinese Office Action dated Jan. 10, 2023, pertaining to Chinese Patent Application No. 202080027797.8 3 pages.
Brazil Office Action dated Sep. 26, 2023, pertaining to BR Patent Application No. BR112021017212-2, 4 pgs.
Japanese Decision of Rejection dated Jul. 30, 2024, pertaining to JP Patent Application No. 2021-552836, 4 pgs.
Korean Notice of Preliminary Rejection dated Jan. 24, 2025, pertaining to KR Patent Application No. KR 10-2021-7031698, 12 pgs.

* cited by examiner

Ligand 11

Ligand 12

Ligand 13

Ligand 14

Ligand 15

Ligand 16

Ligand 17

Ligand 18

Ligand 19

Ligand 20

Ligand 21

Ligand 22

Ligand 23

Ligand 24

Ligand 25

BIARYL HYDROXYTHIOPHENE GROUP IV TRANSITION METAL POLYMERIZATION WITH CHAIN TRANSFER CAPABILITY

CROSS REFERENCE TO RELATED APPLICATIONS

This application claims priority to U.S. Provisional Patent Application Ser. No. 62/815,567 filed on Mar. 8, 2019, the entire disclosure of which is hereby incorporated by reference.

TECHNICAL FIELD

Embodiments of the present disclosure generally relate to propylene polymerization catalyst systems and processes, and, more specifically, the synthesis of biaryl phenoxy group IV transition metal catalysts for propylene polymerization and to olefin polymerization processes incorporating the catalyst systems.

BACKGROUND

Olefin-based polymers such as polypropylene and propylene-based polymers are produced via various catalyst systems. Selection of such catalyst systems used in the polymerization process of the olefin-based polymers is an important factor contributing to the characteristics and properties of such olefin based polymers. Many catalysts that efficiently produce ethylene-based polymers are substantially less efficient for producing polypropylenes.

Propylene-based polymers are manufactured for a wide variety of articles. By varying parameters of the polypropylene polymerization process, polypropylene resins may be tailored to have physical properties compatible with use of the resins in desired applications. In a polymerization reactor, propylene monomers and, optionally, one or more co-monomers are present in liquid diluents or solvents. Examples of diluents or solvents include alkanes or isoalkanes such as isobutane. Hydrogen may also be added to the reactor. Typical catalyst systems for producing propylene-based polymers may comprise a chromium-based catalyst system, a Ziegler-Natta catalyst system, and/or a metallocene or non-metallocene molecular transition metal catalyst system. The reactants in the diluent and the catalyst system are circulated at an elevated polymerization temperature around the reactor, thereby producing propylene-based homopolymer or copolymer. Either periodically or continuously, part of the reaction mixture, including the polypropylene product dissolved in the diluent, together with unreacted propylene and one or more optional co-monomers, is removed from the reactor. The reaction mixture, when removed from the reactor, may be processed to remove the polypropylene product from the diluent and the unreacted reactants, with the diluent and unreacted reactants typically being recycled back into the reactor. Alternatively, the reaction mixture may be sent to a second reactor, serially connected to the first reactor, where a second polypropylene fraction may be produced.

Despite the currently available homogeneous solution olefin polymerization catalyst systems, there is a need for catalysts which can polymerize propylene to make polypropylene with a range of tacticity and molecular weights, as well as olefin block copolymers (OBCs) containing polypropylene units using chain transfer and chain shuttling agents (CSA).

SUMMARY

Embodiments of this disclosure include polymerization processes. The polymerization process includes contacting propylene and optionally one or more $(C_4\text{-}C_{12})\alpha$-olefins in a reactor in the presence of a catalyst system. The catalyst system includes a metal-ligand complex according to formula (I):

(I)

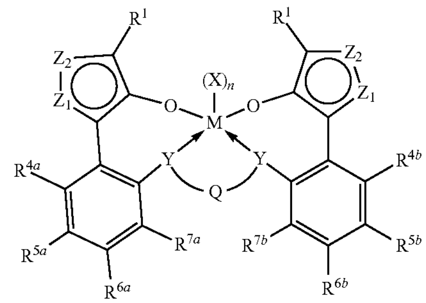

In formula (I), M is a metal chosen from titanium, zirconium, or hafnium, the metal having a formal oxidation state of +2, +3, or +4. Each X is a monodentate or bidentate ligand independently chosen from unsaturated $(C_2\text{-}C_{20})$hydrocarbon, unsaturated $(C_2\text{-}C_{50})$heterohydrocarbon, $(C_1\text{-}C_{50})$hydrocarbyl, $(C_6\text{-}C_{50})$aryl, $(C_6\text{-}C_{50})$heteroaryl, cyclopentadienyl, substituted cyclopentadienyl, $(C_4\text{-}C_{12})$diene, halogen, —$OR^C$, —$N(R^N)_2$, and —$NCOR^C$. Subscript n of $(X)_n$ is 1 or 2. Each Y is —O—, —S—, or —$N(R^N)$.

In formula (I), each $R^1$ is independently selected from the group consisting of —H, $(C_1\text{-}C_{40})$hydrocarbyl, $(C_1\text{-}C_{40})$heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C{=}N$—, $R^CC(O)O$—, $R^COC(O)$—, $R^CC(O)N(R)$—, $(R^C)_2NC(O)$—, halogen, radicals having formula (II), radicals having formula (III), and radicals having formula (IV):

(II)

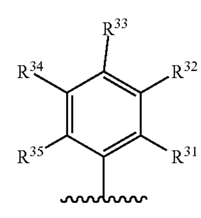

(III)

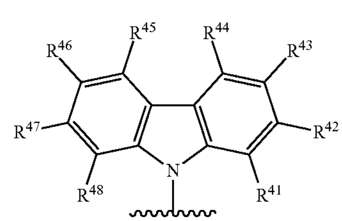

-continued (IV)

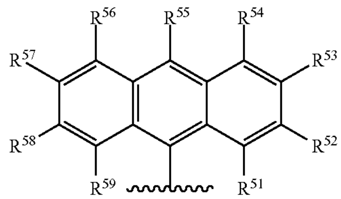

In formulas (II), (III), and (IV), each of $R^{31-35}$, $R^{41-48}$, and $R^{51-59}$ is independently chosen from $(C_1\text{-}C_{40})$hydrocarbyl, $(C_1\text{-}C_{40})$heterohydrocarbyl, $—Si(R^C)_3$, $—Ge(R^C)_3$, $—P(R^P)_2$, $—N(R^N)_2$, $—N{=}CHR^C$, $—OR^C$, $—SR^C$, $—NO_2$, —CN, $—CF_3$, $R^CS(O)—$, $R^CS(O)_2—$, $(R^C)_2C{=}N—$, $R^CC(O)O—$, $R^COC(O)—$, $R^CC(O)N(R^N)—$, $(R^C)_2NC(O)—$, halogen, or —H, provided at least one $R^1$ in formula (I) is a radical having formula (II), a radical having formula (III), or a radical having formula (IV).

In formula (I), Q is $(C_1\text{-}C_{12})$alkylene, $(C_1\text{-}C_{12})$heteroalkylene, $(—CH_2Si(R_Q)_2CH_2—)$, $(—CH_2CH_2Si(R_Q)_2CH_2CH_2—)$, $(—CH_2Ge(R_Q)_2CH_2—)$, or $(—CH_2CH_2Ge(R_Q)_2CH_2CH_2—)$, where $R_Q$ is $(C_1\text{-}C_{20})$hydrocarbyl. Each $z_1$ and $z_2$ is independently selected from the group consisting of sulfur, oxygen, $—N(R^Z)—$, and $—C(R^Z)—$, provided at least one of $z_1$ and $z_2$ in each individual ring containing groups $z_1$ and $z_2$ is sulfur.

In formula (I), $R^{4a}$, $R^{5a}$, $R^{6a}$, $R^{7a}$, $R^{4b}$, $R^{5b}$, $R^{6b}$, and $R^{7b}$ are independently chosen from $(C_1\text{-}C_{50})$hydrocarbyl, $(C_1\text{-}C_{50})$heterohydrocarbyl, $(C_6\text{-}C_{50})$aryl, $(C_4\text{-}C_{50})$heteroaryl, $—Si(R^C)_3$, $—Ge(R^C)_3$, $—P(R^P)_2$, $—N(R^N)_2$, $—OR^C$, $—SR^C$, $—NO_2$, —CN, $—CF_3$, $R^CS(O)—$, $—P(O)(R^P)_2$, $R^CS(O)_2—$, $(R^C)_2C{=}N—$, $R^CC(O)O—$, $R^COC(O)—$, $R^CC(O)N(R)—$, $(R^C)_2NC(O)—$, halogen, and —H Optionally $R^{4a}$ and $R^{5a}$, or $R^{5a}$ and $R^{6a}$, or $R^{6a}$ and $R^{7a}$, or $R^{4b}$ and $R^{5b}$, or $R^{5b}$ and $R^{6b}$, or $R^{6b}$ and $R^{7b}$ may be covalently connected to form an aromatic ring or a non-aromatic ring.

Each $R^C$, $R^N$, $R^Z$ and $R^P$ in formula (I) is independently selected from the group consisting of $(C_1\text{-}C_{20})$hydrocarbyl, $(C_1\text{-}C_{20})$heterohydrocarbyl, and —H.

DETAILED DESCRIPTION

Figure 1:
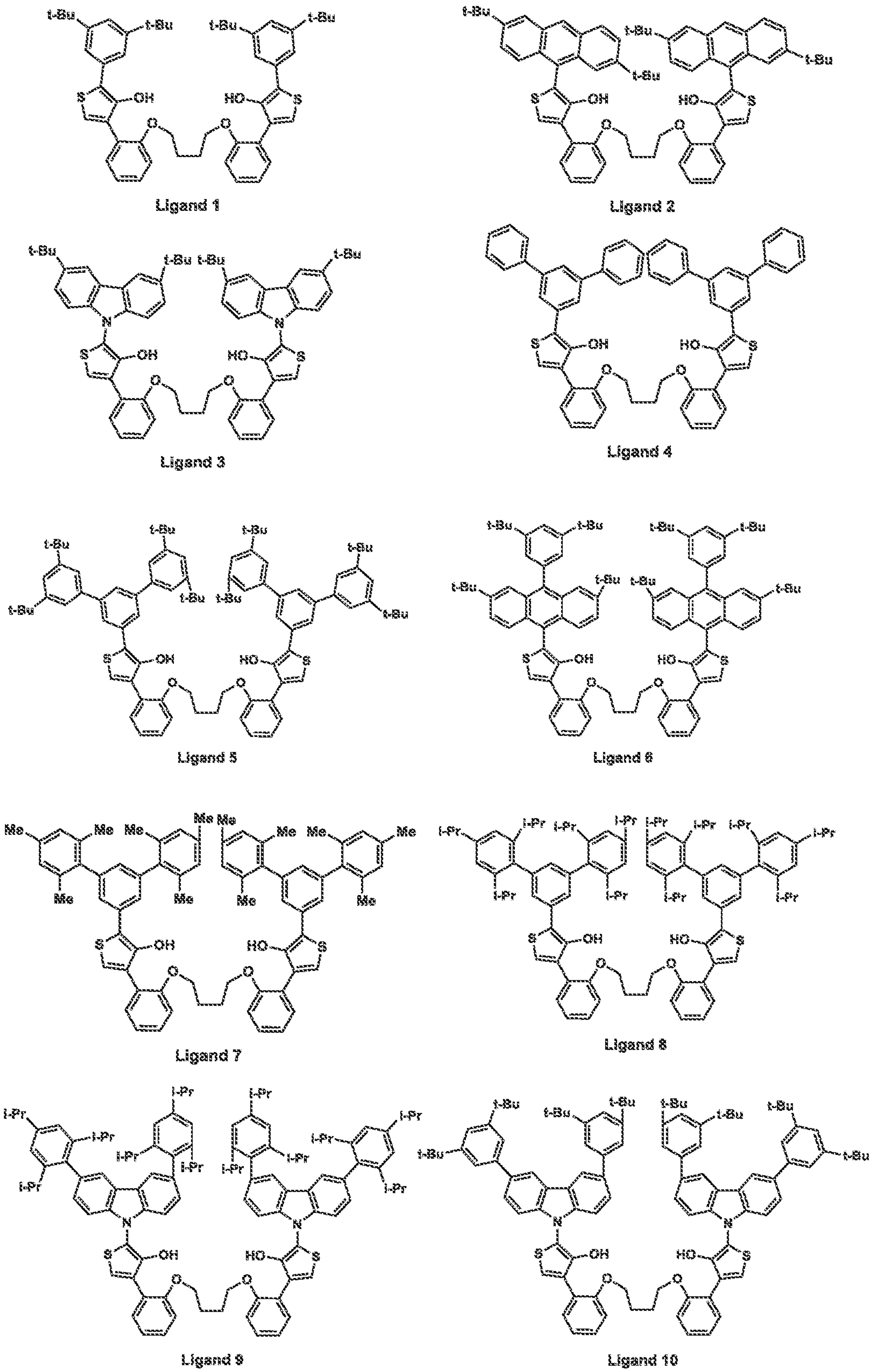
FIG. 1 depicts Ligand 1 to Ligand 10.

Specific embodiments of catalyst systems will now be described. It should be understood that the catalyst systems of this disclosure may be embodied in different forms and should not be construed as limited to the specific embodiments set forth in this disclosure.

Common abbreviations are listed below:

R, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf trifluoromethane sulfonate; CV: column volume (used in column chromatography); EtOAc ethyl acetate; TEA: triethylaluminum; MAO: methylaluminoxane; MMAO: modified methylaluminoxane; $LiCH_2TMS$: (trimethylsilyl)methyllithium; TMS: trimethylsilyl; $Pd(AmPhos)Cl_2$: Bis(di-tert-butyl(4-dimethylaminophenyl)phosphine)dichloropalladium(II); Pd(AmPhos): Chloro(crotyl)(di-tert-butyl(4-dimethylaminophenyl)phosphine)palladium(II); $Pd(dppf)Cl_2$: [1,1'-Bis(diphenylphosphino)ferrocene]palladium(II) dichloride; $ScCl_3$: scandium(III) chloride; PhMe: toluene; THF: tetrahydrofuran; $CH_2Cl_2$: dichloromethane; DMF: N,N-dimethylformamide; EtOAc: ethyl acetate; $Et_2O$: diethyl ether; MeOH: methanol; $NH_4Cl$: ammonium chloride; $MgSO_4$: magnesium sulfate; $Na_2SO_4$: sodium sulfate; NaOH: sodium hydroxide; brine: saturated aqueous sodium chloride; $SiO_2$: silica; $CDCl_3$: chloroform-D; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; TLC; thin layered chromatography; rpm: revolution per minute; rt: room temperature.

The term "independently selected" is used herein to indicate that the R groups, such as, $R^1$, $R^2$, $R^3$, $R^4$, and $R^5$, can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.) A chemical name associated with an R group is intended to convey the chemical structure that is recognized in the art as corresponding to that of the chemical name. Thus, chemical names are intended to supplement and illustrate, not preclude, the structural definitions known to those of skill in the art.

When used to describe certain carbon atom-containing chemical groups, a parenthetical expression having the form "$(C_x\text{-}C_y)$" means that the unsubstituted form of the chemical group has from x carbon atoms to y carbon atoms, inclusive of x and y. For example, a $(C_1\text{-}C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "$(C_x\text{-}C_y)$" parenthetical may contain more than y carbon atoms depending on the identity of any groups $R^S$. For example, a "$(C_1\text{-}C_{50})$alkyl substituted with exactly one group $R^S$, where $R^S$ is phenyl ($—C_6H_5$)" may contain from 7 to 56 carbon atoms. Thus, in general when a chemical group defined using the "$(C_x\text{-}C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (I) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1\text{-}C_{50})$hydrocarbyl" means a hydrocarbon radical of from 1 to 50 carbon atoms and the term "$(C_1\text{-}C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1\text{-}C_{50})$hydrocarbyl may be an unsubstituted or substituted $(C_1\text{-}C_{50})$alkyl, $(C_3\text{-}C_{50})$cycloalkyl, $(C_3\text{-}C_{20})$cycloalkyl-$(C_1\text{-}C_{20})$alkylene, $(C_6\text{-}C_{40})$aryl, or $(C_6\text{-}C_{20})$aryl-$(C_1\text{-}C_{20})$alkylene (such as benzyl ($—CH_2\text{-}C_6H_5$)).

The terms "$(C_1\text{-}C_{50})$alkyl" and "$(C_1\text{-}C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1\text{-}C_{50})$alkyl are unsubstituted $(C_1\text{-}C_{20})$alkyl; unsubstituted $(C_1\text{-}C_{10})$alkyl; unsubstituted $(C_1\text{-}C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1\text{-}C_{40})$alkyl are substituted $(C_1\text{-}C_{20})$alkyl, substituted $(C_1\text{-}C_{10})$alkyl, trifluoromethyl, and $[C_{45}]$alkyl. The term "$[C_{45}]$alkyl" means there is a maximum of 45 carbon atoms in the radical, including substituents, and is, for example, a $(C_{27}\text{-}C_{40})$alkyl substituted by one $R^S$, which is a $(C_1\text{-}C_5)$alkyl, respectively. Each $(C_1\text{-}C_5)$alkyl may be methyl, trifluoromethyl, ethyl, I-propyl, I-methylethyl, or 1,1-dimethylethyl.

The term "$(C_6\text{-}C_{50})$aryl" means an unsubstituted or substituted (by one or more $R^S$) monocyclic, bicyclic, or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6\text{-}C_{50})$aryl include: unsubstituted $(C_6\text{-}C_{20})$aryl, unsubstituted $(C_6\text{-}C_{18})$aryl; 2-$(C_1\text{-}C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6\text{-}C_{40})$aryl include: substituted $(C_1\text{-}C_{20})$aryl; substituted $(C_6\text{-}C_{15})$aryl; 2,4-bis($[C_{20}]$alkyl)-phenyl; polyfluorophenyl; pentafluorophenyl; and fluoren-9-one-1-yl.

The term "$(C_3\text{-}C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x\text{-}C_y)$cycloalkyl) are defined in an analogous manner as having from x to y carbon atoms and being either unsubstituted or substituted with one or more $R^S$. Examples of unsubstituted $(C_3\text{-}C_{40})$cycloalkyl are unsubstituted $(C_3\text{-}C_{20})$cycloalkyl, unsubstituted $(C_3\text{-}C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3\text{-}C_{40})$cycloalkyl are substituted $(C_3\text{-}C_{20})$cycloalkyl, substituted $(C_3\text{-}C_{10})$cycloalkyl, cyclopentanon-2-yl, and 1-fluorocyclohexyl.

Examples of $(C_1\text{-}C_{50})$hydrocarbylene include unsubstituted or substituted $(C_6\text{-}C_{50})$arylene, $(C_3\text{-}C_{50})$cycloalkylene, and $(C_1\text{-}C_{50})$alkylene (e.g., $(C_1\text{-}C_{20})$alkylene). The diradicals may be on the same carbon atom (e.g., $—CH_2—$) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an $\alpha,\omega$-diradical, and others a 1,2-diradical. The $\alpha,\omega$-diradical is a diradical that has maximum carbon backbone spacing between the radical carbons. Some examples of $(C_2\text{-}C_{20})$alkylene $\alpha,\omega)$-diradicals include ethan-1,2-diyl (i.e. $—CH_2CH_2—$), propan-1,3-diyl (i.e. $—CH_2CH_2CH_2—$), 2-methylpropan-1,3-diyl (i.e. $—CH_2CH(CH_3)CH_2—$). Some examples of $(C_6\text{-}C_{50})$ arylene $\alpha,\omega$-diradicals include phenyl-1,4-diyl, napthalen-2,6-diyl, or napthalen-3,7-diyl.

The term "$(C_1\text{-}C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1\text{-}C_{50})$alkylene are unsubstituted $(C_1\text{-}C_{20})$alkylene, including unsubstituted $—CH_2CH_2—$, $—(CH_2)_3—$, $—(CH_2)_4—$, $—(CH_2)_5—$, $—(CH_2)_6—$, $—(CH_2)_7—$, $—(CH_2)_8—$, $—CH_2C^*HCH_3$, and $—(CH_2)_4C^*(H)(CH_3)$, in which "C*" denotes a carbon atom from which a hydrogen atom is removed to form a secondary or tertiary alkyl radical. Examples of substituted $(C_1\text{-}C_{50})$alkylene are substituted $(C_1\text{-}C_{20})$alkylene, $—CF_2—$. $—C(O)—$, and $—(CH_2)_{14}C(CH_3)_2(CH_2)_5—$ (i.e., a 6,6-dimethyl substituted normal-1,20-eicosylene). Since as mentioned previously two $R^S$ may be taken together to form a $(C_1\text{-}C_{18})$ alkylene, examples of substituted $(C_1\text{-}C_{50})$alkylene also include 1,2-bis(methylene)cyclopentane, 1,2-bis(methylene)cyclohexane, 2,3-bis(methylene)-7,7-dimethyl-bicyclo [2.2.1]heptane, and 2,3-bis (methylene)bicyclo [2.2.2]octane.

The term "$(C_3\text{-}C_{50})$cycloalkylene" means a cyclic diradical (i.e., the radicals are on ring atoms) of from 3 to 50 carbon atoms that either is unsubstituted or is substituted by one or more $R^S$.

The term "heteroatom." refers to an atom other than hydrogen or carbon. Examples of groups containing one or more than one heteroatom include O, S, S(O), $S(O)_2$, $Si(R^C)_2$, $P(R^P)$, $N(R^N)$, $—N{=}C(R^C)_2$, $—Ge(R^C)_2—$, $—Si(R^C)—$, boron (B), aluminum (Al), gallium (Ga), or indium (In), where each $R^C$ and each $R^P$ is unsubstituted $(C_1\text{-}C_{18})$ hydrocarbyl or —H. and where each $R^N$ is unsubstituted $(C_1\text{-}C_{18})$hydrocarbyl. The term "heterohydrocarbon" refers to a molecule or molecular framework in which one or more carbon atoms of a hydrocarbon are replaced with a heteroatom. The term "$(C_1\text{-}C_{50})$heterohydrocarbyl" means a heterohydrocarbon radical of from 1 to 50 carbon atoms, and the term "$(C_1\text{-}C_{50})$heterohydrocarbylene" means a heterohydrocarbon diradical of from 1 to 50 carbon atoms. The heterohydrocarbon of the $(C_1\text{-}C_{50})$heterohydrocarbyl or the $(C_1\text{-}C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1\text{-}C_{50})$heterohydrocarbyl and $(C_1\text{-}C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1\text{-}C_{50})$heterohydrocarbyl may be unsubstituted or substituted. Non-limiting examples of the $(C_1\text{-}C_{50})$heterohydrocarbyl include $(C_1\text{-}C_{50})$heteroalkyl, $(C_1\text{-}C_{50})$hydrocarbyl-O—, $(C_1\text{-}C_{50})$hydrocarbyl-S—, $(C_1\text{-}C_{50})$hydrocarbyl-S(O)—, $(C_1\text{-}C_{50})$hydrocarbyl-$S(O)_2$—. $(C_1\text{-}C_{50})$hydrocarbyl-$Si(R^C)_2$—, $(C_1\text{-}C_{50})$hydrocarbyl-$N(R^N)$—, $(C_1\text{-}C_{50})$hydrocarbyl-$P(R^P)$—, $(C_2\text{-}C_{50})$heterocycloalkyl. $(C_2\text{-}C_{19})$heterocycloalkyl-$(C_1\text{-}C_{20})$alkylene. $(C_3\text{-}C_{20})$cycloalkyl-$(C_1\text{-}C_{19})$heteroalkylene, $(C_2\text{-}C_{19})$heterocycloalkyl-$(C_1\text{-}C_{20})$heteroalkylene, $(C_1\text{-}C_{50})$heteroaryl, $(C_1\text{-}C_{19})$heteroaryl-$(C_1\text{-}C_{20})$alkylene, $(C_6\text{-}C_{20})$aryl-$(C_1\text{-}C_{19})$heteroalkylene, or $(C_1\text{-}C_{19})$heteroaryl-$(C_1\text{-}C_{20})$heteroalkylene.

The term "$(C_1\text{-}C_{50})$heteroaryl" means an unsubstituted or substituted (by one or more $R^S$) mono-, bi-, or tricyclic heteroaromatic hydrocarbon radical of from 1 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x\text{-}C_y)$heteroaryl generally, such as $(C_1\text{-}C_{12})$heteroaryl) are defined in an analogous manner as having from x to y carbon atoms (such as 1 to 12 carbon atoms) and being unsubstituted or substituted by one or more than one $R^S$. The monocyclic heteroaromatic hydrocarbon radical is a 5-membered ring or a 6-membered ring. The 5-membered ring monocyclic heteroaromatic hydrocarbon radical has 5 minus h carbon atoms, where h is the number of heteroatoms and may be 1, 2, 3, or 4; and each heteroatom may be O, S, N. or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring monocyclic heteroaromatic hydrocarbon radical has 6 minus h carbon atoms, where h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 911-carbazol-9-yl. An example of the fused 6,6,6-ring system is acrydin-9-yl.

The term "$(C_1\text{-}C_{50})$heteroalkyl" means a saturated straight or branched chain radical containing one to fifty carbon atoms and one or more heteroatom. The term "$(C_1\text{-}C_{50})$heteroalkylene" means a saturated straight or branched chain diradical containing from 1 to 50 carbon atoms and one or more than one heteroatoms. The heteroatoms of the heteroalkyls or the heteroalkylenes may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted $(C_2\text{-}C_{40})$heterocycloalkyl include unsubstituted $(C_2\text{-}C_{20})$heterocycloalkyl, unsubstituted $(C_2\text{-}C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom ($C_1$), bromine atom (Br), or iodine atom (I). The term "halide" means anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorous double bonds, or carbon-silicon double bonds, not including double bonds that may be present in substituents $R^S$, if any, or in aromatic rings or heteroaromatic rings, if any.

Embodiments of this disclosure include polymerization processes. The polymerization process includes contacting propylene and optionally one or more $(C_4\text{-}C_{12})\alpha$-olefins in a reactor in the presence of a catalyst system and a transfer agent. The catalysts system includes a metal-ligand complex according to formula (I):

(I)

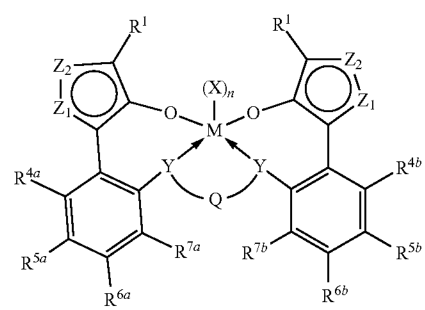

In formula (I), M is a metal chosen from titanium, zirconium, or hafnium, the metal having a formal oxidation state of +2, +3, or +4. Each X is a monodentate or bidentate ligand independently chosen from unsaturated $(C_2\text{-}C_{20})$hydrocarbon, unsaturated $(C_2\text{-}C_{50})$heterohydrocarbon, $(C_1\text{-}C_{50})$hydrocarbyl, $(C_6\text{-}C_{50})$aryl, $(C_6\text{-}C_{50})$heteroaryl, cyclopentadienyl, substituted cyclopentadienyl, $(C_4\text{-}C_{12})$diene, halogen, —$OR^C$, —$N(R^N)_2$, and —$NCOR^C$. Subscript n of $(X)_n$ is 1 or 2.

In formula (I), each $R^1$ is independently selected from the group consisting of —H, $(C_1\text{-}C_{40})$hydrocarbyl, $(C_1\text{-}C_{40})$heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C{=}N$—, $R^CC(O)O$—, $R^COC(O)$—, $R^CC(O)N(R)$—, $(R^C)_2NC(O)$—, halogen, radicals having formula (II), radicals having formula (III), and radicals having formula (IV):

(II)

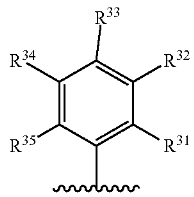

(III)

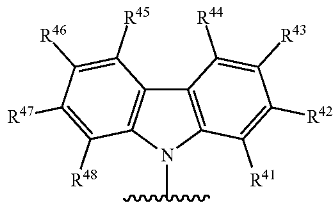

(IV)

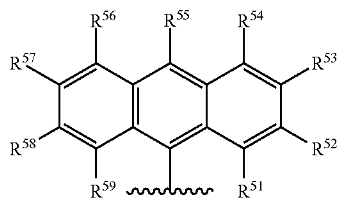

In formulas (II), (III), and (IV), each of $R^{31-35}$, $R^{41-48}$, and $R^{51-59}$ is independently chosen from $(C_1$-$C_{40})$hydrocarbyl, $(C_1$-$C_{40})$heterohydrocarbyl, —$Si(R^C)_3$, —$Ge(R^C)_3$, —$P(R^P)_2$, —$N(R^N)_2$, —N═$CHR^C$, —$OR^C$, —$SR^C$, —$NO_2$, —CN, —$CF_3$, $R^CS(O)$—, $R^CS(O)_2$—, $(R^C)_2C$═N—, $R^CC(O)O$—, $R^COC(O)$—, $R^CC(O)N(R^N)$—, $(R^C)_2NC(O)$—, halogen, or —H, provided at least one $R^1$ in formula (I) is a radical having formula (II), a radical having formula (III), or a radical having formula (IV).

In formula (I), Q is $(C_1$-$C_{12})$alkylene, $(C_1$-$C_{12})$heteroalkylene, $(C_1$-$C_{20})$arylene, $(C_1$-$C_{20})$heteroarylene, (—$CH_2Si(R_Q)_2CH_2$—), (—$CH_2CH_2Si(R_Q)_2CH_2CH_2$—), (—$CH_2Ge(R_Q)_2CH_2$—), or (—$CH_2CH_2Ge(R_Q)_2CH_2CH_2$—), where $R_Q$ is $(C_1$-$C_{20})$hydrocarbyl. Each $z_1$ and $z_2$ is independently selected from the group consisting of sulfur, oxygen, —$N(R^Z)$—, and —$C(R^Z)$—, provided at least one of $z_1$ and $z_2$ in each individual ring containing groups $z_1$ and $z_2$ is sulfur.

In formula (I), $R^{4a}$, $R^{5a}$, $R^{6a}$, $R^{7a}$, $R^{4b}$, $R^{5b}$, $R^{6b}$, and $R^{7b}$ are independently chosen from $(C_1$-$C_{50})$hydrocarbyl, $(C_1$-$C_{50})$heterohydrocarbyl, $(C_6$-$C_{50})$aryl, $(C_4$-$C_{50})$heteroaryl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, —$P(O)(R^P)_2$, $R^CS(O)_2$—, $(R^C)_2C$═N—, $R^CC(O)O$—, $R^COC(O)$—, $R^CC(O)N(R)$—, $(R^C)_2NC(O)$—, halogen, and —H Optionally $R^{4a}$ and $R^{5a}$, or $R^{5a}$ and $R^{6a}$, or $R^{6a}$ and $R^{7a}$, or $R^{4b}$ and $R^{5b}$, or $R^{5b}$ and $R^{6b}$, or $R^{6b}$ and $R^{7b}$ may be covalently connected to form an aromatic ring or a non-aromatic ring.

Each $R^C$, $R^N$, $R^Z$ and $R^P$ in formula (I) is independently selected from the group consisting of $(C_1$-$C_{20})$hydrocarbyl, $(C_1$-$C_{20})$heterohydrocarbyl, and —H.

In some embodiments, each $z_1$ is sulfur and $z_2$ is —$C(R^Z)$—, wherein $R^Z$ is $(C_1$-$C_5)$alkyl or —H. In other embodiments, each $z_2$ is sulfur and $z_1$ is —$C(R^Z)$—, wherein $R^Z$ is $(C_1$-$C_5)$alkyl or —H.

In one or more embodiments of the metal-ligand complex of formula (I), each $R^1$ is a radical having formula (III), in which at least one of $R^{41-48}$ is chosen from $(C_1$-$C_{40})$hydrocarbyl, $(C_1$-$C_{40})$heterohydrocarbyl, —$Si(R^C)_3$, —$OR^C$, —$SR^C$, —$NO_2$, —CN, —$CF_3$, or halogen. In various embodiments of the metal-ligand complex of formula (I), each $R^1$ is a radical having formula (III), in which $R^{42}$ and $R^{47}$ are independently chosen from $(C_1$-$C_{20})$alkyl, —$Si(R^C)_3$, —$CF_3$, or halogen and $R^{43}$ and $R^{46}$ are —H. In other embodiments, $R^{43}$ and $R^{46}$ are independently chosen from $(C_1$-$C_{20})$alkyl, —$Si(R^C)_3$, —$CF_3$, or halogen and $R^{42}$ and $R^{47}$ are —H.

In various embodiments of the metal-ligand complex of formula (I), each $R^1$ is a radical having formula (IV), in which at least one of $R^{51-59}$ is chosen from $(C_1$-$C_{40})$hydrocarbyl, $(C_1$-$C_{40})$heterohydrocarbyl, —$Si(R^C)_3$, —$OR^C$, —$SR^C$, —$NO_2$, —CN, —$CF_3$, or halogen.

In one or more embodiments of the metal-ligand complex of formula (I), each $R^1$ is a radical having formula (II), $R^{32}$ and $R^{34}$ are independently $(C_1$-$C_{40})$hydrocarbyl, $(C_1$-$C_{40})$heterohydrocarbyl, —$Si(R^C)_3$, —$OR^C$, —$SR^C$, —$NO_2$, —CN, —$CF_3$, or halogen. In some embodiments, each $R^1$ is a radical having formula (II), $R^{32}$ and $R^{34}$ are independently $(C_1$-$C_{20})$alkyl, substituted $(C_6$-$C_{20})$aryl, or unsubstituted $(C_6$-$C_{20})$aryl. In various embodiments, each $R^1$ is a radical having formula (II), $R^{32}$ and $R^{34}$ are independently tert-butyl, phenyl, 3,5-di(tert-butyl)phenyl, 2,4,6-trimethylphenyl, or 2,4,6-tri(iso-propyl)phenyl.

In some embodiments of the metal-ligand complex of formula (I), at least one of $R^{4a}$, $R^{5a}$, $R^{6a}$, $R^{7a}$ is halogen and at least one of $R^{4b}$, $R^{5b}$, $R^{6b}$, and $R^{7b}$ is halogen. In various embodiments, at least two of $R^{4a}$, $R^{5a}$, $R^{6a}$, $R^{7a}$ are halogen and at least two of $R^{4b}$, $R^{5b}$, $R^{6b}$, and $R^{7b}$ are halogen. In some embodiments, at least three of $R^{4a}$, $R^{5a}$, $R^{6a}$, $R^{7a}$ are halogen and at least three of $R^{4b}$, $R^{5b}$, $R^{6b}$, and $R^{7b}$ are halogen.

In one or more embodiments of the metal-ligand complex of formula (I), Q is (—$CH_2Si(R_Q)_2CH_2$—), (—$CH_2CH_2Si(R_Q)_2CH_2CH_2$—), (—$CH_2Ge(R_Q)_2CH_2$—), or (—$CH_2CH_2Ge(R_Q)_2CH_2CH_2$—), where $R_Q$ is $(C_1$-$C_5)$alkyl. In various embodiments, Q is benzene-1,2-diyl or cyclohexane-1,2-diyl. In some embodiments, Q is (—$CH_2Si(R_Q)_2CH_2$—) or (—$CH_2Si(R_Q)_2CH_2$—), where $R_Q$ is ethyl or 2-propyl. In one or more embodiments, Q is benzene-1,2-diyldimethyl.

In one or more embodiments of the metal-ligand complex of formula (I), when Q is $(C_3$-$C_4)$alkylene, at least two of $R^{4a}$, $R^{5a}$, $R^{6a}$, $R^{7a}$, $R^{4b}$, $R^{5b}$, $R^{6b}$, and $R^{7b}$ are selected from the group consisting of $(C_6$-$C_{50})$aryl, $(C_4$-$C_{50})$heteroaryl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, —$P(O)(R^P)_2$, $R^CS(O)_2$—, $(R^C)_2C$═N—, $R^CC(O)O$—, $R^COC(O)$—, $R^CC(O)N(R^N)$—, $(R^C)_2NC(O)$—, and halogen.

In one or more embodiments of the metal-ligand complex of formula (I), each Y is —O—, —S—, or —$N(R^N)$—. In some embodiments, Y is oxygen.

In one or more embodiments, the polymerization processes of this disclosure include contacting propylene and/or one or more $(C_4$-$C_{12})\alpha$-olefins in a reactor in the presence of a catalyst system and a chain transfer agent or chain shuttling agent. The polymerization process includes a mixture or reaction product of: (A) a procatalyst comprising a metal-ligand complex having a structure of formula (I) and a cocatalyst; (B) an olefin polymerization catalyst characterized as having a comonomer selectivity different from the procatalyst of (A); and (C) the chain transfer agent or chain shuttling agent.

As used herein, the term "chain transfer agent" refers to a molecule that can transfer polymer chains between two distinct catalysts in a single polymerization reactor. Each catalyst in the reactor may have a different monomer selectivity. While the term "chain transfer agent" is similar to the term "chain shuttling agent", a person of skill in the art would recognize that a chain transfer agent may be used as a chain shuttling agent depending on the type of reactor and catalyst system. For example, chain shuttling occurs in a continuous reactor with a dual catalyst system. In this scenario, a chain shuttling agent is added to the catalyst systems of the polymerization reaction. In contrast, chain transfer occurs in a batch reactor with a single catalyst system, and therefore, a chain transfer agent is added into the catalyst system. However, the same molecule may be used as a chain transfer agent or a chain shuttling agent.

Typically, chain transfer agents comprise a first metal that is Al, B, or Ga, the first metal being in a formal oxidation state of +3; or a second metal that is Zn or Mg, the second metal being in a formal oxidation state of +2. Chain transfer agents are described in U.S. Patent Application Publication Number US 2007/0167315, which is incorporated herein by reference in its entirety.

In one or more embodiments of the polymerization process, the chain transfer agent, when present, may be chosen from diethylzinc, di(iso-butyl)zinc, di(n-hexyl)zinc, triethylaluminum, trioctylaluminum, triethylgallium, iso-butylaluminum bis(dimethyl(t-butyl)siloxane), iso-butylaluminum bis(di(trimethylsilyl)amide), n-octylaluminum di(pyridine-2-methoxide), bis(n-octadecyl) iso-butylaluminum, iso-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), ethylzinc (t-butoxide), dimethylmagnesium, dibutylmagnesium, and n-butyl-sec-butylmagnesium.

In illustrative embodiments, the catalyst systems may include a metal-ligand complex according to formula (I) and having the structure of any of Procatalysts 1-28:

Procatalyst 1

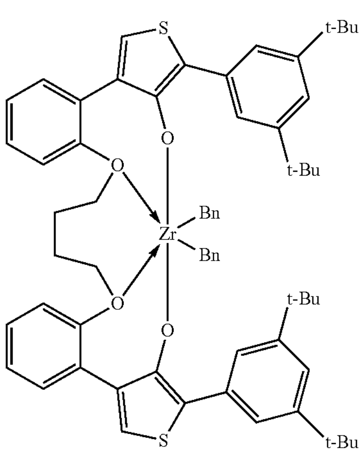

-continued

Procatalyst 2

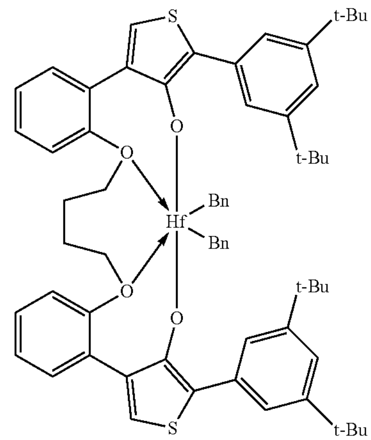

Procatalyst 3

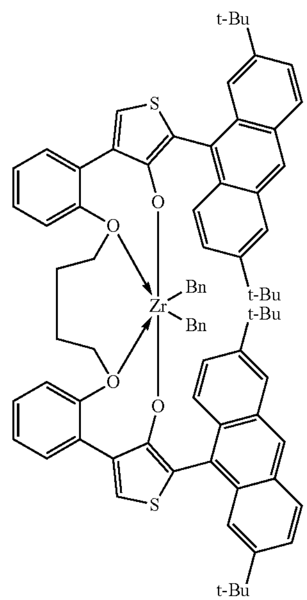

Procatalyst 4

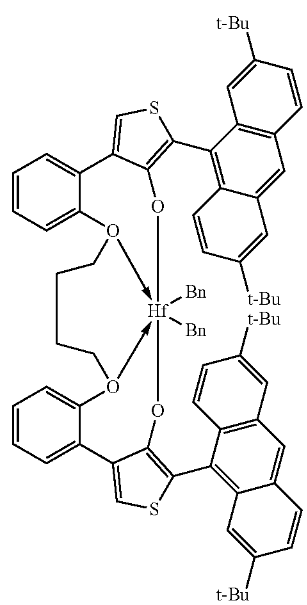

-continued
Procatalyst 5
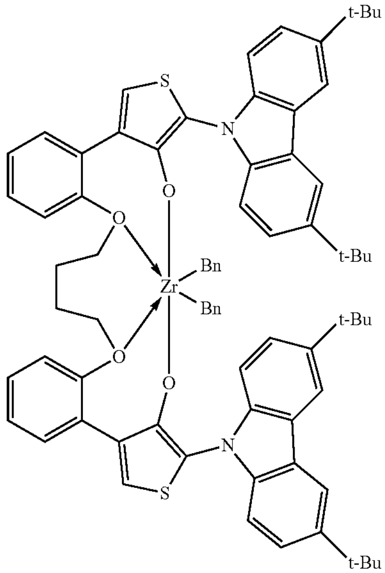
Procatalyst 6
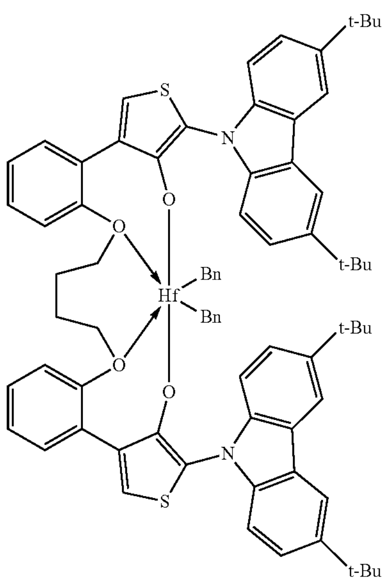
-continued
Procatalyst 7
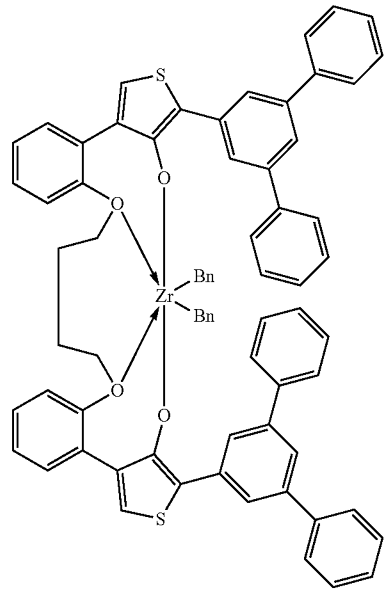
Procatalyst 8
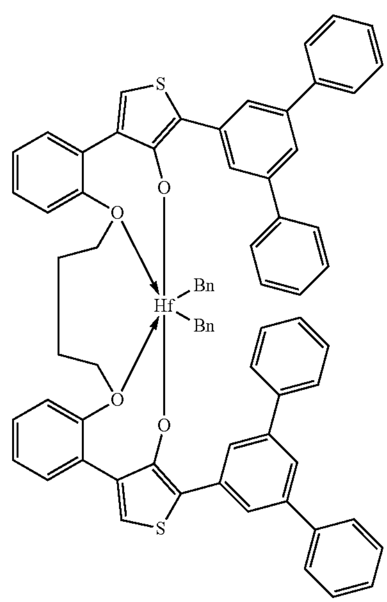

-continued
Procatalyst 9
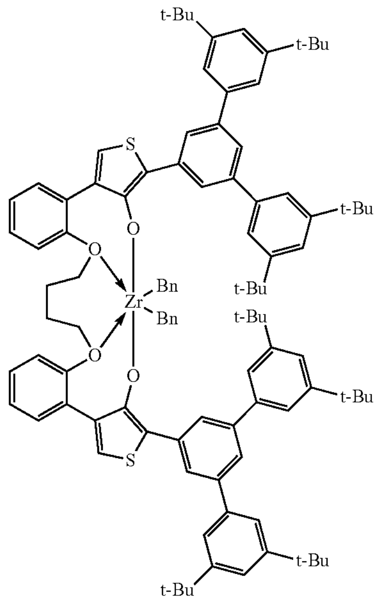
Procatalyst 10
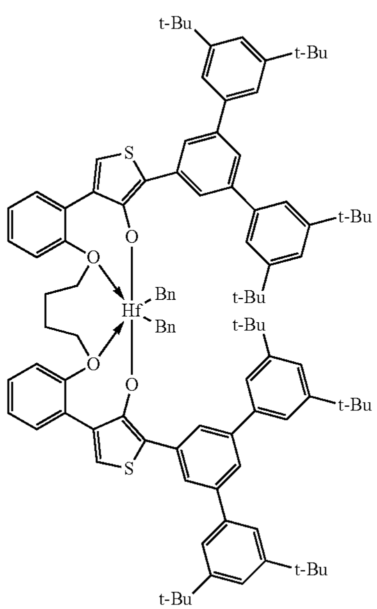
-continued
Procatalyst 11
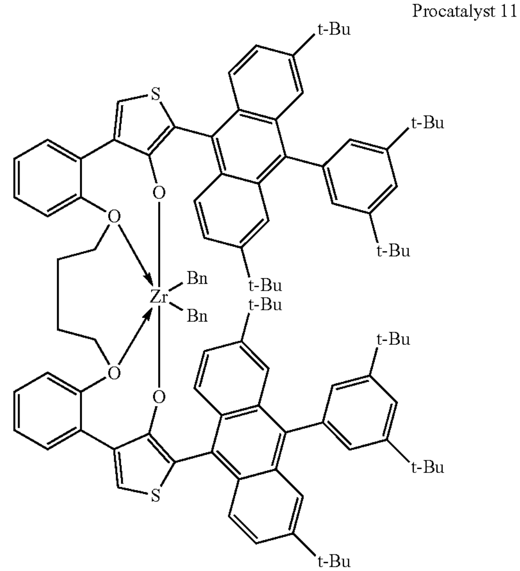
Procatalyst 12
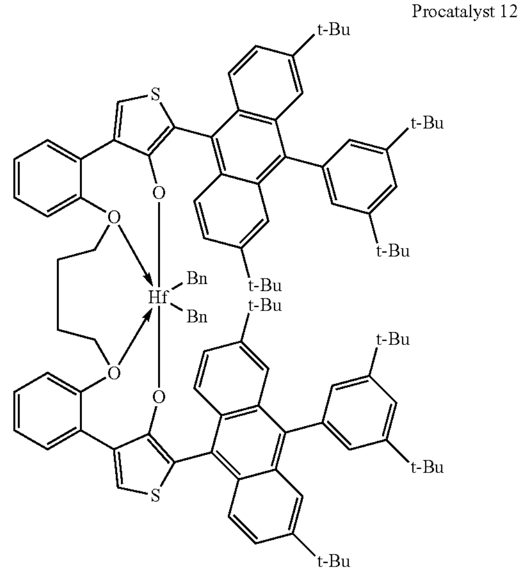

-continued
Procatalyst 13
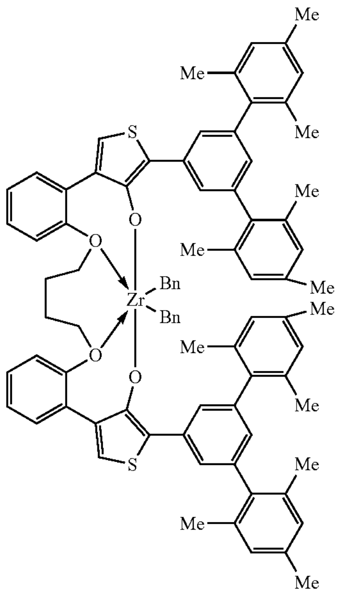
Procatalyst 14
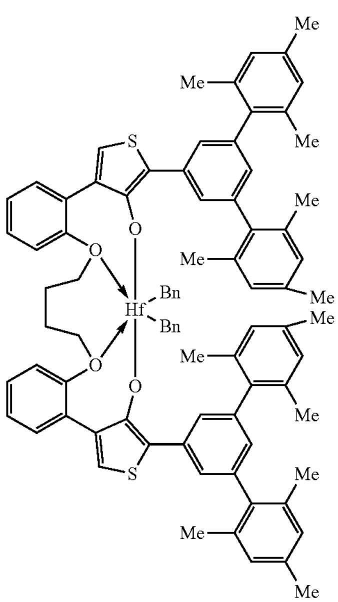
-continued
Procatalyst 15
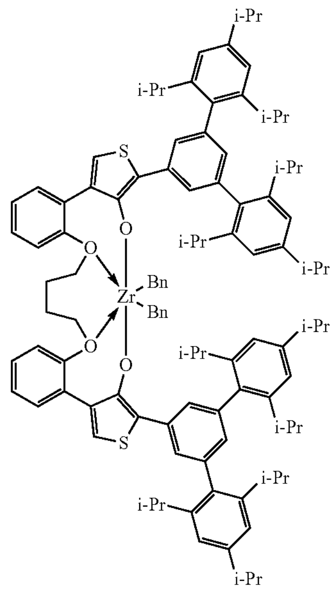
Procatalyst 16
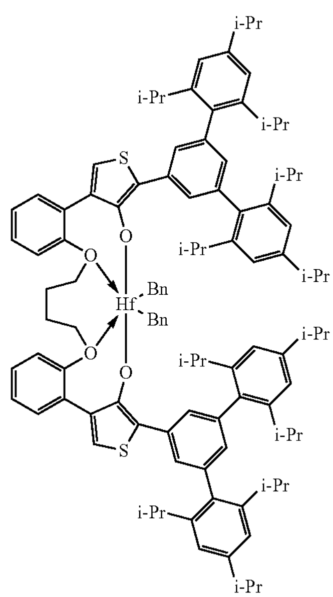

-continued
Procatalyst 17
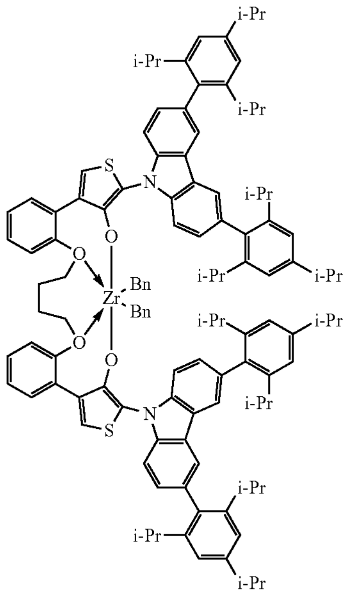
Procatalyst 18
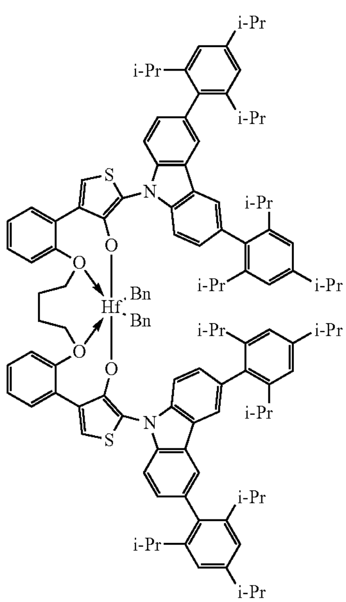
-continued
Procatalyst 19
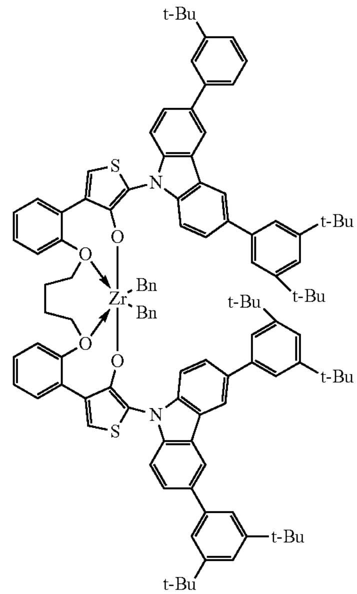
Procatalyst 20
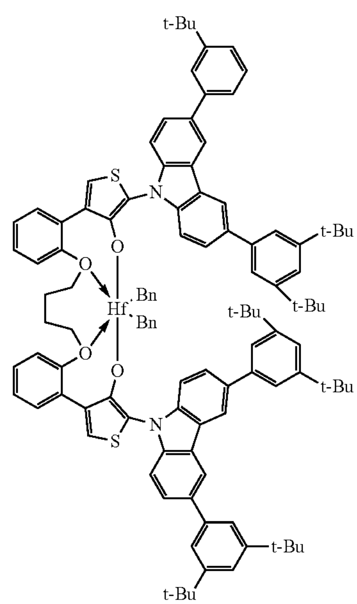

-continued
Procatalyst 21
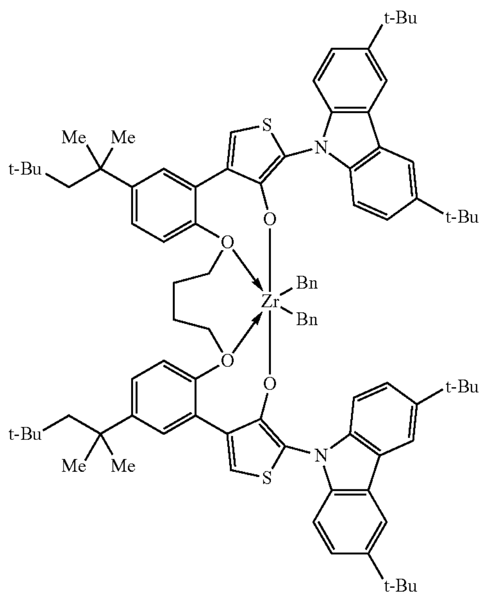
Procatalyst 22
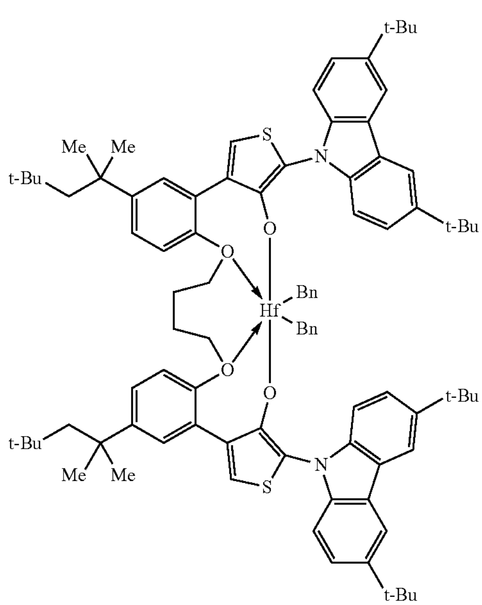
-continued
Procatalyst 23
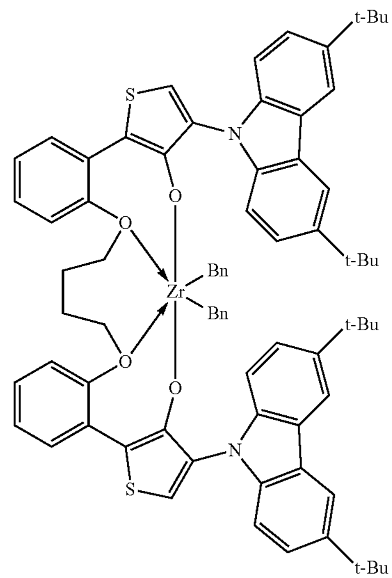
Procatalyst 24
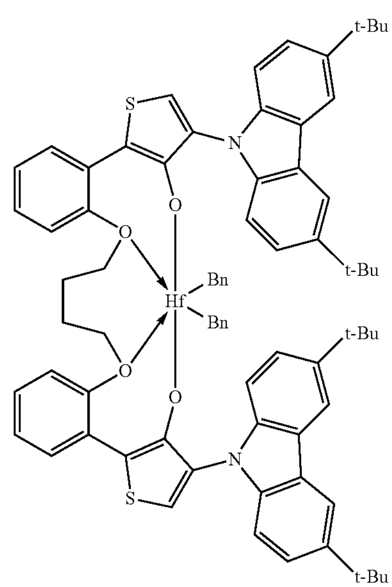

Procatalyst 25
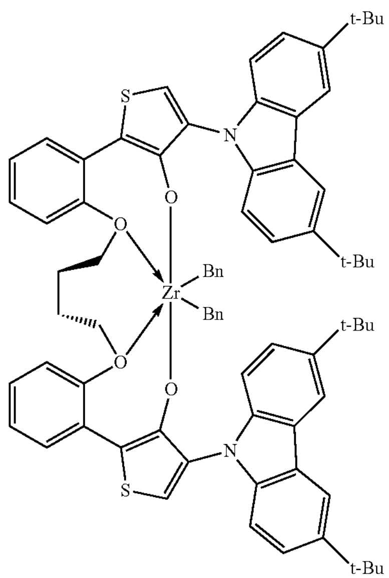
Procatalyst 26
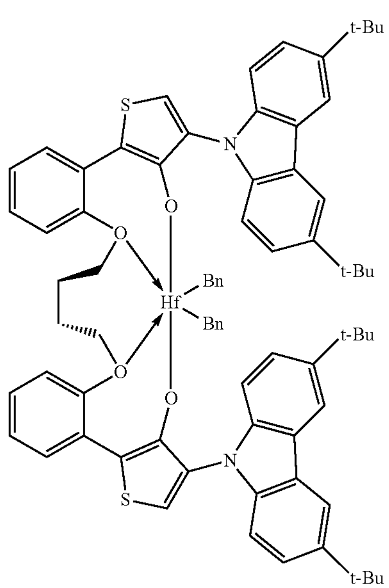
Procatalyst 27
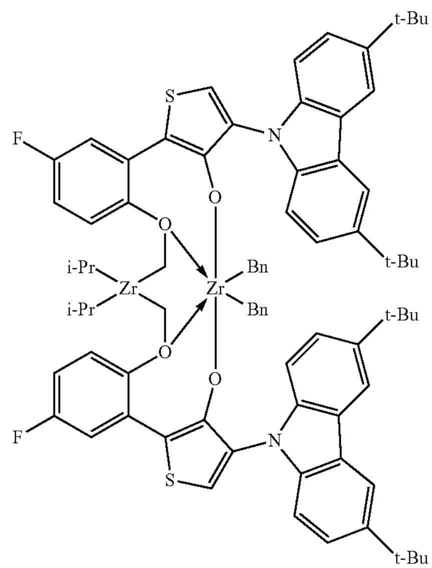
Procatalyst 28
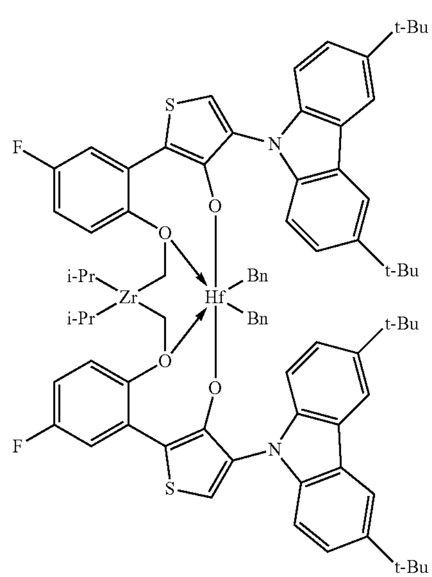

Procatalyst 29
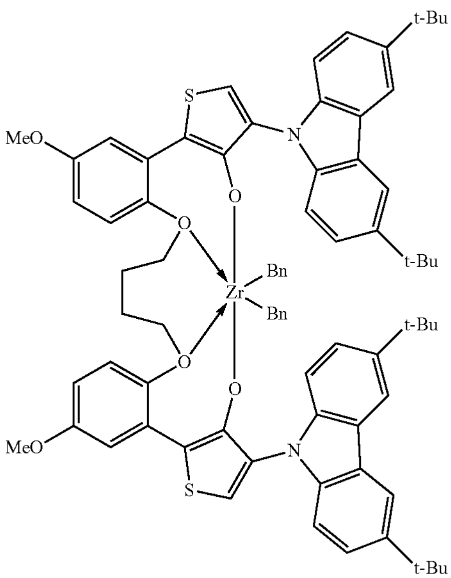
Procatalyst 30
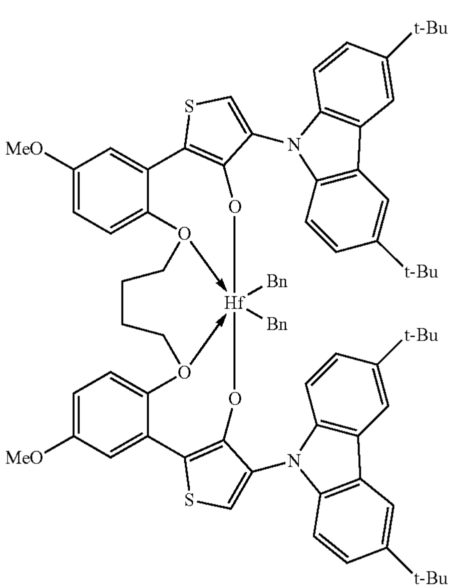
Procatalyst 31
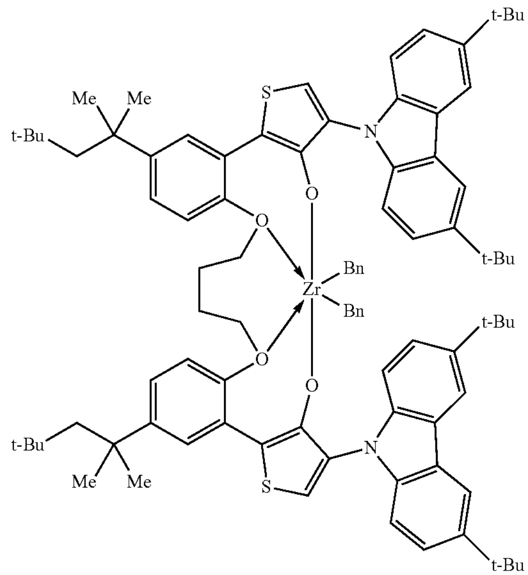
Procatalyst 32
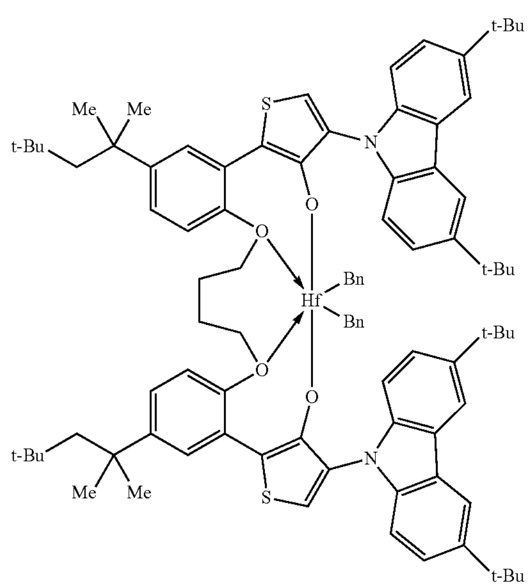

-continued
Procatalyst 33
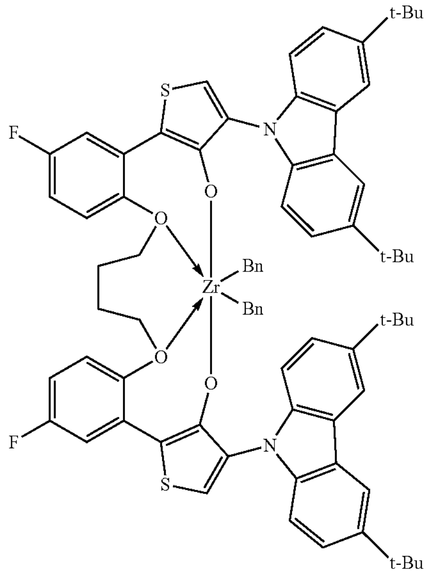
Procatalyst 34
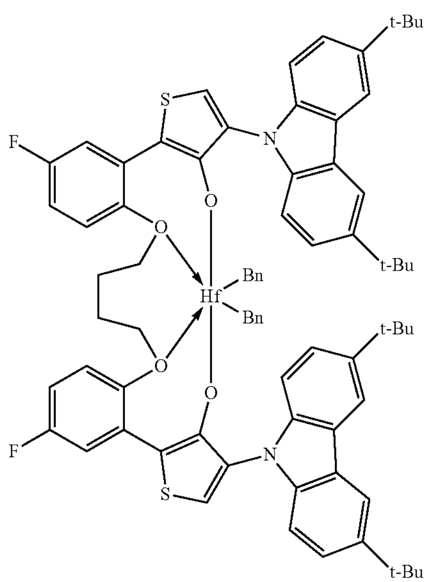
-continued
Procatalyst 35
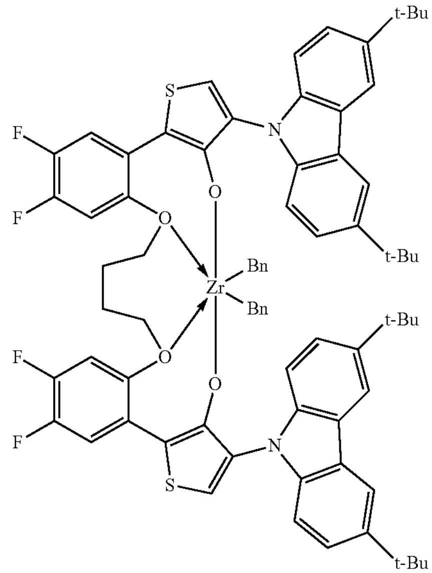
Procatalyst 36
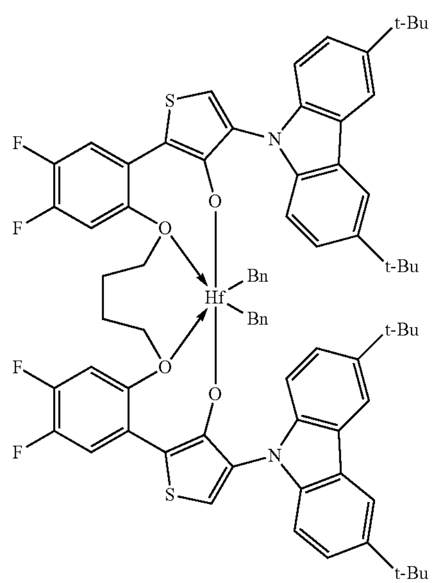

-continued
Procatalyst 37
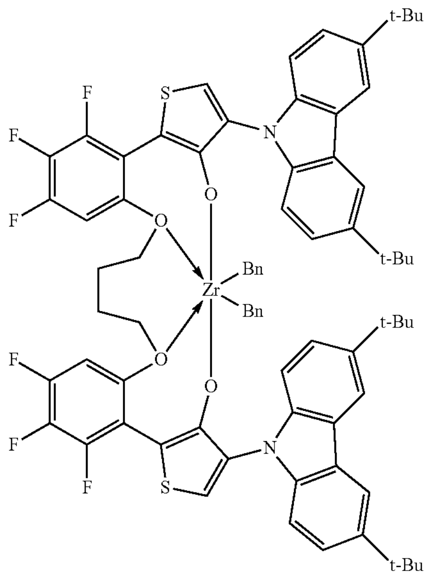
Procatalyst 38
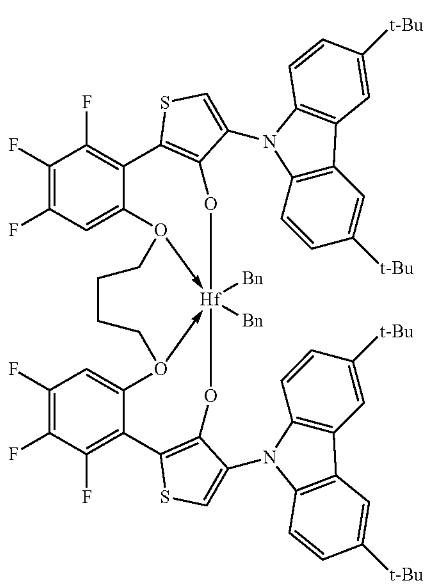
-continued
Procatalyst 39
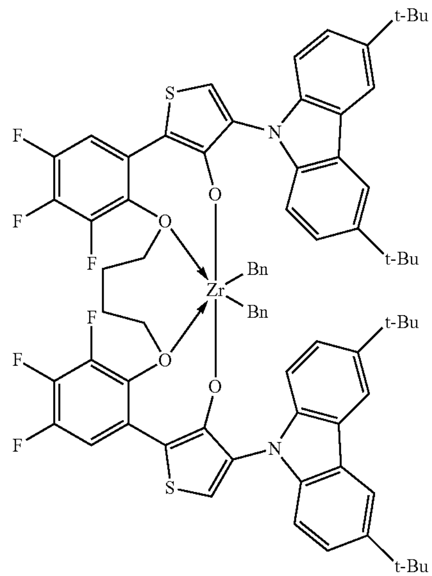
Procatalyst 40
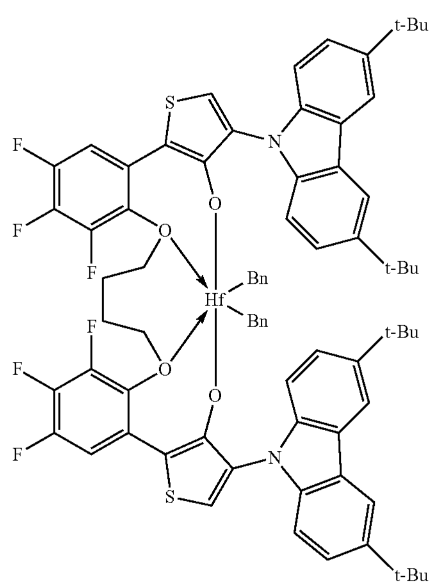

-continued
Procatalyst 41
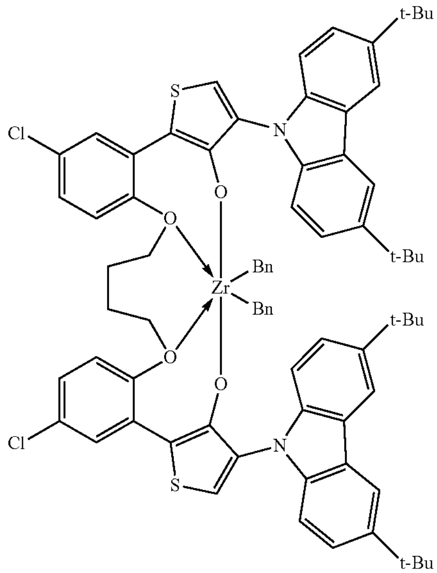
Procatalyst 42
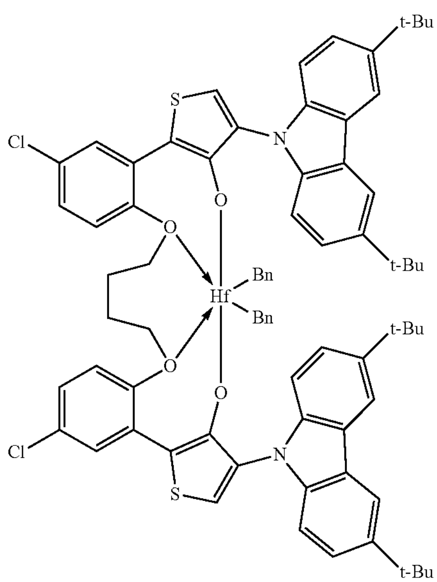
-continued
Procatalyst 43
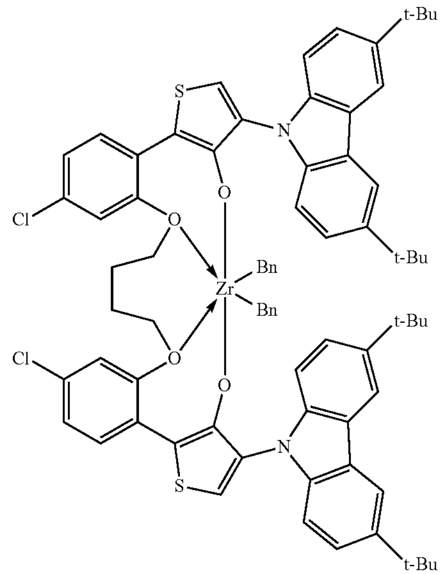
Procatalyst 44
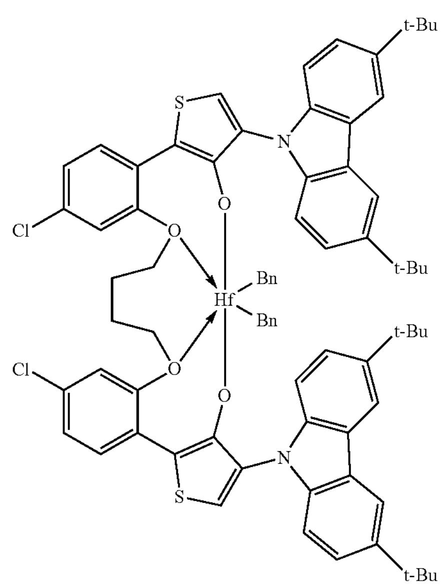

-continued
Procatalyst 45
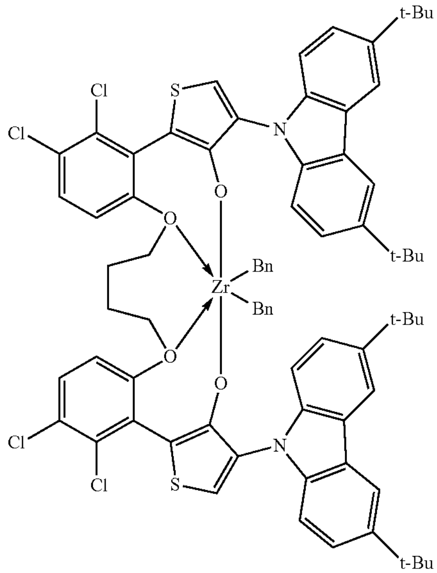
Procatalyst 46
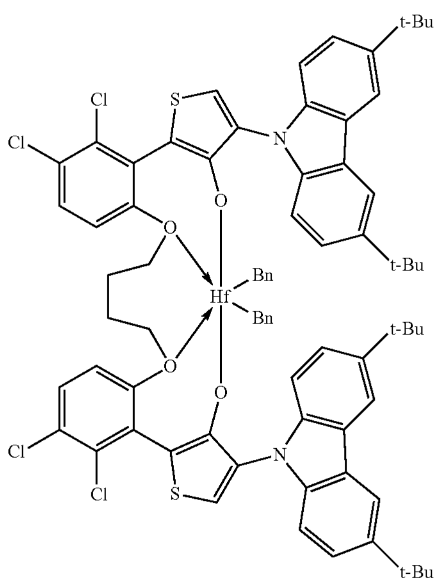
-continued
Procatalyst 47
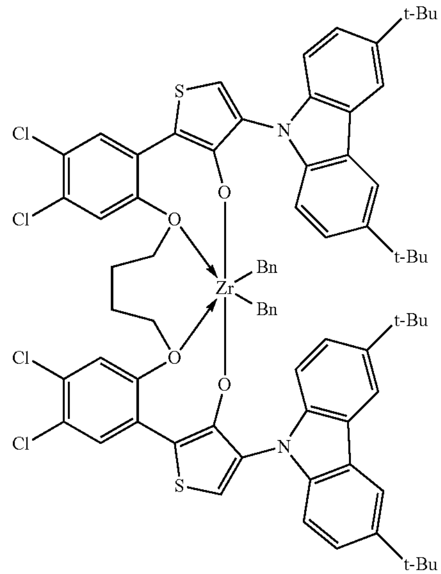
Procatalyst 48
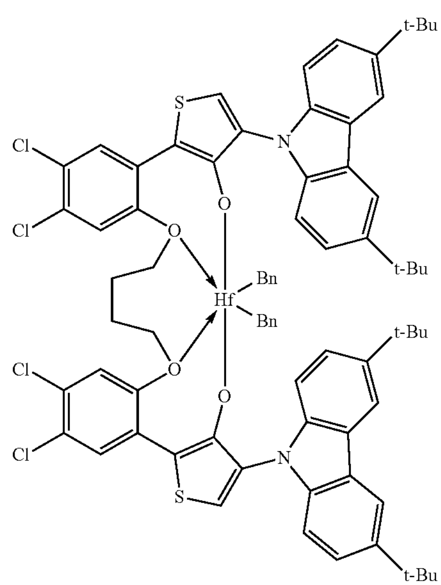

-continued

Procatalyst 49

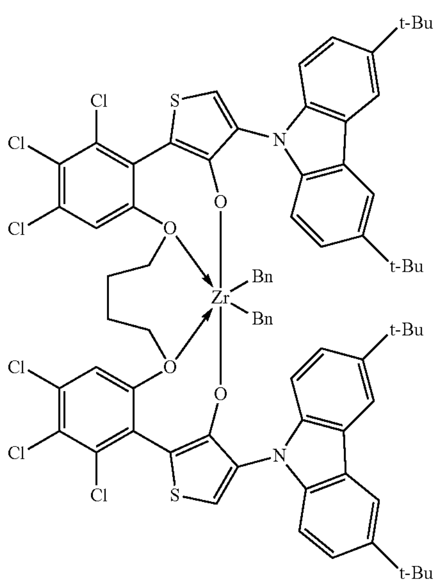

Procatalyst 50

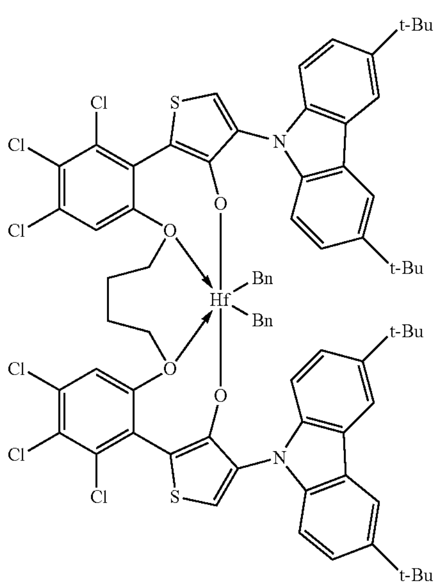

Cocatalyst Component

The catalyst system comprising a metal-ligand complex of formula (I) may be rendered catalytically active by any technique known in the art for activating metal-based catalysts of olefin polymerization reactions. For example, the procatalyst according to a metal-ligand complex of formula (I) may be rendered catalytically active by contacting the complex to, or combining the complex with, an activating co-catalyst. Additionally, the metal-ligand complex according to formula (I) includes both a procatalyst form, which is neutral, and a catalytic form, which may be positively charged due to the loss of a monoanionic ligand, such a benzyl, methyl, or phenyl. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activating co-catalysts include Group 13 metal compounds containing ($C_1$-$C_{20}$)hydrocarbyl substituents as described herein. In some embodiments, Group 13 metal compounds are tri(($C_1$-$C_{20}$)hydrocarbyl)-substituted-aluminum or tri(($C_1$-$C_{20}$)hydrocarbyl)-boron compounds. In other embodiments, Group 13 metal compounds are tri(hydrocarbyl)-substituted-aluminum, tri(($C_1$-$C_{20}$)hydrocarbyl)-boron compounds, tri(($C_1$-$C_{10}$)alkyl)aluminum, tri(($C_6$-$C_{18}$)aryl) boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris(($C_1$-$C_{20}$)hydrocarbyl borate (e.g. trityl tetrafluoroborate) or a tri(($C_1$-$C_{20}$)hydrocarbyl)ammonium tetra(($C_1$-$C_{20}$)hydrocarbyl)borane (e.g. bis(octadecyl)methylammonium tetrakis(pentafluorophenyl)borane). As used herein, the term "ammonium" means a nitrogen cation that is a (($C_1$-$C_{20}$)hydrocarbyl)$_4N^+$ a (($C_1$-$C_{20}$)hydrocarbyl)$_3N(H)^+$, a (($C_1$-$C_{20}$)hydrocarbyl)$_2N(H)_2$, ($C_1$-$C_{20}$)hydrocarbylN(H)$_3^+$, or N(H)$_4$+, wherein each ($C_1$-$C_{20}$)hydrocarbyl, when two or more are present, may be the same or different.

Combinations of neutral Lewis acid activating co-catalysts include mixtures comprising a combination of a tri(($C_1$-$C_4$)alkyl)aluminum and a halogenated tri(($C_6$-$C_{18}$)aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane):(alumoxane) [e.g., (Group 4 metal-ligand complex):(tris(pentafluoro-phenylborane):(alumoxane)] are from 1:1:1 to 1:10:30, in other embodiments, from 1:1:1.5 to 1:5:10.

The catalyst system that includes the metal-ligand complex of formula (I) may be activated to form an active catalyst composition by combination with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis(pentafluorophenyl)borate(1-) amine, and combinations thereof.

In some embodiments, more than one of the foregoing activating co-catalysts may be used in combination with each other. A specific example of a co-catalyst combination is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl) borane in the reaction to the total number of moles of the one or more metal-ligand complexes of formula (I) in the reaction is from 0.5:1 to 10:1, from 1:1 to 6:1, or from 1:1 to 5:1. The remaining activating co-catalysts are generally employed in mole quantities approximately equal to the total mole quantities of the one or more metal-ligand complexes of formula (I).

Polyolefins

The catalytic systems previously described are utilized in the polymerization of olefins, primarily propylene. In some embodiments, there is only a single type of olefin or α-olefin in the polymerization process, creating a homopolymer. However, additional α-olefins may be incorporated into the polymerization process. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The propylene-based polymers, for example homopolymers and/or interpolymers (including copolymers) of propylene and optionally one or more co-monomers such as α-olefins, may comprise from at least 50 percent by weight monomer units derived from propylene. All individual values and subranges encompassed by "from at least 50 weight percent" are disclosed herein as separate embodiments; for example, the propylene based polymers, homopolymers and/or interpolymers (including copolymers) of propylene and optionally one or more co-monomers such as α-olefins may comprise at least 60 weight percent monomer units derived from propylene; at least 70 weight percent monomer units derived from propylene; at least 80 weight percent monomer units derived from propylene; or from 50 to 100 weight percent monomer units derived from propylene; or from 80 to 100 weight percent units derived from propylene.

In some embodiments, the propylene-based polymers may comprise at least 90 mole percent units derived from propylene. All individual values and subranges from at least 90 mole percent are included herein and disclosed herein as separate embodiments. For example, the propylene-based polymers may comprise at least 93 mole percent units derived from propylene; at least 96 mole percent units; at least 97 mole percent units derived from propylene; or in the alternative, from 90 to 100 mole percent units derived from propylene; from 90 to 99.5 mole percent units derived from propylene; or from 97 to 99.5 mole percent units derived from propylene.

In some embodiments of the propylene-based polymer produced by the polymerization system of this disclosure, the amount of additional α-olefin is less than 50 mol %; other embodiments include at least 0.5 mol % to 25 mol %; and in further embodiments the amount of additional α-olefin includes at least 5 mol % to 10 mol %. In some embodiments, the additional α-olefin is 1-octene.

The polymerization processes according to embodiments may include components, aspects, or apparatus from conventional polymerization processes for producing propylene-based polymers, provided the conventional processes further include a catalyst system including a metal-ligand complex according to formula (I) of this disclosure. Such conventional polymerization processes include, but are not limited to, solution polymerization processes, gas phase polymerization processes, slurry phase polymerization processes, and combinations thereof using one or more conventional reactors in parallel or in series. Such conventional reactors include loop reactors, isothermal reactors, fluidized bed gas phase reactors, stirred tank reactors, batch reactors, or any combinations thereof, for example.

In one embodiment, the propylene-based polymer may be produced via solution polymerization in a dual reactor system, for example a dual loop reactor system, wherein propylene and optionally one or more α-olefins are polymerized in the presence of the catalyst system, as described herein, and optionally, one or more co-catalysts. In another embodiment, the propylene-based polymer may be produced via solution polymerization in a dual reactor system, for example a dual loop reactor system, wherein propylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the propylene-based polymer may be produced via solution polymerization in a dual reactor system, for example a dual loop reactor system, wherein propylene and optionally one or more α-olefins are polymerized in the presence of the catalyst system, as described herein, in both reactors.

In another embodiment, the propylene-based polymer may be produced via solution polymerization in a single reactor system, for example a single loop reactor system, in which propylene and optionally one or more α-olefins are polymerized in the presence of the catalyst system, as described within this disclosure, and optionally one or more cocatalysts, as described in the preceding paragraphs.

The propylene-based polymers may further comprise one or more additives introduced into the reactor at a suitable stage during the polymerization process. Such additives include, but are not limited to, antistatic agents, color enhancers, dyes, lubricants, pigments, primary antioxidants, secondary antioxidants, processing aids. IV stabilizers, and combinations thereof. The propylene-based polymers may contain any amounts of additives. The propylene-based polymers may compromise from about 0 to about 10 percent by the combined weight of such additives, based on the weight of the propylene-based polymers and the one or more additives. The propylene-based polymers may further comprise fillers, which may include, but are not limited to, organic or inorganic fillers. The propylene-based polymers may contain from about 0 to about 20 weight percent fillers such as, for example, calcium carbonate, talc, or $Mg(OH)_2$, based on the combined weight of the propylene-based polymers and all additives or fillers. The propylene-based polymers may further be blended with one or more polymers to form a blend.

In some embodiments, a polymerization process for producing a propylene-based polymer may include polymerizing propylene and at least one additional α-olefin in the presence of a catalyst system, wherein the catalyst system incorporates at least one metal-ligand complex of formula (I). The polymer resulting from such a catalyst system that incorporates the metal-ligand complex of formula (I) may have a density according to ASTM D792 (incorporated herein by reference in its entirety) from 0.850 g/$cm^3$ to 0.950 g/$cm^3$, from 0.880 g/$cm^3$ to 0.920 g/$cm^3$, from 0.880 g/$cm^3$ to 0.910 g/$cm^3$, or from 0.880 g/$cm^3$ to 0.900 g/$cm^3$, for example.

In another embodiment, the polymer resulting from the catalyst system that includes the metal-ligand complex of formula (I) has a melt flow ratio ($I_{10}/I_2$) from 10 to 135, in which melt index $I_2$ is measured according to ASTM D1238 (incorporated herein by reference in its entirety) at 230° C. and 2.16 kg load, and melt index $I_{10}$ is measured according to ASTM D1238 at 230° C. and 10 kg load. In other embodiments the melt flow ratio ($I_{10}/I_2$) is from 10 to 100, and in others, the melt flow ratio is from 10 to 80.

In some embodiments, the polymer resulting from the catalyst system that includes the metal-ligand complex of formula (I) has a molecular-weight distribution (MWD) from 2.0 to 20, where MWD is defined as $M_w/M_n$ with $M_w$ being a weight-average molecular weight and $M_n$ being a number-average molecular weight. All individual values and subranges encompassed by "from 2.0 to 20" are disclosed herein as separate embodiments; for example, the polymers resulting from the catalyst system have a MWD from 2.0 to 6. Another embodiment includes a MWD from 2.0.5 to 4; and other embodiments include MWD from 2 to 3.

Embodiments of the catalyst systems described in this disclosure yield unique polymer properties as a result of the high molecular weights of the polymers formed and the amount of the co-monomers incorporated into the polymers.

EXPERIMENTAL PROCEDURES

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an XBridge C18 3.5 μm 2.1×50 mm column using a 5:95 to 100:0 acetonitrile to water gradient with 0.1% formic acid as the ionizing agent. HRMS analyses are performed using an Agilent 1290 Infinity LC with a Zorbax Eclipse Plus C18 1.8 μm 2.1×50 mm column coupled with an Agilent 6230 TOF Mass Spectrometer with electrospray ionization. $^1H$ NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1H$ NMR data are reported in ppm downfield from internal tetramethylsilane (TMS, 8 scale) using residual protons in the deuterated solvent as references. $^{13}C$ NMR data are determined with $^1H$ decoupling, and the chemical shifts are reported downfield from tetramethylsilane (TMS, δ scale) in ppm versus the using residual carbons in the deuterated solvent as references.

General Procedure for Parallel Pressure Reactor Screening Experiments

Polyolefin catalysis screening is performed in a high throughput parallel pressure reactor (PPR) system. The PPR system is composed of an array of 48 single-cell (6×8 matrix) reactors in an inert-atmosphere glovebox. Each cell is equipped with a glass insert with an internal working liquid volume of approximately 5 mL. Each cell has independent controls for pressure, and the liquid in the cell is continuously stirred at 800 rpm. Catalyst solutions, unless otherwise noted, are prepared by dissolving an appropriate amount of a procatalyst in toluene. All liquids (for example, solvent, chain shuttling agent solutions as appropriate to the experiment, and catalyst solutions) are added to the single-cell reactors via robotic syringes. Gaseous reagents (i.e. propylene, $H_2$) are added to the single-cell reactors via a gas injection port. Prior to each run, the reactors are heated to 80° C., purged with propylene, and vented.

A portion of Isopar-E is added to the reactors. The reactors are heated to the run temperature and pressured to the appropriate psig with propylene. Toluene solutions of reagents are added in the following order: (1) 500 nmol of scavenger MMAO-3A; (2) activator (cocatalyst-1, cocatalyst-2, etc, 1.50 eq with-respect-to precatalyst); and (3) catalyst.

Each liquid addition is chased with a small amount of Isopar-E so that after the final addition, a total reaction volume of 5 mL is reached. Upon addition of the catalyst, the PPR software begins monitoring the pressure of each cell. The pressure (within approximately 2-6 psig) is maintained by the supplemental addition of propylene gas by opening the valve at the set point minus 1 psi and closing it when the pressure reached 2 psi higher. All drops in pressure are cumulatively recorded as "Uptake" or "Conversion" of the propylene for the duration of the run or until the uptake or conversion requested value is reached, whichever occurs first. Each reaction is quenched with the addition of 10% carbon monoxide in argon for 4 minutes at 40-50 psi higher than the reactor pressure. A shorter "Quench Time" means that the catalyst is more active. In order to prevent the formation of too much polymer in any given cell, the reaction is quenched upon reaching a predetermined uptake level (70 psig for 110° C. runs). After all the reactions are quenched, the reactors are allowed to cool to 70° C. The reactors are vented, purged for 5 minutes with nitrogen to remove carbon monoxide, and the tubes are removed. The polymer samples are dried in a centrifugal evaporator at 70° C. for 12 hours, weighed to determine polymer yield, and submitted for IR (1-octene incorporation) and GPC (molecular weight) analysis.

HT-GPC Analysis

The molecular weight data is determined by analysis on a hybrid Symyx/Dow built Robot-Assisted Dilution High-Temperature Gel Permeation Chromatographer (Sym-RAD-GPC). The polymer samples are dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was diluted to 1 mg/mL immediately before the injection of a 250 μL aliquot of the sample. The GPC is equipped with two Polymer Labs PLgel 10 μm MIXED-B columns (300×10 mm) at a flow rate of 2.0 mL/minute at 160° C. Sample detection is performed using a PolyChar IR4 detector in concentration mode. A conventional calibration of narrow polystyrene (PS) standards is utilized with apparent units adjusted to homo-polypropylene (PP) using known Mark-Houwink coefficients for PS and PP in TCB at this temperature.

DSC Analysis

Differential scanning calorimetry (DSC) was used to measure the melting transitions ($T_M$) of each polypropylene sample. A Discovery DSC from TA Instruments was used for the DSC measurements. Samples were first heated from room temperature to 175° C. using the 'Jump To' feature. After being held at this temperature for 3 min, the samples were cooled to 0° C. at 30° C./min, and were then heated again to 175° C. at 10° C./min. $T_M$ values were measured from this second heating step.

EXAMPLES

Figure 2:
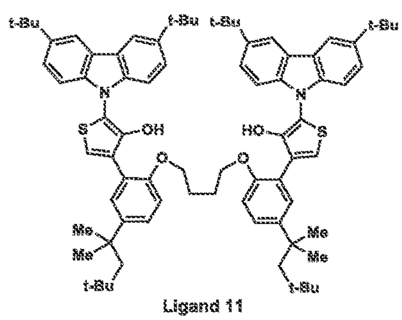
FIG. 2 depicts Ligand 11 to Ligand 19.
Figure 2:
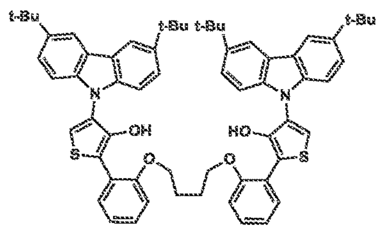
Figure 2:
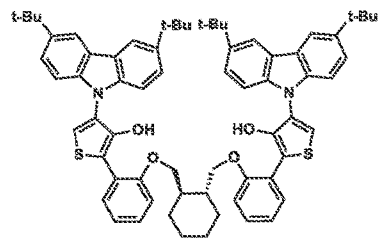
Figure 2:
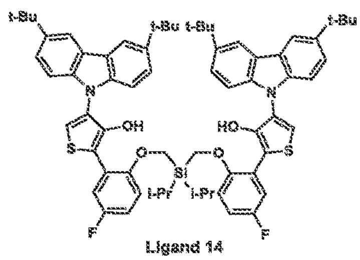
Figure 2:
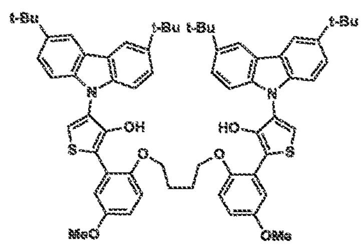
Figure 2:
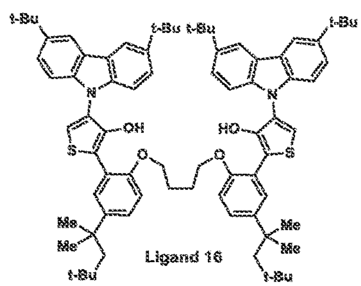
Figure 2:
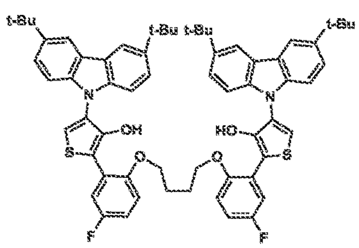
Figure 2:
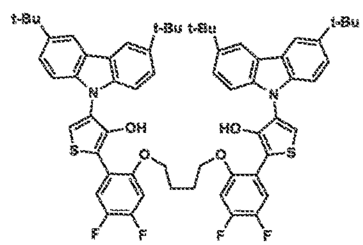
Figure 2:
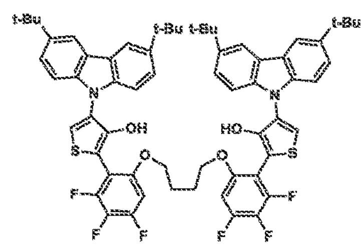
Figure 3:
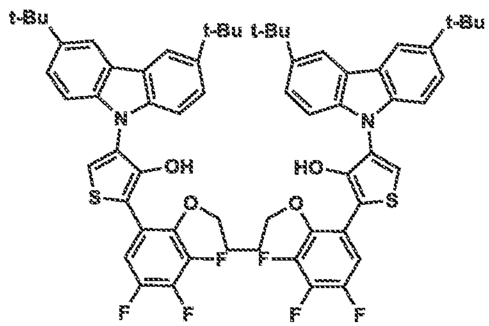
FIG. 3 depicts Ligand 20 to Ligand 25.
Figure 3:
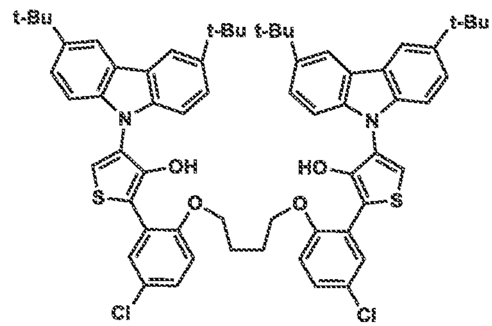
Figure 3:
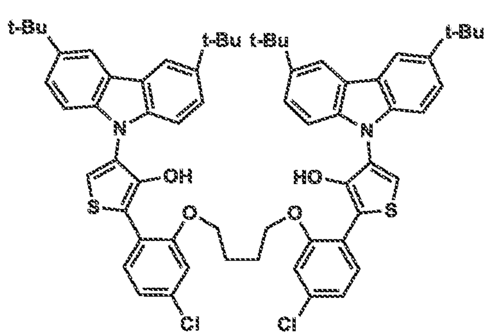
Figure 3:
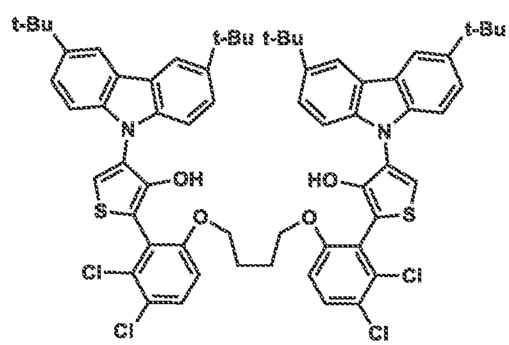
Figure 3:
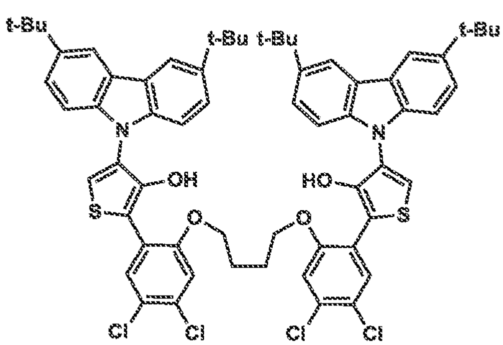
Figure 3:
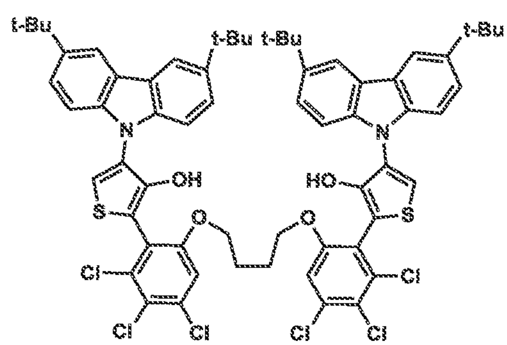
Figure 4:
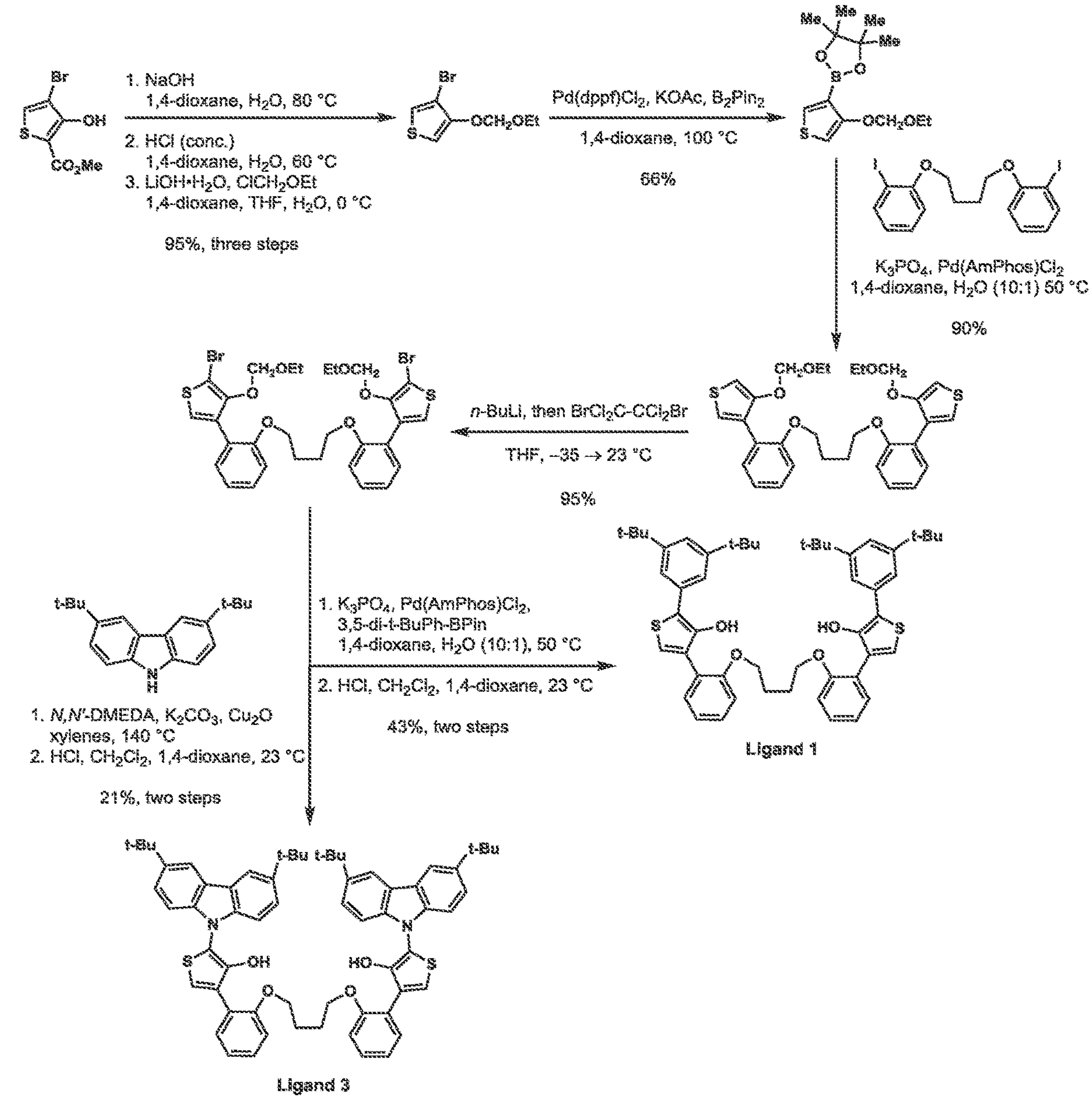
FIG. 4 depicts a three step synthetic scheme to synthesize the precursors to the ligands.
Figure 5:
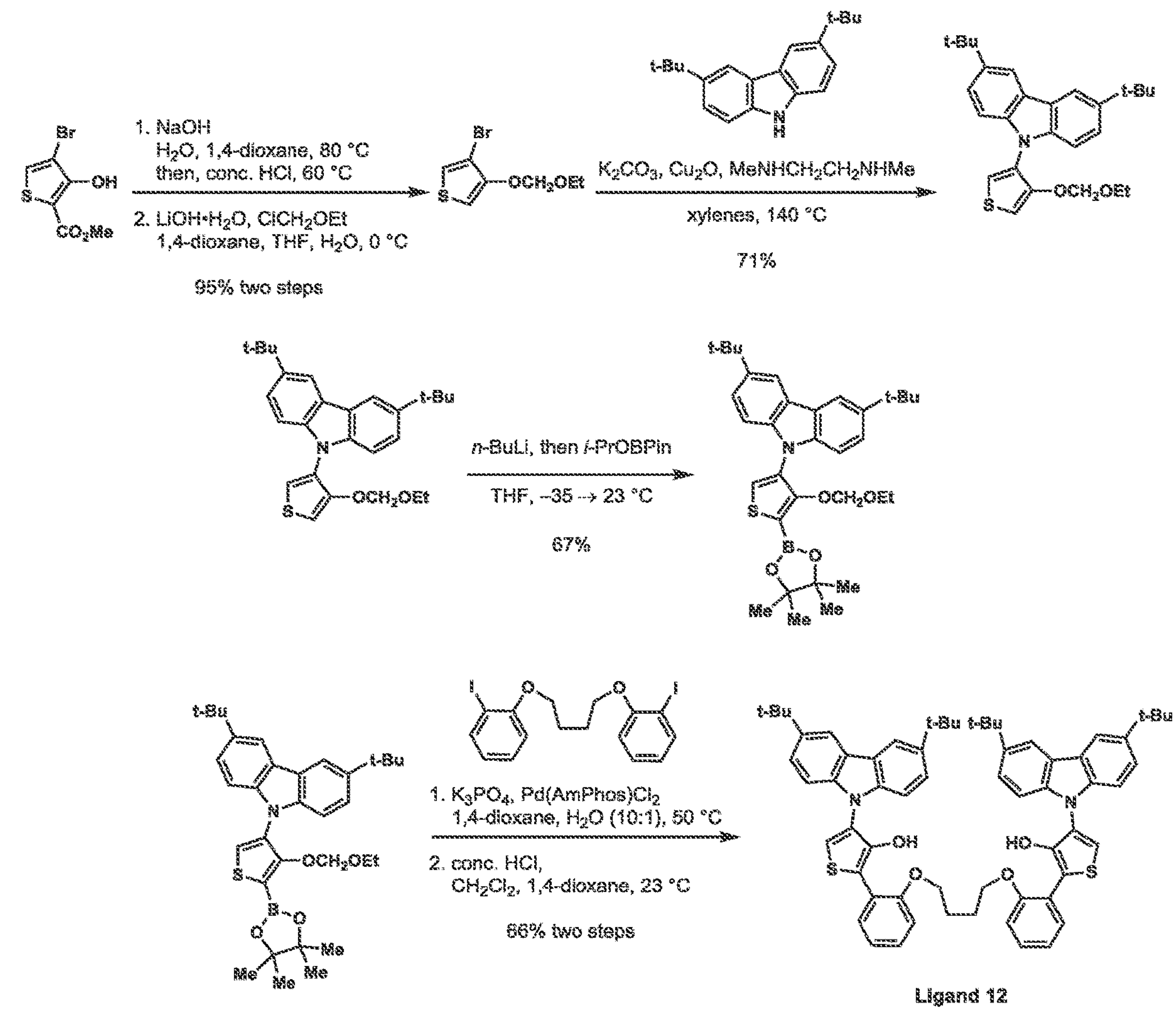
FIG. 5 depicts a three step synthetic scheme to synthesize the precursors to the ligands.

Examples 1 to 113 are synthetic procedures for intermediates of the ligands, ligands, and the isolated procatalysts. Procatalysts 1 to 50 were synthesized from the corresponding Ligands 1 to 25 which are presented in FIGS. 1 to 3. Ligands 1 to 25 were synthesised by a scheme shown in FIGS. 4 and 5.

Example 1: Synthesis of Hydroxy-Thiophene Intermediate

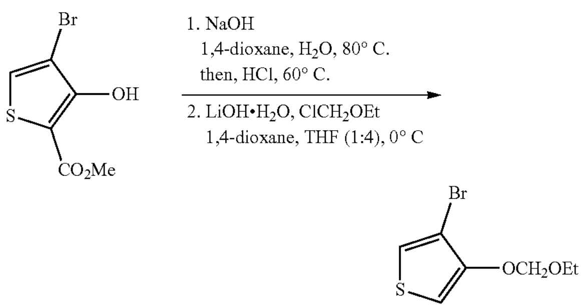

To a suspension of the hydroxythiopene (10.020 grams, 42.267 mmol, 1.00 eq) in 1,4-dioxane (100 mL) and $H_2O$ (450 mL) under nitrogen was added NaOH (50.000 g, 1.250 mol, 29.6 eq) all at once. The now pale yellow mixture was equipped with a reflux condenser and placed in a mantle heated to 80° C. After stirring (500 rpm) for 2.5 hrs TLC of the now golden yellow solution indicated complete conversion of the starting thiophene to a lower Rr spot. The mixture was removed the mantle, allowed to gradually cool to 23° C., placed in an ice water bath for 60 mins, and concentrated HCl (125 mL, 37%) was added over 10 mins. The now white heterogeneous mixture was removed from the ice water bath, placed in a mantle heated to 60° C., stirred vigorously (1000 rpm) for 5 hrs, the now pale golden yellow solution was removed from the mantle, allowed to cool gradually to 23° C., diluted with $Et_2O$ (100 mL), stirred vigorously for 2 mins, poured into a separatory funnel, partitioned, organics were washed with aqueous HCl (2×100 mL, 1 N), residual organics were extracted from the aqueous layer using $Et_2O$ (2×50 mL), dried over solid $Na_2SO_4$, decanted, and the $Et_2O$ was removed via rotary evaporation to afford the crude bromo-hydroxythiophene as a solution in 1,4-dioxane (100 mL). An aliquot was removed, fully concentrated in vacuo, and NMR indicated pure product which exists as a mixture of tautomers. The material is used in the subsequent experiment without concentration or purification.

The clear pale yellow solution of the hydroxythiophene in 1,4-dioxane (100 mL, from above) was diluted with non-anhydrous, non-deoxygenated THF (400 mL), $H_2O$ (6 mL) was added, the solution was placed in an ice water bath, sparged with nitrogen for 1 hr, placed under a positive flow of nitrogen upon which solid lithium hydroxide-monohydrate (3.544 g, 84.453 mmol, 2.00 eq) was added. The mixture changed to a dark red-brown solution, stirred vigorously (1000 rpm) for 1 hr upon which neat chloromethylethyl ether (11.8 mL, 126.80 mmol, 3.00 eq) was added via syringe in a quick dropwise manner. After stirring for 2 hrs at 0° C. the dark brown solution was diluted aqueous NaOH (200 mL, 1 N), stirred for 2 mins, THF was removed in vacuo, the biphasic mixture was diluted with $CH_2Cl_2$ (100 mL), suction filtered over a pad of celite, rinsed with $CH_2Cl_2$ (4×50 mL), the dark brown filtrate mixture was poured into a separatory funnel, partitioned, organics were washed with aqueous NaOH (2×100 mL, 1 N), residual organics were extracted from the aqueous using $CH_2Cl_2$ (2×50 mL), combined, dried over solid $Na_2SO_4$, decanted, and carefully concentrated to afford a golden brown oil which was diluted with $CH_2Cl_2$ (25 mL), suction filtered over a pad of silica gel, rinsed with $CH_2Cl_2$ (4×50 mL), and the filtrate was concentrated to afford the thiophene-ether as a golden yellow oil (9.534 g, 40.209 mmol, 95% two steps). NMR indicated product.

$^1H$ NMR (400 MHz, Chloroform-d) δ (8.34 (s, 1H)*), 7.12 (d, J=3.7 Hz, 1H), 6.43 (d, J=3.7 Hz, 1H), 5.49 (s, 1H), (3.72 (s, 2H)*). $^{13}C$ NMR (101 MHz, Chloroform-d) δ (210.23*), 195.46, 160.19, (149.69*), 121.43, (111.65*), (103.07*), 100.24, (37.05*).

Example 2: Synthesis of Boropinacolate Intermediate

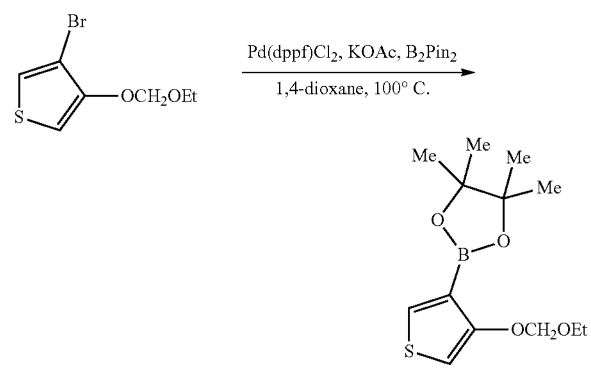

Prior to use, the bromothiophene was azeotropically dried using toluene (4×10 mL). In a nitrogen filled glovebox, to a flask equipped with a stirbar was charged with the bromothiophene (7.411 g, 31.255 mmol, 1.00 eq), KOAc (9.203 g, 93.766 mmol, 3.00 eq), $Pd(dppf)Cl_2$ (1.276 g, 1.563 mmol, 0.05 eq), and $B_2Pin_2$ (8.731 g, 34.381 mmol, 1.10 eq), and the solid mixture was then suspended in deoxygenated anhydrous 1,4-dioxane (250 mL). The flask was then placed in a mantle heated to 100° C. After stirring (1000 rpm) for 36 hrs the black mixture was removed from the mantle, allowed to cool gradually to 23° C., suction filtered over a pad of silica gel, washed with $CH_2Cl_2$ (4×20 mL), the clear dark grey/black filtrate was concentrated, residual 1,4-dioxane was removed azeotropically using toluene (3×10 mL), the black mixture was then suspended in hexanes (50 mL), stirred vigorously (1000 rpm) for 20 mins, suction filtered over celite, rinsed with hexanes (4×20 mL), the resultant pale red-orange filtrate solution was concentrated, diluted with $CH_2Cl_2$ (10 mL), suction filtered over silica gel, washed with $CH_2Cl_2$ (4×20 mL), and concentrated to afford the boropinacolate thiophene as a red-orange amorphous oil (8.303 g, 20.745 mmol, 66%, 71% pure by NMR). NMR indicated product with residual $B_2Pin_2$ and the protodebrominated byproduct.

$^1$H NMR (400 MHz, Chloroform-d) δ 7.71 (d, J=3.2 Hz, 1H), 6.55 (d, J=3.2 Hz, 1H), 5.17 (s, 2H), 3.74 (q, J=7.1 Hz, 3H), 1.30 (s, 12H), 1.21 (t, J=7.1 Hz, 3H). $^{13}$C NMR (126 MHz, Chloroform-d) δ 159.17, 135.96, 102.29, 94.95, 83.34, 64.16, 24.77, 15.14.

Example 3: Synthesis of Linked Iodophenyl Ether Intermediate

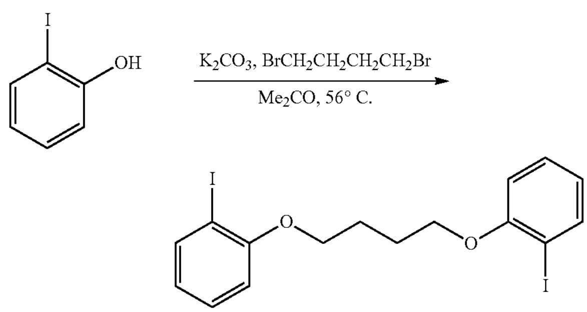

A white heterogeneous mixture of 2-iodophenol (2.000 g, 9.091 mmol, 2.00 eq), $K_2CO_3$ (2.513 g, 18.180 mmol, 4.00 eq), and 1,4-dibromobutane (0.54 mL, 4.545 mmol, 1.00 eq) in acetone (25 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with $CH_2Cl_2$ (50 mL), stirred for 2 mins, suction filtered over a pad of celite, rinsed with $CH_2Cl_2$ (4×20 mL), the resultant pale yellow filtrate was concentrated onto celite, and purified via silica gel chromatography using an ISCO chromatography purification system; 25% $CH_2Cl_2$ in hexanes to afford the iodophenyl ether as a white solid (2.024 g, 4.096 mmol, 90%). NMR indicated pure product.

$^1$H NMR (500 MHz, Chloroform-d) δ 7.77 (dd, J=7.8, 1.8 Hz, 2H), 7.34-7.22 (m, 2H), 6.83 (d, J=8.2 Hz, 2H), 6.70 (t, J=7.6 Hz, 2H), 4.14 (d, J=5.3 Hz, 4H), 2.17-2.06 (m, 4H). $^{13}$C NMR (126 MHz, Chloroform-d) δ 157.42, 139.39, 129.44, 129.43, 122.42, 112.11, 112.09, 86.68, 68.61, 26.04.

Example 4: Synthesis of the Precursor to Ligands 1-10

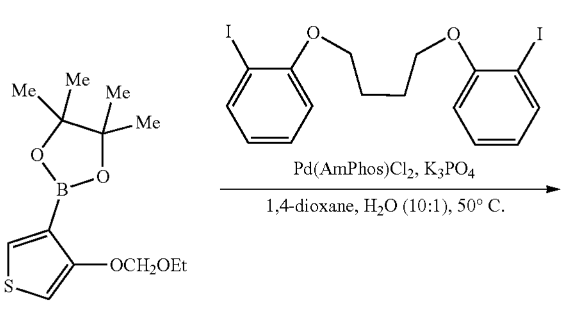

-continued

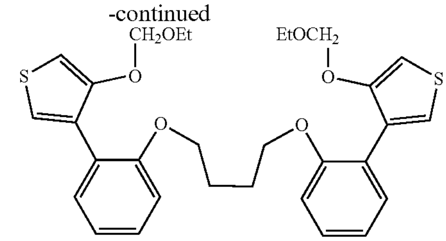

A mixture of the thiophene (1.512 g, 5.321 mmol, 3.00 eq), $K_3PO_4$ (3.389 g, 15.966 mmol, 9.00 eq), Pd(AmPhos)$Cl_2$ (0.251 g, 0.3548 mmol, 0.20 eq), and the bisphenyliodide (0.876 g, 1.774 mmol, 1.00 eq). The mixture was evacuated, then back-filled with nitrogen, this process was repeated 3× more, then deoxygenated 1,4-dioxane (18.0 mL) and deoxygenated water (1.8 mL) were added sequentially via syringe. The mixture was sealed with a PTFE cap under a purging flow of nitrogen, and then placed in a mantle heated to 50° C. After stirring (1000 rpm) for 36 hrs the black mixture was removed from the mantle, allowed to cool gradually to 23° C., suction filtered over a pad of silica gel, washed with $CH_2Cl_2$ (4×20 mL), the clear dark grey/black filtrate was concentrated onto celite, and purified via silica gel chromatography via an ISCO chromatography purification system; 25%-75% $CH_2Cl_2$ in hexanes to afford the bisthiophene as a pale golden yellow foam (0.712 g, 1.284 mmol, 72%). NMR indicated pure product.

$^1$H NMR (500 MHz, Chloroform-d) δ 7.42 (dd, J=7.5, 1.8 Hz, 2H), 7.27-7.25 (m, 4H), 6.98 (td, J=7.5, 1.1 Hz, 2H), 6.90 (dd, J=8.3, 1.1 Hz, 2H), 6.66 (d, J=3.5 Hz, 2H), 5.11 (s, 4H), 3.96-3.91 (m, 4H), 3.67 (q, J=7.1 Hz, 4H), 1.82-1.77 (m, 4H), 1.20 (t, J=7.1 Hz, 6H). $^{13}$C NMR (126 MHz, Chloroform-d) δ 156.34, 153.36, 131.07, 129.85, 128.54, 123.97, 123.12, 120.29, 112.42, 100.80, 94.89, 68.02, 64.11, 26.01, 15.10.

Example 5: Synthesis of the Precursor to Ligands 1-10

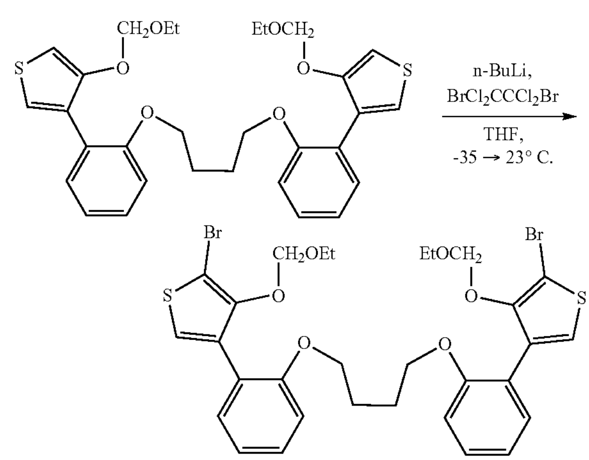

The bisthiophene was azeotropically dried using PhMe (4×10 mL) prior to use. A clear colorless solution of the thiophene (475.0 mg, 0.8563 mmol, 1.00 eq) in deoxygenated anhydrous THF (15 mL) in a nitrogen filled glovebox was placed in a freezer cooled to −35° C. for 12 hrs upon which a precooled solution of n-BuLi (1.00 mL, 2.569 mmol, 3.00 eq, titrated 2.50 M in hexanes) was added via syringe in a dropwise manner. The now golden yellow-orange mixture was allowed to sit in the freezer for 4 hrs upon which it was removed and while stirring (500 rpm) solid 1,2-dibromotetrachloroethane (837.0 mg, 2.569 mmol, 3.00 eq) was added in a quick dropwise manner. After stirring for 2 hrs at 23° C. the now pale yellow heterogeneous mixture was removed from the glovebox, neutralized with aqueous phosphate buffer (50 mL, pH=8, 0.05 M), diluted with $CH_2Cl_2$ (30 mL) and brine (20 mL), poured into a separatory funnel, partitioned, organics were washed with a saturated aqueous mixture of phosphate buffer (pH=8, 0.05 M) and brine (2×40 mL, 1:1), residual organics were extracted from the aqueous layer using $CH_2Cl_2$ (2×20 mL), combined, dried over solid $Na_2SO_4$, decanted, concentrated onto celite, and purified via silica gel chromatography; 25%-75% $CH_2Cl_2$ in hexanes to afford the dibromothiophene as a pale golden yellow amorphous oil (544.0 mg, 0.7635 mmol, 89%). NMR indicated pure product.

$^1$H NMR (500 MHz, Chloroform-d) δ 7.37 (dd, J=7.5, 1.7 Hz, 2H), 7.28 (ddd, J=8.3, 7.4, 1.8 Hz, 2H), 7.22 (s, 2H), 6.97 (td, J=7.5, 1.1 Hz, 2H), 6.90 (dd, J=8.3, 1.1 Hz, 2H), 4.82 (s, 4H), 3.97-3.93 (m, 4H), 3.48 (q, J=7.1 Hz, 4H), 1.84-1.80 (m, 4H), 1.00 (t, J=7.1 Hz, 6H). $^{13}$C NMR (126 MHz, Chloroform-d) δ 156.31, 151.30, 132.47, 130.83, 129.15, 123.67, 122.86, 120.45, 112.30, 98.73, 97.05, 67.98, 65.09, 25.84, 14.81.

Example 6: Synthesis of Ligand 1

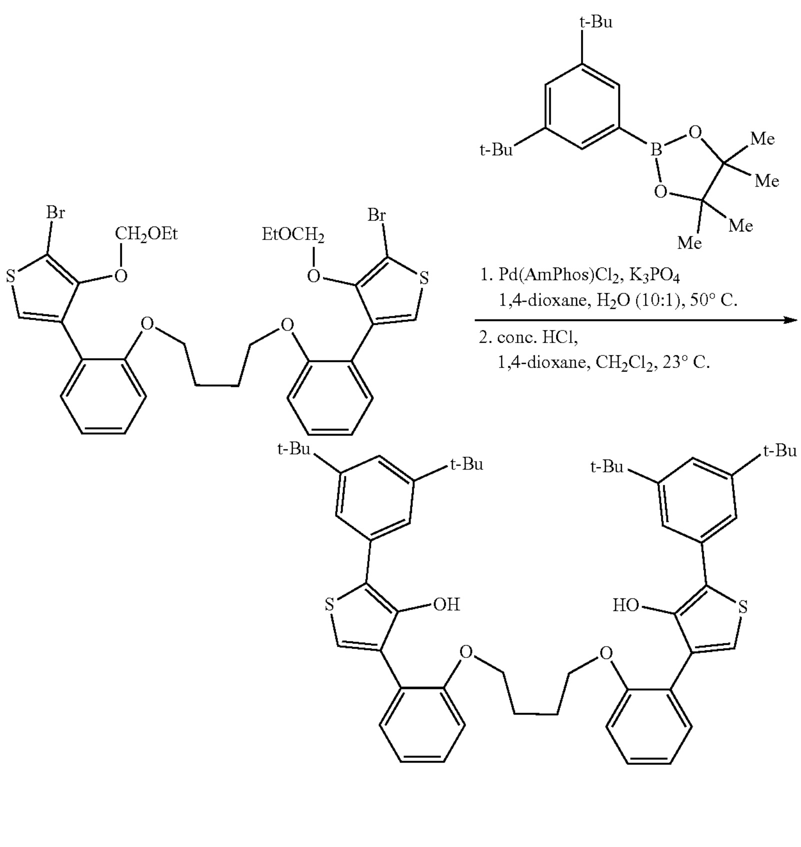

To vial equipped with a stirbar was added the dibromide (0.200 g, 0.2807 mmol, 1.00 eq), $K_3PO_4$ (0.715 g, 3.369 mmol, 12.0 eq), $Pd(AmPhos)Cl_2$ (40.0 mg, 0.0561 mmol, 0.20 eq), and the 3,5-di-tert-butylphenylboropinacolate (0.355 g, 1.123 mmol, 4.00 eq). The mixture was evacuated, then back-filled with nitrogen, this process was repeated 3× more, then deoxygenated 1,4-dioxane (6.0 mL) and water (0.6 mL) were added sequentially via syringe. The vial was sealed with a PTFE cap under a purging flow of nitrogen, and then placed in a mantle heated to 50° C. After stirring (1000 rpm) for 36 hrs the purple-black mixture was removed from the mantle, allowed to cool gradually to 23° C., suction filtered over a pad of silica gel, washed with $CH_2Cl_2$ (4×20 mL), the clear purple filtrate was concentrated onto celite, and purified via silica gel chromatography using an ISCO chromatography purification system; 25%-100% $CH_2Cl_2$ in hexanes to afford the bisprotected coupled 3,5-di-tert-butylphenylthiophene as a white foam (0.223 g, 0.2394 mmol, 85%). NMR indicated pure product.

To a solution of the protected bisthiophene in $CH_2Cl_2$ (5 mL) and 1,4-dioxane (5 mL) was added conc. HCl (5 mL). The dark golden brown solution was vigorously stirred (1000 rpm) at 23° C. for 24 hrs under nitrogen, then diluted with aqueous HCl (25 mL, 1 N) and $CH_2Cl_2$ (20 mL), the biphasic mixture was poured into a separatory funnel, partitioned, organics were washed with aqueous HCl (2×20 mL, 1 N), the residual organics were extracted from the aqueous layer using $CH_2Cl_2$ (2×10 mL), combined, dried over solid $Na_2SO_4$, decanted, concentrated onto celite, and purified via silica gel chromatography using an ISCO chromatography purification system; 25%-100% $CH_2Cl_2$ in hexanes to afford the bishydroxythiophene ligand as a white amorphous foam (98.5 mg, 0.1208 mmol, 51%, 43% two steps). NMR indicated pure product.

$^1$H NMR (500 MHz, Chloroform-d) δ 7.68 (d, J=1.7 Hz, 4H), 7.43 (dd, J=7.6, 1.7 Hz, 2H), 7.34 (t, J=1.8 Hz, 2H), 7.28 (ddd, J=8.2, 7.4, 1.7 Hz, 2H), 7.10-7.06 (m, 2H), 7.06 (s, 2H), 6.96 (s, 2H), 6.89 (dd, J=8.3, 1.2 Hz, 2H), 4.07-4.03

(m, 4H), 1.93-1.87 (m, 4H), 1.37 (s, 36H). $^{13}$C NMR (126 MHz, Chloroform-d) δ 154.10, 150.76, 147.57, 132.94, 132.75, 131.67, 129.30, 125.03, 122.75, 121.50, 120.75, 120.66, 119.41, 114.00, 69.64, 34.92, 31.48, 25.75.

Characterization of the Protected Ligand 1:

$^{1}$H NMR (500 MHz, Chloroform-d) δ 7.61 (d, J=1.8 Hz, 4H), 7.53 (dd, J=7.5, 1.8 Hz, 2H), 7.38 (t, J=1.8 Hz, 2H), 7.30-7.24 (m, 2H), 7.22 (s, 2H), 7.01 (td, J=7.4, 1.1 Hz, 2H), 6.94 (dd, J=8.3, 1.1 Hz, 2H), 4.66 (s, 4H), 4.05 (d, J=5.2 Hz, 4H), 3.16 (q, J=7.0 Hz, 4H), 1.99 (q, J=2.9 Hz, 4H), 1.39 (s, 36H), 0.72 (t, J=7.1 Hz, 6H). $^{13}$C NMR (126 MHz, Chloroform-d) δ 156.47, 150.82, 148.54, 133.49, 132.53, 131.07, 128.90, 128.73, 124.67, 122.47, 121.15, 120.86, 120.46, 112.51, 109.65, 97.06, 67.90, 64.69, 34.93, 31.50, 25.88, 14.55.

Example 7: Synthesis of Procatalyst 1

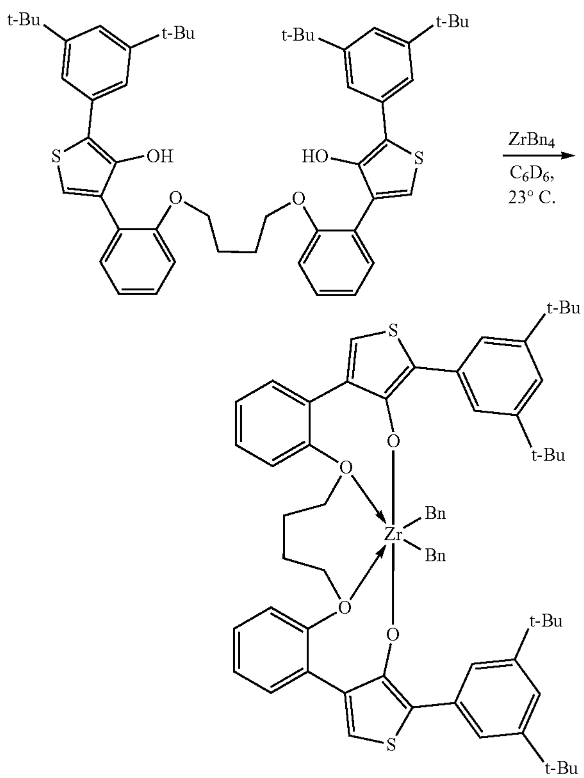

Ligand 1 was azeotropically dried using PhMe (4×10 mL) prior to use. To a solution of the thiophene (5.8 mg, 0.00711 mmol, 1.00 eq) in anhydrous $C_6D_6$ (1.28 mL) in a nitrogen filled glovebox at 23° C. was added a solution of $ZrBn_4$ (3.3 mg, 0.00711 mmol, 1.00 eq) in $C_6D_6$ (0.14 mL) in a dropwise manner. After stirring (500 rpm) for 45 mins the golden yellow solution was filtered using a 0.20 μm PTFE submicron filter to afford the zirconium complex as a 0.005 M solution in $C_6D_6$. The same procedure can be used with PhMe to prepare the procatalyst solution which is used directly after filtration for the polymerization experiments.

$^{1}$H NMR (500 MHz, Benzene-d$_6$) δ 7.78 (d, J=1.8 Hz, 4H), 7.56 (t, J=1.8 Hz, 2H), 7.20-7.17 (m, 2H), 7.12-7.11 (m, 2H), 6.99-6.95 (m, 2H), 6.90-6.82 (m, 4H), 6.76 (tt, J=7.4, 1.2 Hz, 2H), 6.69 (s, 2H), 6.63-6.58 (m, 4H), 5.92-5.87 (m, 2H), 4.17 (dd, J=11.9, 10.1 Hz, 2H), 3.51 (dd, J=11.8, 4.8 Hz, 2H), 1.33 (s, 36H), 1.32 (s, 4H), 0.77 (t, J=9.4 Hz, 2H), 0.46 (d, J=12.1 Hz, 2H). $^{13}$C NMR (126 MHz, Benzene-d$_6$) δ 155.93, 153.46, 151.24, 147.65, 134.39, 133.79, 131.53, 130.07, 128.15, 126.24, 123.51, 123.41, 121.75, 121.03, 120.83, 119.16, 80.99, 76.61, 34.72, 31.31, 26.86.

Example 8: Synthesis of Procatalyst 2

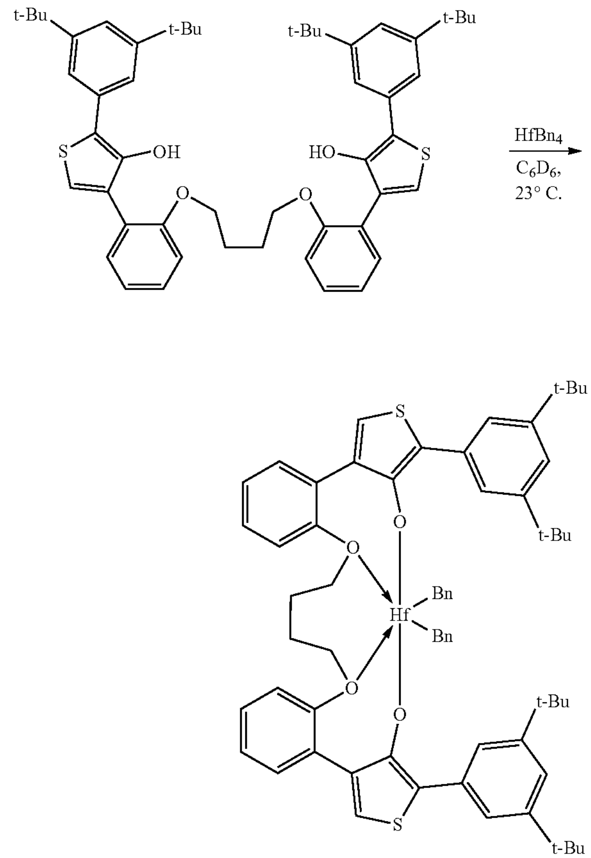

Ligand 1 was azeotropically dried using PhMe (4×10 mL) prior to use. To a solution of the thiophene (6.7 mg, 0.00822 mmol, 1.00 eq) in anhydrous $C_6D_6$ (1.48 mL) in a nitrogen filled glovebox at 23° C. was added a solution of $HfBn_4$ (4.5 mg, 0.00822 mmol, 1.00 eq) in $C_6D_6$ (0.18 mL) in a dropwise manner. After stirring (500 rpm) for 45 mins the golden yellow solution was filtered using a 0.20 μm PTFE submicron filter to afford the hafnium complex as a 0.005 M solution in $C_6D_6$. The same procedure can be used with PhMe to prepare the procatalyst solution which is used directly after filtration for the polymerization experiments.

$^{1}$H NMR (500 MHz, Benzene-d$_6$) δ 7.75 (d, J=1.9 Hz, 4H), 7.56 (t, J=1.8 Hz, 2H), 7.20-7.15 (m, 2H), 7.12 (td, J=1.7, 1.3, 0.7 Hz, 4H), 6.92-6.83 (m, 4H), 6.74 (tt, J=7.3, 1.3 Hz, 2H), 6.69 (s, 2H), 6.62-6.57 (m, 4H), 5.92 (dd, J=8.0, 1.4 Hz, 2H), 4.30-4.23 (m, 2H), 3.58 (dd, J=12.5, 4.9 Hz, 2H), 2.42 (d, J=12.7 Hz, 2H), 1.45 (d, J=12.8 Hz, 3H), 1.33 (s, 40H), 0.78 (t, J=9.6 Hz, 2H), 0.41 (d, J=11.4 Hz, 2H). $^{13}$C NMR (126 MHz, Benzene-d$_6$) δ 155.90, 153.51, 151.23, 147.91, 134.12, 133.72, 131.54, 130.05, 128.91, 126.83, 126.35, 123.60, 123.55, 121.72, 121.25, 121.21, 119.10, 81.77, 80.32, 34.71, 31.32, 27.04.

Example 9: Synthesis of Ligand 2

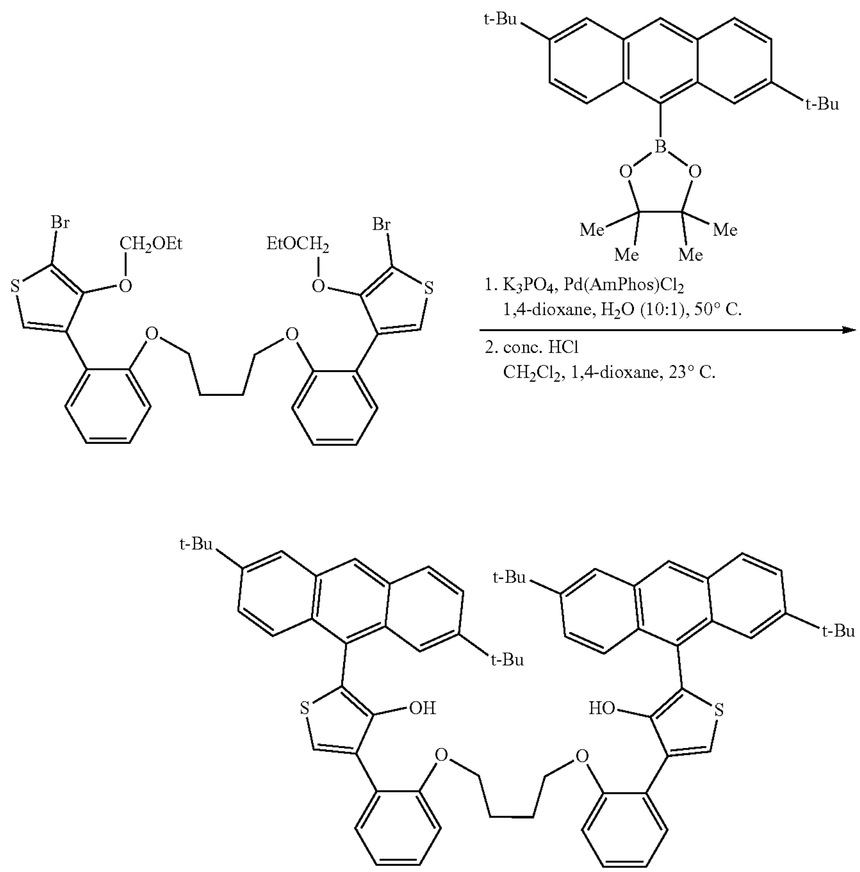

A mixture of the dibromide (200.0 mg, 0.2807 mmol, 1.00 eq), Pd(AmPhos)$Cl_2$ (40.0 mg, 0.0564 mmol, 0.20 eq), $K_3PO_4$ (536.0 mg, 2.526 mmol, 9.00 eq), and the boropinacolate ester (351.0 mg, 0.8421 mmol, 3.00 eq) was evacuated, back-filled with nitrogen, this process was repeated 4× more, then freshly sparged deoxygenated 1,4-dioxane (3.0 mL) and $H_2O$ (0.3 mL) were added sequentially. The canary yellow mixture was then placed in a mantle heated to 50° C., stirred vigorously (1000 rpm) for 24 hrs, the dark grey mixture was removed from the mantle, allowed to cool to ambient temperature, diluted with $CH_2Cl_2$ (20 mL), suction filtered over a pad of silica gel, rinsed with $CH_2Cl_2$ (4×20 mL), the resultant filtrate was concentrated onto celite, and purified via silica gel chromatography; 10% $CH_2Cl_2$-50% $CH_2Cl_2$ in hexanes and then purified again via silica gel chromatography; 35% $CH_2Cl_2$ in hexanes to afford the protected coupled product as an off-white foam (101.0 mg, 0.0893 mmol, 32%). NMR indicated pure product.

To a solution of the protected coupled bisthiophene (101.0 mg, 0.0893 mmol, 1.00 eq) in $CH_2Cl_2$ (5 mL) and 1,4-dioxane (5 mL) under nitrogen was added concentrated HCl (3 mL, 37% aqueous) via syringe. The golden yellow solution was stirred (500 rpm) for 16 hrs, diluted with aqueous HCl (10 mL, 1 N) and $CH_2Cl_2$ (10 mL), poured into a separatory funnel, partitioned, organics were washed with aqueous HCl (1×10 mL, 1 N), residual organics were extracted from the aqueous using $CH_2Cl_2$ (2×20 mL), combined, dried over solid $Na_2SO_4$, decanted, concentrated onto celite, and purified via silica gel chromatography; 10%-35% $CH_2Cl_2$ in hexanes to afford the bis-hydroxythiophene as a white foam (90.4 mg, 0.0890 mmol, 99%, 32% over two steps). NMR indicated pure product.

$^1$H NMR (500 MHz, Chloroform-d) δ 8.45 (s, 2H), 7.98 (d, J=8.9 Hz, 2H), 7.95-7.90 (m, 4H), 7.90-7.87 (m, 2H), 7.65-7.53 (m, 4H), 7.49 (ddd, J=9.2, 7.1, 2.0 Hz, 2H), 7.44 (d, J=3.6 Hz, 2H), 7.30-7.23 (m, 2H), 7.12 (t, J=7.5 Hz, 2H), 6.76 (d, J=8.2 Hz, 2H), 6.47 (d, J=6.4 Hz, 2H), 3.97-3.86 (m, 4H), 1.90-1.80 (m, 4H), 1.42 (s, 9H), 1.41 (s, 9H), 1.33 (s, 18H). $^{13}$C NMR (126 MHz, Chloroform-d) δ 154.35, 149.39, 147.73, 147.04, 131.88, 131.50, 131.35, 130.92, 130.67, 130.33, 129.08, 128.05, 127.32, 126.21, 125.47, 125.29, 124.90, 124.56, 122.81, 122.42, 122.41, 122.39, 120.76, 114.67, 114.65, 113.57, 113.53, 69.12, 69.08, 35.06, 30.97, 30.95, 30.91, 25.87, 25.83.

Characterization of the Protected Ligand:

$^1$H NMR (500 MHz, Chloroform-d) δ 8.44 (s, 2H), 8.04-7.96 (m, 4H), 7.97-7.88 (m, 4H), 7.64 (dd, J=7.6, 1.8 Hz, 2H), 7.59 (s, 2H), 7.57 (ddd, J=8.9, 6.4, 2.1 Hz, 4H), 7.30 (td, J=7.8, 1.8 Hz, 2H), 7.04 (td, J=7.4, 1.0 Hz, 2H), 7.01 (d, J=8.3 Hz, 2H), 4.42 (q, J=5.9 Hz, 4H), 4.14 (d, J=5.1 Hz, 4H), 2.64 (q, J=7.1 Hz, 4H), 2.13-2.05 (m, 4H), 1.44 (s, 18H), 1.39 (s, 18H), 0.42 (t, J=7.0 Hz, 6H). $^{13}$C NMR (126 MHz, Chloroform-d) δ 156.55, 151.02, 147.67, 147.12, 132.01, 132.00, 131.66, 131.28, 131.17, 130.66, 130.09, 128.68, 127.83, 127.19, 126.45, 125.91, 125.48, 124.74, 124.74, 124.55, 123.58, 122.52, 121.78, 121.21, 120.49, 112.51, 96.57, 68.04, 64.08, 35.10, 34.81, 30.97, 30.93, 29.72, 26.18, 14.17.

Example 10: Synthesis of Ligand 3

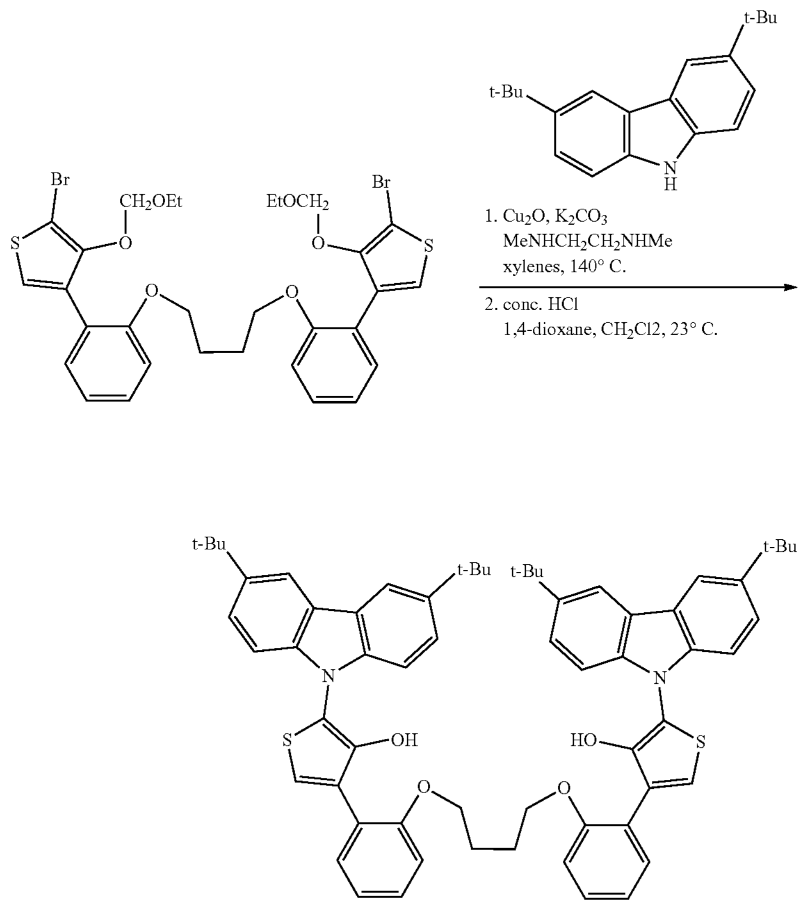

The dibromide was azeotropically dried using PhMe (4×10 mL) prior to use. A solid mixture of the dibromide (0.850 g, 1.193 mmol, 1.00 eq), 3,6-di-t-butylcarbazole (1.667 g, 5.965 mmol, 5.00 eq), $Cu_2O$ (0.854 g, 5.965 mmol, 5.00 eq), and $K_2CO_3$ (3.300 g, 23.860 mmol, 20.0 eq) in an oven-dried flask equipped with a stirbar and reflux condenser was evacuated, then back-filled with nitrogen, this process was repeated 4× more, upon which deoxygenated anhydrous xylenes (20.0 mL) was added followed by neat N,N'-dimethylethylenediamine (1.30 mL, 11.930 mmol, 10.00 eq) added via syringe. After stirring vigorously (1000 rpm) for 72 hrs, the dark red heterogeneous mixture was removed from the mantle, allowed to cool gradually to 23° C., diluted with $CH_2Cl_2$ (30 mL), stirred vigorously (1000 rpm) for 2 mins, suction filtered over silica gel using $CH_2Cl_2$ as the eluent, rinsed with $CH_2Cl_2$ (4×25 mL) the golden orange filtrate was concentrated onto celite, and purified via silica gel chromatography; 45% $CH_2Cl_2$ in hexanes to afford the biscarbazoyl-thiophene as a golden yellow foam (0.317 g, 0.2857 mmol, 24%). NMR indicated product which contained trace impurities. The product was used in the subsequent reaction without further purification.

To a solution of the protected hydroxythiophene (0.317 g, 0.2857 mmol, 1.00 eq) in $CH_2Cl_2$ (5 mL) and 1,4-dioxane (5 mL) was added concentrated HCl (5 mL) under nitrogen at 23° C. After stirring vigorously (1000 rpm) for 16 hrs the pale golden brown solution was diluted with aqueous HCl (20 mL, 1 N) and $CH_2Cl_2$ (20 mL), poured into a separatory funnel, partitioned, organics were washed with aqueous HCl (2×20 mL), residual organics were extracted from the aqueous layer using $CH_2Cl_2$ (2×20 mL), combined, dried over solid $Na_2SO_4$, decanted, concentrated onto celite, and purified via silica gel chromatography; 10%-30% $CH_2Cl_2$ in hexanes to afford the hydroxythiophene as a golden yellow foam (0.252 g, 0.2537 mmol, 89%, 21% two steps). NMR indicated pure product.

$^1H$ NMR (500 MHz, Chloroform-d) δ 8.10 (d, J=1.8 Hz, 4H), 7.53 (dd, J=7.6, 1.7 Hz, 2H), 7.39 (dd, J=8.6, 1.9 Hz, 4H), 7.32 (td, J=7.8, 1.7 Hz, 2H), 7.23 (d, J=8.5 Hz, 4H), 7.18 (s, 2H), 7.12 (td, J=7.5, 1.1 Hz, 2H), 6.91 (dd, J=8.3, 1.1 Hz, 2H), 6.66 (s, 2H), 4.07-4.03 (m, 4H), 1.91-1.87 (m, 4H), 1.43 (s, 36H). $^{13}C$ NMR (126 MHz, Chloroform-d) δ 154.34, 147.72, 143.16, 140.41, 131.33, 130.56, 129.51, 124.52, 123.60, 123.51, 122.66, 119.31, 116.25, 115.50, 113.48, 109.66, 69.47, 34.70, 32.01, 26.03.

Characterization of the Protected Ligand 3:

$^1H$ NMR (500 MHz, Chloroform-d) δ 8.10 (d, J=2.0 Hz, 4H), 7.55 (dd, J=7.5, 1.8 Hz, 2H), 7.45 (dd, J=8.6, 1.9 Hz, 4H), 7.36 (d, J=8.6 Hz, 4H), 7.34-7.30 (m, 2H), 7.29 (s, 2H), 7.07-6.98 (m, 4H), 4.50 (s, 4H), 4.18-4.11 (m, 4H), 2.83 (q, J=7.0 Hz, 4H), 2.13-2.03 (m, 4H), 1.45 (s, 36H), 0.55 (t, J=7.0 Hz, 6H). $^{13}C$ NMR (126 MHz, Chloroform-d) δ 156.62, 148.96, 143.32, 140.40, 132.13, 131.05, 129.11, 124.38, 123.83, 123.44, 122.05, 120.51, 120.38, 116.06, 112.16, 110.00, 96.74, 68.17, 64.44, 34.73, 32.01, 26.37, 14.19.

Example 11: Synthesis of Procatalyst 5

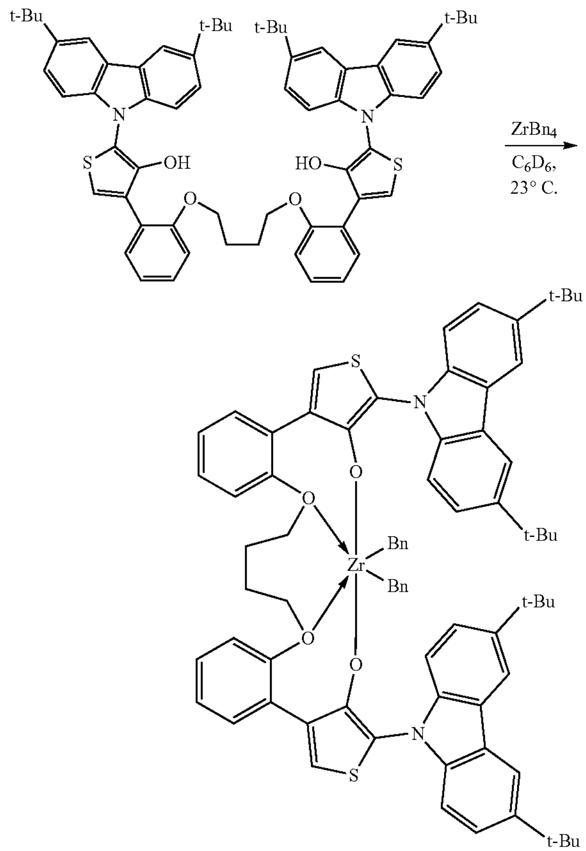

Ligand 3 was azeotropically dried using PhMe (4×10 mL) prior to use. To a clear colorless solution of the thiophene (15.6 mg, 0.0157 mmol, 1.00 eq) in anhydrous $C_6D_6$ (1.25 mL) in a nitrogen filled glovebox at 23° C. was added a solution of $ZrBn_4$ (7.2 mg, 0.0157 mmol, 1.00 eq) in $C_6D_6$ (0.30 mL) in a dropwise manner. After stirring (500 rpm) for 1 hr the pale golden yellow solution was filtered using a 0.20 μm PTFE submicron filter to afford the zirconium complex as a 0.01 M solution in $C_6D_6$. NMR indicated product. The same procedure can be used with PhMe as the solvent to prepare the procatalyst solution (0.005 M) which is used directly after filtration for the polymerization experiments.

$^1$H NMR (400 MHz, Benzene-$d_6$) δ 8.42 (d, J=1.8 Hz, 2H), 8.19 (d, J=1.9 Hz, 2H), 7.64 (d, J=8.5 Hz, 2H), 7.46 (ddd, J=8.7, 5.8, 1.9 Hz, 4H), 7.28 (d, J=8.7 Hz, 2H), 7.10-7.00 (m, 2H), 6.97-6.93 (m, 2H), 6.80-6.67 (m, 6H), 6.62 (s, 2H), 6.35-6.29 (m, 2H), 6.14-6.06 (m, 4H), 5.18 (dd, J=7.9, 1.4 Hz, 2H), 4.04 (t, J=10.5 Hz, 2H), 3.35 (dd, J=11.8, 4.5 Hz, 2H), 1.45 (s, 18H), 1.26 (s, 18H), 0.99 (d, J=12.1 Hz, 2H), 0.76 (t, J=9.1 Hz, 2H), 0.61 (t, J=12.8 Hz, 2H), 0.46 (d, J=12.2 Hz, 2H). $^{13}$C NMR (101 MHz, Benzene-$d_6$) δ 155.80, 151.78, 146.61, 143.34, 143.08, 139.98, 139.59, 133.04, 131.33, 130.53, 130.21, 128.88, 128.30, 126.71, 125.79, 125.26, 124.87, 123.21, 122.80, 122.74, 120.78, 116.56, 116.38, 115.83, 115.71, 112.39, 109.35, 80.63, 74.21, 34.55, 34.39, 31.94, 31.68, 25.88.

Example 12: Synthesis of Procatalyst 6

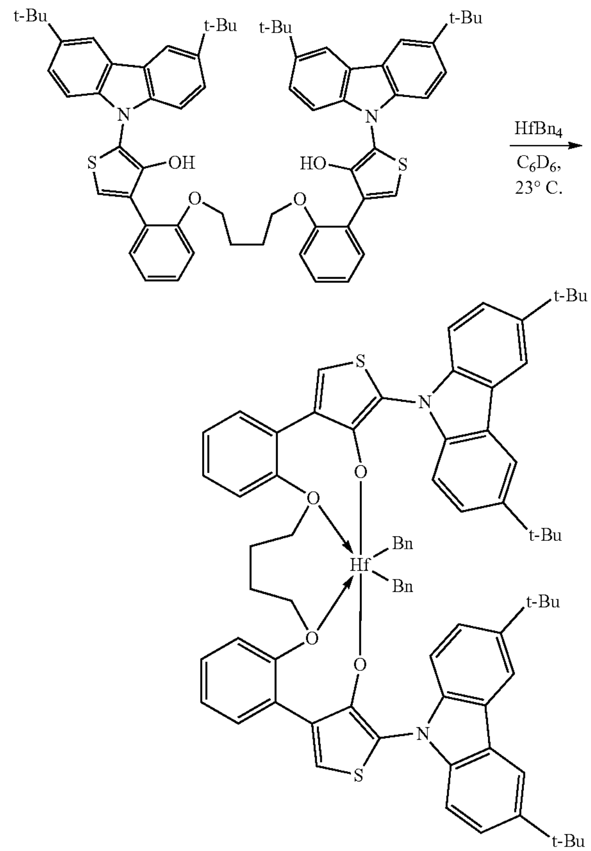

Ligand 3 was azeotropically dried using PhMe (4×10 mL) prior to use. To a clear colorless solution of the thiophene (13.3 mg, 0.01339 mmol, 1.00 eq) in anhydrous $C_6D_6$ (1.00 mL) in a nitrogen filled glovebox at 23° C. was added a solution of $HfBn_4$ (7.3 mg, 0.01339 mmol, 1.00 eq) in $C_6D_6$ (0.31 mL) in a dropwise manner. After stirring (500 rpm) for 1 hr the pale golden yellow solution was filtered using a 0.20 μm PTFE submicron filter to afford the hafnium complex as a 0.01 M solution in $C_6D_6$. The same procedure can be used with PhMe as the solvent to prepare the procatalyst solution (0.005 M) which is used directly after filtration for the polymerization experiments.

$^1$H NMR (400 MHz, Benzene-$d_6$) δ 8.44 (d, J=1.8 Hz, 2H), 8.19 (d, J=1.8 Hz, 2H), 7.65-7.60 (m, 2H), 7.45 (ddd, J=10.7, 8.6, 1.9 Hz, 4H), 7.19 (dd, J=8.6, 0.6 Hz, 2H), 7.10-7.03 (m, 2H), 6.95 (ddq, J=7.3, 1.4, 0.7 Hz, 2H), 6.78-6.73 (m, 4H), 6.74-6.68 (m, 4H), 6.61 (s, 2H), 6.16-6.10 (m, 4H), 5.18 (dd, J=8.1, 1.3 Hz, 2H), 4.07 (t, J=10.8 Hz, 2H), 3.43-3.34 (m, 2H), 1.46 (s, 18H), 1.26 (s, 18H), 0.87 (d, J=13.2 Hz, 2H), 0.79-0.68 (m, 2H), 0.57-0.47 (m, 2H), 0.19 (d, J=13.2 Hz, 2H). $^{13}$C NMR (126 MHz, Benzene-$d_6$) δ 155.63, 151.81, 147.60, 143.41, 143.11, 139.92, 139.58, 132.72, 131.40, 130.30, 128.96, 128.15, 127.99, 127.28, 126.99, 126.91, 126.04, 125.29, 124.96, 123.58, 122.73, 122.67, 120.76, 116.45, 116.38, 116.29, 115.64, 112.53, 109.37, 81.66, 78.32, 34.57, 34.41, 31.97, 31.70, 26.09.

Example 13: Synthesis of Ligand 4

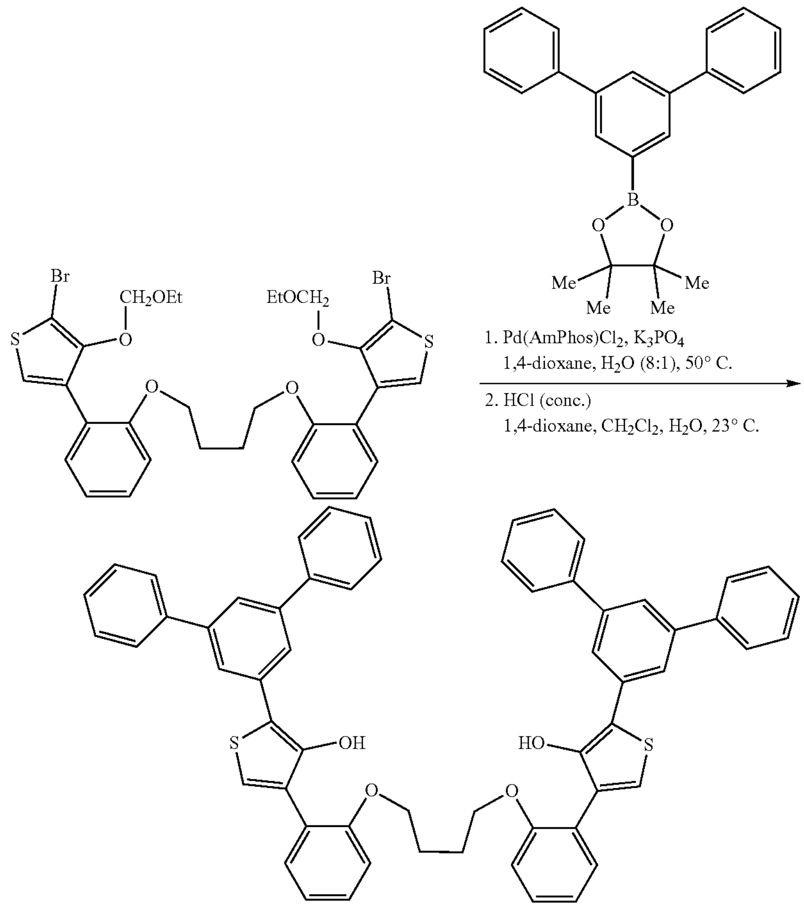

A mixture of the dibromide (361.5 mg, 0.5074 mmol, 1.00 eq), $Pd(AmPhos)Cl_2$ (72.0 mg, 0.1015 mmol, 0.20 eq), $K_3PO_4$ (969.0 mg, 4.566 mmol, 9.00 eq), and the m-terphenyl boropinacolate ester (542.0 mg, 1.522 mmol, 3.00 eq) was evacuated, back-filled with nitrogen, this process was repeated 4× more, then freshly sparged deoxygenated 1,4-dioxane (6.0 mL) and $H_2O$ (0.8 mL) were added sequentially. The canary yellow mixture was then placed in a mantle heated to 50° C., stirred vigorously (1000 rpm) for 48 hrs, the dark grey mixture was removed from the mantle, allowed to cool to ambient temperature, diluted with $CH_2Cl_2$ (20 mL), suction filtered over a pad of silica gel, rinsed with $CH_2Cl_2$ (4×20 mL), the resultant filtrate was concentrated onto celite, and purified via silica gel chromatography; 10% $CH_2Cl_2$-65% $CH_2Cl_2$ in hexanes to afford the protected coupled product as a white foam (393.0 mg, 0.3886 mmol, 77%). NMR indicated product with trace impurities.

To a solution of the protected coupled bisthiophene (393.0 mg, 0.3886 mmol, 1.00 eq) in $CH_2Cl_2$ (5 mL) and 1,4-dioxane (5 mL) under nitrogen was added concentrated HCl (5 mL, 37% aqueous) via syringe. The golden yellow solution was stirred (500 rpm) for 20 hrs, diluted with aqueous HCl (10 mL, 1 N) and $CH_2Cl_2$ (10 mL), poured into a separatory funnel, partitioned, organics were washed with aqueous HCl (1×10 mL, 1 N), residual organics were extracted from the aqueous using $CH_2Cl_2$ (2×20 mL), combined, dried over solid $Na_2SO_4$, decanted, concentrated onto celite, and purified via silica gel chromatography; 25%-55% $CH_2Cl_2$ in hexanes to afford the bis-hydroxythiophene as a white foam (213.0 mg, 0.2380 mmol, 61%, 47% two steps). NMR indicated pure product.

$^1H$ NMR (500 MHz, Chloroform-d) δ 8.15 (d, J=1.7 Hz, 4H), 7.79 (d, J=1.4 Hz, 4H), 7.77 (q, J=1.3 Hz, 6H), 7.57-7.50 (m, 8H), 7.47-7.42 (m, 6H), 7.31-7.25 (m, 2H), 7.12 (s, 2H), 7.10 (td, J=7.5, 1.1 Hz, 2H), 6.88 (dd, J=8.3, 1.0 Hz, 2H), 4.11-3.99 (m, 4H), 1.98-1.88 (m, 4H). $^{13}C$ NMR (126 MHz, Chloroform-d) δ 154.04, 148.57, 142.10, 141.35, 135.00, 133.04, 131.71, 129.55, 128.90, 127.55, 127.42, 124.75, 124.74, 124.24, 122.93, 120.27, 119.49, 114.03, 69.85, 25.93.

Characterization of the Protected Ligand 4:

$^1H$ NMR (500 MHz, Chloroform-d) δ 7.98 (d, J=1.6 Hz, 4H), 7.74 (d, J=1.9 Hz, 2H), 7.70 (d, J=7.4 Hz, 8H), 7.54-7.43 (m, 10H), 7.43-7.35 (m, 4H), 7.29-7.21 (m, 4H), 6.99 (t, J=7.4 Hz, 2H), 6.87 (d, J=8.2 Hz, 2H), 4.71 (s, 4H), 4.00 (d, J=5.3 Hz, 4H), 3.19 (q, J=7.0 Hz, 4H), 2.04-1.89 (m, 4H), 0.73 (t, J=7.0 Hz, 6H). $^{13}C$ NMR (126 MHz, Chloroform-d) δ 156.42, 149.33, 142.07, 140.99, 134.37, 133.67, 130.96, 128.89, 128.83, 127.54, 127.52, 127.26, 125.64, 124.80, 124.42, 121.59, 120.50, 112.52, 97.35, 68.03, 64.97, 26.05, 14.57.

Example 14: Synthesis of Procatalyst 7

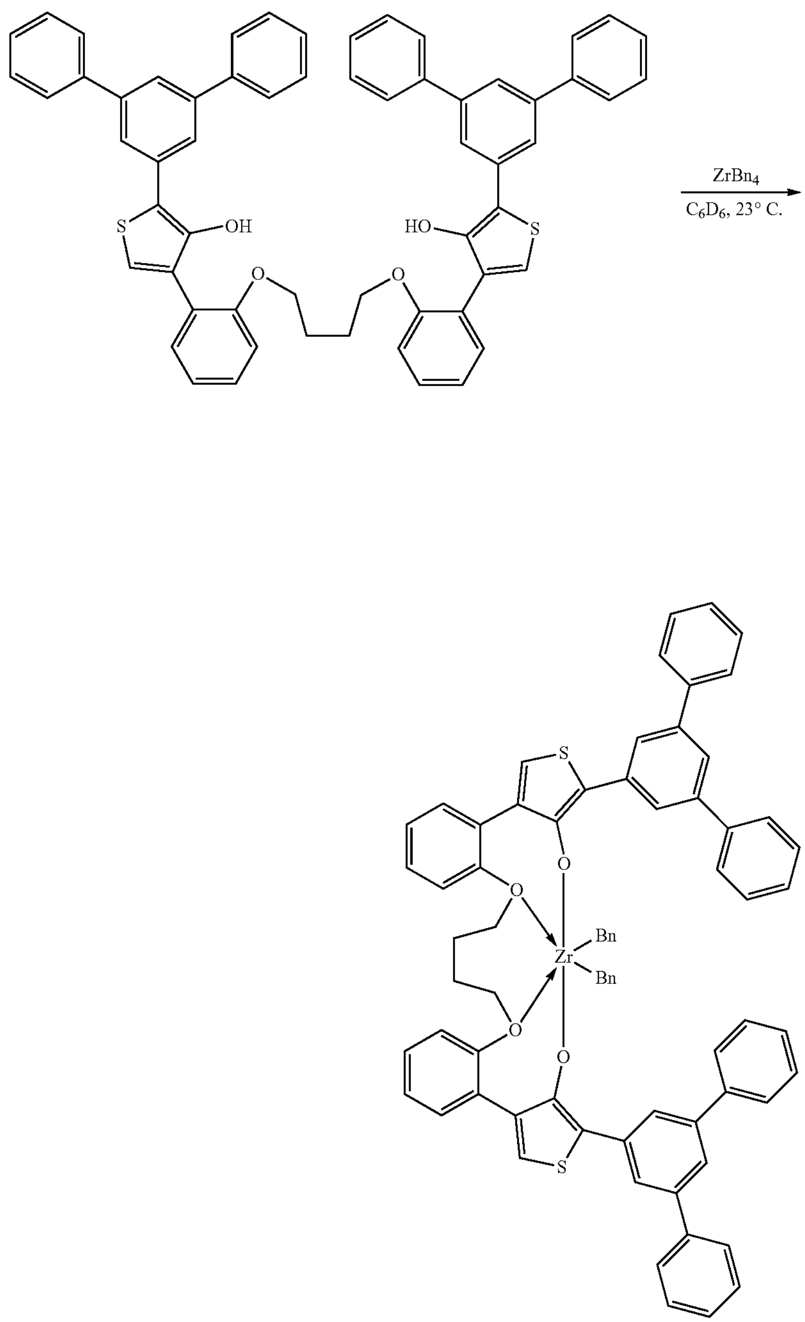

Ligand 4 was azeotropically dried using PhMe (4×10 mL) prior to use. To a clear colorless solution of the thiophene (9.3 mg, 0.0104 mmol, 1.00 eq) in anhydrous $C_6D_6$ (1.05 mL) in a nitrogen filled glovebox at 23° C. was added a solution of $ZrBn_4$ (4.7 mg, 0.0104 mmol, 1.00 eq) in $C_6D_6$ (0.19 mL) in a dropwise manner. After stirring (500 rpm) for 1 hr the pale golden yellow solution was filtered using a 0.20 μm PTFE submicron filter to afford the zirconium complex as a 0.01 M solution in $C_6D_6$. The same procedure can be used with PhMe as the solvent to prepare the procatalyst solution (0.005 M) which is used directly after filtration for the polymerization experiments.

$^1$H NMR (400 MHz, Benzene-$d_6$) δ 8.38 (d, J=1.7 Hz, 4H), 7.73 (t, J=1.7 Hz, 2H), 7.61-7.55 (m, 8H), 7.17-7.12 (m, 8H), 7.11-6.92 (m, 12H), 6.77 (td, J=7.4, 1.3 Hz, 2H), 6.71 (ddt, J=9.2, 7.5, 1.6 Hz, 4H), 6.67 (s, 2H), 6.35-6.30 (m, 4H), 6.19 (dd, J=8.1, 1.3 Hz, 2H), 4.14 (dd, J=11.9, 9.9 Hz, 2H), 3.47 (dd, J=12.0, 4.6 Hz, 2H), 2.28 (d, J=12.1 Hz, 2H), 1.53 (d, J=12.0 Hz, 2H), 0.84-0.73 (m, 2H), 0.47 (d, J=12.0 Hz, 2H). $^{13}$C NMR (101 MHz, Benzene-$d_6$) δ 155.21, 154.56, 147.21, 142.96, 141.03, 135.65, 135.24, 131.66, 130.03, 129.45, 128.73, 128.15, 126.62, 126.12, 125.38, 124.70, 123.11, 121.04, 119.70, 119.02, 80.45, 76.42, 26.58.

Example 15: Synthesis of Procatalyst 8

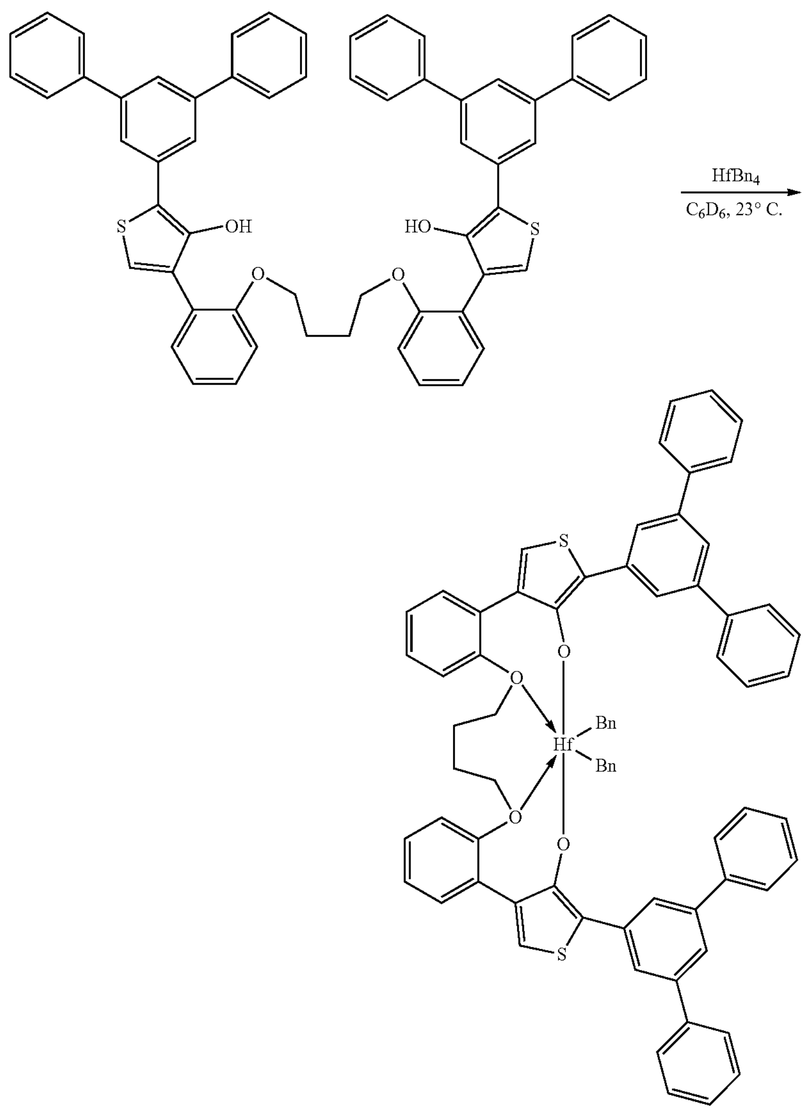

Ligand 4 was azeotropically dried using PhMe (4×10 mL) prior to use. To a clear colorless solution of the thiophene (10.3 mg, 0.0115 mmol, 1.00 eq) in anhydrous $C_6D_6$ (1.00 mL) in a nitrogen filled glovebox at 23° C. was added a solution of $HfBn_4$ (6.3 mg, 0.0115 mmol, 1.00 eq) in $C_6D_6$ (0.27 mL) in a dropwise manner. After stirring (500 rpm) for 1 hr the pale golden yellow solution was filtered using a 0.20 μm PTFE submicron filter to afford the hafnium complex as a 0.01 M solution in $C_6D_6$. The same procedure can be used with PhMe as the solvent to prepare the procatalyst solution (0.005 M) which is used directly after filtration for the polymerization experiments.

$^1$H NMR (400 MHz, Benzene-$d_6$) δ 8.36 (d, J=1.7 Hz, 4H), 7.74 (t, J=1.7 Hz, 2H), 7.62-7.56 (m, 8H), 7.19-7.12 (m, 8H), 7.12-6.93 (m, 10H), 6.81-6.67 (m, 6H), 6.66 (s, 2H), 6.37-6.32 (m, 4H), 6.21 (dd, J=8.0, 1.4 Hz, 2H), 4.28-4.17 (m, 2H), 3.52 (dd, J=12.2, 4.7 Hz, 2H), 2.11 (d, J=13.0 Hz, 2H), 1.33 (d, J=13.0 Hz, 2H), 0.80 (dd, J=14.1, 6.2 Hz, 2H), 0.47-0.35 (m, 2H). $^{13}$C NMR (101 MHz, Benzene-$d_6$) δ 155.13, 154.62, 147.58, 142.94, 141.03, 137.46, 135.60, 134.98, 131.65, 130.05, 129.42, 128.73, 128.15, 127.19, 127.17, 126.28, 125.28, 124.65, 123.28, 121.18, 119.65, 119.48, 81.28, 80.66, 26.74.

Example 16: Synthesis of Boropinacolate Intermediate for Ligand 4

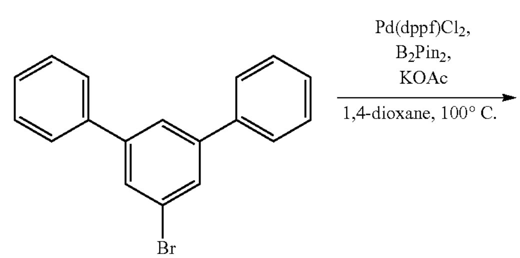

-continued

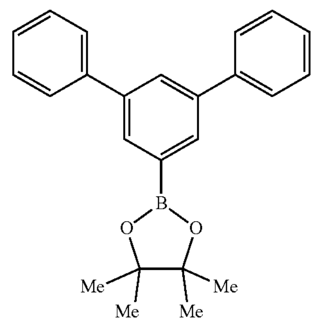

In a nitrogen filled glovebox a mixture of the bromo-m-terphenyl (3.350 g, 10.834 mmol, 1.00 eq), Pd(dppf)$Cl_2$ (0.442 g, 0.5417 mmol, 0.05 eq), $B_2Pin_2$ (4.127 g, 16.251 mmol, 1.50 eq), and KOAc (3.190 g, 32.502 mmol, 3.00 eq) in anhydrous deoxygenated 1,4-dioxane (100 mL) was placed in a mantle heated to 100° C., stirred vigorously (1000 rpm) for 24 hrs, removed from the heating mantle, allowed to cool gradually to 23° C., suction filtered through a pad of silica gel, rinsed with $CH_2Cl_2$ (4×25 mL), the resulting filtrate solution was concentrated onto celite, and purified via silica gel chromatography; 10% $CH_2Cl_2$-100% $CH_2Cl_2$ in hexanes to afford the boropinacolate ester as a white solid (3.446 g, 9.672 mmol, 89%). NMR indicated pure product.

$^1$H NMR (500 MHz, Chloroform-d) δ 8.08 (dt, J=2.7, 1.7 Hz, 2H), 7.95 (p, J=2.0 Hz, 1H), 7.73 (dq, J=7.9, 1.5 Hz, 4H), 7.48 (tt, J=8.0, 1.5 Hz, 4H), 7.39 (ddt, J=8.3, 6.9, 1.3 Hz, 2H), 1.42 (s, 6H), 1.41 (s, 6H). $^{13}$C NMR (126 MHz, Chloroform-d) δ 141.15, 141.09, 132.49, 128.91, 128.68, 127.36, 127.31, 83.95, 24.90.

Example 17: Synthesis of Ligand 5

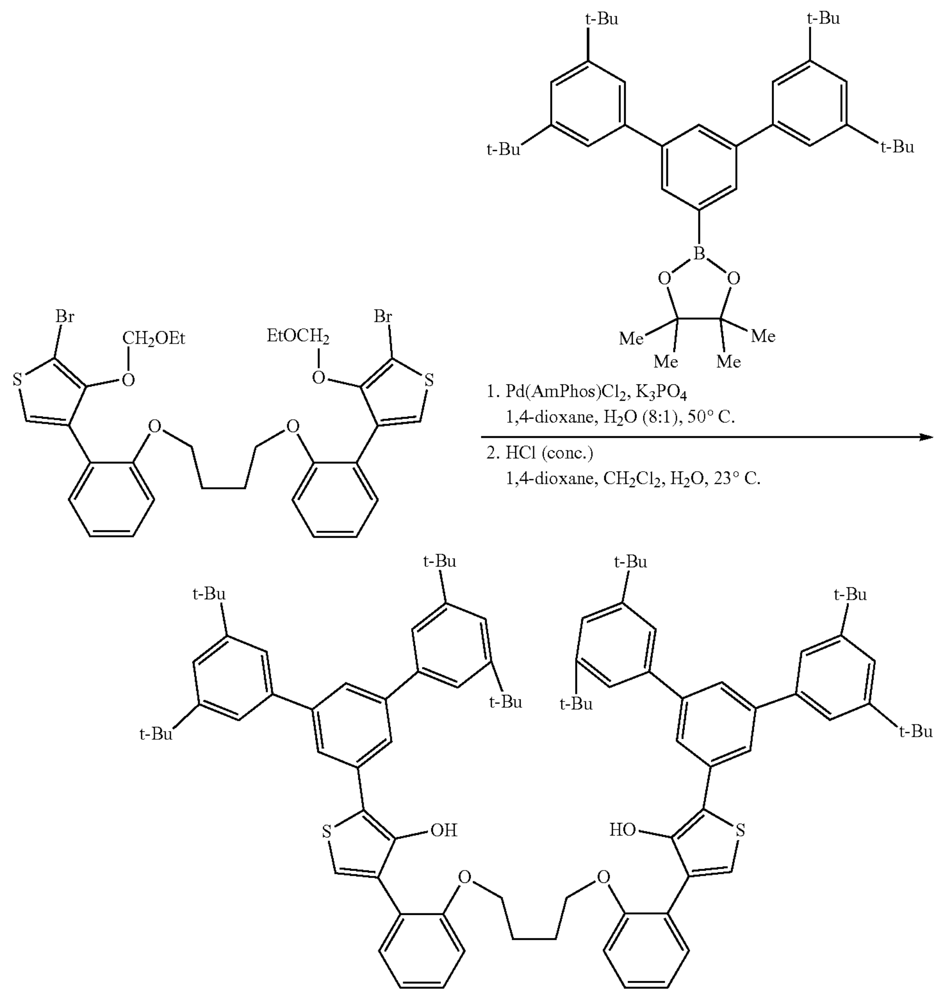

A mixture of the dibromide (268.7 mg, 0.3771 mmol, 1.00 eq), Pd(AmPhos)$Cl_2$ (53.0 mg, 0.0754 mmol, 0.20 eq), $K_3PO_4$ (720.0 mg, 3.394 mmol, 9.00 eq), and the m-bis(3, 5-di-t-butylphenyl)terphenyl boropinacolate ester (689.0 mg, 1.186 mmol, 3.15 eq) was evacuated, back-filled with nitrogen, this process was repeated 4× more, then freshly sparged deoxygenated 1,4-dioxane (7.5 mL) and $H_2O$ (1.0 mL) were added sequentially. The canary yellow mixture was then placed in a mantle heated to 50° C., stirred vigorously (1000 rpm) for 48 hrs, the dark grey mixture was removed from the mantle, allowed to cool to ambient temperature, diluted with $CH_2Cl_2$ (20 mL), suction filtered over a pad of silica gel, rinsed with $CH_2C_2$ (4×20 mL), the resultant filtrate was concentrated onto celite, and purified via silica gel chromatography; 10% $CH_2C_2$-50% $CH_2Cl_2$ in hexanes to afford the protected coupled product as a white foam (476.0 mg, 0.3260 mmol, 86%). NMR indicated pure product.

To a solution of the protected coupled bisthiophene (476.0 mg, 0.3260 mmol, 1.00 eq) in $CH_2Cl_2$ (5 mL) and 1,4-dioxane (5 mL) under nitrogen was added concentrated HCl (5 mL, 37% aqueous) via syringe. The golden yellow solution was stirred (500 rpm) for 24 hrs, diluted with aqueous HCl (10 mL, 1 N) and $CH_2Cl_2$ (10 mL), poured into a separatory funnel, partitioned, organics were washed with aqueous HCl (1×10 mL, 1 N), residual organics were extracted from the aqueous using $CH_2Cl_2$ (2×20 mL), combined, dried over solid $Na_2SO_4$, decanted, concentrated onto celite, and purified via silica gel chromatography; 10%-25% $CH_2Cl_2$ in hexanes to afford the bis-hydroxythiophene as a white foam (251.0 mg, 0.1868 mmol, 57%). NMR indicated pure product.

$^1$H NMR (400 MHz, Chloroform-d) δ 8.02 (d, J=1.6 Hz, 4H), 7.65 (t, J=1.7 Hz, 2H), 7.52 (s, 4H), 7.51 (s, 4H), 7.48 (t, J=1.8 Hz, 4H), 7.41 (dd, J=7.6, 1.7 Hz, 2H), 7.24 (td, J=7.7, 1.7 Hz, 2H), 7.08 (d, J=4.9 Hz, 4H), 7.05 (td, J=7.5, 1.0 Hz, 2H), 6.85 (dd, J=8.3, 1.1 Hz, 2H), 4.10-4.01 (m, 4H), 1.95-1.85 (m, 4H), 1.39 (s, 72H). $^{13}$C NMR (101 MHz, Chloroform-d) δ 153.95, 151.14, 148.35, 143.27, 141.04, 134.49, 132.94, 131.67, 129.45, 125.13, 124.87, 124.72, 122.79, 122.01, 121.52, 120.04, 119.60, 113.86, 69.68, 35.01, 31.55, 25.79.

Characterization of the Protected Ligand 5:

$^1$H NMR (400 MHz, Chloroform-d) δ 7.94 (d, J=1.6 Hz, 4H), 7.70 (d, J=1.8 Hz, 2H), 7.52-7.49 (m, 14H), 7.28-7.18 (m, 4H), 6.97 (t, J=7.4 Hz, 2H), 6.85 (d, J=8.3 Hz, 2H), 4.71 (s, 4H), 3.99 (d, J=5.4 Hz, 4H), 3.19 (q, J=7.0 Hz, 4H), 1.96 (q, J=3.4, 2.9 Hz, 4H), 1.41 (s, 72H), 0.72 (t, J=7.0 Hz, 6H).

$^{13}$C NMR (101 MHz, Chloroform-d) δ 156.35, 151.21, 149.18, 143.32, 140.80, 133.99, 133.52, 130.97, 128.81, 127.74, 125.82, 125.79, 124.30, 121.92, 121.64, 121.53, 120.39, 112.33, 97.24, 67.89, 64.98, 35.02, 31.56, 25.99, 14.57.

Example 18: Synthesis of Procatalyst 9

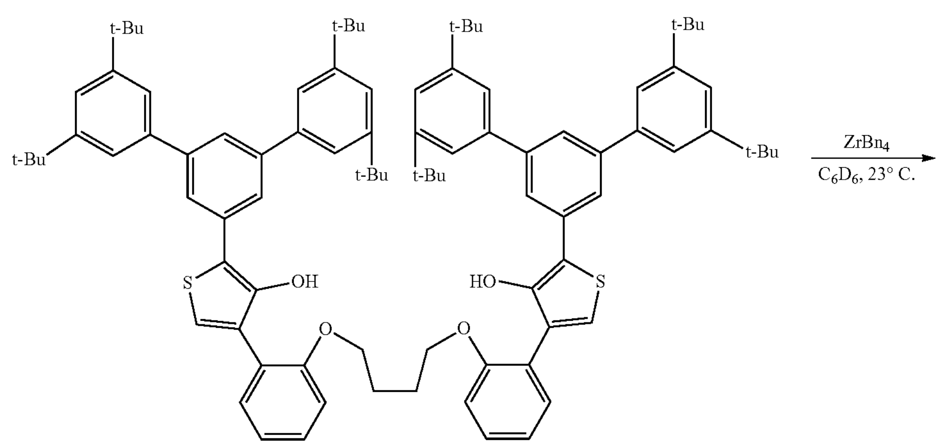

-continued

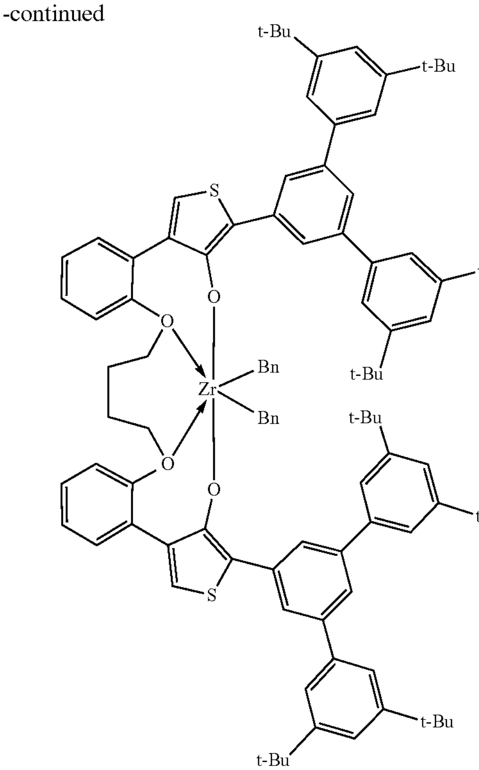

Ligand 5 was azeotropically dried using PhMe (4×10 mL) prior to use. To a clear colorless solution of the thiophene (17.5 mg, 0.01302 mmol, 1.00 eq) in anhydrous $C_6D_6$ (1.00 mL) in a nitrogen filled glovebox at 23° C. was added a solution of $ZrBn_4$ (5.9 mg, 0.01302 mmol, 1.00 eq) in $C_6D_6$ (0.24 mL) in a dropwise manner. After stirring (500 rpm) for 1 hr the pale golden yellow solution was filtered using a 0.20 μm PTFE submicron filter to afford the zirconium complex as a 0.01 M solution in $C_6D_6$. The same procedure can be used with PhMe to prepare the procatalyst solution (0.005 M) which is used directly after filtration for the polymerization experiments.

$^{1}$H NMR (400 MHz, Benzene-$d_6$) δ 8.44 (d, J=1.6 Hz, 4H), 8.04 (t, J=1.7 Hz, 2H), 7.68 (d, J=1.8 Hz, 8H), 7.45 (t, J=1.8 Hz, 4H), 7.12-7.00 (m, 2H), 6.99-6.93 (m, 2H), 6.91-6.83 (m, 6H), 6.70-6.64 (m, 2H), 6.61 (s, 2H), 6.21 (dd, J=8.3, 1.1 Hz, 2H), 6.15-6.10 (m, 4H), 4.15 (t, J=10.7 Hz, 2H), 3.50 (dd, J=12.0, 3.5 Hz, 2H), 2.15 (d, J=12.3 Hz, 2H), 1.55 (d, J=12.3 Hz, 2H), 1.23 (s, 72H), 0.75-0.65 (t, J=9.3 Hz, 2H), 0.43-0.30 (m, 2H). $^{13}$C NMR (101 MHz, Benzene-$d_6$) δ 155.73, 154.60, 151.09, 147.57, 144.73, 141.38, 135.46, 134.94, 131.48, 130.10, 129.57, 128.15, 127.17, 126.18, 126.02, 125.88, 125.55, 123.19, 122.10, 121.60, 120.67, 119.56, 119.22, 80.64, 77.44, 34.62, 31.24, 26.57.

Example 19: Synthesis of Procatalyst 10

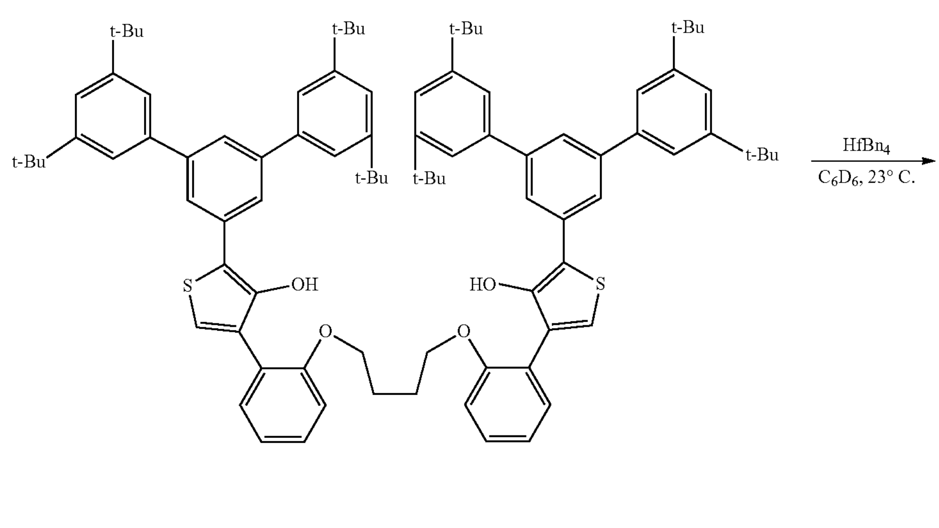

-continued

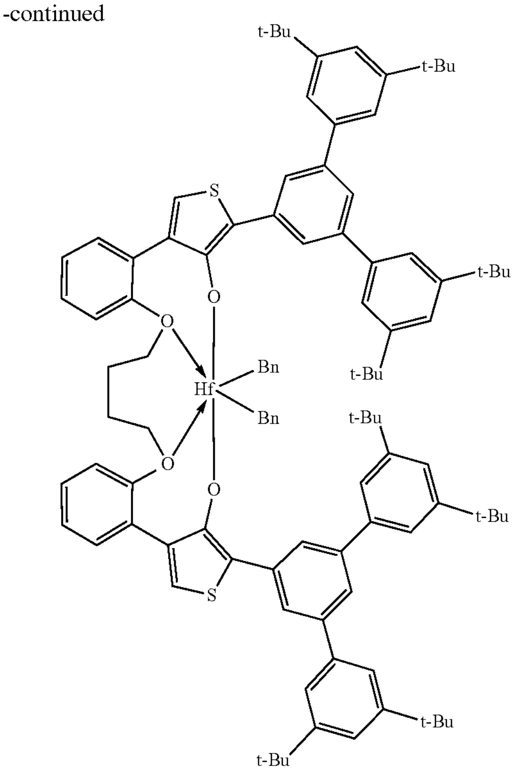

Ligand 5 was azeotropically dried using PhMe (4×10 mL) prior to use. To a clear colorless solution of the thiophene (18.2 mg, 0.01354 mmol, 1.00 eq) in anhydrous $C_6D_6$ (1.05 mL) in a nitrogen filled glovebox at 23° C. was added a solution of $HfBn_4$ (7.4 mg, 0.01354 mmol, 1.00 eq) in $C_6D_6$ (0.30 mL) in a dropwise manner. After stirring (500 rpm) for 1 hr the pale golden yellow solution was filtered using a 0.20 μm PTFE submicron filter to afford the hafnium complex as a 0.01 M solution in $C_6D_6$. The same procedure can be used with PhMe as a solvent to prepare the procatalyst solution (0.005 M) which is used directly after filtration for the polymerization experiments.

$^1H$ NMR (400 MHz, Benzene-$d_6$) δ 8.42 (d, J=1.6 Hz, 4H), 8.05 (t, J=1.7 Hz, 2H), 7.70 (d, J=1.8 Hz, 8H), 7.45 (t, J=1.8 Hz, 4H), 7.12-7.05 (m, 4H), 7.01-6.83 (m, 6H), 6.69-6.63 (m, 2H), 6.60 (s, 2H), 6.25 (dd, J=8.7, 1.1 Hz, 2H), 6.17-6.11 (m, 4H), 4.24 (t, J=10.9 Hz, 2H), 3.56 (d, J=11.9 Hz, 2H), 1.97 (d, J=13.2 Hz, 2H), 1.33 (d, J=13.3 Hz, 2H), 1.24 (s, 72H), 0.69 (t, J=9.7 Hz, 2H), 0.34-0.24 (m, 2H). $^{13}C$ NMR (126 MHz, Benzene-$d_6$) δ 155.67, 154.67, 151.12, 147.89, 144.71, 141.38, 135.43, 134.72, 131.49, 130.16, 129.55, 128.17, 128.13, 127.99, 127.29, 126.94, 126.86, 126.03, 125.92, 125.49, 123.40, 122.11, 121.64, 120.88, 119.67, 119.53, 81.49, 81.31, 34.65, 31.26, 26.78.

Example 20: Synthesis of Boropinacolate Ester Intermediate to Ligand 5

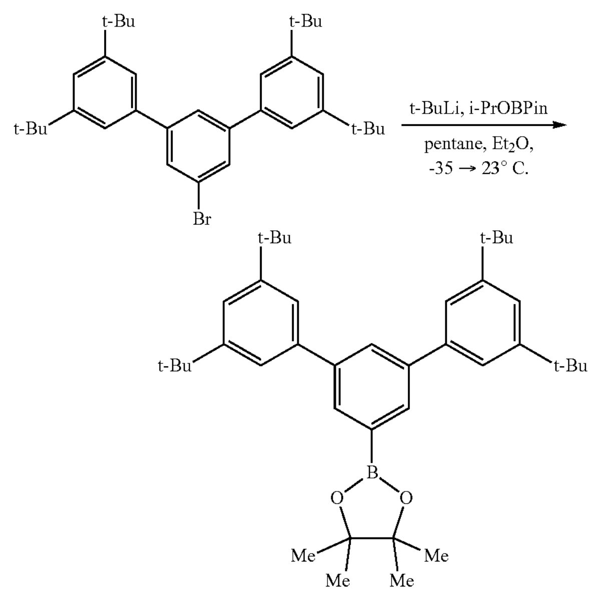

To a precooled solution of t-BuLi (3.6 mL, 6.122 mmol, 3.30 eq, 1.7 M in pentane) in anhydrous deoxygenated pentane (20 mL) in a nitrogen filled glovebox at −35° C. (precooled for 16 hrs) was added a precooled solution of the 3,5-bis-(3,5-di-t-Buphenyl)-m-terphenyl bromide (0.990 g, 1.855 mmol, 1.00 eq) in pentane/$Et_2O$ (20 mL, 1:1) in a dropwise manner over 10 mins. The now golden yellow mixture was allowed to sit in the freezer (−35° C.) for 4 hrs upon which neat i-PrOBPin (1.25 mL, 6.122 mmol, 3.30 eq) was added via syringe. The now pale yellow heterogeneous mixture was allowed to stir at 23° C. for 3 hrs, i-PrOH (3 mL) was added, the mixture was removed from the glove-box, water (20 mL) and $Et_2O$ (30 mL) were added, the biphasic mixture was stirred for 2 mins, poured into a separatory funnel, partitioned, organics were washed with water (2×25 mL), residual organics were extracted with $Et_2O$ (2×25 mL), combined, dried over solid $Na_2SO_4$, decanted, concentrated onto celite, and purified via silica gel chromatography on the ISCO; hexanes-50% $CH_2C_2$ in hexanes to afford the mesityl-m-terphenyl boropinacolate ester as a white foam (0.689 g, 1.187 mmol, 64%). NMR indicated pure product.

$^1$H NMR (400 MHz, Chloroform-d) δ 8.07 (s, 2H), 7.95 (s, 1H), 7.60-7.50 (m, 6H), 1.48 (s, 36H), 1.46 (s, 12H). $^{13}$C NMR (101 MHz, Chloroform-d) δ 151.11, 142.63, 141.07, 132.62, 130.23, 122.12, 121.46, 83.93, 35.08, 31.67, 24.95.

Example 21: Synthesis of Bromide Intermediated to Ligand 5

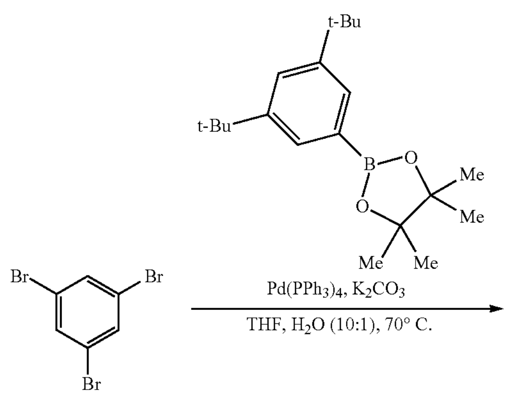

-continued

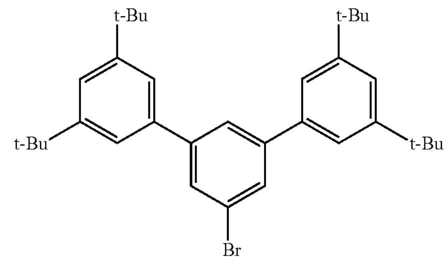

A mixture of the tribromobenzene (2.299 g, 7.303 mmol, 1.00 eq), 3,5-di-t-butylphenyl boropinacolate ester (6.237 g, 19.719 mmol, 2.70 eq), $Pd(PPh_3)_4$ (0.844 g, 0.7303 mmol, 0.10 eq), and $K_2CO_3$ (8.176 g, 59.154 mmol, 8.10 eq) equipped with a reflux condenser was evacuated, then back-filled with nitrogen, this evacuation/re-fill process was repeated 3× more, freshly deoxygenated THF (50 mL) and $H_2O$ (5.0 mL) were added simultaneously via syringes, the golden yellow mixture was placed in a mantle heated to 70° C., stirred vigorously (1000 rpm) for 24 hrs, removed from the mantle, allowed to cool gradually to 23° C., the golden yellow suspension was suction filtered through silica gel, rinsed with $CH_2Cl_2$ (4×20 mL), the yellow filtrate solution was concentrated onto celite, and purified via silica gel chromatography; hexanes to afford the 3,5-bis-(3,5-di-t-Buphenyl)phenyl bromide as a white solid (0.990 g, 1.855 mmol, 25%). NMR indicated pure product.

$^1$H NMR (500 MHz, Chloroform-d) δ 7.72-7.69 (m, 3H), 7.52 (t, J=1.8 Hz, 2H), 7.44 (d, J=1.8 Hz, 4H), 1.42 (s, 38H). $^{13}$C NMR (126 MHz, Chloroform-d) δ 151.45, 144.95, 139.54, 128.98, 125.69, 122.87, 122.12, 121.81, 35.05, 31.54.

Example 22: Synthesis of Ligand 6

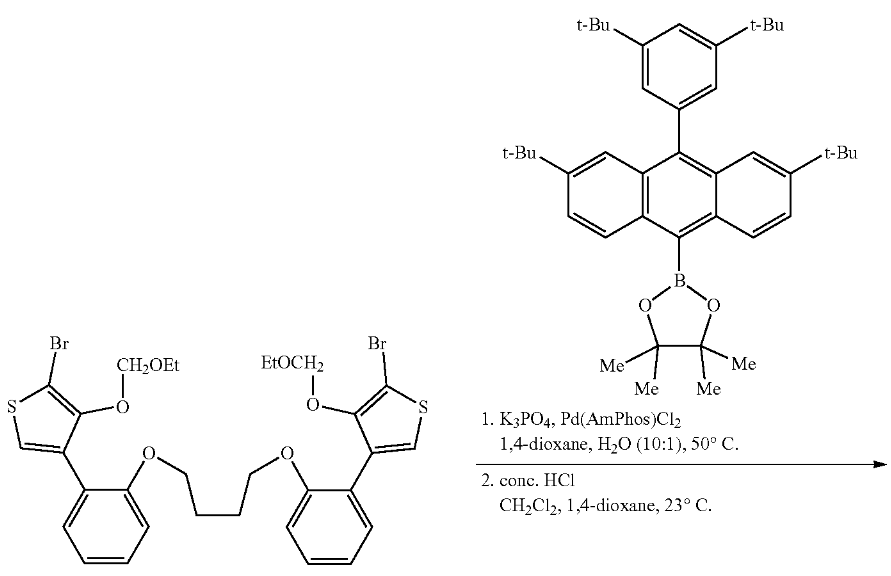

-continued

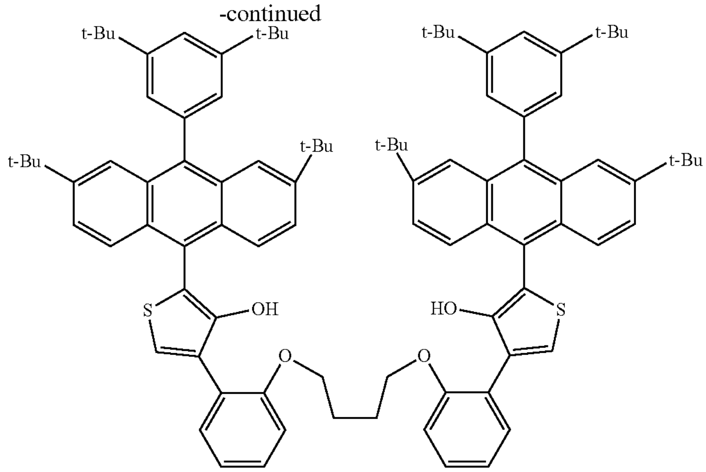

To vial equipped with a stirbar was added the dibromide (0.407 g, 0.5712 mmol, 1.00 eq), $K_3PO_4$ (1.091 g, 5.141 mmol, 9.0 eq), Pd(AmPhos)$Cl_2$ (81.0 mg, 0.1142 mmol, 0.20 eq), and the anthracenylboropinacol ester (0.960 g, 1.588 mmol, 2.78 eq). The mixture was evacuated, then back-filled with nitrogen, this process was repeated 3× more, then deoxygenated 1,4-dioxane (6.0 mL) and water (0.6 mL) were added sequentially via syringe. The vial was sealed with a PTFE cap under a purging flow of nitrogen, and then placed in a mantle heated to 50° C. After stirring (1000 rpm) for 36 hrs the purple-black mixture was removed from the mantle, allowed to cool gradually to 23° C., suction filtered over a pad of silica gel, washed with $CH_2Cl_2$ (4×20 mL), the clear purple filtrate was concentrated, residual 1,4-dioxane was removed azeotropically on the rotovap with toluene (3×10 mL), the resultant black mixture was suspended in $CH_2Cl_2$ (10 mL), suction filtered through silica gel to remove residual insoluble impurities, washed with $CH_2Cl_2$ (4×20 mL), the purple filtrate was concentrated onto celite, and purified via silica gel chromatography using an ISCO chromatography purification system; 25%-65% $CH_2Cl_2$ in hexanes to afford the bisprotected coupled thiophene as a golden yellow foam (0.588 g, 0.3899 mmol, 68%). NMR indicated pure product.

To a solution of the protected bisthiophene in $CH_2Cl_2$ (5 mL) and 1,4-dioxane (5 mL) was added conc. HCl (5 mL). The dark golden brown solution was vigorously stirred (1000 rpm) at 23° C. for 24 hrs under nitrogen, then diluted with aqueous HCl (25 mL, 1 N) and $CH_2Cl_2$ (20 mL), the biphasic mixture was poured into a separatory funnel, partitioned, organics were washed with aqueous HCl (2×20 mL, 1 N), the residual organics were extracted from the aqueous layer using $CH_2Cl_2$ (2×10 mL), combined, dried over solid $Na_2SO_4$, decanted, concentrated onto celite, and purified via silica gel chromatography using an ISCO chromatography purification system; 25%-80% $CH_2Cl_2$ in hexanes to afford the bishydroxythiophene ligand as a golden yellow amorphous foam (0.373 g, 0.2680 mmol, 69%, 47% two steps). NMR indicated pure product.

$^1$H NMR (500 MHz, Chloroform-d) δ 8.02 (d, J=9.2 Hz, 4H), 7.78 (d, J=2.0 Hz, 4H), 7.65 (dd, J=7.6, 1.7 Hz, 2H), 7.60 (t, J=1.9 Hz, 2H), 7.52 (dd, J=9.2, 2.0 Hz, 4H), 7.48 (s, 2H), 7.40 (dt, J=8.1, 1.7 Hz, 4H), 7.29 (td, J=7.8, 1.8 Hz, 2H), 7.15 (td, J=7.5, 1.1 Hz, 2H), 6.85-6.78 (m, 2H), 6.64 (s, 2H), 4.01 (d, J=4.7 Hz, 4H), 1.95 (q, J=2.9, 2.2 Hz, 4H), 1.47 (s, 18H), 1.46 (s, 18H), 1.29 (s, 36H). $^{13}$C NMR (126 MHz, Chloroform-d) δ 154.37, 150.32, 150.29, 149.60, 146.76, 139.56, 137.84, 131.58, 131.22, 130.21, 129.20, 126.28, 125.97, 124.96, 124.93, 124.61, 122.54, 122.23, 121.97, 120.49, 115.31, 113.56, 69.40, 35.07, 34.92, 31.71, 31.69, 30.92, 26.06.

Characterization of the Protected Ligand:

$^1$H NMR (400 MHz, Chloroform-d) δ 8.02 (d, J=9.3 Hz, 4H), 7.67 (d, J=1.9 Hz, 4H), 7.60 (dd, J=7.5, 1.8 Hz, 2H), 7.52 (t, J=1.8 Hz, 2H), 7.51 (d, J=0.9 Hz, 3H), 7.48 (d, J=2.0 Hz, 2H), 7.29 (dt, J=11.3, 1.6 Hz, 4H), 7.26-7.23 (m, 2H), 7.00 (td, J=7.5, 1.0 Hz, 2H), 6.97 (dd, J=8.3, 1.0 Hz, 2H), 4.45 (s, 4H), 4.14 (m, 4H), 2.68 (q, J=7.0 Hz, 4H), 2.10 (m, 4H), 1.39 (s, 18H), 1.38 (s, 18H), 1.24 (s, 36H), 0.44 (t, J=7.0 Hz, 6H). $^{13}$C NMR (101 MHz, Chloroform-d) δ 156.67, 151.30, 150.27, 150.18, 146.73, 139.47, 137.70, 132.60, 131.26, 130.00, 129.93, 128.73, 126.44, 125.94, 125.78, 125.16, 124.84, 124.71, 123.17, 122.24, 121.62, 120.48, 120.37, 112.28, 96.86, 68.12, 64.20, 34.98, 34.96, 34.87, 31.61, 31.59, 30.83, 26.25, 14.17.

Example 23: Synthesis of Procatalyst 11

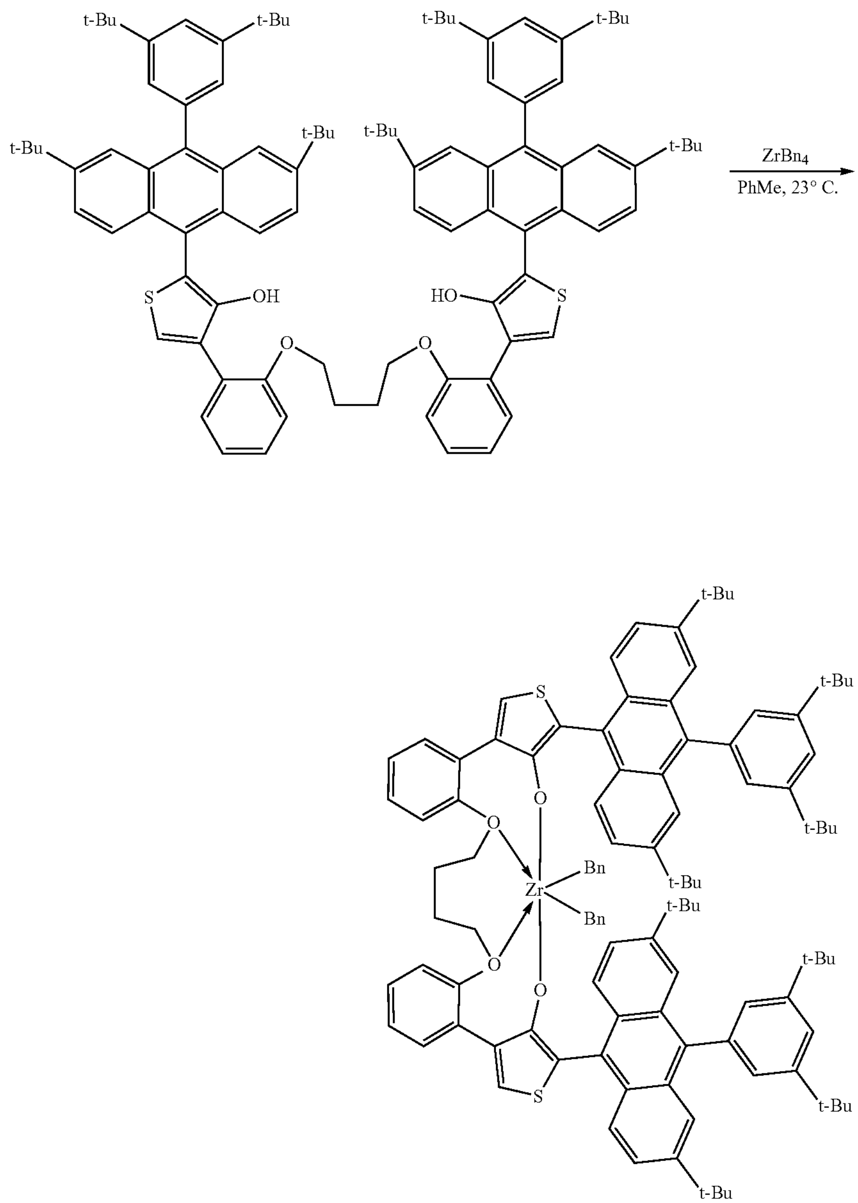

Ligand 6 was azeotropically dried using PhMe (4×10 mL) prior to use. To a clear golden yellow solution of the thiophene (21.8 mg, 0.0157 mmol, 1.00 eq) in anhydrous toluene (2.80 mL) in a nitrogen filled glovebox at 23° C. was added a solution of $ZrBn_4$ (7.1 mg, 0.0157 mmol, 1.00 eq) in toluene (0.29 mL) in a dropwise manner. After stirring (500 rpm) for 30 mins the pale golden yellow solution was concentrated, the resultant golden yellow solid was suspended in hexanes (3 mL), concentrated, this suspension/concentration process was repeated 2× more, the resultant complex was suspended in hexanes (3 mL), stirred vigorously (1000 rpm) for 2 mins, filtered through a 0.20 μm PTFE filter, rinsed with hexanes (3×3 mL), and the hexanes filtrate was concentrated to afford the zirconium complex as a golden yellow solid (25.7 mg, 0.0154 mmol, 98%). NMR indicated product. 2.2:1 rotameric mixture.

$^1H$ NMR (400 MHz, Benzene-$d_6$) δ 8.72-8.67 (m, 2H), 8.24 (dt, J=2.4, 1.2 Hz, 2H), 8.11-8.04 (m, 2H), 7.81 (dd, J=2.0, 0.6 Hz, 2H), 7.66 (t, J=1.9 Hz, 2H), 7.60 (t, J=1.6 Hz, 2H), 7.45-7.24 (m, 8H), 7.05 (s, 2H), 7.04-6.79 (m, 10H), 6.74 (td, J=7.2, 1.3 Hz, 2H), 5.85-5.81 (m, 4H), 5.00 (dd, J=8.0, 1.4 Hz, 2H), 4.19-4.10 (m, 2H), 3.34 (d, J=11.8 Hz, 2H), 1.36 (s, 18H), 1.25 (s, 18H), 1.24 (s, 18H), 1.24-1.15 (m, 2H), 1.10 (s, 18H), 0.95-0.91 (m, 2H), 0.61 (d, J=11.9 Hz, 2H), 0.20 (d, J=11.9 Hz, 2H). $^{13}C$ NMR (126 MHz, Benzene-$d_6$) δ 156.02, 155.85, 150.85, 150.68, 150.40, 147.60, 146.78, 146.28, 139.19, 138.76, 133.45, 131.64, 131.30, 130.64, 130.55, 130.20, 129.62, 129.31, 128.17, 126.10, 125.82, 125.41, 123.61, 123.17, 121.99, 121.58, 120.34, 120.29, 114.84, 109.99, 72.76, 72.01, 34.81, 34.74, 34.67, 34.63, 31.42, 31.29, 30.75, 30.60, 25.72.

Example 24: Synthesis of Procatalyst 12

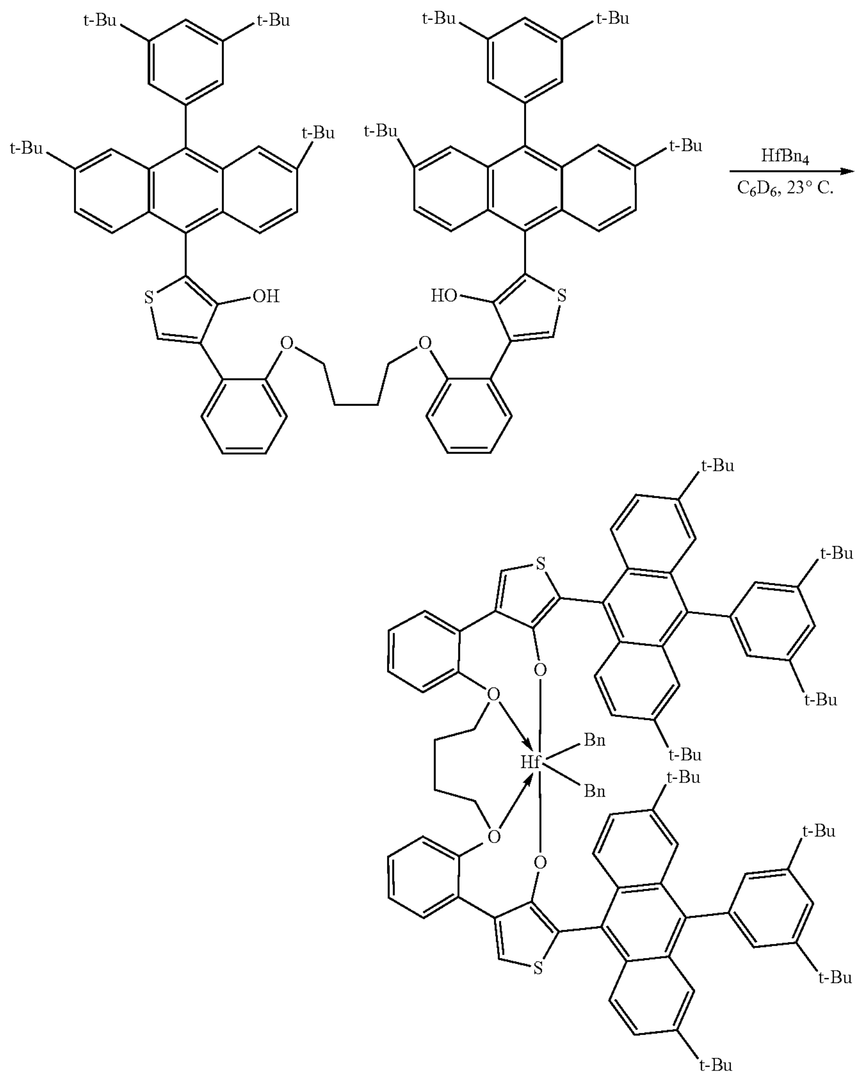

Ligand 6 was azeotropically dried using PhMe (4×10 mL) prior to use. To a clear golden yellow solution of the thiophene (15.6 mg, 0.0112 mmol, 1.00 eq) in anhydrous $C_6D_6$ (1.00 mL) in a nitrogen filled glovebox at 23° C. was added a solution of $HfBn_4$ (6.1 mg, 0.0112 mmol, 1.00 eq) in $C_6D_6$ (0.25 mL) in a dropwise manner. After stirring (500 rpm) for 20 mins the pale golden yellow solution was filtered using a 0.20 μm PTFE submicron filter to afford the hafnium complex as a 0.009 M solution in $C_6D_6$. NMR indicated product. The same procedure can be used with PhMe to prepare the procatalyst solution (0.005 M) which is used directly after filtration for the polymerization experiments.

$^1$H NMR (400 MHz, Benzene-$d_6$) δ 8.68 (d, J=9.2 Hz, 2H), 8.25 (d, J=2.0 Hz, 2H), 8.01 (d, J=9.4 Hz, 2H), 7.81 (d, J=1.9 Hz, 2H), 7.67 (t, J=1.8 Hz, 2H), 7.61 (t, J=1.6 Hz, 2H), 7.39-7.35 (m, 4H), 7.31-7.26 (m, 4H), 7.05 (s, 2H), 7.09-6.85 (m, 10H), 6.76-6.70 (m, 2H), 5.93-5.86 (m, 4H), 4.95 (dd, J=7.9, 1.5 Hz, 2H), 4.14 (d, J=11.5 Hz, 2H), 3.33 (d, J=11.7 Hz, 2H), 1.36 (s, 18H), 1.34-1.31 (m, 2H), 1.25 (s, 18H), 1.24 (s, 18H), 1.11 (s, 18H), 0.91-0.84 (m, 2H), 0.50 (d, J=13.1 Hz, 2H), −0.09 (d, J=13.1 Hz, 2H). $^{13}$C NMR (101 MHz, Benzene-$d_6$) δ 156.08, 155.66, 150.85, 150.41, 147.82, 147.64, 146.26, 139.12, 138.79, 133.13, 131.61, 131.32, 130.62, 130.13, 129.42, 129.39, 128.89, 128.13, 127.97, 127.03, 127.00, 126.91, 126.79, 126.31, 126.25, 125.81, 125.66, 125.59, 125.26, 115.09, 80.70, 77.66, 34.79, 34.73, 34.64, 34.62, 31.40, 31.29, 30.73, 30.59, 25.84.

Example 25: Synthesis of Boropinacolate Ester Intermediate to Ligand 6

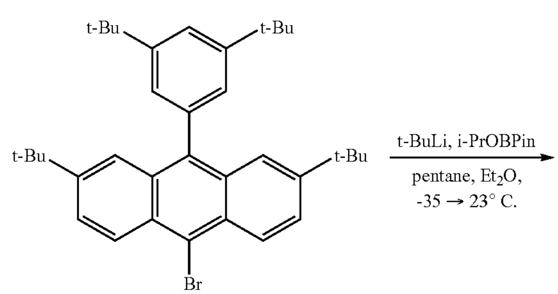

-continued

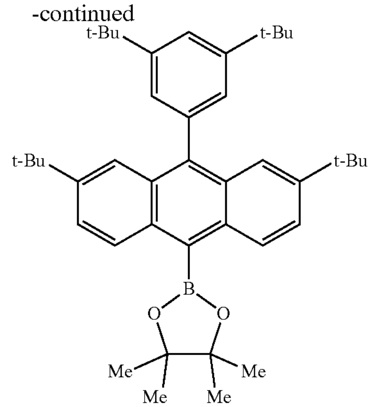

To a precooled solution of t-BuLi (3.2 mL, 5.397 mmol, 3.30 eq, 1.7 M in pentane) in anhydrous deoxygenated pentane (25 mL) in a nitrogen filled glovebox at −35° C. (precooled for 16 hrs) was added the solid anthracenylbromide (0.912 g, 1.635 mmol, 1.00 eq). Then, a precooled solution of pentane/$Et_2O$ (30 mL, 1:1) was added in a quick dropwise manner while stirring vigorously (1000 rpm). The now golden yellow mixture was allowed to sit in the freezer (−35° C.) for 4 hrs upon which neat i-PrOBPin (1.25 mL, 6.122 mmol, 3.30 eq) was added via syringe to the now red-brown mixture. The now pale yellow heterogeneous mixture was allowed to stir at 23° C. for 3 hrs, i-PrOH (3 mL) was added, the mixture was removed from the glovebox, water (20 mL) and $Et_2O$ (30 mL) was added, the biphasic mixture was stirred for 2 mins, poured into a separatory funnel, partitioned, organics were washed with water (2×25 mL), residual organics were extracted with $Et_2O$ (2×25 mL), combined, dried over solid $Na_2SO_4$, decanted, concentrated, the resultant pale yellow mixture was suspended in $CH_2Cl_2$ (20 mL), suction filtered through silica gel, rinsed with $CH_2Cl_2$ (4×25 mL), and the resulting filtrate solution was concentrated to afford the anthracenyl boropinacolate ester as a pale yellow foam (0.960 g, 1.588 mmol, 97%). NMR indicated product.

$^1$H NMR (500 MHz, Chloroform-d) δ 8.49 (dd, J=9.1, 0.6 Hz, 2H), 7.70 (dd, J=2.1, 0.7 Hz, 2H), 7.61 (dd, J=9.2, 2.1 Hz, 2H), 7.56 (t, J=1.9 Hz, 1H), 7.31 (d, J=1.8 Hz, 2H), 1.62 (s, 12H), 1.43 (s, 18H), 1.32 (s, 18H). $^{13}$C NMR (126 MHz, Chloroform-d) δ 150.88, 150.20, 146.33, 140.60, 138.05, 134.05, 129.79, 128.08, 125.82, 124.53, 122.14, 121.98, 121.11, 120.40, 84.15, 35.00, 34.89, 31.66, 30.89, 25.22.

Example 26: Synthesis of Bromide Intermediate to Ligand 6

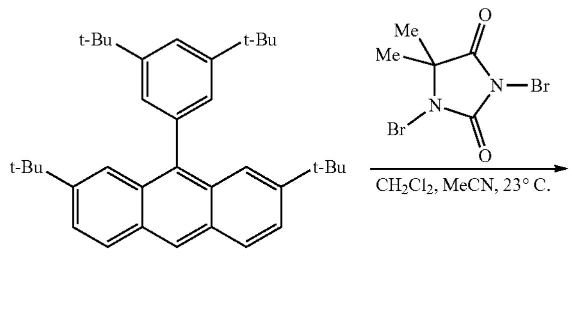

-continued

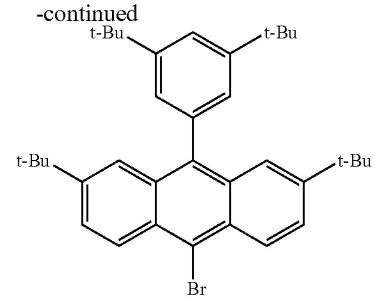

To a pale yellow solution of the di-t-butylanthracene (0.791 g, 1.653 mmol, 1.00 eq) in $CH_2Cl_2$/MeCN (40 mL, 1:1) at 23° C. was added solid dibromo-dimethylhydantoin (0.250 g, 0.8761 mmol, 0.53 eq) all at once. The golden yellow suspension was stirred (500 rpm) for 4 hrs upon which TLC indicated full conversion of the starting anthracene. The solution was concentrated onto celite, and purified via silica gel chromatography; hexanes to afford the bromoanthracene as a white foam (0.912 g, 1.635 mmol, 99%). NMR indicated pure product.

$^1$H NMR (400 MHz, Chloroform-d) δ 8.58 (d, J=9.3 Hz, 2H), 7.75 (d, J=1.8 Hz, 2H), 7.72 (dd, J=9.2, 2.0 Hz, 2H), 7.62 (t, J=1.8 Hz, 1H), 7.36 (d, J=1.8 Hz, 2H), 1.47 (s, 18H), 1.36 (s, 18H). $^{13}$C NMR (101 MHz, Chloroform-d) δ 150.47, 147.34, 138.56, 137.38, 131.17, 128.66, 127.50, 125.96, 125.88, 122.17, 122.02, 120.74, 35.06, 34.95, 31.68, 30.88.

Example 27: Synthesis of Anthracenyl Intermediate to Ligand 6

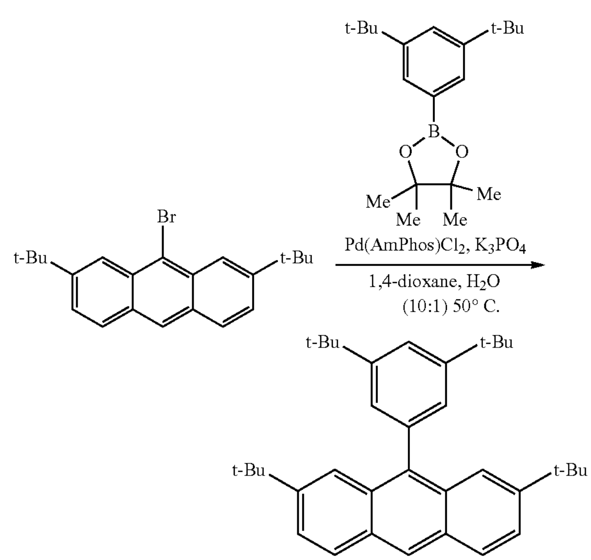

A mixture of the bromoanthracene (0.623 g, 1.687 mmol, 1.00 eq), Pd(AmPhos)$Cl_2$ (0.119 g, 0.1687 mmol, 0.10 eq), $K_3PO_4$ (1.611 g, 7.590 mmol, 4.50 eq), and the boropinacolate ester (0.800 g, 2.530 mmol, 1.50 eq) was evacuated, then back-filled with nitrogen, this was repeated 4× more, then freshly sparged deoxygenated 1,4-dioxane (15 mL) and water (1.5 mL) was added, the canary yellow mixture was placed in a mantle heated to 50° C., after stirring for 6 hrs TLC indicated complete consumption of the starting bromoanthracene, the now purple-black mixture was diluted with $CH_2Cl_2$ (20 mL), suction filtered through a pad of silica gel, rinsed with $CH_2Cl_2$ (4×20 mL), the filtrate was concentrated onto celite, and purified via silica gel chromatography; hexanes to afford the 3,5-di-t-butylphenyl-bis-t-butylanthracene as a white foam (0.791 g, 1.653 mmol, 98%). NMR indicated pure product.

$^1$H NMR (400 MHz, Chloroform-d) δ 8.40 (s, 1H), 8.00 (dd, J=8.9, 0.6 Hz, 2H), 7.77 (dt, J=1.8, 0.8 Hz, 2H), 7.60-7.56 (m, 3H), 7.38 (d, J=1.8 Hz, 2H), 1.46 (s, 18H), 1.36 (s, 18H). $^{13}$C NMR (101 MHz, Chloroform-d) δ 150.24, 147.03, 137.89, 137.64, 130.23, 129.88, 128.00, 126.02, 125.01, 124.13, 122.16, 121.44, 120.43, 35.09, 35.04, 31.69, 30.98.

Example 28: Synthesis of Bromoanthracene Intermediate for Ligand 6

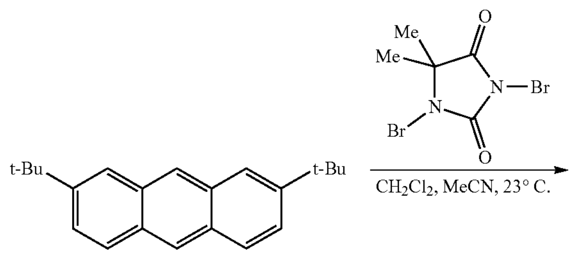

-continued

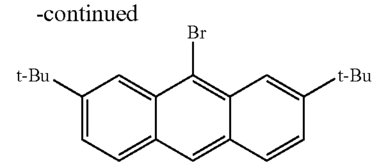

To a pale yellow slight suspension of the di-t-butylanthracene (1.035 g, 3.563 mmol, 1.00 eq) in $CH_2Cl_2$/MeCN (50 mL, 1:1) at 23° C. was added solid dibromo-dimethylhydantoin (0.510 g, 1.782 mmol, 0.50 eq) all at once. The now dark golden yellow suspension was stirred (500 rpm) for 90 mins upon which the mixture was concentrated, suspended in MeOH (30 mL), placed in a mantle heated to 70° C., stirred vigorously (1000 rpm) for 30 mins, the golden yellow mixture was then allowed to slowly, gradually cool to 23° C., suction filtered, the resultant solid was washed with MeOH (4×10 mL), and dried in vacuo to afford the bromo-di-t-butylanthracene as an off-white powder (0.623 g, 1.687 mmol, 47%). NMR indicated pure product.

$^1$H NMR (400 MHz, Chloroform-d) δ 8.40 (dt, J=1.6, 0.7 Hz, 2H), 8.31 (s, 1H), 7.90 (dt, J=8.9, 0.6 Hz, 2H), 7.56 (dd, J=8.8, 1.8 Hz, 2H), 1.47 (s, 18H). $^{13}$C NMR (101 MHz, Chloroform-d) δ 149.61, 130.53, 130.51, 128.26, 125.81, 124.83, 122.25, 121.90, 35.41, 30.93.

Example 29: Synthesis of Ligand 7

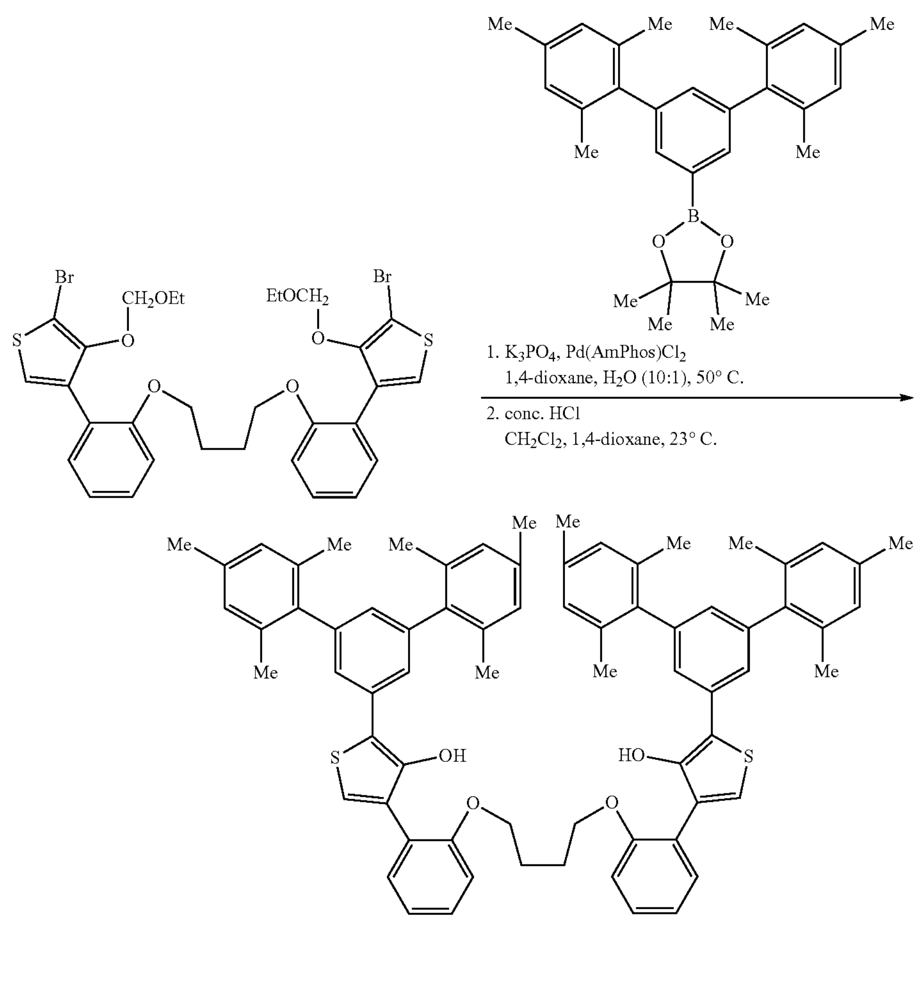

To vial equipped with a stirbar was added the dibromide (0.386 g, 0.5418 mmol, 1.00 eq), $K_3PO_4$ (1.035 g, 4.876 mmol, 9.0 eq), Pd(AmPhos)$Cl_2$ (78.0 mg, 0.1084 mmol, 0.20 eq), and the mesityl terphenyl boropinacol ester (0.716 g, 1.625 mmol, 3.00 eq). The mixture was evacuated, then back-filled with nitrogen, this process was repeated 3× more, then deoxygenated 1,4-dioxane (6.0 mL) and water (0.6 mL) were added sequentially via syringe. The vial was sealed with a PTFE cap under a purging flow of nitrogen, and then placed in a mantle heated to 50° C. After stirring (1000 rpm) for 36 hrs the purple-black mixture was removed from the mantle, allowed to cool gradually to 23° C., suction filtered over a pad of silica gel, washed with $CH_2Cl_2$ (4×20 mL), the clear purple filtrate was concentrated, residual 1,4-dioxane was remove azeotropically on the rotovap with toluene (3×10 mL), the resultant black mixture was suspended in $CH_2Cl_2$ (10 mL), suction filtered through silica gel to remove residual insoluble impurities, washed with $CH_2Cl_2$ (4×20 mL), the purple filtrate was concentrated onto celite, and purified via silica gel chromatography using an ISCO chromatography purification system; 25%-65% $CH_2Cl_2$ in hexanes to afford the bisprotected coupled thiophene as a white foam (0.519 g, 0.4400 mmol, 81%). NMR indicated pure product.

To a solution of the protected bisthiophene in $CH_2Cl_2$ (5 mL) and 1,4-dioxane (5 mL) was added conc. HCl (5 mL). The dark golden brown solution was vigorously stirred (1000 rpm) at 23° C. for 24 hrs under nitrogen, then diluted with aqueous HCl (25 mL, 1 N) and $CH_2Cl_2$ (20 mL), the biphasic mixture was poured into a separatory funnel, partitioned, organics were washed with aqueous HCl (2×20 mL, 1 N), the residual organics were extracted from the aqueous layer using $CH_2Cl_2$ (2×10 mL), combined, dried over solid $Na_2SO_4$, decanted, concentrated onto celite, and purified via silica gel chromatography using an ISCO chromatography purification system; 25%-80% $CH_2Cl_2$ in hexanes to afford the bishydroxythiophene ligand as a white foam (0.324 g, 0.3047 mmol, 69%, 56% two steps). NMR indicated pure product.

$^1$H NMR (500 MHz, Chloroform-d) δ 7.65 (d, J=1.5 Hz, 4H), 7.38 (dd, J=7.6, 1.7 Hz, 2H), 7.29 (ddd, J=8.2, 7.4, 1.7 Hz, 2H), 7.07 (td, J=7.5, 1.1 Hz, 2H), 7.03 (s, 4H), 6.97-6.93 (m, 8H), 6.87 (dd, J=8.4, 1.1 Hz, 2H), 6.79 (t, J=1.5 Hz, 2H), 4.05-3.97 (m, 4H), 2.33 (s, 12H), 2.10 (s, 24H), 1.92-1.84 (m, 4H). $^{13}$C NMR (126 MHz, Chloroform-d) δ 153.96, 148.35, 141.20, 139.03, 136.44, 135.95, 134.06, 133.00, 131.64, 129.39, 128.20, 128.05, 125.48, 124.72, 122.78, 119.86, 119.56, 113.87, 69.54, 25.82, 21.04, 20.85.

Characterization of the Protected Ligand:

$^1$H NMR (400 MHz, Chloroform-d) δ 7.51 (d, J=1.6 Hz, 4H), 7.41 (dd, J=7.6, 1.8 Hz, 2H), 7.24-7.18 (m, 2H), 7.16 (s, 2H), 6.97-6.90 (m, 10H), 6.84 (t, J=1.6 Hz, 2H), 6.79 (dd, J=8.3, 1.1 Hz, 2H), 4.65 (s, 4H), 3.87 (m, 4H), 3.11 (q, J=7.0 Hz, 4H), 2.31 (s, 12H), 2.08 (s, 24H), 1.86 (q, J=3.2, 2.7 Hz, 4H), 0.76 (t, J=7.0 Hz, 6H). $^{13}$C NMR (101 MHz, Chloroform-d) δ 156.30, 148.94, 141.53, 138.68, 136.52, 135.74, 133.80, 133.60, 130.90, 129.03, 128.76, 128.06, 127.40, 126.74, 124.47, 121.26, 120.38, 112.31, 96.92, 67.82, 64.79, 25.95, 21.02, 20.78, 14.63.

Example 30: Synthesis of Procatalyst 13

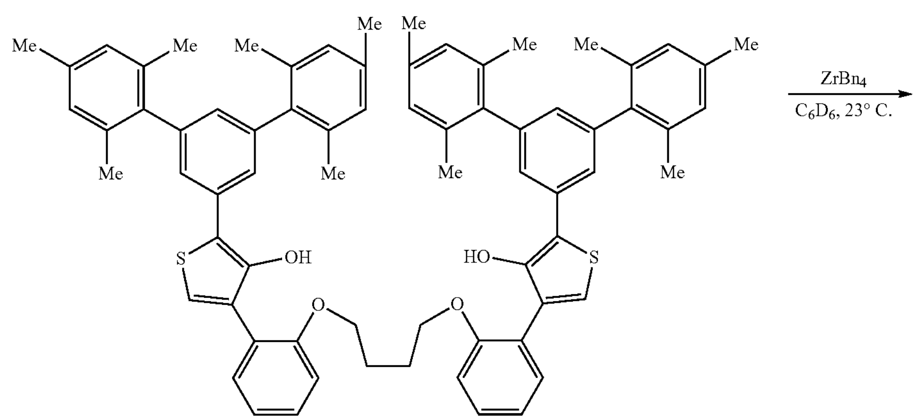

-continued

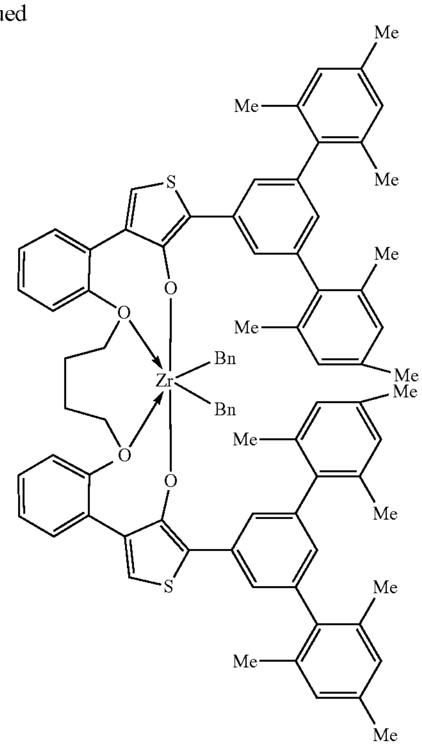

Ligand 7 was azeotropically dried using PhMe (4×10 mL) prior to use. To a white suspension of the thiophene (18.2 mg, 0.0171 mmol, 1.00 eq) in anhydrous $C_6D_6$ (1.48 mL) in a nitrogen filled glovebox at 23° C. was added a solution of $ZrBn_4$ (7.8 mg, 0.0171 mmol, 1.00 eq) in $C_6D_6$ (0.32 mL) in a dropwise manner. After stirring (500 rpm) for 1 hr the pale golden yellow solution was filtered using a 0.20 μm PTFE submicron filter to afford the zirconium complex as a 0.01 M solution in $C_6D_6$. NMR indicated product, and the same procedure can be used with PhMe to prepare the procatalyst solution in 0.005 M which is used directly after filtration for the polymerization experiments.

$^1$H NMR (400 MHz, Benzene-$d_6$) δ 8.17 (d, J=1.5 Hz, 4H), 7.01-6.93 (m, 2H), 6.90 (td, J=7.4, 7.0, 1.1 Hz, 2H), 6.87-6.80 (m, 6H), 6.79-6.75 (m, 8H), 6.74 (t, J=1.5 Hz, 2H), 6.70-6.64 (m, 4H), 6.60 (s, 2H), 6.18-6.12 (m, 4H), 4.38-4.26 (m, 2H), 3.68 (d, J=11.5 Hz, 2H), 2.20 (s, 12H), 2.14 (s, 12H), 2.12 (s, 12H), 1.99 (d, J=12.0 Hz, 2H), 1.41 (d, J=12.0 Hz, 2H), 0.94-0.81 (m, 2H), 0.47-0.32 (m, 2H). $^{13}$C NMR (101 MHz, Benzene-$d_6$) δ 155.62, 154.42, 147.07, 142.28, 138.70, 136.20, 135.63, 135.47, 135.17, 134.89, 132.27, 130.01, 129.73, 128.89, 128.32, 128.29, 128.13, 127.24, 126.61, 125.44, 125.25, 123.16, 120.79, 119.58, 119.05, 81.18, 74.98, 26.65, 20.98, 20.84, 20.70.

Example 31: Synthesis of Procatalyst 14

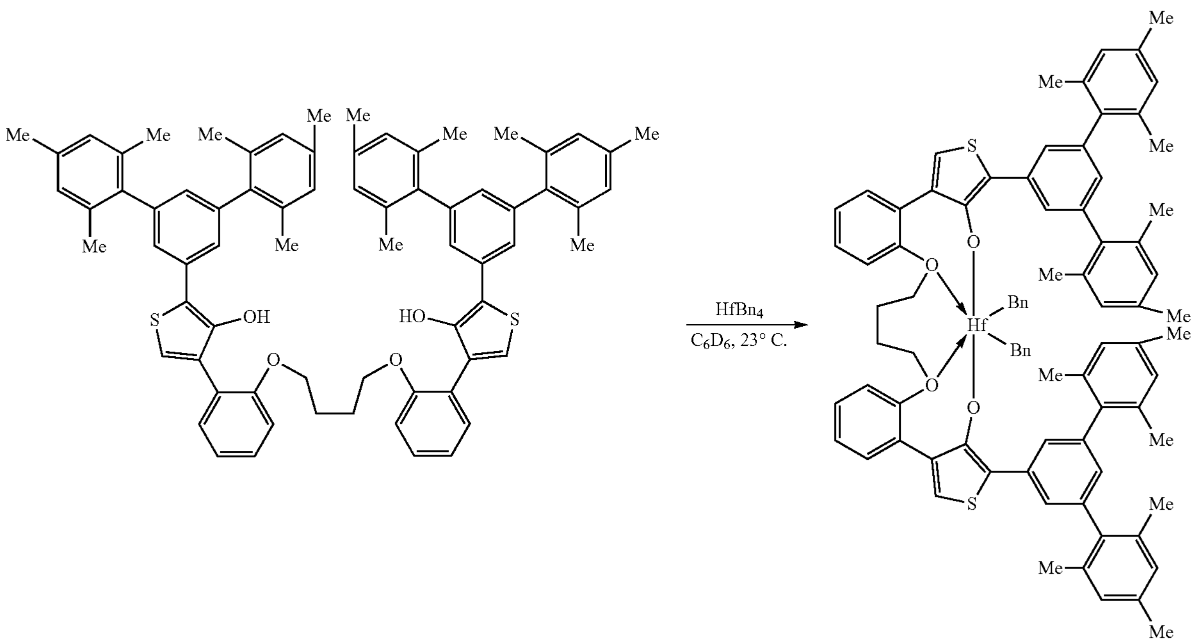

Ligand 7 was azeotropically dried using PhMe (4×10 mL) prior to use. To a white suspension of the thiophene (18.5 mg, 0.0174 mmol, 1.00 eq) in anhydrous $C_6D_6$ (1.31 mL) in a nitrogen filled glovebox at 23° C. was added a solution of $HfBn_4$ (9.5 mg, 0.0174 mmol, 1.00 eq) in $C_6D_6$ (0.39 mL) in a dropwise manner. After stirring (500 rpm) for 1 hr the pale golden yellow solution was filtered using a 0.20 μm PTFE submicron filter to afford the hafnium complex as a 0.01 M solution in $C_6D_6$. NMR indicated product, and the same procedure can be used with PhMe to prepare the procatalyst solution in 0.005 M which is used directly after filtration for the polymerization experiments.

$^1$H NMR (400 MHz, Benzene-$d_6$) δ 8.14 (d, J=1.5 Hz, 4H), 7.12-7.03 (m, 2H), 6.97-6.93 (m, 2H), 6.93-6.83 (m, 6H), 6.77 (dd, J=8.6, 1.6 Hz, 8H), 6.74 (t, J=1.5 Hz, 2H), 6.72-6.68 (m, 2H), 6.67-6.62 (m, 2H), 6.60 (s, 2H), 6.19-6.13 (m, 4H), 4.43-4.33 (m, 2H), 3.73 (dd, J=12.7, 4.5 Hz, 2H), 2.19 (s, 12H), 2.14 (s, 13H), 2.12 (s, 14H), 1.82 (d, J=12.9 Hz, 2H), 1.19 (d, J=12.9 Hz, 2H), 0.89 (t, J=10.2 Hz, 2H), 0.36 (d, J=11.3 Hz, 2H). $^{13}$C NMR (101 MHz, Benzene-$d_6$) δ 155.44, 154.44, 147.58, 142.26, 138.70, 136.20, 135.48, 135.31, 135.15, 134.78, 132.30, 130.04, 129.75, 128.80, 128.34, 128.28, 128.15, 127.05, 126.95, 126.15, 125.39, 123.35, 120.84, 119.52, 119.50, 81.95, 79.19, 26.70, 20.98, 20.86, 20.70.

Example 32: Synthesis of mesityl m-terphenyl bromide intermediate for Ligand 7

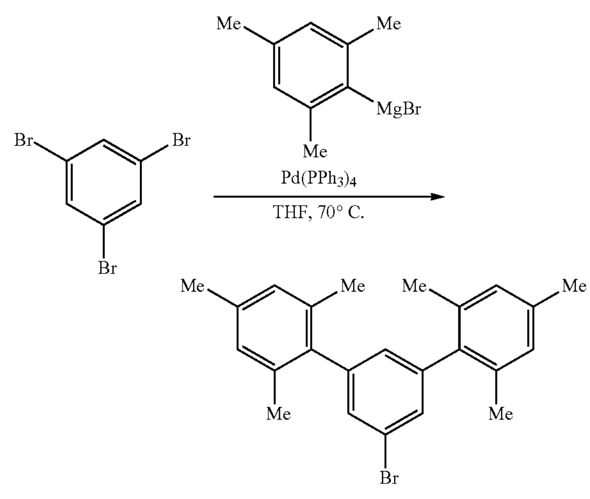

To a solution of the tribromobenzene (1.000 g, 3.177 mmol, 1.00 eq) and $Pd(PPh_3)_4$ (0.367 g, 0.3177 mmol, 0.10 eq) in anhydrous deoxygenated THF (30 mL) in a nitrogen filled glovebox at 23° C. was added a solution of 2,4,6-trimethylphenylmagnesium bromide (8.0 mL, 7.943 mmol, 2.50 eq, 1.0 M in THF) in a quick dropwise manner. The resultant red-black solution was placed in a mantle heated to 70° C., stirred vigorously (1000 rpm) for 18 hrs, removed from the mantle, allowed to cool gradually to 23° C., neutralized with i-PrOH (5 mL), removed from the glovebox, concentrated, the resultant dark red-black mixture was suspended in $CH_2Cl_2$ (25 mL), suction filtered over a pad of silica gel, rinsed with $CH_2C_2$ (4×25 mL), the resultant golden brown solution was concentrated onto celite, and purified via silica gel chromatography; hexanes to afford the 3,5-bis-(2,4,6-trimethylphenyl)-phenybromide as a white solid (0.428 g, 1.088 mmol, 34%). NMR indicated pure product.

$^1$H NMR (400 MHz, Chloroform-d) δ 7.28 (d, J=1.5 Hz, 2H), 6.93 (s, 4H), 6.87 (d, J=1.6 Hz, 1H), 2.32 (s, 6H), 2.05 (s, 12H). $^{13}$C NMR (101 MHz, Chloroform-d) δ 143.21, 137.47, 136.96, 135.63, 130.43, 129.27, 128.13, 122.41, 21.01, 20.71.

Example 33: Synthesis of the Boropinacolate Intermediate to Ligand 7

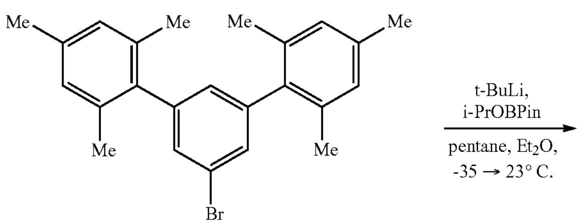

-continued

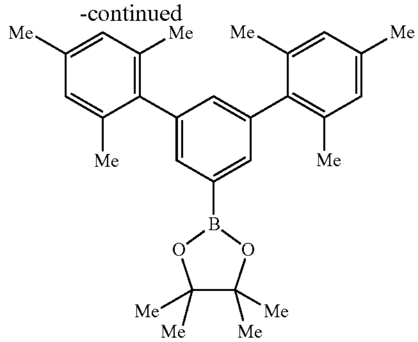

To a precooled solution of t-BuLi (10.0 mL, 16.938 mmol, 3.30 eq, 1.7 M in pentane) in anhydrous deoxygenated pentane (45 mL) in a nitrogen filled glovebox at −35° C. (precooled for 16 hrs) was added a precooled suspension of the mesityl-m-terphenyl bromide (2.019 g, 5.133 mmol, 1.00 eq) in pentane/$Et_2O$ (30 mL, 1:1) in a dropwise manner over 10 mins. The now golden yellow mixture was allowed to sit in the freezer (−35° C.) for 4 hrs upon which neat i-PrOBPin (3.50 mL, 16.938 mmol, 3.30 eq) was added via syringe. The now pale yellow heterogeneous mixture was allowed to stir at 23° C. for 3 hrs, i-PrOH (3 mL) was added, the mixture was removed from the glovebox, water (20 mL) and $Et_2O$ (30 mL) was added, the biphasic mixture was stirred for 2 mins, poured into a separatory funnel, partitioned, organics were washed with water (2×25 mL), residual organics were extracted with $Et_2O$ (2×25 mL), combined, dried over solid $Na_2SO_4$, decanted, concentrated onto celite, and purified via silica gel chromatography on the ISCO; hexanes-50% $CH_2Cl_2$ in hexanes to afford the mesityl-m-terphenyl boropinacolate ester as a white foam (2.095 g, 4.757 mmol, 93%). NMR indicated pure product.

$^1$H NMR (500 MHz, Chloroform-d) δ 7.58 (dt, J=2.9, 1.7 Hz, 2H), 7.07 (p, J=1.8 Hz, 1H), 6.94 (d, J=2.0 Hz, 4H), 2.34 (s, 6H), 2.07 (s, 12H), 1.37 (s, 12H). $^{13}$C NMR (126 MHz, Chloroform-d) δ 140.52, 138.93, 136.27, 135.80, 133.84, 133.10, 127.95, 83.70, 24.98, 21.04, 20.90.

Example 34: Synthesis of Ligand 8

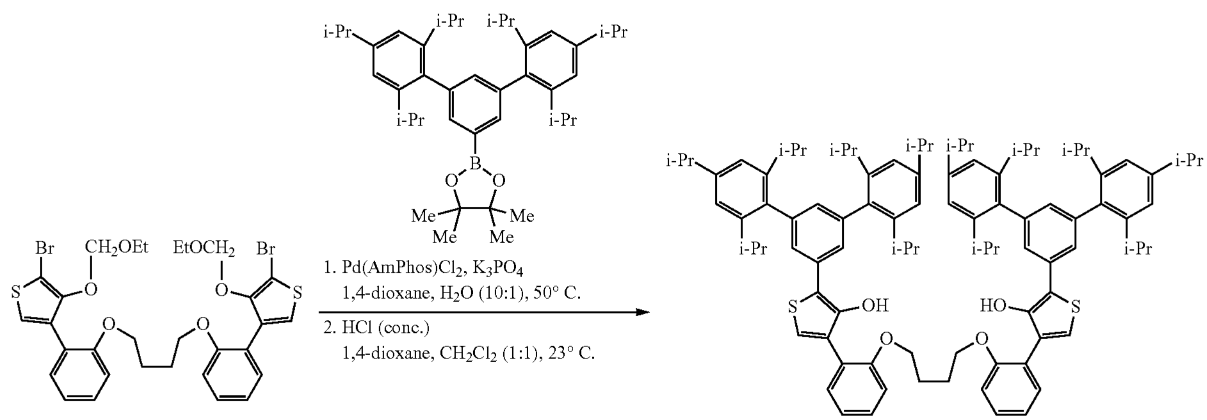

To vial equipped with a stirbar was added the dibromide (0.390 g, 0.5476 mmol, 1.00 eq), $K_3PO_4$ (1.046 g, 4.928 mmol, 9.00 eq), Pd(AmPhos)$Cl_2$ (78.0 mg, 0.1095 mmol, 0.20 eq), and the TRIP-m-terphenylboropinacol ester (1.000 g, 1.643 mmol, 3.00 eq). The mixture was evacuated, then back-filled with nitrogen, this process was repeated 3× more, then deoxygenated 1,4-dioxane (10.0 mL) and water (1.0 mL) were added sequentially via syringe. The mixture was placed under a purging flow of nitrogen, and then placed in a mantle heated to 50° C. After stirring (1000 rpm) for 48 hrs the purple-black mixture was removed from the mantle, allowed to cool gradually to 23° C., diluted with $CH_2Cl_2$ (20 mL), suction filtered over a pad of silica gel, washed with $CH_2Cl_2$ (4×20 mL), the clear purple filtrate was concentrated, residual 1,4-dioxane was removed azeotropically on the rotovap with toluene (3×10 mL), the resultant black mixture was suspended in $CH_2Cl_2$ (10 mL), suction filtered through silica gel to remove residual insoluble impurities, washed with $CH_2Cl_2$ (4×20 mL), the purple filtrate was concentrated onto celite, and purified via silica gel chromatography using an ISCO chromatography purification system; 10%-60% $CH_2Cl_2$ in hexanes to afford the bisprotected coupled thiophene as a golden yellow foam (0.748 g, 0.4928 mmol, 90%). NMR indicated pure product.

To a solution of the protected bisthiophene in $CH_2Cl_2$ (10 mL) and 1,4-dioxane (10 mL) was added conc. HCl (10 mL). The dark golden brown solution was vigorously stirred (1000 rpm) at 23° C. for 24 hrs under nitrogen, then diluted with aqueous HCl (25 mL, 1 N) and $CH_2Cl_2$ (20 mL), the biphasic mixture was poured into a separatory funnel, partitioned, organics were washed with aqueous HCl (1×20 mL, 1 N), the residual organics were extracted from the aqueous layer using $CH_2Cl_2$ (2×10 mL), combined, dried over solid $Na_2SO_4$, decanted, concentrated onto celite, and purified via silica gel chromatography using an ISCO chromatography purification system; 10%-60% $CH_2Cl_2$ in hexanes to afford the bishydroxythiophene ligand as a golden yellow amorphous foam (0.610 g, 0.4357 mmol, 88%, 80% two steps). NMR indicated pure product.

$^1$H NMR (400 MHz, Chloroform-d) δ 7.76 (t, J=1.5 Hz, 4H), 7.37 (dt, J=7.6, 1.5 Hz, 2H), 7.28-7.22 (m, 2H), 7.08-7.01 (m, 14H), 6.86 (dd, J=4.9, 3.3 Hz, 4H), 4.00 (d, J=5.8 Hz, 4H), 2.94 (hept, J=6.9 Hz, 4H), 2.88-2.76 (m, 8H), 1.88 (d, J=5.3 Hz, 4H), 1.31 (d, J=6.9 Hz, 24H), 1.15 (d, J=6.9 Hz, 24H), 1.06 (d, J=6.9 Hz, 24H). $^{13}$C NMR (101 MHz, Chloroform-d) δ 153.91, 148.57, 147.69, 146.53, 140.55, 137.04, 133.17, 133.14, 131.69, 129.42, 129.30, 125.49, 124.52, 122.69, 120.44, 119.85, 119.57, 113.59, 69.39, 34.25, 30.41, 25.73, 24.26, 24.24, 24.08.

Characterization of the Protected Ligand:

$^1$H NMR (400 MHz, Chloroform-d) δ 7.61 (d, J=1.5 Hz, 4H), 7.42 (dd, J=7.6, 1.8 Hz, 2H), 7.22-7.17 (m, 2H), 7.18 (s, 2H), 7.06 (s, 8H), 6.93 (dd, J=15.0, 1.0 Hz, 2H), 6.93 (d, J=1.3 Hz, 2H), 6.81 (dd, J=8.3, 1.0 Hz, 2H), 4.68 (s, 4H), 3.91 (d, J=5.4 Hz, 4H), 3.12 (q, J=7.0 Hz, 4H), 2.94 (p, J=6.9 Hz, 5H), 2.81 (p, J=6.8 Hz, 9H), 1.85 (q, J=3.1 Hz, 4H), 1.30 (d, J=7.0 Hz, 28H), 1.16 (d, J=6.8 Hz, 25H), 1.07 (d, J=6.8 Hz, 27H), 0.75 (t, J=7.0 Hz, 6H). $^{13}$C NMR (101 MHz, Chloroform-d) δ 156.28, 148.90, 147.86, 146.43, 140.87, 136.63, 133.81, 132.81, 130.94, 130.18, 128.72, 127.69, 126.85, 124.42, 121.39, 120.46, 120.36, 112.34, 96.83, 67.85, 64.73, 34.27, 30.41, 25.84, 24.42, 24.11, 24.07, 14.55.

Example 35: Synthesis of Procatalyst 15

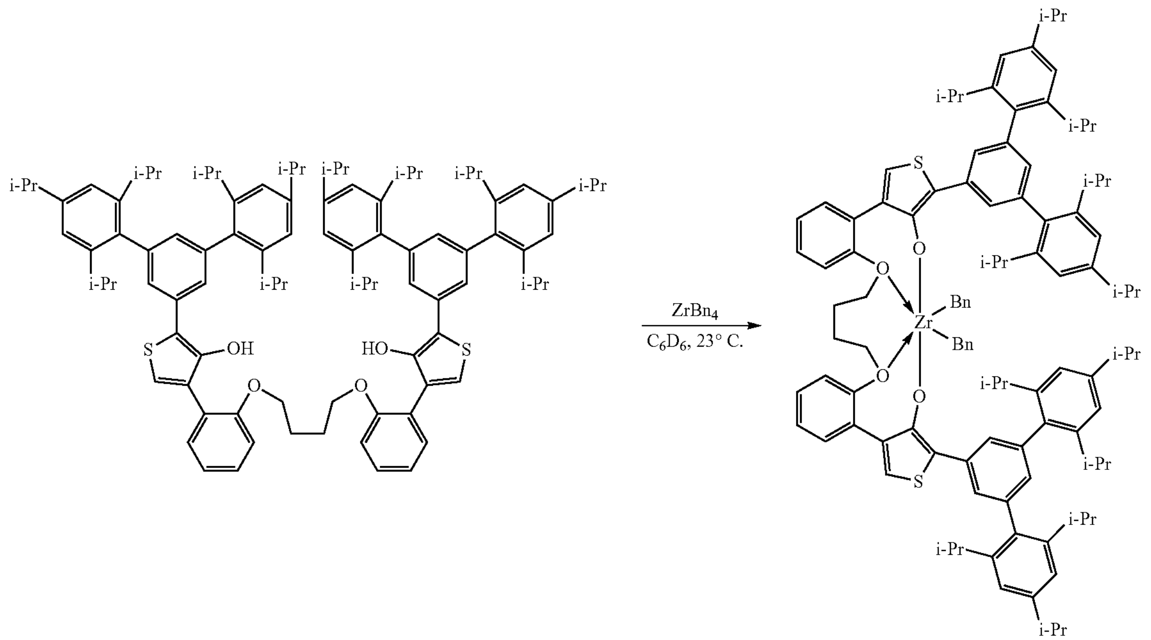

Ligand 8 was azeotropically dried using PhMe (4×10 mL) prior to use. To a white suspension of the thiophene (9.4 mg, 0.00671 mmol, 1.00 eq) in anhydrous $C_6D_6$ (1.10 mL) in a nitrogen filled glovebox at 23° C. was added a solution of $ZrBn_4$ (3.1 mg, 0.00671 mmol, 1.00 eq) in $C_6D_6$ (0.13 mL) in a dropwise manner. After stirring (500 rpm) for 1 hr the pale golden yellow solution was filtered using a 0.20 μm PTFE submicron filter to afford the zirconium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^1$H NMR (400 MHz, Benzene-$d_6$) δ 8.28 (d, J=1.5 Hz, 4H), 7.91 (d, J=1.5 Hz, 2H), 7.21-7.11 (m, 6H), 6.99-6.93 (m, 4H), 6.90 (td, J=7.5, 1.2 Hz, 2H), 6.81-6.67 (m, 6H), 6.63-6.57 (m, 2H), 6.60 (s, 2H), 6.53 (t, J=7.0 Hz, 2H), 6.08-6.02 (m, 4H), 4.34 (t, J=10.9 Hz, 2H), 3.80-3.71 (m, 2H), 3.21 (p, J=6.8 Hz, 4H), 3.10 (hept, J=6.9 Hz, 4H), 2.98 (p, J=6.8 Hz, 2H), 2.92-2.76 (m, 6H), 1.96 (d, J=11.7 Hz, 2H), 1.61 (d, J=11.8 Hz, 2H), 1.28 (d, J=6.9 Hz, 6H), 1.24 (dd, J=6.9, 1.7 Hz, 24H), 1.19 (ddd, J=9.6, 6.7, 3.5 Hz, 24H), 1.15 (d, J=7.1 Hz, 12H), 1.09 (d, J=6.8 Hz, 6H), 0.79 (t, J=10.1 Hz, 2H), 0.30-0.22 (m, 2H). $^{13}$C NMR (101 MHz, Benzene-$d_6$) δ 155.34, 154.46, 148.27, 148.07, 146.75, 146.59, 146.30, 141.51, 141.39, 137.09, 136.96, 135.89, 134.42, 132.14, 130.57, 130.10, 129.77, 129.25, 128.82, 128.15, 126.78, 126.01, 125.95, 123.22, 122.88, 120.81, 120.69, 120.63, 120.60, 120.33, 119.32, 81.43, 74.81, 34.54, 34.46, 34.43, 30.65, 30.60, 30.51, 26.80, 25.47, 24.37, 24.16, 24.11, 24.02, 23.97, 23.81.

Example 36: Synthesis of Procatalyst 16

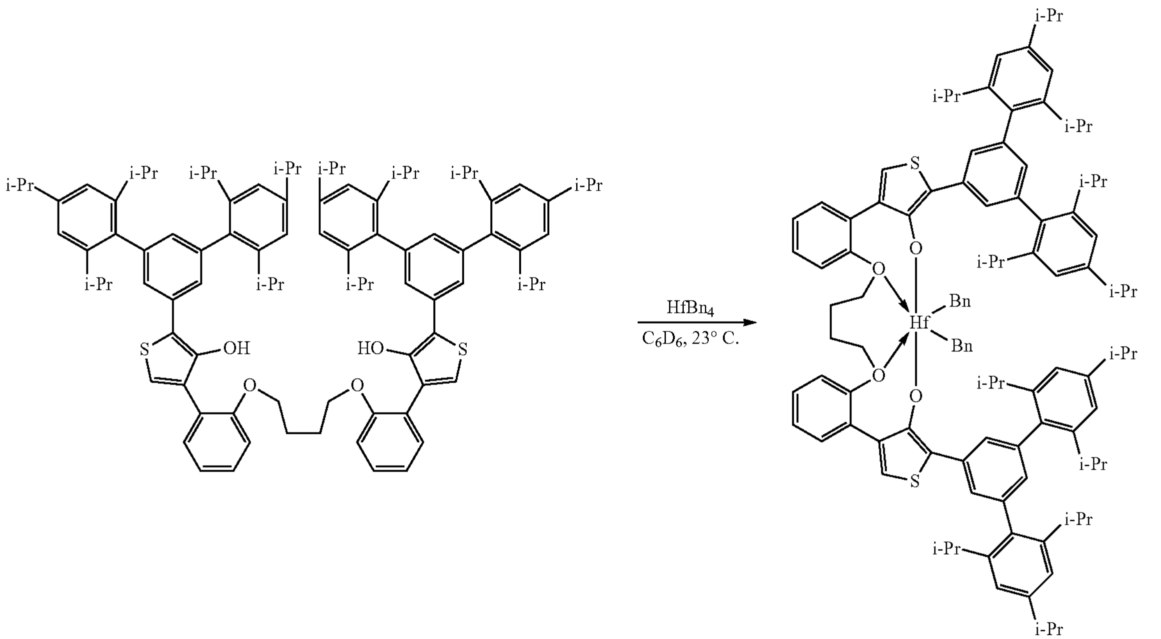

Ligand 8 was azeotropically dried using PhMe (4×10 mL) prior to use. To a white suspension of the thiophene (18.0 mg, 0.0129 mmol, 1.00 eq) in anhydrous $C_6D_6$ (1.0 mL) in a nitrogen filled glovebox at 23° C. was added a solution of $HfBn_4$ (7.0 mg, 0.0129 mmol, 1.00 eq) in $C_6D_6$ (0.28 mL) in a dropwise manner. After stirring (500 rpm) for 1 hr the pale golden yellow solution was filtered using a 0.20 μm PTFE submicron filter to afford the hafnium complex as a 0.01 M solution in $C_6D_6$. NMR indicated product which exists as a mixture of isomers/rotomers. The same procedure can be used with PhMe as the solvent to prepare the procatalyst solution (0.005 M) which is used directly after filtration for the polymerization experiments.

$^1$H NMR (400 MHz, Benzene-$d_6$) δ 8.25 (d, J=1.5 Hz, 4H), 8.08 (d, J=1.5 Hz, 2H), 7.23-7.11 (m, 6H), 7.08-7.04 (m, 2H), 7.04-6.70 (m, 10H), 6.60 (s, 2H), 6.60-6.52 (m, 2H), 6.51-6.41 (m, 2H), 6.11-6.05 (m, 2H), 5.89 (d, J=7.6 Hz, 2H), 4.47-4.34 (m, 2H), 3.80 (d, J=12.7 Hz, 2H), 3.20 (p, J=6.9 Hz, 2H), 3.16-2.92 (m, 6H), 2.82 (dtt, J=13.7, 10.0, 6.9 Hz, 4H), 1.78 (t, J=12.2 Hz, 2H), 1.35 (d, J=12.7 Hz, 2H), 1.32-1.12 (m, 54H), 1.10 (d, J=6.8 Hz, 6H), 0.99 (d, J=6.8 Hz, 6H), 0.89 (d, J=6.8 Hz, 6H), 0.78 (t, J=10.2 Hz, 2H), 0.22 (q, J=11.7 Hz, 2H). $^{13}$C NMR (101 MHz, Benzene-$d_6$) δ 155.12, 154.44, 153.79, 152.36, 148.13, 148.06, 146.87, 146.71, 146.60, 146.38, 146.28, 146.07, 145.10, 141.51, 136.97, 136.57, 135.56, 134.62, 134.32, 133.63, 132.16, 130.18, 129.79, 128.93, 128.59, 128.15, 126.98, 126.41, 126.20, 125.91, 123.40, 120.92, 120.83, 120.69, 120.64, 120.25, 120.12, 119.82, 82.23, 79.41, 34.47, 34.43, 30.82, 30.66, 30.60, 30.54, 25.70, 25.47, 24.54, 24.36, 24.15, 24.03, 23.97, 23.95, 23.83, 23.64.

Example 37: Synthesis of Bromide Intermediate to Ligand 8

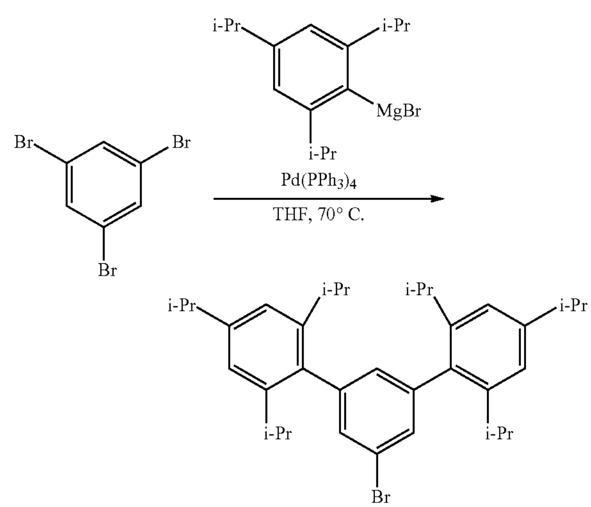

To a solution of the tribromobenzene (0.500 g, 1.588 mmol, 1.00 eq) and $Pd(PPh_3)_4$ (0.184 g, 0.1588 mmol, 0.10 eq) in anhydrous deoxygenated THF (10 mL) in a nitrogen filled glovebox at 23° C. was added a solution of 2,4,6-triisopropylphenylmagnesium bromide (8.0 mL, 3.970 mmol, 2.50 eq, 0.5 M in THF) in a quick dropwise manner. The resultant red-black solution was placed in a mantle heated to 70° C., stirred vigorously (1000 rpm) for 24 hrs, removed from the mantle, allowed to cool gradually to 23° C., neutralized with i-PrOH (5 mL), removed from the glovebox, concentrated, the resultant dark red-black mixture was suspended in $CH_2Cl_2$ (25 mL), suction filtered over a pad of silica gel, rinsed with $CH_2Cl_2$ (4×25 mL), the resultant golden brown solution was concentrated onto celite, and purified via silica gel chromatography; hexanes to afford the 3,5-bis-(2,4,6-isopropylphenyl)-phenylbromide as a white solid (0.368 g, 0.6543 mmol, 41%). NMR indicated pure product.

$^1H$ NMR (500 MHz, Chloroform-d) δ 7.33 (d, J=1.4 Hz, 2H), 7.03 (s, 4H), 6.95 (t, J=1.5 Hz, 1H), 2.92 (hept, J=6.9 Hz, 2H), 2.68 (hept, J=6.9 Hz, 4H), 1.28 (d, J=6.9 Hz, 12H), 1.15 (d, J=6.8 Hz, 12H), 1.04 (d, J=6.9 Hz, 12H). $^{13}C$ NMR (126 MHz, Chloroform-d) δ 148.32, 146.33, 142.58, 135.39, 130.66, 130.34, 121.88, 120.55, 34.30, 30.44, 24.34, 24.06.

Example 38: Synthesis of Boropinacolate Ester Intermediate to Ligand 8

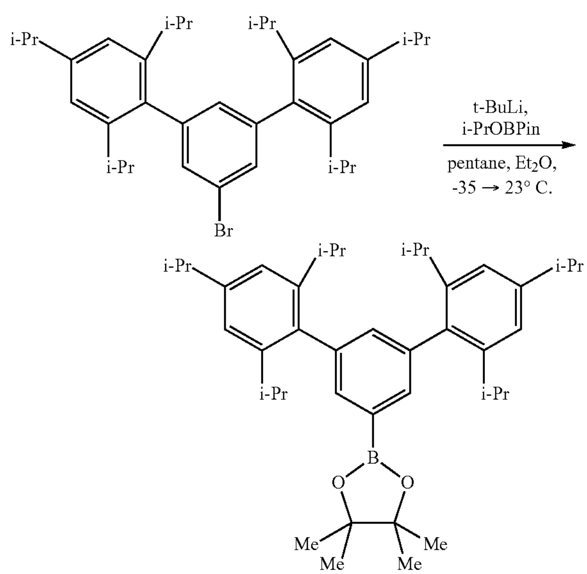

To a precooled solution of t-BuLi (10.0 mL, 16.500 mmol, 3.50 eq, 1.7 M in pentane) in anhydrous deoxygenated pentane (40 mL) in a nitrogen filled glovebox at −35° C. (precooled for 16 hrs) was added a precooled suspension of the TRIP-m-terphenyl bromide (2.648 g, 4.714 mmol, 1.00 eq) in pentane/$Et_2O$ (30 mL, 1:1) in a dropwise manner over 10 mins. The now golden yellow mixture was allowed to sit in the freezer (−35° C.) for 4 hrs upon which neat i-PrOBPin (3.40 mL, 16.500 mmol, 3.50 eq) was added via syringe. The now pale yellow heterogeneous mixture was allowed to stir at 23° C. for 3 hrs, i-PrOH (3 mL) was added to neutralize any residual t-BuLi, the mixture was removed from the glovebox, water (20 mL) and $Et_2O$ (30 mL) was added, the biphasic mixture was stirred for 2 mins, poured into a separatory funnel, partitioned, organics were washed with water (2×25 mL), residual organics were extracted with $Et_2O$ (2×25 mL), combined, dried over solid $Na_2SO_4$, decanted, concentrated onto celite, and purified via silica gel chromatography on the ISCO; hexanes-50% $CH_2Cl_2$ in hexanes to afford the TRIP-m-terphenyl boropinacolate ester as a white foam (1.165 g, 1.914 mmol, 41%). NMR indicated pure product.

$^1H$ NMR (500 MHz, Chloroform-d) δ 7.61 (d, J=1.7 Hz, 2H), 7.15 (t, J=1.8 Hz, 1H), 7.04 (s, 4H), 2.94 (p, J=6.9 Hz, 2H), 2.73 (p, J=6.8 Hz, 4H), 1.34 (s, 12H), 1.31 (d, J=6.9 Hz, 12H), 1.16 (d, J=6.9 Hz, 12H), 1.05 (d, J=6.9 Hz, 12H). $^{13}C$ NMR (126 MHz, Chloroform-d) δ 147.64, 146.47, 139.69, 136.95, 134.16, 133.95, 120.31, 83.60, 34.30, 30.33, 28.85, 25.01, 24.82, 24.48, 24.12, 24.03.

Example 39: Synthesis of Ligand 9

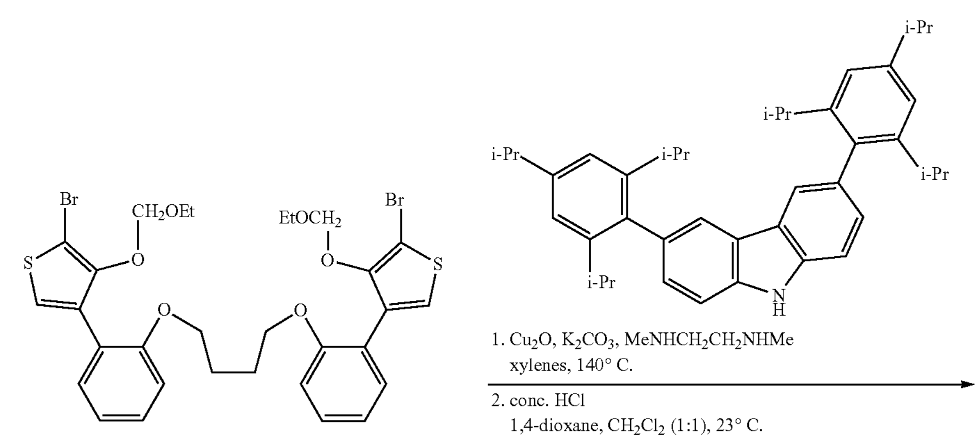

-continued

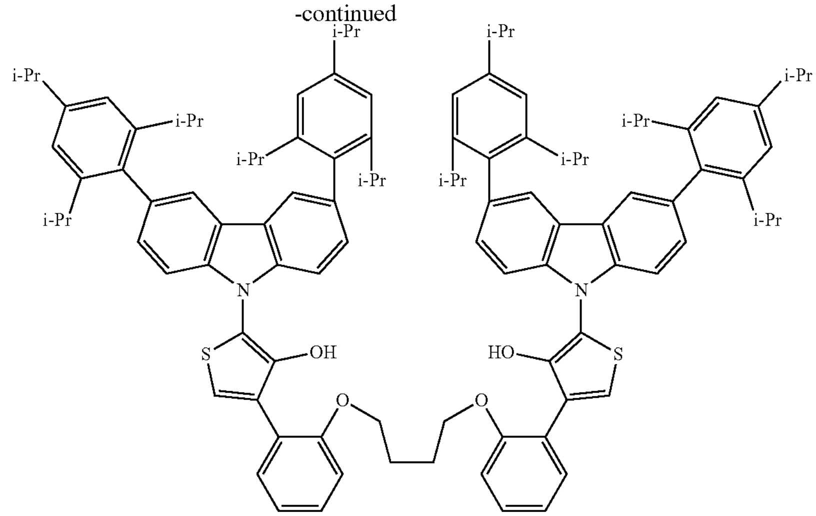

The dibromide was azeotropically dried using PhMe (4×10 mL) prior to use. In a nitrogen filled glovebox a solid mixture of the dibromide (0.864 g, 1.213 mmol, 1.00 eq), the carbazole (2.043 g, 3.572 mmol, 2.95 eq), $Cu_2O$ (0.868 g, 6.063 mmol, 5.00 eq), and $K_2CO_3$ (3.353 g, 24.260 mmol, 20.0 eq) in an oven-dried flask equipped with a stirbar and reflux condenser was suspended in anhydrous deoxygenated xylenes (25.0 mL), neat N,N'-dimethylethylenediamine (1.30 mL, 11.930 mmol, 10.00 eq) was added via syringe, the mixture was then sealed under nitrogen, removed from the glovebox, placed under nitrogen, placed in a mantle heated to 140° C., stirred vigorously (1000 rpm) for 72 hrs, the dark red heterogeneous mixture was removed from the mantle, allowed to cool gradually to 23° C., diluted with $CH_2Cl_2$ (30 mL), stirred vigorously (1000 rpm) for 2 mins, suction filtered over silica gel using $CH_2Cl_2$ as the eluent, rinsed with $CH_2Cl_2$ (4×25 mL), the golden orange filtrate was concentrated onto celite, and purified via silica gel chromatography; 10%-45% $CH_2Cl_2$ in hexanes to afford the biscarbazoyl-thiophene as a white foam (0.384 g, 0.2269 mmol, 19%). NMR indicated product which contained trace impurities. The product was used in the subsequent reaction without further purification.

To a solution of the protected hydroxythiophene (0.384 g, 0.2269 mmol, 1.00 eq) in $CH_2Cl_2$ (5 mL) and 1,4-dioxane (5 mL) was added concentrated HCl (5 mL) under nitrogen at 23° C. After stirring vigorously (1000 rpm) for 16 hrs the pale golden brown solution was diluted with aqueous HCl (20 mL, 1 N) and $CH_2Cl_2$ (20 mL), poured into a separatory funnel, partitioned, organics were washed with aqueous HCl (1×20 mL), residual organics were extracted from the aqueous layer using $CH_2Cl_2$ (2×20 mL), combined, dried over solid $Na_2SO_4$, decanted, concentrated onto celite, and purified via silica gel chromatography; 10%-50% $CH_2Cl_2$ in hexanes to afford the hydroxythiophene as a pale yellow foam (0.306 g, 0.1941 mmol, 86%, 16% two steps). NMR indicated pure product.

$^{1}$H NMR (400 MHz, Chloroform-d) δ 7.91 (d, J=1.5 Hz, 4H), 7.55 (dd, J=7.6, 1.8 Hz, 2H), 7.46 (d, J=8.3 Hz, 4H), 7.28-7.21 (m, 8H), 7.16-7.09 (m, 10H), 7.00 (s, 2H), 6.95 (dd, J=8.3, 1.1 Hz, 2H), 4.15 (d, J=5.1 Hz, 4H), 3.01 (hept, J=6.9 Hz, 4H), 2.79 (hept, J=7.0 Hz, 8H), 2.03 (h, J=2.7 Hz, 4H), 1.38 (d, J=6.9 Hz, 24H), 1.13 (d, J=5.9 Hz, 36H), 1.06 (d, J=6.8 Hz, 12H). $^{13}$C NMR (101 MHz, Chloroform-d) δ 154.20, 148.01, 147.75, 147.15, 141.02, 137.48, 132.93, 131.44, 130.77, 129.69, 128.24, 124.53, 123.29, 122.98, 121.15, 120.56, 119.59, 115.23, 113.97, 109.84, 69.79, 34.35, 30.27, 26.03, 24.36, 24.18.

Characterization of the Protected Ligand 9:

$^{1}$H NMR (400 MHz, Chloroform-d) δ 7.84 (s, 4H), 7.55 (t, J=6.8 Hz, 6H), 7.37 (s, 2H), 7.28 (dd, J=8.3, 1.5 Hz, 4H), 7.26-7.20 (m, 2H), 7.10 (d, J=3.3 Hz, 8H), 7.00 (t, J=7.5 Hz, 2H), 6.95 (d, J=8.3 Hz, 2H), 4.62 (s, 4H), 4.12 (d, J=5.2 Hz, 4H), 2.97 (hept, J=6.9 Hz, 4H), 2.84 (q, J=7.0 Hz, 4H), 2.74 (h, J=6.9 Hz, 8H), 2.07 (d, J=5.0 Hz, 4H), 1.34 (d, J=6.9 Hz, 24H), 1.09 (d, J=6.9 Hz, 48H), 0.54 (t, J=7.0 Hz, 6H). $^{13}$C NMR (101 MHz, Chloroform-d) δ 156.44, 148.84, 147.72, 147.15, 146.97, 140.95, 137.42, 132.92, 132.03, 130.91, 129.16, 128.30, 123.98, 123.21, 122.69, 120.92, 120.58, 120.57, 120.51, 112.36, 110.12, 97.06, 34.29, 30.24, 26.17, 24.38, 24.31, 24.29, 24.12, 14.11.

Example 40: Synthesis of Procatalyst 17

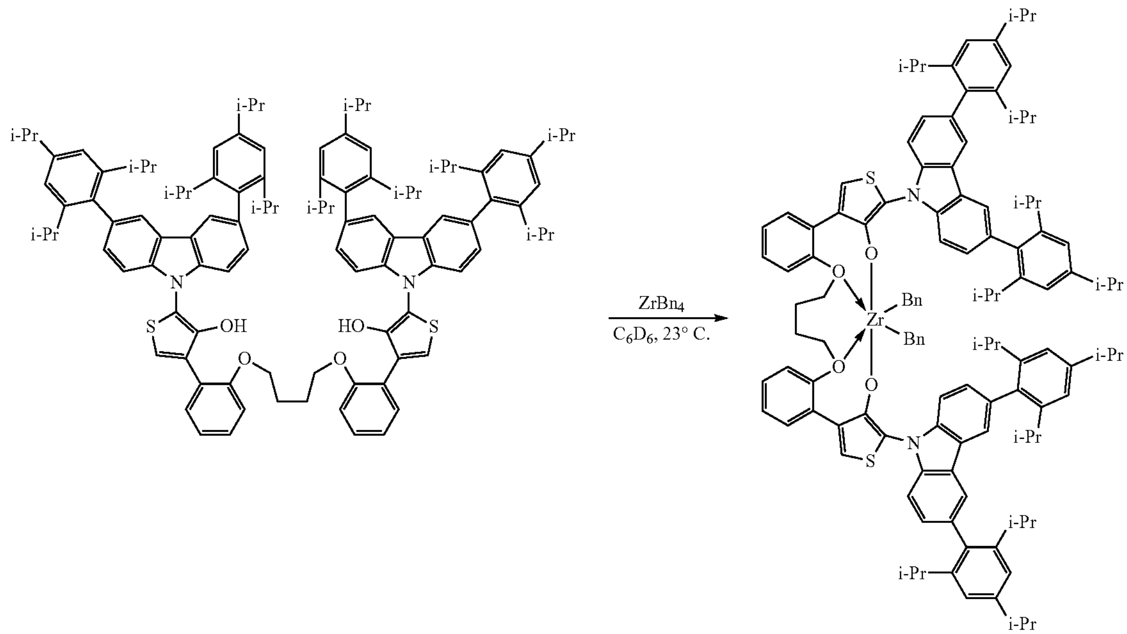

Ligand 9 was azeotropically dried using PhMe (4×10 mL) prior to use. To a clear colorless solution of the thiophene (20.0 mg, 0.0127 mmol, 1.00 eq) in anhydrous $C_6D_6$ (1.0 mL) in a nitrogen filled glovebox at 23° C. was added a solution of $ZrBn_4$ (5.8 mg, 0.0127 mmol, 1.00 eq) in $C_6D_6$ (0.24 mL) in a dropwise manner. After stirring (500 rpm) for 1 hr the pale golden yellow solution was filtered using a 0.20 μm PTFE submicron filter to afford the zirconium complex as a 0.01 M solution in $C_6D_6$. NMR indicated product which exists as a mixture of isomers/rotomers. The same procedure can be used with PhMe as the solvent to prepare the procatalyst solution (0.005 M) which is used directly after filtration for the polymerization experiments.

$^1$H NMR (400 MHz, Benzene-$d_6$) δ 8.09 (d, J=1.5 Hz, 2H), 7.97 (d, J=1.2 Hz, 2H), 7.75 (d, J=8.3 Hz, 2H), 7.41-7.35 (m, 4H), 7.25-7.12 (m, 10H), 6.97-6.94 (m, 4H), 6.85-6.75 (m, 6H), 6.62 (s, 2H), 6.61-6.55 (m, 2H), 6.12-6.05 (m, 4H), 5.89 (dd, J=8.0, 1.4 Hz, 2H), 4.13 (t, J=10.2 Hz, 2H), 3.42 (d, J=11.5 Hz, 2H), 3.09-2.69 (m, 12H), 1.86 (d, J=11.8 Hz, 2H), 1.38-0.97 (m, 62H), 0.97-0.88 (m, 6H), 0.85 (d, J=6.8 Hz, 6H), 0.89-0.80 (m, 2H), 0.76-0.65 (m, 2H). $^{13}$C NMR (101 MHz, Benzene-$d_6$) δ 155.12, 152.04, 148.20, 148.08, 147.83, 147.70, 147.66, 147.09, 146.69, 146.51, 140.61, 140.33, 137.84, 137.67, 133.67, 133.26, 133.00, 128.84, 128.15, 126.38, 124.55, 122.75, 122.54, 121.41, 121.13, 120.79, 120.75, 120.50, 120.44, 120.35, 120.10, 117.19, 115.44, 112.27, 108.98, 79.88, 75.02, 34.57, 34.48, 30.54, 30.49, 30.43, 30.34, 25.91, 24.78, 24.29, 24.27, 24.24, 24.11, 24.08, 24.04, 24.02.

Example 41: Synthesis of Procatalyst 18

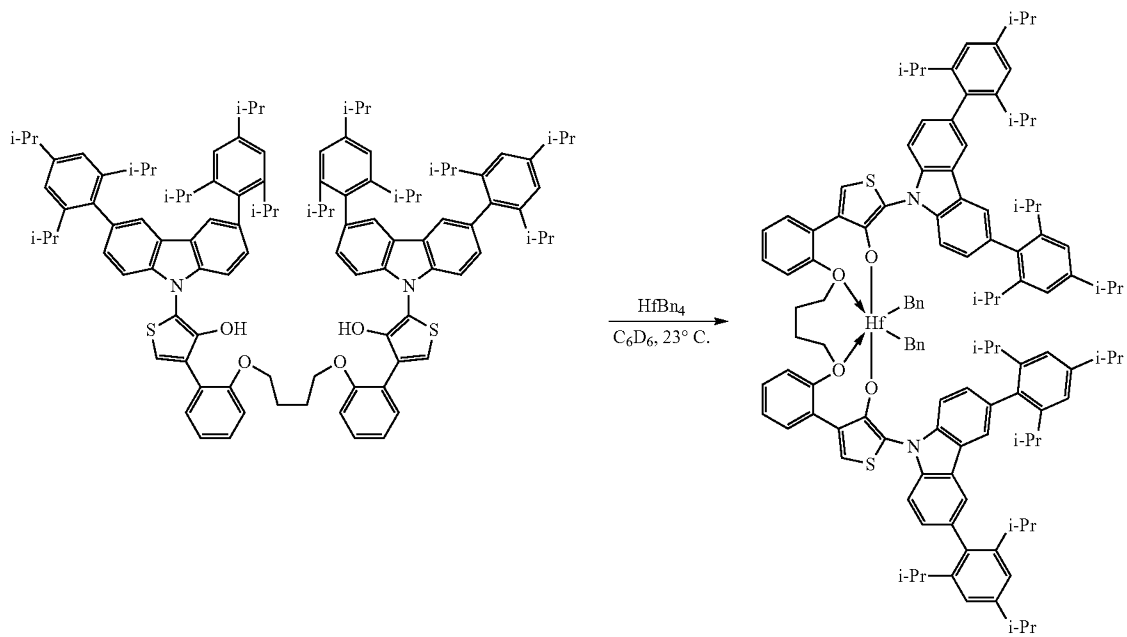

Ligand 9 was azeotropically dried using PhMe (4×10 mL) prior to use. To a clear colorless solution of the thiophene (20.0 mg, 0.0127 mmol, 1.00 eq) in anhydrous $C_6D_6$ (1.0 mL) in a nitrogen filled glovebox at 23° C. was added a solution of $HfBn_4$ (6.9 mg, 0.0127 mmol, 1.00 eq) in $C_6D_6$ (0.28 mL) in a dropwise manner. After stirring (500 rpm) for 1 hr the pale golden yellow solution was filtered using a 0.20 μm PTFE submicron filter to afford the hafnium complex as a 0.01 M solution in $C_6D_6$. NMR indicated product which exists as a mixture of isomers/rotomers. The same procedure can be used with PhMe as the solvent to prepare the procatalyst solution (0.005 M) which is used directly after filtration for the polymerization experiments.

$^1$H NMR (400 MHz, Benzene-$d_6$) δ 8.11 (dd, J=1.7, 0.6 Hz, 2H), 8.01-7.98 (m, 2H), 7.75-7.71 (m, 2H), 7.42-7.32 (m, 6H), 7.26 (s, 4H), 7.16 (dd, J=7.4, 2.0 Hz, 4H), 7.11 (dd, J=5.3, 2.4 Hz, 2H), 6.98-6.93 (m, 2H), 6.91-6.74 (m, 6H), 6.61 (s, 2H), 6.59-6.54 (m, 2H), 6.18-6.12 (m, 4H), 5.82 (dd, J=7.9, 1.6 Hz, 2H), 4.23 (t, J=10.7 Hz, 2H), 3.44 (d, J=11.2 Hz, 2H), 3.09-2.68 (m, 12H), 1.78 (d, J=13.0 Hz, 2H), 1.29 (dt, J=6.8, 1.9 Hz, 18H), 1.19 (ddd, J=7.1, 3.6, 2.0 Hz, 18H), 1.17-1.14 (m, 6H), 1.14-1.11 (m, 6H), 1.09 (dd, J=7.0, 1.9 Hz, 6H), 1.06 (d, J=6.8 Hz, 6H), 0.94 (d, J=6.8 Hz, 6H), 0.86 (d, J=6.9 Hz, 6H), 0.78 (d, J=8.5 Hz, 2H), 0.72 (d, J=13.1 Hz, 2H), 0.61 (d, J=13.2 Hz, 2H). $^{13}$C NMR (101 MHz, Benzene-$d_6$) δ 155.15, 151.90, 148.22, 147.82, 147.72, 147.60, 147.09, 146.58, 140.43, 140.12, 137.87, 137.66, 133.67, 133.24, 132.70, 131.67, 130.15, 129.85, 129.35, 129.02, 128.54, 128.15, 127.14, 126.61, 126.55, 126.18, 124.54, 124.32, 123.30, 122.60, 121.36, 121.06, 120.79, 120.75, 120.52, 120.33, 120.08, 116.92, 116.04, 112.43, 108.83, 81.55, 79.59, 34.57, 34.48, 30.54, 30.42, 30.33, 26.26, 24.79, 24.42, 24.36, 24.32, 24.29, 24.26, 24.10, 24.08, 24.04, 23.97, 23.91.

Example 42: Synthesis of Intermediate to Ligand 9

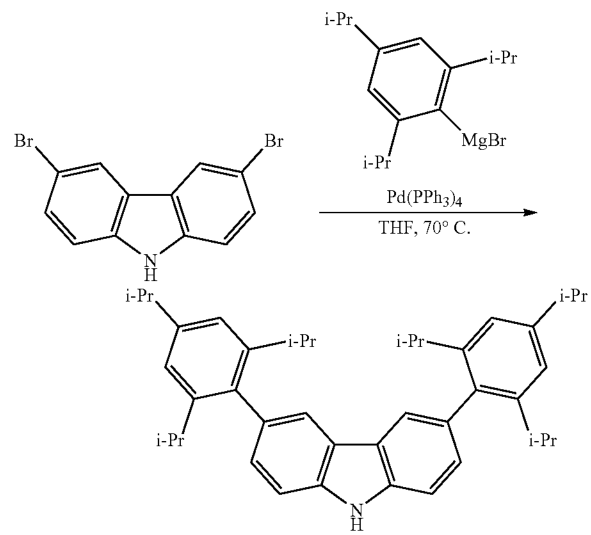

To a solution of 3,6-dibromocarbazole (2.000 g, 6.154 mmol, 1.00 eq) and $Pd(PPh_3)_4$ (0.711 g, 0.6155 mmol, 0.10 eq) in anhydrous deoxygenated THF (30 mL) in a nitrogen filled glovebox was added a solution of 2,4,6-triisopropylphenyl magnesium bromide (39.4 mL, 19.693 mmol, 3.30 eq, 0.5 M in THF) in a quick dropwise manner. The now golden yellow solution was placed in a mantle heated to 70° C., stirred (500 rpm) for 48 hrs, the resultant black solution was removed from the mantle, allowed to cool gradually to 23° C., neutralized with i-PrOH (10 mL), stirred for 2 mins, removed from the glovebox, diluted with $CH_2Cl_2$ (20 mL), suction filtered through silica gel, rinsed with $CH_2Cl_2$ (4×20 mL), the filtrate solution was concentrated onto celite, and purified via silica gel chromatography; hexanes-25% $CH_2Cl_2$ in hexanes to afford the disubstituted carbazole as a white solid (2.041 g, 3.569 mmol, 58%). NMR indicated pure product.

$^1$H NMR (500 MHz, Chloroform-d) δ 8.14 (s, 1H), 7.86-7.81 (m, 2H), 7.49 (dd, J=8.2, 0.7 Hz, 2H), 7.29-7.23 (m, 2H), 7.10 (s, 4H), 2.98 (hept, J=6.9 Hz, 2H), 2.75 (hept, J=6.9 Hz, 4H), 1.34 (d, J=7.0 Hz, 12H), 1.10 (d, J=6.9 Hz, 24H). $^{13}$C NMR (126 MHz, Chloroform-d) δ 147.64, 147.14, 138.58, 137.56, 131.93, 128.06, 123.04, 121.14, 120.52, 110.02, 34.28, 30.25, 24.35, 24.26, 24.12.

Example 43: Synthesis of Ligand 10 suction filtered over silica gel using $CH_2C_2$ as the eluent, rinsed with $CH_2Cl_2$ (4×25 mL), the golden orange filtrate was concentrated onto celite, and purified via silica gel chromatography; 10%-50% $CH_2Cl_2$ in hexanes to afford the biscarbazoyl-thiophene as a white foam (0.560 g, 0.3418 mmol, 28%). NMR indicated product. The product was used in the subsequent reaction without further purification.

To a solution of the protected hydroxythiophene (0.560 g, 0.3418 mmol, 1.00 eq) in $CH_2Cl_2$ (5 mL) and 1,4-dioxane (5 mL) was added concentrated HCl (5 mL) under nitrogen at 23° C. After stirring vigorously (1000 rpm) for 16 hrs the pale golden brown solution was diluted with aqueous HCl (20 mL, 1 N) and $CH_2Cl_2$ (20 mL), poured into a separatory funnel, partitioned, organics were washed with aqueous HCl (1×20 mL), residual organics were extracted from the aqueous layer using $CH_2Cl_2$ (2×20 mL), combined, dried over solid $Na_2SO_4$, decanted, concentrated onto celite, and purified via silica gel chromatography; 10%-50% $CH_2Cl_2$ in hexanes to afford the hydroxythiophene as a pale yellow foam (0.461 g, 0.3029 mmol, 89%, 25% two steps). NMR indicated pure product.

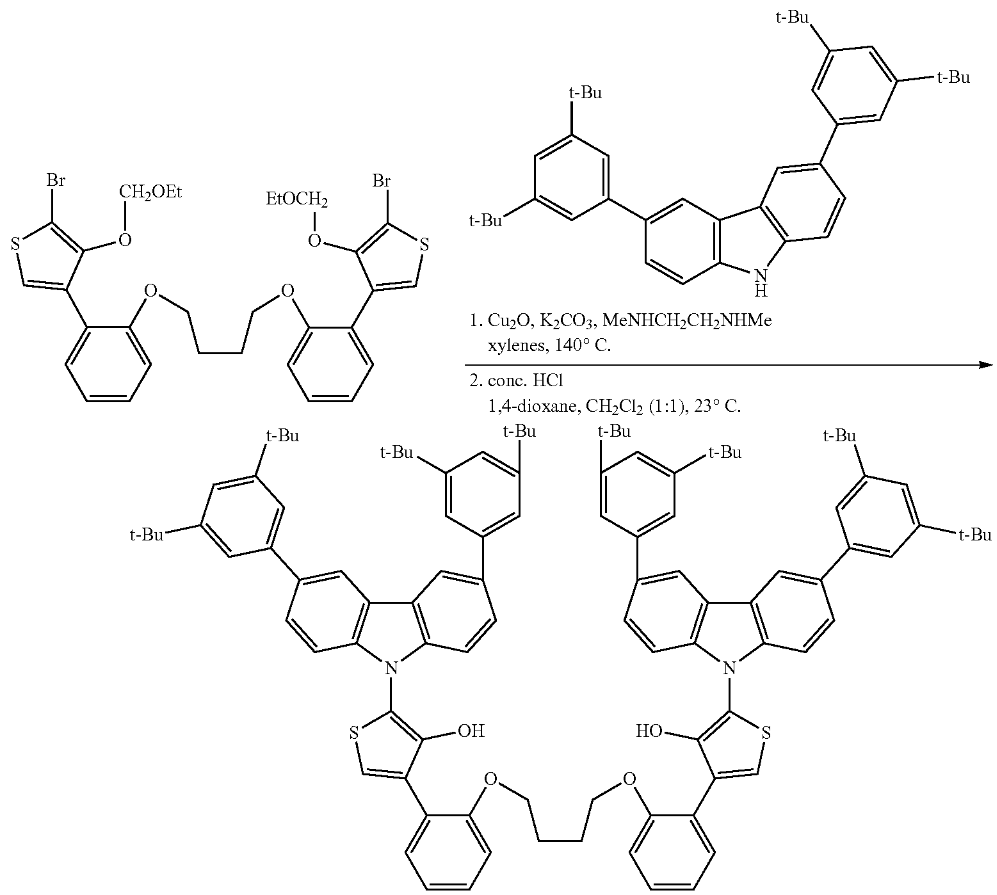

The dibromide was azeotropically dried using PhMe (4×10 mL) prior to use. In a nitrogen filled glovebox a solid mixture of the dibromide (0.864 g, 1.213 mmol, 1.00 eq), the carbazole (1.557 g, 2.863 mmol, 2.36 eq), $Cu_2O$ (0.868 g, 6.063 mmol, 5.00 eq), and $K_2CO_3$ (3.353 g, 24.260 mmol, 20.0 eq) in an oven-dried flask equipped with a stirbar and reflux condenser was suspended in anhydrous deoxygenated xylenes (25.0 mL), neat N,N'-dimethylethylenediamine (1.30 mL, 11.930 mmol, 10.00 eq) was added via syringe, the mixture was then sealed under nitrogen, removed from the glovebox, placed under nitrogen, placed in a mantle heated to 140° C., stirred vigorously (1000 rpm) for 72 hrs, the dark red heterogeneous mixture was removed from the mantle, allowed to cool gradually to 23° C., diluted with $CH_2Cl_2$ (30 mL), stirred vigorously (1000 rpm) for 2 mins, $^1$H NMR (400 MHz, Chloroform-d) δ 8.32 (d, J=1.6 Hz, 4H), 7.61 (dd, J=8.5, 1.7 Hz, 4H), 7.53-7.47 (m, 10H), 7.44 (t, J=1.8 Hz, 4H), 7.41 (d, J=8.4 Hz, 4H), 7.18 (s, 2H), 7.10 (td, J=7.8, 1.9 Hz, 2H), 7.04 (td, J=7.5, 1.2 Hz, 2H), 6.90 (s, 2H), 6.79 (dd, J=8.1, 1.2 Hz, 2H), 4.03 (d, J=4.9 Hz, 4H), 1.94-1.84 (m, 4H), 1.41 (s, 72H). $^{13}$C NMR (101 MHz, Chloroform-d) δ 154.06, 151.03, 148.00, 141.74, 141.55, 135.48, 131.26, 130.87, 129.70, 126.14, 124.23, 124.10, 122.73, 122.07, 120.80, 119.45, 119.24, 115.02, 113.51, 110.45, 69.56, 34.99, 31.59, 25.98.

Characterization of the Protected Ligand 10:

$^{1}$H NMR (400 MHz, Chloroform-d) δ 8.40 (s, 4H), 7.79-7.71 (m, 4H), 7.65-7.41 (m, 20H), 7.28 (t, J=7.8 Hz, 2H), 7.05 (q, J=8.3, 7.9 Hz, 4H), 4.62 (s, 4H), 4.21 (d, J=5.2 Hz, 4H), 2.92 (q, J=7.0 Hz, 4H), 2.21-2.11 (m, 4H), 1.49 (s, 72H), 0.62 (t, J=7.0 Hz, 6H). $^{13}$C NMR (101 MHz, Chloroform-d) δ 156.55, 151.12, 149.20, 141.73, 141.55, 135.72, 132.23, 131.04, 129.27, 126.40, 124.12, 122.11, 121.74, 120.93, 120.77, 120.59, 119.17, 112.34, 110.87, 96.83, 68.21, 64.56, 35.07, 31.68, 26.33, 14.29.

Example 44: Synthesis of Procatalyst 19

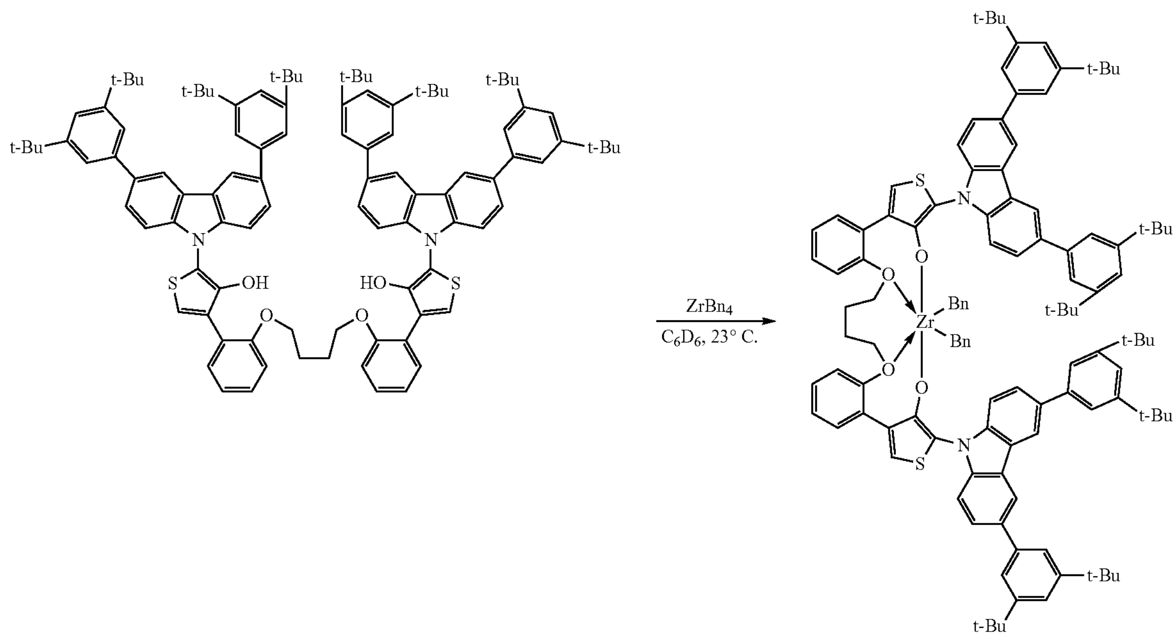

Ligand 10 was azeotropically dried using PhMe (4×10 mL) prior to use. To a clear colorless solution of the thiophene (14.9 mg, 0.00979 mmol, 1.00 eq) in anhydrous $C_6D_6$ (1.75 mL) in a nitrogen filled glovebox at 23° C. was added a solution of $ZrBn_4$ (4.5 mg, 0.00979 mmol, 1.00 eq) in $C_6D_6$ (0.19 mL) in a dropwise manner. After stirring (500 rpm) for 1 hr the pale golden yellow solution was filtered using a 0.20 μm PTFE submicron filter to afford the zirconium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^{1}$H NMR (400 MHz, Benzene-$d_6$) δ 8.56 (dd, J=1.7, 0.7 Hz, 2H), 8.10 (dd, J=1.8, 0.6 Hz, 2H), 7.78 (d, J=1.8 Hz, 4H), 7.77-7.70 (m, 4H), 7.65 (dd, J=8.5, 1.7 Hz, 2H), 7.60 (t, J=1.8 Hz, 2H), 7.53 (d, J=1.8 Hz, 4H), 7.47 (t, J=1.8 Hz, 2H), 7.34 (dd, J=8.4, 0.6 Hz, 2H), 7.13 (dd, J=7.7, 1.8 Hz, 2H), 7.01-6.96 (m, 4H), 6.94-6.89 (m, 2H), 6.73 (dddd, J=7.4, 6.1, 5.1, 1.2 Hz, 4H), 6.67 (s, 2H), 6.17-6.09 (m, 4H), 5.19 (dd, J=8.3, 1.1 Hz, 2H), 4.09 (t, J=10.5 Hz, 2H), 3.50-3.37 (m, 2H), 1.38 (s, 36H), 1.33 (s, 36H), 1.02 (d, J=12.1 Hz, 2H), 0.89-0.76 (m, 2H), 0.73-0.60 (m, 2H), 0.54 (d, J=12.1 Hz, 2H). $^{13}$C NMR (101 MHz, Benzene-$d_6$) δ 155.92, 152.28, 151.21, 150.56, 146.08, 142.48, 142.00, 141.42, 141.01, 136.51, 135.85, 133.02, 131.32, 130.44, 128.74, 128.15, 126.92, 125.90, 125.55, 125.26, 123.49, 123.30, 122.67, 122.36, 120.98, 120.58, 120.08, 119.62, 119.34, 117.07, 115.30, 112.77, 110.05, 80.79, 74.27, 34.79, 34.66, 31.43, 31.40, 31.37, 25.86.

Example 45: Synthesis of Procatalyst 20

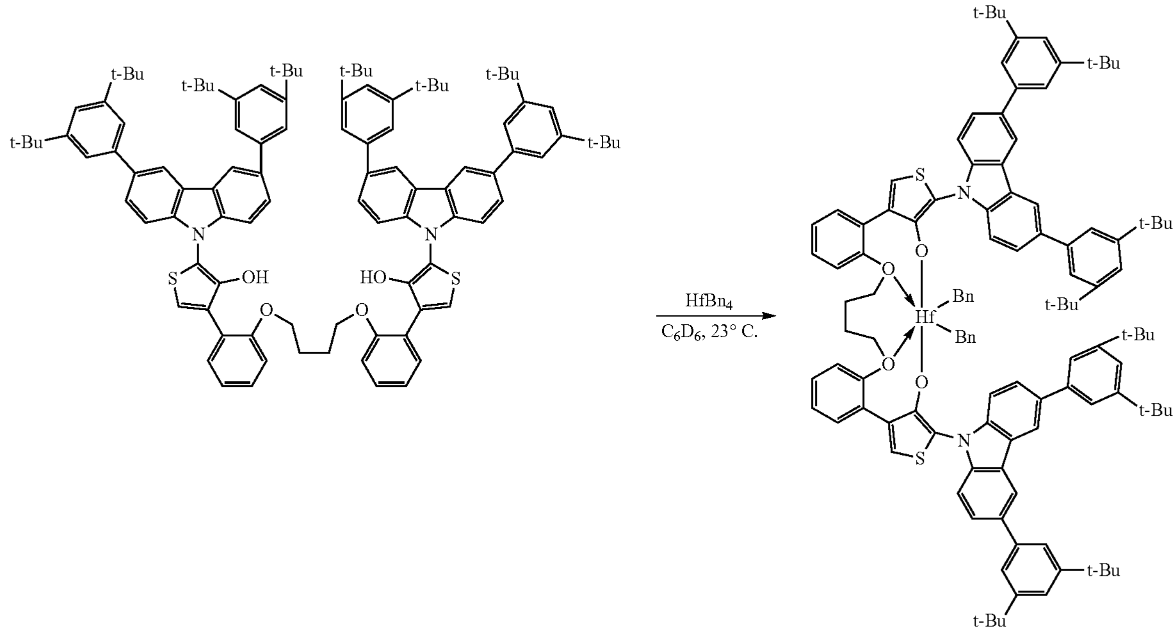

Ligand 10 was azeotropically dried using PhMe (4×10 mL) prior to use. To a clear colorless solution of the thiophene (15.9 mg, 0.0105 mmol, 1.00 eq) in anhydrous $C_6D_6$ (1.84 mL) in a nitrogen filled glovebox at 23° C. was added a solution of $HfBn_4$ (5.7 mg, 0.0105 mmol, 1.00 eq) in $C_6D_6$ (0.25 mL) in a dropwise manner. After stirring (500 rpm) for 1 hr the pale golden yellow solution was filtered using a 0.20 μm PTFE submicron filter to afford the hafnium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^1$H NMR (400 MHz, Benzene-$d_6$) δ 8.61-8.55 (m, 2H), 8.10 (d, J=1.6 Hz, 2H), 7.78 (d, J=1.8 Hz, 4H), 7.76-7.67 (m, 4H), 7.65-7.58 (m, 4H), 7.53 (d, J=1.8 Hz, 4H), 7.47 (t, J=1.8 Hz, 2H), 7.26 (d, J=8.6 Hz, 2H), 7.13 (dd, J=7.7, 1.8 Hz, 2H), 7.05-6.99 (m, 2H), 6.98-6.90 (m, 4H), 6.74 (td, J=7.5, 1.1 Hz, 2H), 6.72-6.68 (m, 2H), 6.67 (s, 2H), 6.20-6.12 (m, 4H), 5.21-5.15 (m, 2H), 4.11 (t, J=10.8 Hz, 2H), 3.48 (d, J=9.3 Hz, 2H), 1.38 (s, 36H), 1.34 (s, 36H), 0.91 (d, J=13.2 Hz, 2H), 0.87-0.73 (m, 2H), 0.57 (d, J=13.0 Hz, 2H), 0.28 (d, J=13.2 Hz, 2H). $^{13}$C NMR (101 MHz, Benzene-$d_6$) δ 155.72, 152.33, 151.21, 150.55, 147.05, 142.51, 142.00, 141.35, 140.99, 136.54, 135.86, 132.67, 131.36, 130.50, 128.81, 128.15, 127.13, 127.08, 126.15, 125.62, 125.33, 125.26, 123.83, 123.23, 122.69, 122.35, 120.92, 120.58, 120.05, 119.58, 119.29, 116.96, 115.76, 112.85, 110.06, 81.80, 78.41, 34.79, 34.66, 31.45, 31.40, 26.05.

Example 46: Synthesis of Intermediate to Ligand 11

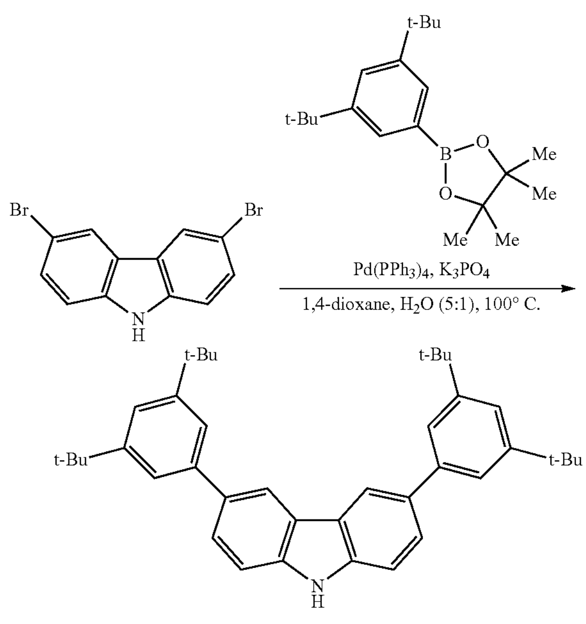

A mixture of the carbazole (1.062 g, 3.267 mmol, 1.00 eq), 3,5-di-t-butylphenyl boropinacolate ester (3.100 g, 9.801 mmol, 3.00 eq), $Pd(PPh_3)_4$ (0.755 g, 0.6534 mmol, 0.20 eq), and $K_3PO_4$ (6.241 g, 29.403 mmol, 9.00 eq) equipped with a reflux condenser was evacuated, then back-filled with nitrogen, this evacuation/re-fill process was repeated 3× more, freshly deoxygenated 1,4-dioxane (30 mL) and $H_2O$ (5.0 mL) were added simultaneously via syringes, the golden yellow mixture was placed in a mantle heated to 100° C., stirred vigorously (1000 rpm) for 48 hrs, removed from the mantle, allowed to cool gradually to 23° C., the golden yellow suspension was suction filtered through silica gel, rinsed with $CH_2Cl_2$ (4×20 mL), the yellow filtrate solution was concentrated onto celite, and purified via silica gel chromatography; hexanes-50% $CH_2Cl_2$ in hexanes to afford the disubstituted carbazole as a white foam (1.551 g, 2.852 mmol, 87%). NMR indicated pure product.

$^1$H NMR (500 MHz, Chloroform-d) δ 8.34-8.29 (m, 2H), 8.10 (s, 1H), 7.68 (dd, J=8.4, 1.8 Hz, 2H), 7.54 (d, J=1.7 Hz, 4H), 7.51 (d, J=8.3 Hz, 2H), 7.45 (t, J=1.8 Hz, 2H), 1.43 (s, 36H). $^{13}$C NMR (126 MHz, Chloroform-d) δ 151.03, 141.57, 139.25, 134.55, 126.04, 123.93, 122.02, 120.74, 119.18, 110.71, 35.01, 31.60.

Example 47: Synthesis of Ligand 11

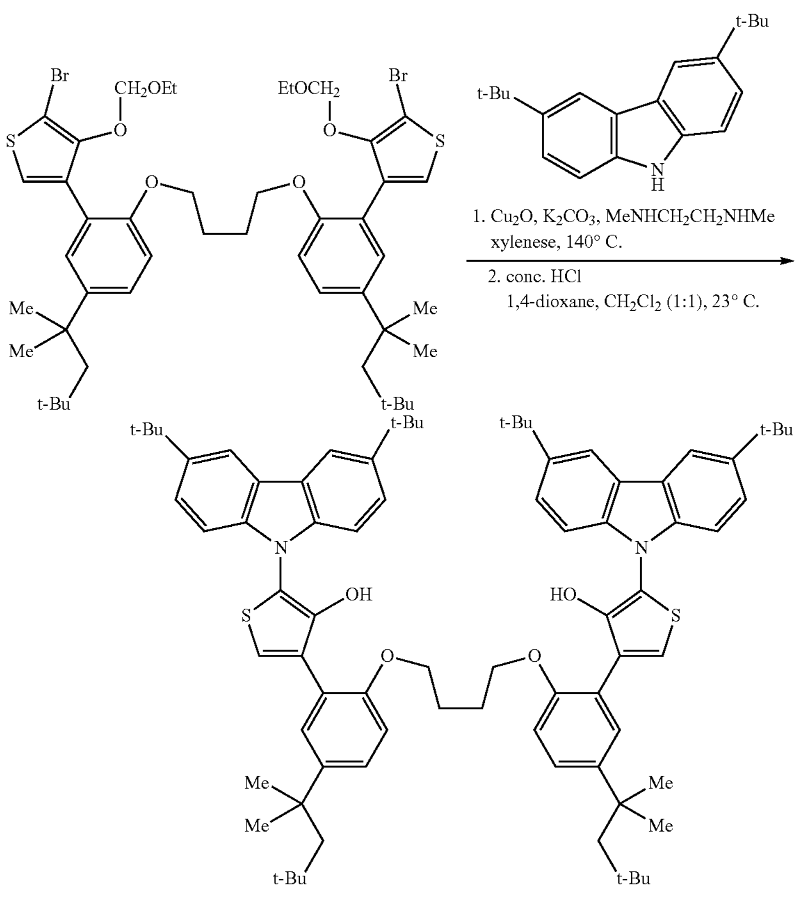

The dibromide was azeotropically dried using PhMe (4×10 mL) prior to use. In a nitrogen filled glovebox a solid mixture of the dibromide (2.054 g, 2.192 mmol, 1.00 eq), the carbazole (3.063 g, 10.961 mmol, 5.00 eq), $Cu_2O$ (1.568 g, 10.961 mmol, 5.00 eq), and $K_2CO_3$ (6.059 g, 43.844 mmol, 20.0 eq) in an oven-dried flask equipped with a stirbar and reflux condenser was suspended in anhydrous deoxygenated xylenes (50.0 mL), neat N,N'-dimethylethylenediamine (2.40 mL, 21.922 mmol, 10.00 eq) was added via syringe, the mixture was then sealed under nitrogen, removed from the glovebox, placed under nitrogen, placed in a mantle heated to 140° C., stirred vigorously (1000 rpm) for 72 hrs, the dark red heterogeneous mixture was removed from the mantle, allowed to cool gradually to 23° C., diluted with $CH_2Cl_2$ (30 mL), stirred vigorously (1000 rpm) for 2 mins, suction filtered over silica gel using $CH_2Cl_2$ as the eluent, rinsed with $CH_2Cl_2$ (4×25 mL), the golden orange filtrate was concentrated onto celite, and purified via silica gel chromatography; 10%-50% $CH_2Cl_2$ in hexanes to afford the biscarbazoyl-thiophene as a white foam (0.830 g, 0.6222 mmol, 28%). NMR indicated product. The product was used in the subsequent reaction without further purification.

To a solution of the protected hydroxythiophene (0.830 g, 0.6222 mmol, 1.00 eq) in $CH_2Cl_2$ (5 mL) and 1,4-dioxane (5 mL) was added concentrated HCl (5 mL) under nitrogen at 23° C. After stirring vigorously (1000 rpm) for 16 hrs the pale golden brown solution was diluted with aqueous HCl (20 mL, 1 N) and $CH_2Cl_2$ (20 mL), poured into a separatory funnel, partitioned, organics were washed with aqueous HCl (1×20 mL), residual organics were extracted from the aqueous layer using $CH_2Cl_2$ (2×20 mL), combined, dried over solid $Na_2SO_4$, decanted, concentrated onto celite, and purified via silica gel chromatography; 10%-50% $CH_2Cl_2$ in hexanes to afford the hydroxythiophene as a pale yellow foam (0.461 g, 0.4796 mmol, 77%, 22% two steps). NMR indicated pure product.

$^1$H NMR (500 MHz, Chloroform-d) δ 8.16 (dd, J=1.9, 0.6 Hz, 4H), 7.56 (d, J=2.5 Hz, 2H), 7.48 (dd, J=8.6, 1.9 Hz, 4H), 7.35-7.30 (m, 6H), 7.24 (s, 2H), 6.97 (s, 2H), 6.83 (d, J=8.6 Hz, 2H), 4.06 (d, J=4.2 Hz, 4H), 1.92 (q, J=2.7, 1.9 Hz, 4H), 1.81 (s, 4H), 1.49 (s, 36H), 1.45 (s, 12H), 0.82 (s, 18H). $^{13}$C NMR (126 MHz, Chloroform-d) δ 151.86, 147.93, 144.50, 143.11, 140.51, 131.44, 129.16, 127.22, 123.64, 123.53, 123.47, 119.02, 116.32, 115.57, 112.79, 109.73, 69.54, 56.98, 38.22, 34.78, 32.48, 32.11, 31.98, 31.71, 26.15.

Characterization of the Protected Ligand 11:

$^{1}H$ NMR (400 MHz, Chloroform-d) δ 8.11 (d, J=1.9 Hz, 4H), 7.53-7.46 (m, 6H), 7.39 (d, J=8.6 Hz, 4H), 7.33-7.26 (m, 4H), 6.91 (d, J=8.6 Hz, 2H), 4.51 (s, 4H), 4.12 (d, J=4.7 Hz, 4H), 2.80 (q, J=7.0 Hz, 4H), 2.07 (s, 4H), 1.77 (s, 4H), 1.47 (s, 36H), 1.41 (s, 12H), 0.79 (s, 18H), 0.50 (t, J=7.0 Hz, 6H). $^{13}C$ NMR (101 MHz, Chloroform-d) δ 154.30, 148.90, 143.23, 142.07, 140.55, 132.68, 128.72, 126.67, 123.79, 123.47, 123.42, 121.90, 120.33, 116.05, 111.56, 110.08, 96.36, 68.23, 64.38, 56.98, 38.06, 34.74, 32.41, 32.06, 31.90, 31.71, 26.45, 14.13.

Example 48: Synthesis of Procatalyst 21

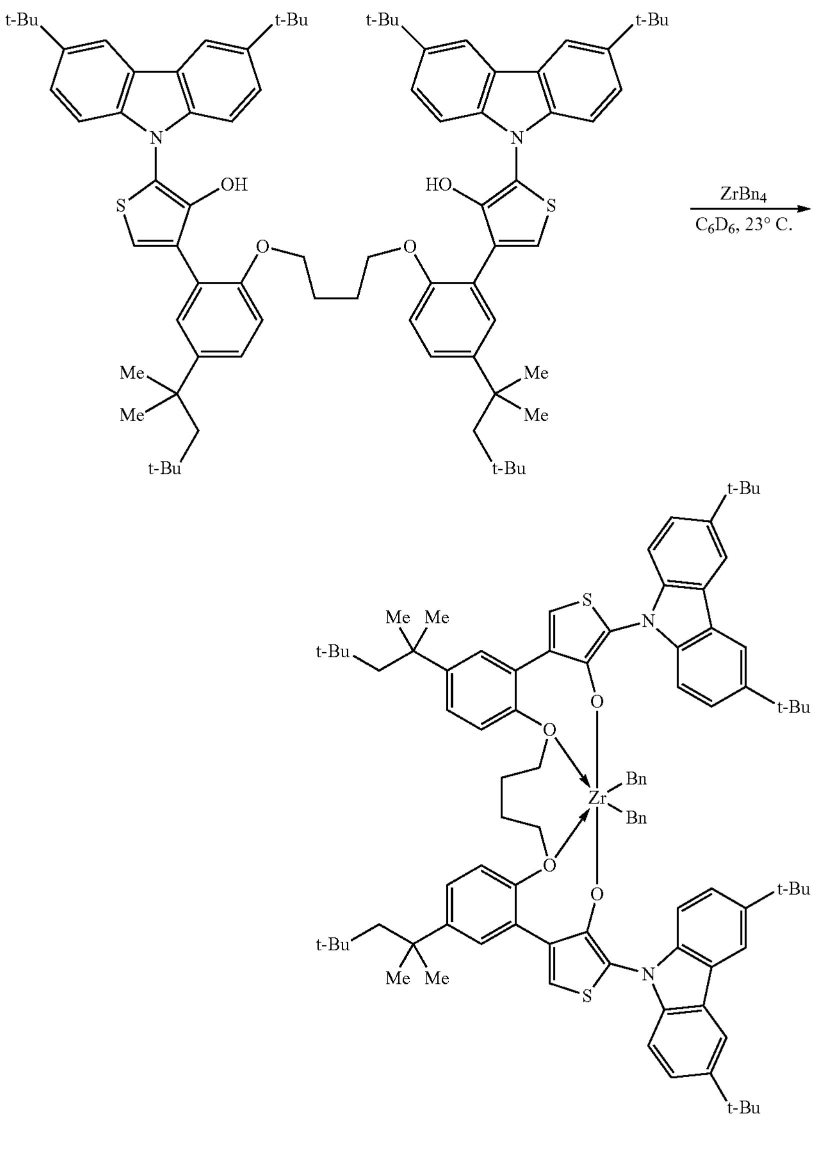

Ligand 11 was azeotropically dried using PhMe (4×10 mL) prior to use. To a clear colorless solution of the thiophene (15.2 mg, 0.0125 mmol, 1.00 eq) in anhydrous $C_6D_6$ (2.26 mL) in a nitrogen filled glovebox at 23° C. was added a solution of $ZrBn_4$ (5.7 mg, 0.0125 mmol, 1.00 eq) in $C_6D_6$ (0.24 mL) in a dropwise manner. After stirring (500 rpm) for 1 hr the pale golden yellow solution was filtered using a 0.20 μm PTFE submicron filter to afford the zirconium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^{1}H$ NMR (500 MHz, Benzene-$d_6$) δ 8.52 (dd, J=2.0, 0.6 Hz, 2H), 8.12 (dd, J=2.0, 0.6 Hz, 2H), 7.74 (dd, J=8.5, 0.6 Hz, 2H), 7.53 (dd, J=8.5, 1.9 Hz, 2H), 7.46-7.40 (m, 4H), 7.25 (dd, J=8.7, 0.6 Hz, 2H), 7.12-7.00 (m, 2H), 6.99-6.95 (m, 4H), 6.84 (tt, J=7.2, 1.3 Hz, 2H), 6.75 (s, 2H), 6.13-6.09 (m, 4H), 5.22 (d, J=8.7 Hz, 2H), 4.13 (t, J=10.8 Hz, 2H), 3.47 (dd, J=12.2, 4.6 Hz, 2H), 1.66 (d, J=14.6 Hz, 2H), 1.57 (s, 18H), 1.51 (d, J=14.6 Hz, 3H), 1.23 (s, 18H), 1.20 (s, 6H), 1.14 (s, 6H), 1.01 (d, J=12.1 Hz, 2H), 0.92 (t, J=9.2 Hz, 3H), 0.72 (s, 18H), 0.67 (d, J=5.4 Hz, 3H), 0.50 (d, J=12.4 Hz, 2H). $^{13}C$ NMR (126 MHz, Benzene-$d_6$) δ 153.70, 151.82, 148.69, 146.79, 143.19, 142.99, 139.97, 139.55, 133.73, 128.21, 127.28, 126.81, 125.32, 124.96, 122.86, 122.68, 122.63, 120.61, 116.40, 116.35, 115.96, 115.88, 112.43, 109.47, 80.91, 74.39, 56.60, 38.21, 34.68, 34.37, 32.17, 32.08, 31.68, 31.65, 30.10, 25.85.

Example 49: Synthesis of Procatalyst 22

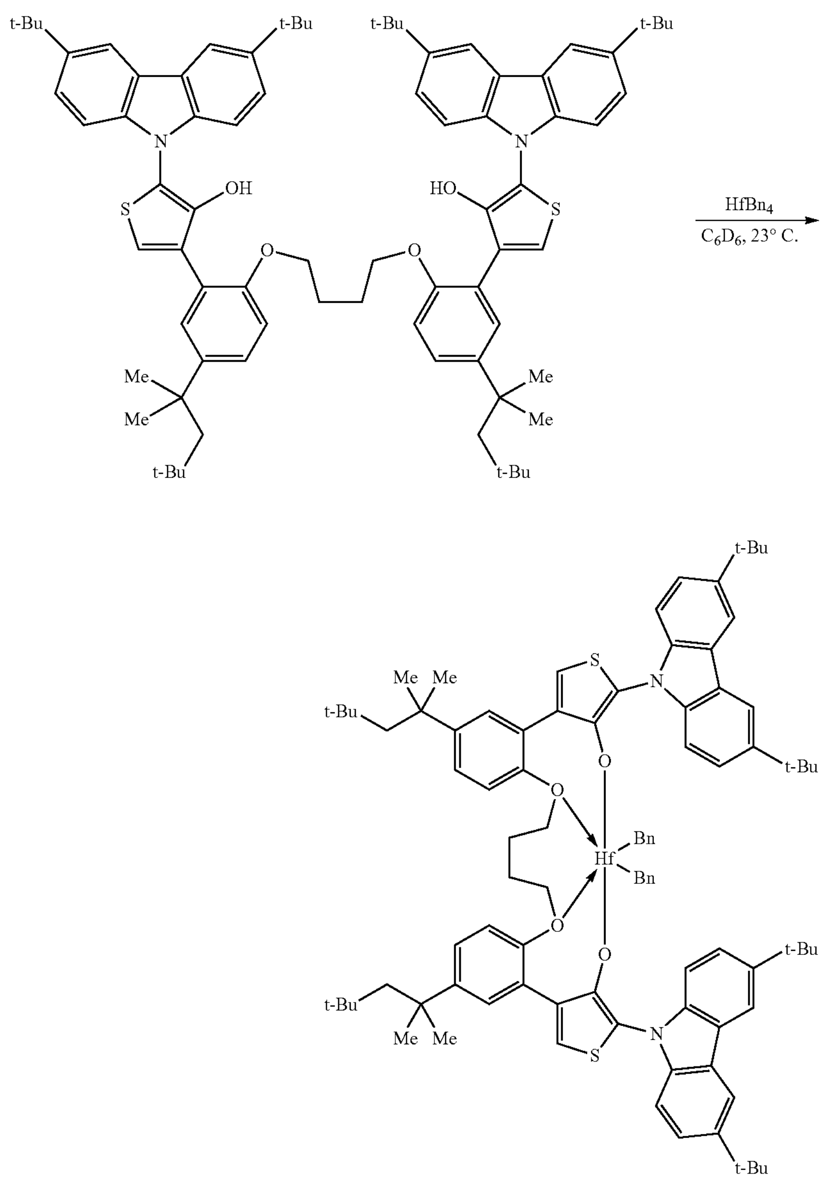

Ligand 11 was azeotropically dried using PhMe (4×10 mL) prior to use. To a clear colorless solution of the thiophene (17.5 mg, 0.0144 mmol, 1.00 eq) in anhydrous $C_6D_6$ (2.54 mL) in a nitrogen filled glovebox at 23° C. was added a solution of $HfBn_4$ (7.8 mg, 0.0144 mmol, 1.00 eq) in $C_6D_6$ (0.33 mL) in a dropwise manner. After stirring (500 rpm) for 1 hr the pale golden yellow solution was filtered using a 0.20 μm PTFE submicron filter to afford the hafnium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^1$H NMR (500 MHz, Benzene-$d_6$) δ 8.54 (dd, J=2.0, 0.6 Hz, 2H), 8.13 (dd, J=2.0, 0.6 Hz, 2H), 7.72 (dd, J=8.5, 0.6 Hz, 2H), 7.53 (dd, J=8.5, 1.9 Hz, 2H), 7.43-7.40 (m, 4H), 7.15 (dd, J=8.8, 0.6 Hz, 2H), 7.07-7.05 (m, 2H), 7.01-6.95 (m, 4H), 6.81 (tt, J=7.3, 1.3 Hz, 2H), 6.75 (s, 2H), 6.14-6.10 (m, 4H), 5.24 (d, J=8.7 Hz, 2H), 4.24-4.13 (m, 2H), 3.58-3.49 (m, 2H), 1.66 (d, J=14.6 Hz, 2H), 1.57 (s, 18H), 1.51 (d, J=14.6 Hz, 2H), 1.24 (s, 18H), 1.20 (s, 6H), 1.14 (s, 6H), 0.90 (t, J=9.6 Hz, 2H), 0.87-0.81 (m, 2H), 0.72 (s, 18H), 0.61 (d, J=11.0 Hz, 2H), 0.27-0.21 (m, 2H). $^{13}$C NMR (126 MHz, Benzene-$d_6$) δ 153.50, 151.90, 149.03, 147.62, 143.23, 142.99, 139.92, 139.53, 137.49, 133.42, 129.03, 128.26, 128.17, 127.07, 126.99, 125.40, 125.29, 125.01, 122.95, 122.79, 122.56, 120.60, 116.40, 116.37, 116.25, 115.82, 112.50, 109.47, 81.81, 77.97, 56.59, 38.25, 34.69, 34.37, 32.18, 32.08, 31.70, 31.66, 31.59, 30.07, 26.00.

Example 50: Synthesis of Dibromide Intermediate for Ligand 11

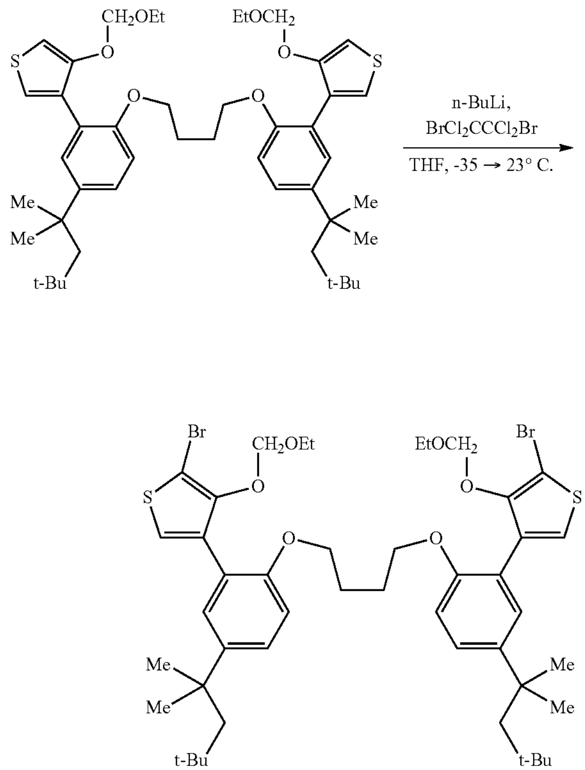

The bisthiophene was azeotropically dried using PhMe (4×10 mL) prior to use. A clear colorless solution of the thiophene (1.974 g, 2.534 mmol, 1.00 eq) in deoxygenated anhydrous THF (40 mL) in a nitrogen filled glovebox was placed in a freezer cooled to −35° C. for 20 hrs upon which a precooled solution of n-BuLi (3.0 mL, 7.601 mmol, 3.00 eq, titrated 2.50 M in hexanes) was added via syringe in a dropwise manner. The now golden brown mixture was allowed to sit in the freezer for 3 hrs upon which it was removed and while stirring (500 rpm) solid 1,2-dibromotetrachloroethane (2.723 g, 8.361 mmol, 3.30 eq) was added in a quick dropwise manner. After stirring for 2.5 hrs at 23° C. the now golden yellow solution was removed from the glovebox, neutralized with brine (50 mL), diluted with $CH_2Cl_2$ (20 mL) and water (20 mL), poured into a separatory funnel, partitioned, residual organics were extracted from the aqueous layer using $CH_2C_2$ (2×20 mL), combined, dried over solid $Na_2SO_4$, decanted, concentrated onto celite, and purified via silica gel chromatography; hexanes-65% $CH_2Cl_2$ in hexanes to afford the dibromothiophene as a golden yellow amorphous oil (2.054 g, 2.192 mmol, 87%). NMR indicated pure product.

$^1$H NMR (400 MHz, Chloroform-d) δ 7.34 (d, J=2.5 Hz, 2H), 7.27-7.22 (m, 2H), 7.21 (s, 2H), 6.79 (d, J=8.6 Hz, 2H), 4.76 (s, 4H), 3.95-3.87 (m, 4H), 3.56 (q, J=7.1 Hz, 4H), 1.78 (q, J=3.0 Hz, 4H), 1.69 (s, 4H), 1.33 (s, 12H), 1.03 (t, J=7.1 Hz, 6H), 0.73 (s, 18H). $^{13}$C NMR (101 MHz, Chloroform-d) δ 153.87, 151.11, 142.13, 132.55, 128.60, 126.64, 122.97, 122.58, 111.68, 98.66, 96.83, 68.02, 65.15, 56.81, 38.00, 32.33, 31.81, 31.62, 25.94, 14.87.

Example 51: Synthesis of Bis-t-Octyl-Iodophenyl Ether Intermediate

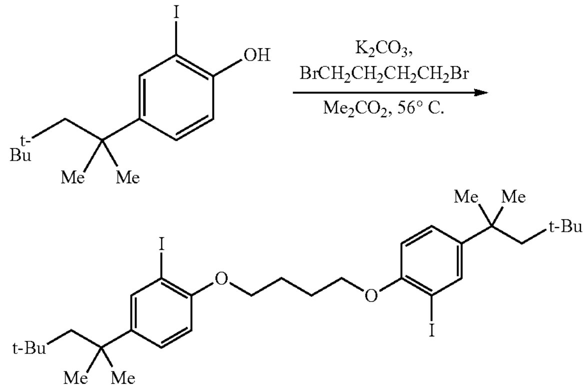

A white heterogeneous mixture of the iodophenol (3.240 g, 9.304 mmol, 2.00 eq), $K_2CO_3$ (3.858 g, 27.912 mmol, 6.00 eq), and 1,4-dibromobutane (0.56 mL, 4.652 mmol, 1.00 eq) in acetone (50 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with $CH_2Cl_2$ (50 mL), stirred for 2 mins, suction filtered over a pad of celite, rinsed with $CH_2Cl_2$ (4×20 mL), the resultant pale yellow filtrate was concentrated onto celite, and purified via silica gel chromatography using an ISCO chromatography purification system; hexanes-50% $CH_2Cl_2$ in hexanes to afford the iodophenyl ether as a white solid (3.180 g, 4.426 mmol, 95%). NMR indicated pure product.

$^1$H NMR (500 MHz, Chloroform-d) δ 7.73 (d, J=2.4 Hz, 2H), 7.28-7.24 (m, 2H), 6.73 (d, J=8.6 Hz, 2H), 4.14-4.06 (m, 4H), 2.14-2.06 (m, 4H), 1.68 (s, 4H), 1.32 (s, 12H), 0.73 (s, 18H). $^{13}$C NMR (126 MHz, Chloroform-d) δ 155.12, 144.49, 137.18, 127.03, 111.29, 86.27, 68.68, 56.87, 37.89, 32.35, 31.83, 31.57, 26.11.

Example 52: Synthesis of 4-t-octyl-2-iodophenol

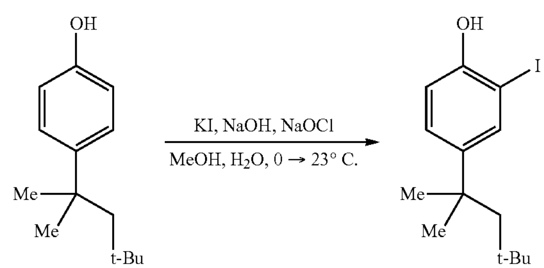 [SMILES: CC(C)(C)CC(C)(C)c1ccc(O)cc1 ; CC(C)(C)CC(C)(C)c1ccc(O)c(I)c1]

A clear colorless solution of the starting phenol (3.324 g, 16.110 mmol, 1.00 eq), KI (3.477 g, 20.943 mmol, 1.30 eq), and aqueous NaOH (21 mL, 20.943 mmol, 1.30 eq, 1 N) in methanol (100 mL) and water (50 mL) under nitrogen was placed in an ice bath and stirred vigorously for 1 hr, upon which precooled commercial aqueous bleach (26 mL, 20.943 mmol, 1.30 eq, 5.2% w/w) was added in a dropwise manner over 10 mins. The now pale opaque yellow mixture was stirred for 2 hrs at 0° C., the mixture was removed from the ice water bath, stirred at 23° C. for 3 hrs, solid $NaH_2PO_4$ (20 g) was added followed by a saturated aqueous mixture $Na_2S_2O_3$ (100 mL) to reduce residual iodine and water (100 mL), the mixture was stirred vigorously for 10 mins, diluted with $CH_2Cl_2$ (50 mL), the biphasic yellow mixture was poured into a separatory funnel, partitioned, organics were washed with aqueous $Na_2S_2O_3$ (2×50 mL), residual organics were extracted from the aqueous layer using $CH_2Cl_2$ (2×50 mL), combined, dried over solid $Na_2SO_4$, decanted, and concentrated onto celite, and purified via silica gel chromatography; hexanes-25% $CH_2Cl_2$ to afford the o-iodophenol as a clear colorless amorphous foam (3.240 g, 9.340 mmol, 58%). NMR indicated pure product.

$^1$H NMR (500 MHz, Chloroform-d) δ 7.60 (d, J=2.3 Hz, 1H), 7.24 (dd, J=8.5, 2.3 Hz, 1H), 6.90 (dd, J=8.6, 0.5 Hz, 1H), 5.11 (s, 1H), 1.68 (s, 2H), 1.32 (s, 6H), 0.73 (s, 9H). $^{13}$C NMR (126 MHz, Chloroform-d) δ 152.34, 144.65, 135.66, 128.14, 114.23, 85.38, 56.87, 37.93, 32.35, 31.81, 31.55.

Example 53: Synthesis of Ligand 12

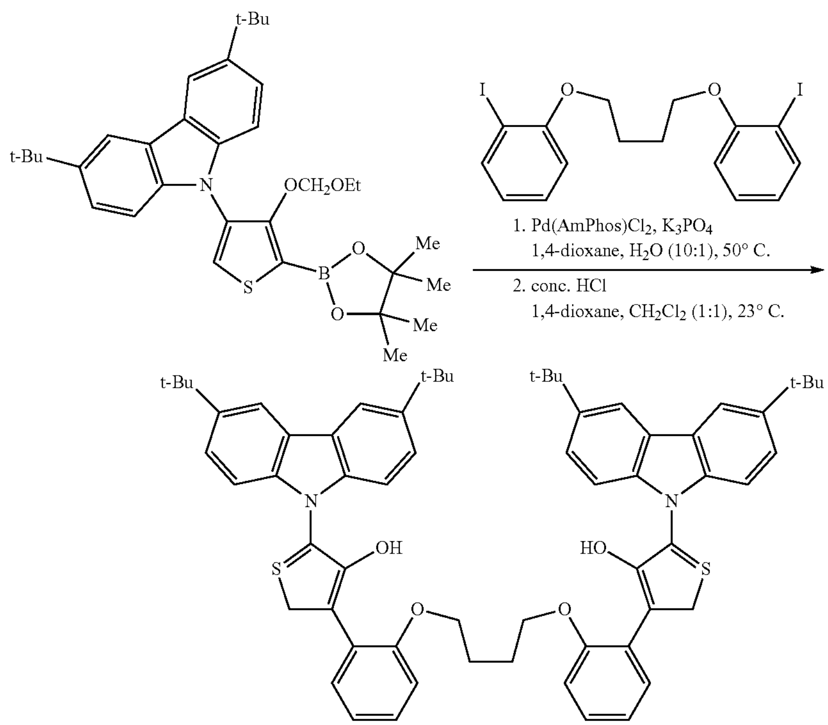

A mixture of the thiophene boropinacolate ester (2.017 g, 2.586 mmol, 3.00 eq, 72% pure by NMR), $K_3PO_4$ (1.647 g, 7.758 mmol, 9.00 eq), Pd(AmPhos)$Cl_2$ (122.0 mg, 0.1724 mmol, 0.20 eq), and the bisphenyliodide (0.426 g, 0.8620 mmol, 1.00 eq). The mixture was evacuated, then back-filled with nitrogen, this process was repeated 3× more, then deoxygenated 1,4-dioxane (17.0 mL) and deoxygenated water (1.7 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-50% $CH_2Cl_2$ in hexanes to afford the bisthiophene as a red amorphous oil (0.837 g, 0.7544 mmol, 88%). NMR indicated pure product.

To a solution of the impure coupled product in $CH_2Cl_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and $CH_2Cl_2$ (10 mL), poured into separatory funnel, partitioned, organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-75% $CH_2Cl_2$ in hexanes to afford the bisthiophene as a light tan solid (0.563 g, 0.5668 mmol, 75%, 66% two steps). NMR indicated pure product.

$^1$H NMR (500 MHz, Chloroform-d) δ 8.11 (d, J=2.0 Hz, 4H), 7.61 (dd, J=7.7, 1.7 Hz, 2H), 7.40 (dd, J=8.6, 1.9 Hz, 4H), 7.32 (s, 2H), 7.30-7.20 (m, 6H), 7.12 (t, J=7.5 Hz, 2H), 6.90 (d, J=8.2 Hz, 2H), 4.11-4.04 (m, 4H), 1.95-1.87 (m, 4H), 1.43 (s, 36H). $^{13}$C NMR (126 MHz, Chloroform-d) δ 153.71, 146.43, 142.65, 139.63, 130.50, 128.74, 127.55, 123.42, 123.16, 123.08, 122.96, 120.13, 116.18, 115.28, 114.09, 109.57, 69.98, 34.68, 32.02, 25.86.

Characterization of the Protected Coupled Product:

$^1$H NMR (500 MHz, Chloroform-d) δ 8.13 (h, J=1.9 Hz, 4H), 7.94 (ddd, J=7.6, 4.1, 2.3 Hz, 2H), 7.49-7.44 (m, 4H), 7.38-7.34 (m, 6H), 7.34-7.28 (m, 2H), 7.08-7.01 (m, 4H), 4.46 (t, J=3.0 Hz, 4H), 4.30-4.19 (m, 4H), 2.79 (qt, J=7.2, 2.7 Hz, 4H), 2.29-2.20 (m, 4H), 1.48 (s, 36H), 0.52 (tt, J=7.1, 2.9 Hz, 6H). $^{13}$C NMR (126 MHz, Chloroform-d) δ 155.83, 147.29, 142.72, 139.49, 131.10, 129.37, 129.13, 124.29, 123.66, 123.07, 121.52, 120.61, 119.19, 115.96, 112.07, 109.85, 96.97, 68.36, 64.61, 34.73, 32.06, 26.37, 14.17.

Example 54: Synthesis of Procatalyst 23

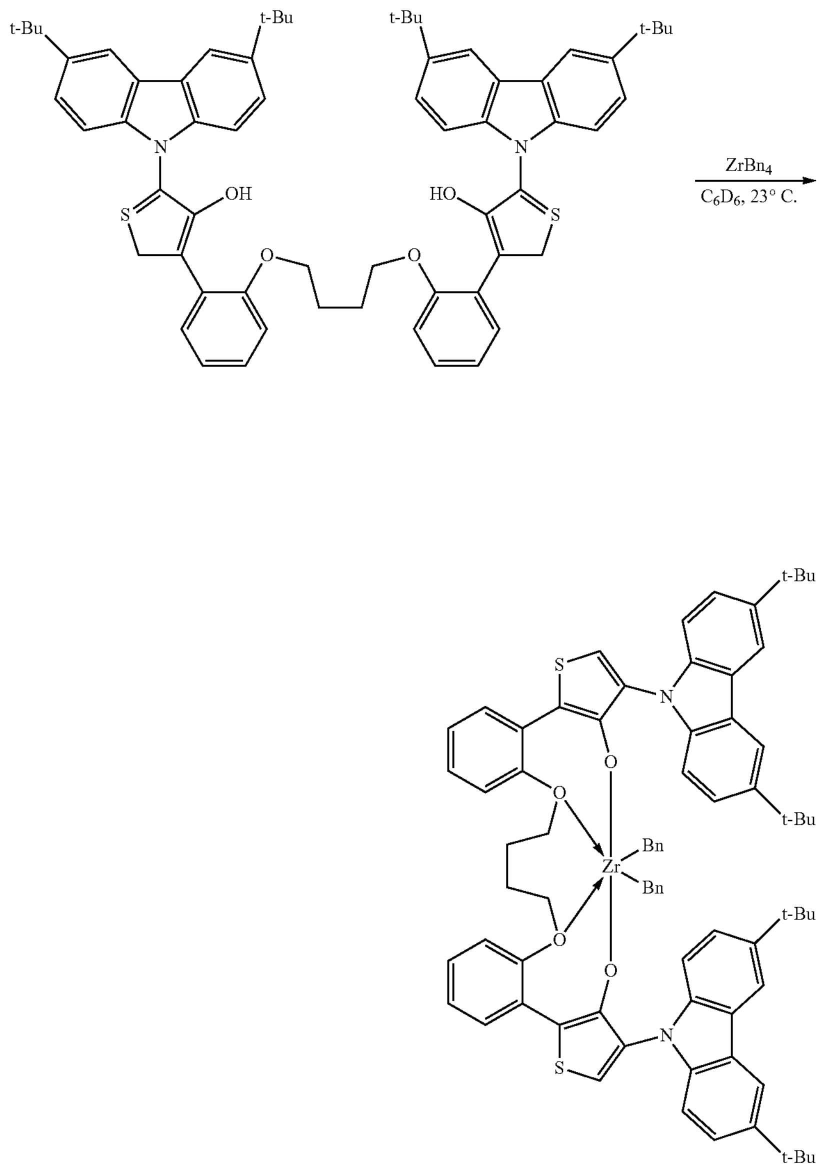

Ligand 12 was azeotropically dried using PhMe (4×10 mL) prior to use. To a clear colorless solution of the thiophene (7.4 mg, 7.45 μmol, 1.00 eq) in anhydrous $C_6D_6$ (1.34 mL) in a nitrogen filled glovebox at 23° C. was added a solution of $ZrBn_4$ (3.8 mg, 8.20 μmol, 1.10 eq) in $C_6D_6$ (0.15 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product. The same procedure can be used with PhMe as the solvent to prepare the procatalyst solution (0.0025 M or 0.005 M) which is used directly after filtration for the polymerization experiments.

$^1$H NMR (500 MHz, Benzene-$d_6$) δ 8.48 (dd, J=2.0, 0.6 Hz, 2H), 8.22 (dd, J=1.9, 0.7 Hz, 2H), 7.50-7.46 (m, 4H), 7.31-7.24 (m, 6H), 6.98-6.96 (m, 4H), 6.86 (s, 2H), 6.83-6.75 (m, 4H), 6.70 (td, J=7.5, 1.2 Hz, 2H), 6.23-6.17 (m, 4H), 5.12 (dd, J=8.2, 1.2 Hz, 2H), 3.97-3.88 (m, 2H), 3.28-3.21 (m, 2H), 1.49 (s, 18H), 1.28 (s, 18H), 1.06 (d, J=12.4 Hz, 2H), 0.77-0.67 (m, 2H), 0.52-0.44 (m, 4H). $^{13}$C NMR (126 MHz, Benzene-$d_6$) δ 156.11, 152.23, 147.06, 143.09, 142.73, 139.24, 139.14, 130.95, 129.75, 126.42, 126.17, 125.92, 125.20, 124.55, 123.48, 122.65, 122.35, 120.75, 117.04, 116.94, 116.27, 115.52, 112.51, 108.85, 80.97, 75.18, 34.57, 34.41, 32.01, 31.71, 26.01.

Example 55: Synthesis of Procatalyst 24

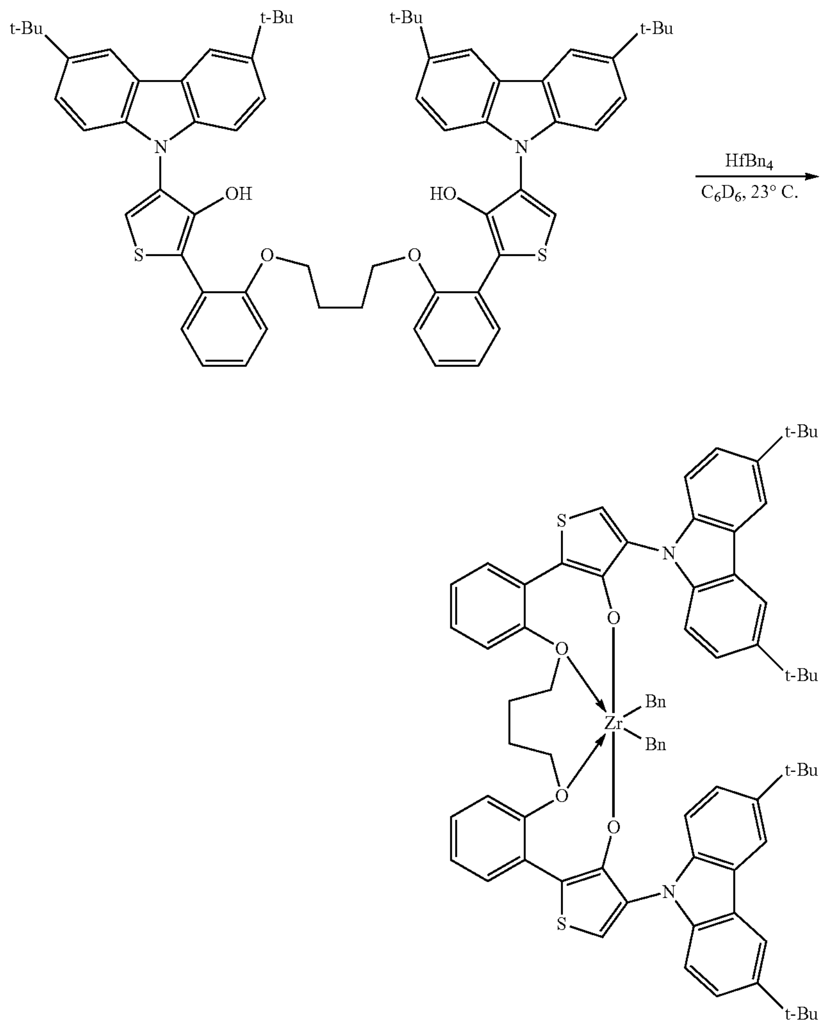

Ligand 12 was azeotropically dried using PhMe (4×10 mL) prior to use. To a clear colorless solution of the thiophene (14.0 mg, 14.09 μmol, 1.00 eq) in anhydrous $C_6D_6$ (2.49 mL) in a nitrogen filled glovebox at 23° C. was added a solution of $HfBn_4$ (8.4 mg, 15.50 μmol, 1.10 eq) in $C_6D_6$ (0.33 mL) in a dropwise manner. After stirring (500 rpm) for 30 mins the pale golden yellow solution was filtered using a 0.20 μm PTFE submicron filter to afford the hafnium complex as a 0.0025 M solution in $C_6D_6$. NMR indicated product. The same procedure can be used with PhMe as the solvent to prepare the procatalyst solution (0.0025 M) which is used directly after filtration for the polymerization experiments.

$^1$H NMR (500 MHz, Benzene-$d_6$) δ 8.49 (dd, J=2.0, 0.6 Hz, 2H), 8.23 (dd, J=2.0, 0.6 Hz, 2H), 7.47 (ddd, J=8.8, 5.0, 1.9 Hz, 4H), 7.27 (ddd, J=8.5, 4.4, 1.2 Hz, 4H), 7.17 (dd, J=8.7, 0.6 Hz, 2H), 6.99-6.95 (m, 4H), 6.86 (s, 2H), 6.78 (dddd, J=8.6, 7.3, 3.6, 1.5 Hz, 4H), 6.71 (td, J=7.6, 1.2 Hz, 2H), 6.22-6.16 (m, 4H), 5.15 (dd, J=8.2, 1.2 Hz, 2H), 4.02-3.93 (m, 2H), 3.35-3.26 (m, 2H), 1.50 (s, 18H), 1.28 (s, 18H), 0.89 (d, J=13.3 Hz, 2H), 0.78-0.68 (m, 2H), 0.47-0.36 (m, 2H), 0.22 (d, J=13.3 Hz, 2H). $^{13}$C NMR (126 MHz, Benzene-$d_6$) δ 155.80, 152.29, 147.74, 143.15, 142.74, 139.23, 139.09, 130.95, 129.74, 128.54, 127.06, 126.75, 126.10, 125.28, 124.59, 123.68, 122.60, 122.28, 120.78, 117.11, 116.38, 116.26, 115.45, 112.56, 108.84, 81.81, 78.35, 34.57, 34.42, 32.01, 31.72, 26.11.

Example 56: Synthesis of Protected Hydroxythiophene Carbazole Intermediate

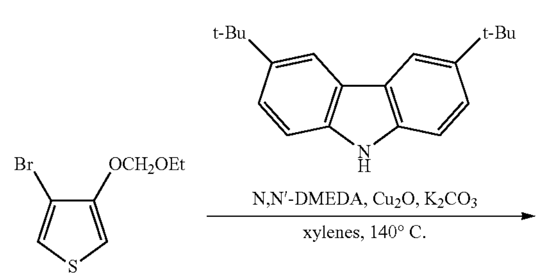

-continued

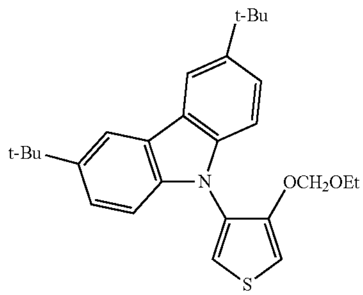

-continued

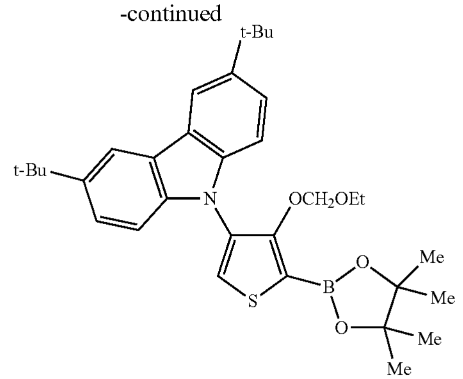

In a nitrogen filled continuous purge glovebox, a mixture of the bromothiophene (5.883 g, 24.811 mmol, 1.00 eq), 3,6-di-t-butylcarbazole (15.252 g, 54.585 mmol, 2.20 eq), $Cu_2O$ (7.100 g, 49.622 mmol, 2.00 eq), and $K_2CO_3$ (34.290 g, 248.11 mmol, 10.00 eq) was suspended in deoxygenated anhydrous xylenes (200 mL), N,N'-DMEDA (21.5 mL, 199.84 mmol, 4.00 eq) was added, the mixture was equipped with a reflux condenser and a rubber septa, removed from the glovebox, placed under nitrogen, placed in a mantle heated to 140° C., stirred vigorously (1000 rpm) for 72 hrs, removed from the mantle, the now deep red-black mixture was allowed to cool gradually to 23° C., $CH_2Cl_2$ (100 mL) was added, the mixture was stirred for 5 mins, suction filtered over a pad of silica gel, rinsed with $CH_2Cl_2$ (4×75 mL), the golden brown filtrate was concentrated onto celite, and purified several times via silica gel chromatography using an ISCO chromatography purification system; 15% $CH_2Cl_2$ in hexanes to afford the thiophene-carbazole product as a white amorphous foam (7.699 g, 17.673 mmol, 71%). NMR indicated pure product.

$^1$H NMR (500 MHz, Chloroform-d) δ 8.12 (d, J=1.9 Hz, 2H), 7.45 (dd, J=8.6, 2.0 Hz, 2H), 7.32 (d, J=3.6 Hz, 1H), 7.20 (d, J=8.6 Hz, 2H), 6.89 (d, J=3.6 Hz, 1H), 3.56 (q, J=7.1 Hz, 2H), 1.47 (s, 18H), 1.16 (t, J=7.1 Hz, 3H). $^{13}$C NMR (126 MHz, Chloroform-d) δ 150.87, 142.60, 139.70, 127.62, 123.44, 123.08, 120.21, 116.07, 109.57, 102.36, 94.78, 64.37, 34.70, 32.03, 15.01.

Example 57: Synthesis of Protected Hydroxythiophene Boropinacolate Intermediate

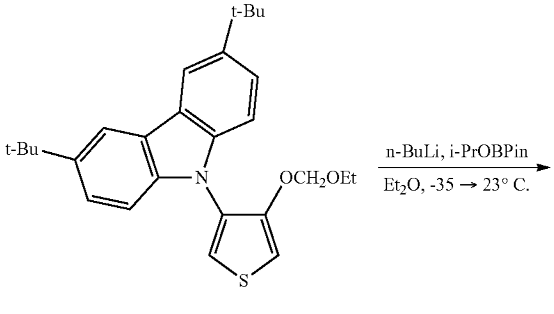

A golden yellow solution of the thiophene (3.000 g, 6.887 mmol, 1.00 eq) in anhydrous deoxygenated $Et_2O$ (75 mL) in a nitrogen filled continuous purge glovebox was placed in the freezer (−35° C.), and allowed to precool for 14 hrs upon which a precooled solution of n-BuLi (3.50 mL, 8.608 mmol, 1.25 eq, titrated 2.5 M in hexanes) was added in a quick dropwise manner. The pale orange solution was allowed to sit in the freezer for 4 hrs upon which the isopropoxyboropinacolate ester (2.81 mL, 13.774 mmol, 2.00 eq) was added neat. The now golden yellow solution was allowed to stir at 23° C. for 2 hrs, the now white heterogeneous mixture was diluted with an aqueous phosphate buffer (20 mL, pH=8, 0.05 M), concentrated via rotary evaporation, the mixture was diluted with $CH_2Cl_2$ (25 mL) and water (25 mL), poured into a separatory funnel, partitioned, organics were washed with water (1×25 mL), residual organics were extracted with $CH_2Cl_2$ (2×25 mL), combined, dried over solid $Na_2SO_4$, decanted, concentrated, the resultant golden yellow foam was dissolved in $CH_2Cl_2$ (10 mL), suction filtered through a short pad of silica gel, rinsed with $CH_2Cl_2$ (4×20 mL), and the golden yellow filtrate solution was concentrated to afford the thiophene-boropinacolate ester as a pale golden yellow foam (2.581 g, 4.596 mmol, 67%, ~72% pure by NMR). The impure product is used in the subsequent reaction without further purification.

$^1$H NMR (500 MHz, Chloroform-d) δ 8.11-8.08 (m, 2H), 7.62 (d, J=0.9 Hz, 1H), 7.45 (dt, J=8.6, 1.4 Hz, 2H), 7.23 (dd, J=8.7, 0.7 Hz, 2H), 4.88 (d, J=0.8 Hz, 2H), 2.96-2.88 (m, 2H), 1.46 (s, 18H), 1.38 (s, 12H), 0.58 (t, J=7.1 Hz, 3H). $^{13}$C NMR (126 MHz, Chloroform-d) δ 158.93, 142.70, 139.53, 130.88, 127.58, 123.65, 123.00, 115.86, 109.77, 98.24, 84.20, 64.53, 34.71, 32.03, 24.80, 14.14.

Example 58: Synthesis of Ligand 13

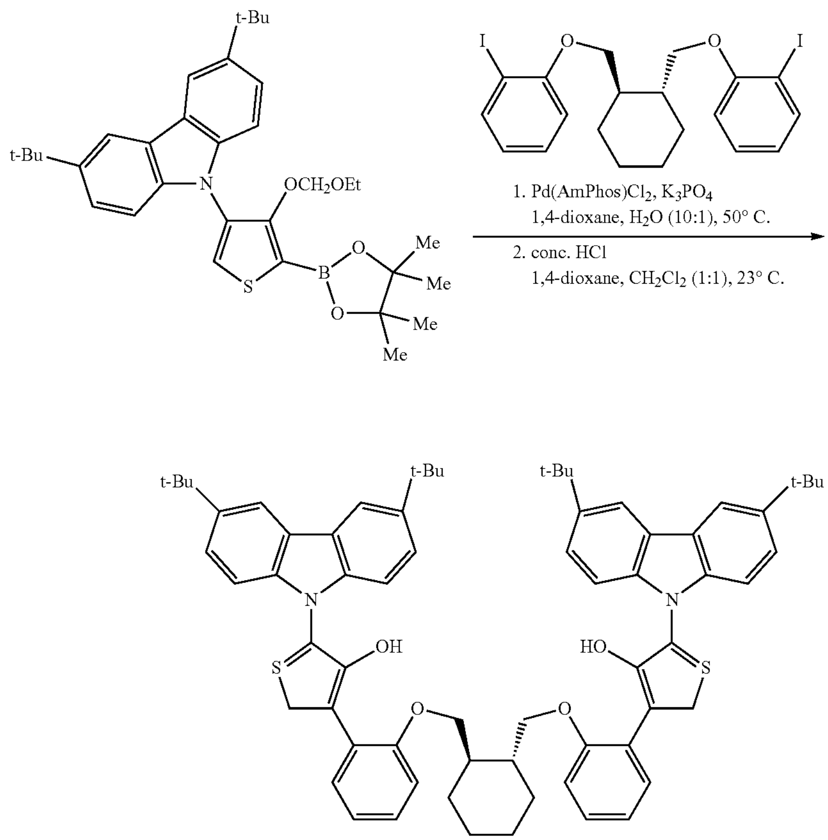

A mixture was prepared of the thiophene boropinacolate ester (1.352 g, 1.806 mmol, 3.00 eq, 72% pure by NMR), $K_3PO_4$ (1.150 g, 5.418 mmol, 9.00 eq), Pd(AmPhos)$Cl_2$ (85.0 mg, 0.1204 mmol, 0.20 eq), and the bisphenyliodide (0.330 g, 0.6020 mmol, 1.00 eq). The mixture was evacuated, then back-filled with nitrogen, this process was repeated 3× more, then deoxygenated 1,4-dioxane (15.0 mL) and deoxygenated water (1.5 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-50% $CH_2Cl_2$ in hexanes to afford the bisthiophene as a red amorphous oil (0.550 g, 0.4727 mmol, 79%). NMR indicated pure product.

To a solution of the impure coupled product in $CH_2Cl_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and $CH_2Cl_2$ (10 mL), poured into separatory funnel, partitioned, organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-75% $CH_2Cl_2$ in hexanes to afford the bisthiophene as a pale yellow foam (0.368 g, 0.3513 mmol, 74%, 59% two steps). NMR indicated pure product.

$^1$H NMR (400 MHz, Chloroform-d) δ 8.10 (d, J=1.9 Hz, 4H), 7.59 (dd, J=7.7, 1.7 Hz, 2H), 7.43-7.35 (m, 6H), 7.28-7.21 (m, 2H), 7.16 (d, J=8.6 Hz, 4H), 7.13-7.06 (m, 4H), 6.82 (dd, J=8.3, 1.1 Hz, 2H), 4.11 (dd, J=9.8, 3.3 Hz, 2H), 3.93 (dd, J=9.9, 4.3 Hz, 2H), 1.83-1.77 (m, 2H), 1.72-1.65 (m, 2H), 1.63-1.54 (m, 2H), 1.43 (s, 36H), 1.15-1.00 (m, 4H). $^{13}$C NMR (101 MHz, Chloroform-d) δ 153.90, 146.54, 142.61, 139.83, 130.67, 128.93, 127.60, 123.51, 123.12, 122.70, 122.60, 120.56, 116.14, 115.34, 113.45, 109.42, 73.64, 40.37, 34.68, 32.01, 29.91, 25.43.

Characterization of the Protected Ligand:

$^1$H NMR (500 MHz, Chloroform-d) δ 8.11 (t, J=2.2 Hz, 4H), 7.83 (dd, J=7.6, 1.7 Hz, 2H), 7.47 (ddd, J=16.4, 8.6, 1.9 Hz, 4H), 7.36-7.30 (m, 6H), 7.26-7.21 (m, 2H), 6.99 (td, J=7.5, 1.1 Hz, 2H), 6.93 (dd, J=8.4, 1.1 Hz, 2H), 4.49-4.38 (m, 4H), 4.17-4.02 (m, 4H), 2.75 (q, J=7.1 Hz, 4H), 2.10-1.98 (m, 4H), 1.95-1.85 (m, 2H), 1.60-1.50 (m, 2H), 1.46 (s, 36H), 1.50-1.42 (m, 2H), 0.49 (t, J=7.0 Hz, 6H). $^{13}$C NMR (126 MHz, Chloroform-d) δ 156.22, 147.22, 142.71, 139.55, 131.32, 129.31, 124.28, 123.69, 123.65, 123.05, 121.31, 120.36, 119.16, 115.94, 111.92, 109.78, 96.91, 71.70, 64.53, 39.60, 34.72, 32.04, 30.48, 26.23, 24.82, 14.16.

Example 59: Synthesis of Procatalyst 25

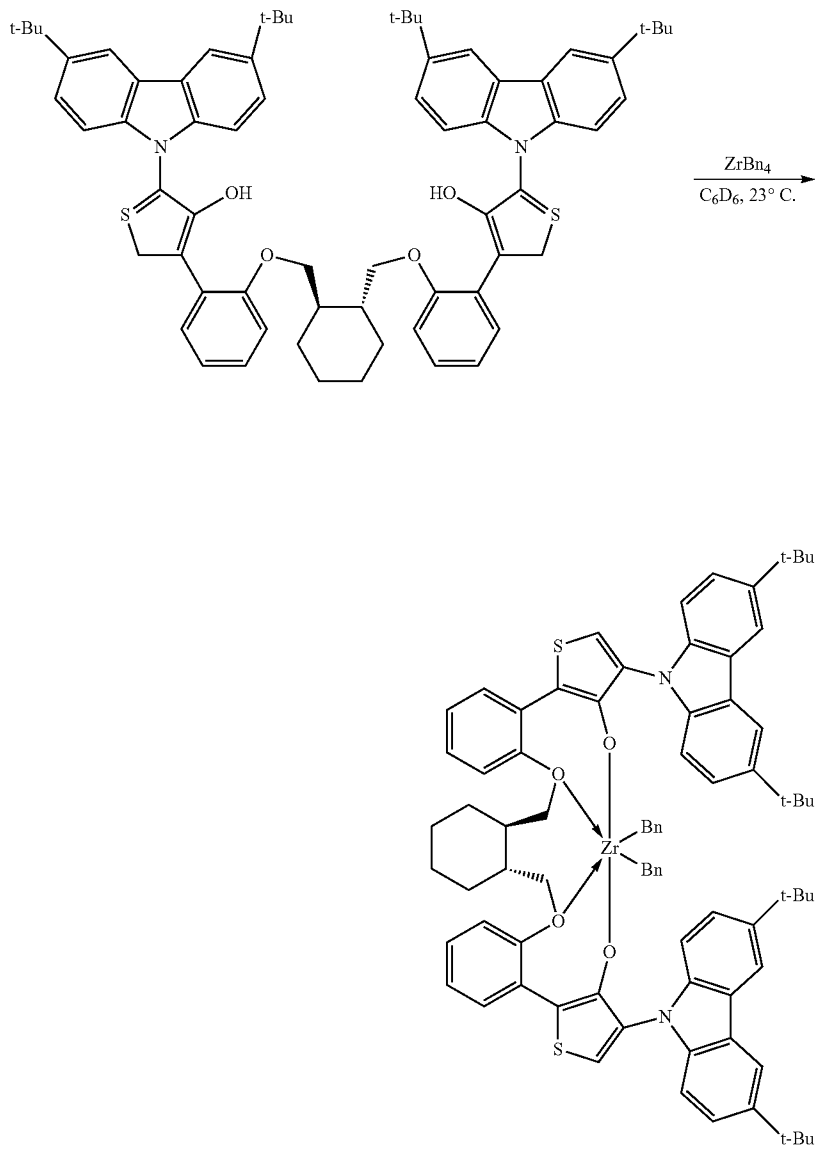

Ligand 13 was azeotropically dried using PhMe (4×10 mL) prior to use. To a clear colorless solution of the thiophene (9.0 mg, 8.59 μmol, 1.00 eq) in anhydrous $C_6D_6$ (1.55 mL) in a nitrogen filled glovebox at 23° C. was added a solution of $ZrBn_4$ (4.3 mg, 9.45 μmol, 1.10 eq) in $C_6D_6$ (0.17 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product which exists as a rotameric mixture. The same procedure can be used with PhMe as the solvent to prepare the procatalyst solution (0.0025 M or 0.005 M) which is used directly after filtration for the polymerization experiments.

$^1$H NMR (500 MHz, Benzene-$d_6$) δ 8.49 (dd, J=2.0, 0.6 Hz, 2H), 8.24 (dd, J=1.9, 0.6 Hz, 2H), 7.54-7.50 (m, 2H), 7.48 (dd, J=8.6, 2.0 Hz, 2H), 7.31 (ddd, J=8.7, 2.0, 0.6 Hz, 2H), 7.28 (d, J=1.8 Hz, 2H), 6.98-6.96 (m, 4H), 6.89 (s, 2H), 6.81 (tt, J=7.4, 1.2 Hz, 2H), 6.77 (ddd, J=8.2, 7.4, 1.8 Hz, 2H), 6.67 (td, J=7.6, 1.1 Hz, 2H), 6.63-6.59 (m, 2H), 6.26-6.22 (m, 4H), 5.18 (dd, J=8.3, 1.1 Hz, 2H), 4.17 (dd, J=12.6, 8.3 Hz, 2H), 3.20 (d, J=12.6 Hz, 2H), 1.51 (s, 18H), 1.42-1.35 (m, 2H) 1.30 (s, 18H), 1.13-1.06 (m, 4H), 0.76-0.69 (m, 2H), 0.65-0.58 (m, 2H), 0.54 (d, J=12.4 Hz, 2H), 0.52-0.44 (m, 2H). $^{13}$C NMR (126 MHz, Benzene-$d_6$) δ 156.40, 152.24, 147.22, 143.15, 142.86, 139.15, 138.97, 131.05, 129.79, 128.30, 128.17, 127.36, 126.40, 125.92, 125.23, 124.64, 123.12, 122.71, 122.38, 120.71, 116.84, 116.72, 116.23, 115.50, 112.72, 109.26, 86.21, 75.13, 42.35, 34.59, 34.43, 32.00, 31.80, 31.72, 29.67, 25.35.

Example 60: Synthesis of Procatalyst 26

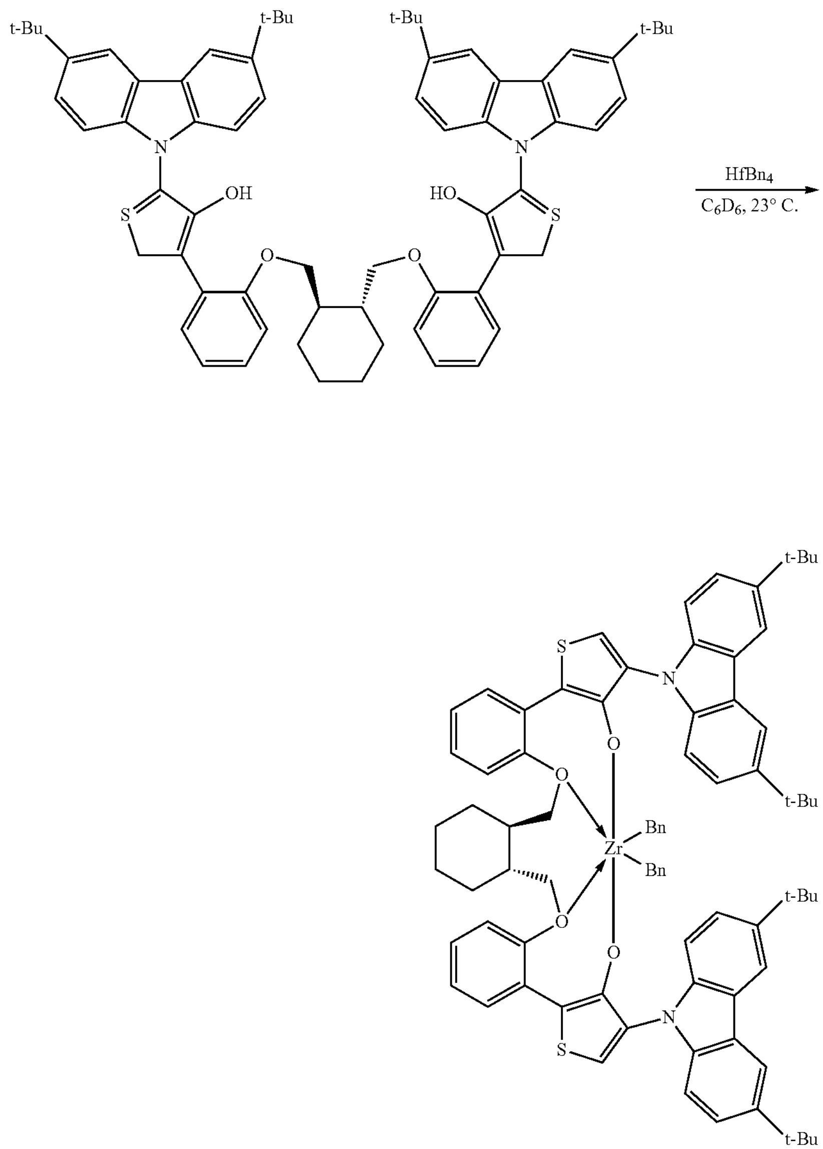

Ligand 13 was azeotropically dried using PhMe (4×10 mL) prior to use. To a clear colorless solution of the thiophene (9.3 mg, 8.88 μmol, 1.00 eq) in anhydrous $C_6D_6$ (1.56 mL) in a nitrogen filled glovebox at 23° C. was added a solution of $HfBn_4$ (5.3 mg, 9.77 μmol, 1.10 eq) in $C_6D_6$ (0.22 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^1$H NMR (500 MHz, Benzene-$d_6$) δ 8.50 (dd, J=2.0, 0.6 Hz, 2H), 8.25 (dd, J=2.0, 0.6 Hz, 2H), 7.48 (ddd, J=15.6, 8.6, 1.9 Hz, 4H), 7.29 (dd, J=8.5, 0.6 Hz, 2H), 7.26 (dd, J=7.7, 1.8 Hz, 2H), 7.22 (dd, J=8.7, 0.6 Hz, 2H), 6.99-6.96 (m, 4H), 6.89 (s, 2H), 6.81-6.76 (m, 4H), 6.68 (td, J=7.6, 1.1 Hz, 2H), 6.25-6.18 (m, 4H), 5.21 (dd, J=8.3, 1.1 Hz, 2H), 4.21 (dd, J=12.6, 8.4 Hz, 2H), 3.22 (d, J=12.7 Hz, 2H), 1.51 (s, 18H), 1.30 (s, 18H), 1.14-1.04 (m, 4H), 0.91 (d, J=13.4 Hz, 2H), 0.74 (t, J=8.5 Hz, 2H), 0.59 (d, J=12.7 Hz, 2H), 0.46 (t, J=10.0 Hz, 2H), 0.25 (d, J=13.3 Hz, 2H). $^{13}$C NMR (126 MHz, Benzene-$d_6$) δ 155.98, 152.30, 147.83, 143.20, 142.86, 139.16, 138.96, 131.06, 129.76, 128.67, 128.57, 128.18, 127.07, 126.75, 126.12, 124.66, 123.30, 122.68, 122.32, 120.76, 116.87, 116.25, 116.21, 115.44, 112.73, 109.23, 86.74, 78.29, 42.23, 34.60, 34.43, 32.01, 31.73, 29.56, 25.30.

Example 61: Synthesis of Ligand 14

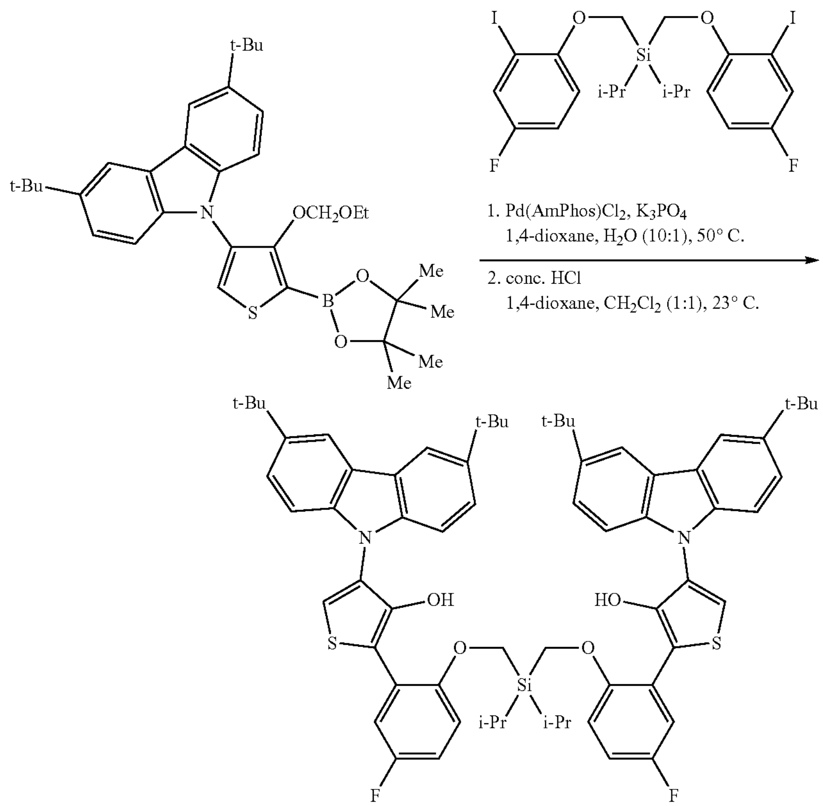

A mixture of the thiophene boropinacolate ester (1.644 g, 2.108 mmol, 3.00 eq, 72% pure by NMR), $K_3PO_4$ (1.342 g, 6.323 mmol, 9.00 eq), Pd(AmPhos)$Cl_2$ (99.0 mg, 0.1405 mmol, 0.20 eq), and the bisphenyliodide (0.433 g, 0.7026 mmol, 1.00 eq). The mixture was evacuated, then back-filled with nitrogen, this process was repeated 3× more, then deoxygenated 1,4-dioxane (15.0 mL) and deoxygenated water (1.5 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-55% $CH_2Cl_2$ in hexanes to afford the bisthiophene as a red amorphous oil (0.452 g, 0.3670 mmol, 52%). NMR indicated pure product.

To a solution of the impure coupled product in $CH_2Cl_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and $CH_2Cl_2$ (10 mL), poured into separatory funnel, partitioned, organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-75% $CH_2Cl_2$ in hexanes to afford the bisthiophene as a clear amorphous foam (0.280 g, 0.2510 mmol, 68%, 36% two steps). NMR indicated pure product.

$^1$H NMR (400 MHz, Chloroform-d) δ 8.18-8.12 (m, 4H), 7.41 (dd, J=8.6, 1.9 Hz, 4H), 7.33 (s, 2H), 7.14 (dd, J=8.5, 0.6 Hz, 4H), 7.07 (dd, J=9.2, 3.1 Hz, 2H), 6.55-6.45 (m, 4H), 6.21 (dd, J=9.2, 4.6 Hz, 2H), 3.72 (s, 4H), 1.46 (s, 36H), 1.08-0.95 (m, 2H), 0.88 (d, J=7.3 Hz, 12H). $^{19}$F NMR (376 MHz, Chloroform-d) δ −121.90 (td, J=8.5, 4.7 Hz). $^{13}$C NMR (101 MHz, Chloroform-d) δ 157.34 (d, J=240.5 Hz), 152.56 (d, J=2.2 Hz), 146.63, 142.86, 139.79, 127.10, 123.54, 123.20, 122.96 (d, J=8.5 Hz), 120.74, 116.56 (d, J=24.4 Hz), 116.07, 115.07 (d, J=23.2 Hz), 114.22 (d, J=1.9 Hz), 114.08 (d, J=8.8 Hz), 109.53, 58.54, 34.72, 32.03, 17.90, 9.71.

Characterization of the Protected Ligand:

$^1$H NMR (500 MHz, Chloroform-d) δ 8.13 (d, J=2.0 Hz, 4H), 7.49 (ddd, J=8.6, 6.2, 2.5 Hz, 6H), 7.36 (s, 2H), 7.27 (d, J=8.6 Hz, 4H), 6.90 (dtd, J=11.9, 9.0, 3.8 Hz, 4H), 4.36 (s, 4H), 3.98 (s, 4H), 2.75 (q, J=6.9 Hz, 4H), 1.48 (s, 36H), 1.41 (t, J=7.7 Hz, 2H), 1.17 (d, J=7.5 Hz, 12H), 0.54 (t, J=7.1 Hz, 6H). $^{19}$F NMR (470 MHz, Chloroform-d) δ −124.28 (td, J=8.5, 4.6 Hz). $^{13}$C NMR (126 MHz, Chloroform-d) δ 156.50 (d, J=238.5 Hz), 154.65 (d, J=1.9 Hz), 147.53, 142.90, 139.51, 129.24, 123.69, 123.12, 123.09 (d, J=1.8 Hz), 122.11 (d, J=8.5 Hz), 119.81, 118.12 (d, J=24.0 Hz), 116.03, 115.29 (d, J=22.8 Hz), 111.98 (d, J=8.3 Hz), 109.70, 96.85, 64.63, 56.85, 34.74, 32.04, 24.82, 18.26, 14.20, 10.09.

Example 62: Synthesis of Procatalyst 27

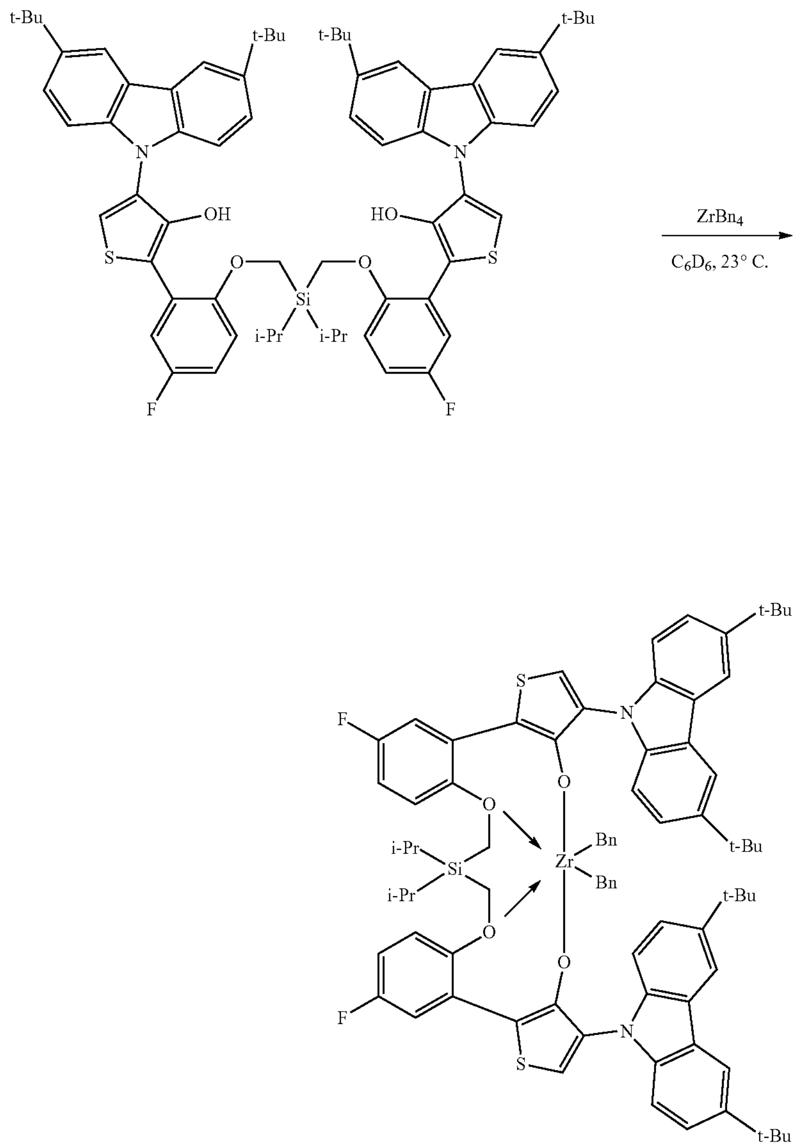

Ligand 14 was azeotropically dried using PhMe (4×10 mL) prior to use. To a clear colorless solution of the thiophene (9.2 mg, 8.25 μmol, 1.00 eq) in anhydrous $C_6D_6$ (2.97 mL) in a nitrogen filled glovebox at 23° C. was added a solution of $ZrBn_4$ (4.1 mg, 9.07 μmol, 1.10 eq) in $C_6D_6$ (0.33 mL) in a dropwise manner. After stirring (500 rpm) for 30 mins the pale golden yellow solution was filtered using a 0.20 μm PTFE submicron filter to afford the zirconium complex as a 0.0025 M solution in $C_6D_6$. NMR indicated product. The same procedure can be used with PhMe as the solvent to prepare the procatalyst solution (0.0025 M) which is used directly after filtration for the polymerization experiments.

$^1$H NMR (500 MHz, Benzene-$d_6$) δ 8.45 (dd, J=1.9, 0.6 Hz, 2H), 8.30 (dd, J=1.9, 0.6 Hz, 2H), 7.55 (dd, J=8.7, 1.9 Hz, 2H), 7.50 (dd, J=8.5, 1.9 Hz, 2H), 7.40 (dd, J=8.7, 0.7 Hz, 2H), 7.33 (dd, J=8.5, 0.6 Hz, 2H), 7.06-7.02 (m, 2H), 6.99-6.92 (m, 4H), 6.84 (s, 2H), 6.80-6.74 (m, 2H), 6.62 (ddd, J=9.0, 7.3, 3.1 Hz, 2H), 6.37-6.34 (m, 4H), 5.37 (dd, J=9.0, 4.8 Hz, 2H), 4.17 (d, J=14.7 Hz, 2H), 3.15 (d, J=14.8 Hz, 2H), 1.40 (s, 18H), 1.28 (s, 18H), 1.12 (d, J=12.5 Hz, 2H), 0.58 (d, J=12.5 Hz, 2H), 0.52 (d, J=7.1 Hz, 6H), 0.42 (d, J=6.5 Hz, 6H), 0.37 (tt, J=8.0, 6.0 Hz, 2H). $^{19}$F NMR (470 MHz, Benzene-$d_6$) δ −115.88 (td, J=7.8, 4.5 Hz). $^{13}$C NMR (126 MHz, Benzene-$d_6$) δ 159.41 (d, J=245.7 Hz), 154.25, 154.23, 152.87, 146.47, 143.27 (d, J=52.4 Hz), 139.70 (d, J=31.6 Hz), 130.56, 128.33, 128.16, 126.41, 125.21, 124.60, 124.12, 122.82, 122.52, 122.29 (d, J=9.1 Hz), 121.24, 119.11, 116.65, 116.35, 116.19 (d, J=13.2 Hz), 116.00 (d, J=13.5 Hz), 115.64, 112.22, 108.99, 75.76, 70.55, 34.54, 34.45, 31.89, 31.69, 17.55, 17.51, 9.44.

Example 63: Synthesis of Procatalyst 28

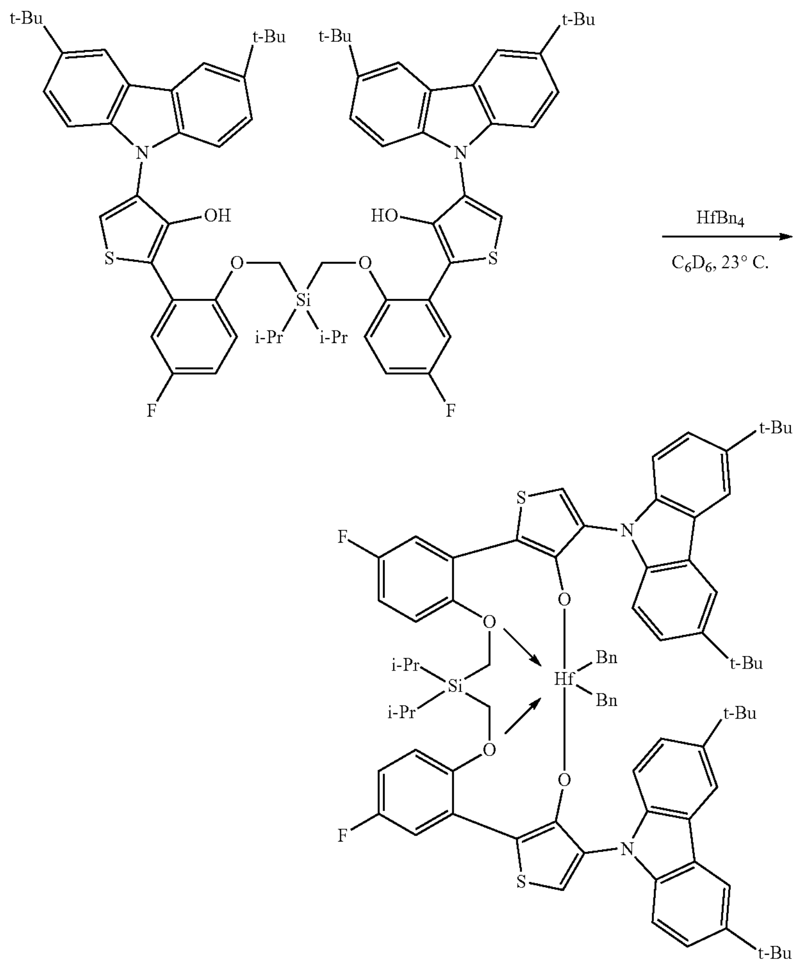

Ligand 14 was azeotropically dried using PhMe (4×10 mL) prior to use. To a clear colorless solution of the thiophene (8.9 mg, 7.98 μmol, 1.00 eq) in anhydrous $C_6D_6$ (2.81 mL) in a nitrogen filled glovebox at 23° C. was added a solution of $HfBn_4$ (4.8 mg, 8.78 μmol, 1.10 eq) in $C_6D_6$ (0.39 mL) in a dropwise manner. After stirring (500 rpm) for 30 mins the pale golden yellow solution was filtered using a 0.20 μm PTFE submicron filter to afford the hafnium complex as a 0.0025 M solution in $C_6D_6$. NMR indicated product. The same procedure can be used with PhMe as the solvent to prepare the procatalyst solution (0.0025 M) which is used directly after filtration for the polymerization experiments.

$^1$H NMR (500 MHz, Benzene-$d_6$) δ 8.46 (dd, J=1.9, 0.6 Hz, 2H), 8.31 (dd, J=1.9, 0.6 Hz, 2H), 7.54 (dd, J=8.7, 1.9 Hz, 2H), 7.49 (dd, J=8.5, 1.9 Hz, 2H), 7.32 (ddd, J=10.9, 8.6, 0.6 Hz, 4H), 6.99-6.89 (m, 6H), 6.84 (s, 2H), 6.78-6.71 (m, 2H), 6.65 (ddd, J=9.0, 7.3, 3.1 Hz, 2H), 6.40-6.35 (m, 4H), 5.39 (dd, J=9.0, 4.7 Hz, 2H), 4.20 (d, J=14.8 Hz, 2H), 3.15 (d, J=14.8 Hz, 2H), 1.40 (s, 18H), 1.28 (s, 18H), 1.01 (d, J=13.6 Hz, 2H), 0.50 (d, J=7.1 Hz, 6H), 0.40 (d, J=7.1 Hz, 6H), 0.39-0.30 (m, 2H), 0.27 (d, J=13.6 Hz, 2H). $^{19}$F NMR (470 MHz, Benzene-$d_6$) δ −115.48 (td, J=8.1, 4.8 Hz). $^{13}$C NMR (126 MHz, Benzene-$d_6$) δ 159.61 (d, J=246.2 Hz), 153.86 (d, J=2.7 Hz), 152.98, 147.22, 143.32 (d, J=61.0 Hz), 139.69 (d, J=36.3 Hz), 138.52, 129.89, 128.61, 127.17, 126.71, 124.65, 124.35, 122.78, 122.71 (d, J=8.9 Hz), 122.46, 121.25, 119.23, 116.32, 116.17 (d, J=10.2 Hz), 115.98 (d, J=9.8 Hz), 115.95, 115.55, 112.30, 108.98, 83.00, 71.02, 34.54, 34.45, 31.89, 31.69, 17.49, 17.45, 9.50.

Example 64: Synthesis of the Bridge Intermediate to Ligand 13

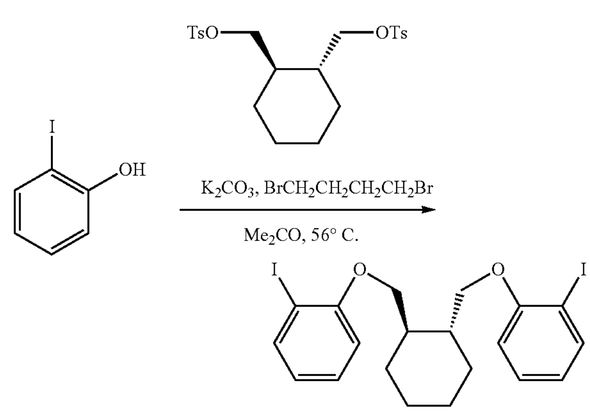

A white heterogeneous mixture of the iodophenol (2.194 g, 9.972 mmol, 2.00 eq), $K_2CO_3$ (2.257 g, 29.916 mmol, 6.00 eq), and the bistosylate (2.257 g, 4.986 mmol, 1.00 eq) in acetone (50 mL) equipped with a reflux condenser under nitrogen was placed in a mantle heated to 60° C., after stirring (500 rpm) for 40 hrs the white heterogeneous mixture was removed from the mantle, allowed to cool to 23° C., diluted with $CH_2Cl_2$ (50 mL), stirred vigorously (1000 rpm) for 5 mins, suction filtered over a pad of celite, rinsed with $CH_2Cl_2$ (3×25 mL), the resultant filtrate solution was concentrated onto celite, and purified via silica gel chromatography; 10% $CH_2Cl_2$ in hexanes-50% $CH_2Cl_2$ in hexanes to afford the bisiodophenyl ether as a white solid (1.420 g, 2.590 mmol, 52%) and the mixed monotosylate monoiodphenyl ether (0.992 g, 1.982 mmol, 40%). NMR of each indicated pure product.

$^1H$ NMR (500 MHz, Chloroform-d) δ 7.76 (dd, J=7.9, 1.6 Hz, 2H), 7.26 (td, J=7.8, 1.6 Hz, 2H), 6.82 (dd, J=8.2, 1.3 Hz, 2H), 6.69 (td, J=7.6, 1.4 Hz, 2H), 4.10-3.98 (m, 4H), 2.01 (ddt, J=25.4, 13.2, 2.9 Hz, 4H), 1.86 (dq, J=8.4, 2.9 Hz, 2H), 1.52 (dd, J=17.3, 7.8 Hz, 2H), 1.41 (ddt, J=12.0, 8.9, 4.9 Hz, 2H). $^{13}C$ NMR (126 MHz, Chloroform-d) δ 157.47, 139.27, 129.46, 122.24, 111.89, 86.52, 72.02, 39.71, 30.29, 26.16.

Example 65: Synthesis of the Bridge Intermediated to Ligand 13

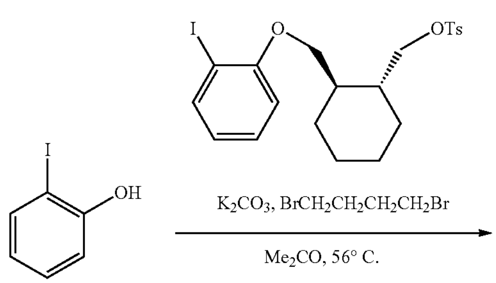

-continued

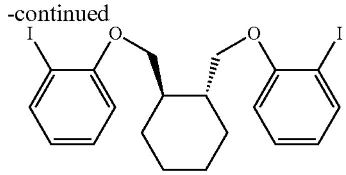

A white heterogeneous mixture of the iodophenol (0.458 g, 2.082 mmol, 1.05 eq), $K_2CO_3$ (0.863 g, 6.246 mmol, 3.15 eq), and the monotosylate (0.992 g, 1.982 mmol, 1.00 eq) in acetone (25 mL) equipped with a reflux condenser under nitrogen was placed in a mantle heated to 60° C., after stirring (500 rpm) for 48 hrs the white heterogeneous mixture was removed from the mantle, allowed to cool to 23° C., diluted with $CH_2Cl_2$ (50 mL), stirred vigorously (1000 rpm) for 5 mins, suction filtered over a pad of celite, rinsed with $CH_2Cl_2$ (3×25 mL), the resultant filtrate solution was concentrated onto celite, and purified via silica gel chromatography; 10% $CH_2Cl_2$ in hexanes-75% $CH_2Cl_2$ in hexanes to afford the bisiodophenyl ether as a white solid (0.677 g, 1.235 mmol, 62%). NMR of each indicated pure product.

$^1H$ NMR (500 MHz, Chloroform-d) δ 7.76 (dd, J=7.9, 1.6 Hz, 2H), 7.26 (td, J=7.8, 1.6 Hz, 2H), 6.82 (dd, J=8.2, 1.3 Hz, 2H), 6.69 (td, J=7.6, 1.4 Hz, 2H), 4.10-3.98 (m, 4H), 2.01 (ddt, J=25.4, 13.2, 2.9 Hz, 4H), 1.86 (dq, J=8.4, 2.9 Hz, 2H), 1.52 (dd, J=17.3, 7.8 Hz, 2H), 1.41 (ddt, J=12.0, 8.9, 4.9 Hz, 2H). $^{13}C$ NMR (126 MHz, Chloroform-d) δ 157.47, 139.27, 129.46, 122.24, 111.89, 86.52, 72.02, 39.71, 30.29, 26.16.

Example 66: Synthesis of Ligand 15

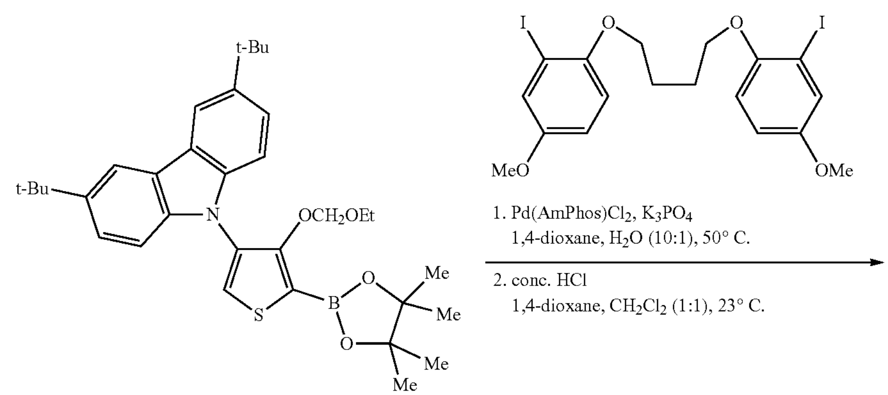

-continued

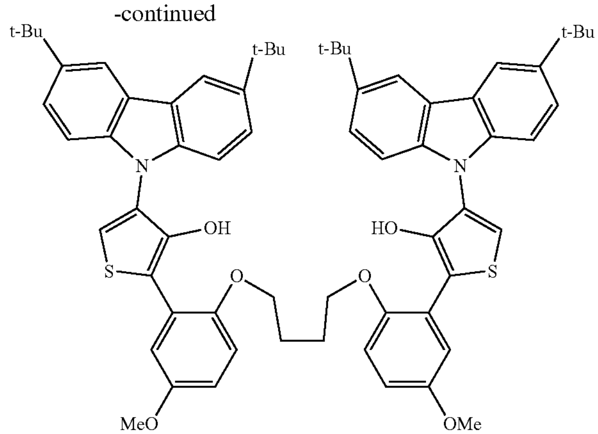

A mixture of the thiophene boropinacolate ester (2.017 g, 2.586 mmol, 3.00 eq, 72% pure by NMR), $K_3PO_4$ (1.647 g, 7.758 mmol, 9.00 eq), Pd(AmPhos)$Cl_2$ (122.0 mg, 0.1724 mmol, 0.20 eq), and the bisphenyliodide (0.478 g, 0.8620 mmol, 1.00 eq). The mixture was evacuated, then back-filled with nitrogen, this process was repeated 3× more, then deoxygenated 1,4-dioxane (17.0 mL) and deoxygenated water (1.7 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-50% $CH_2Cl_2$ in hexanes to afford the bisthiophene as a red amorphous oil (0.747 g, 0.6387 mmol, 74%). NMR indicated pure product.

To a solution of the impure coupled product in $CH_2Cl_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and $CH_2Cl_2$ (10 mL), poured into separatory funnel, partitioned, organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-75% $CH_2Cl_2$ in hexanes to afford the bisthiophene as a light tan solid (0.514 g, 0.4879 mmol, 76%, 57% two steps). NMR indicated pure product.

$^1$H NMR (500 MHz, Chloroform-d) δ 8.14 (d, J=1.9 Hz, 4H), 7.68 (s, 2H), 7.42 (dd, J=8.6, 1.9 Hz, 4H), 7.35 (s, 2H), 7.25 (d, J=8.6 Hz, 4H), 7.14 (d, J=2.9 Hz, 2H), 6.84 (d, J=9.0 Hz, 2H), 6.79 (dd, J=8.9, 2.9 Hz, 2H), 3.99 (q, J=3.5, 2.1 Hz, 4H), 3.84 (s, 6H), 1.83 (q, J=2.8 Hz, 4H), 1.46 (s, 36H). $^{13}$C NMR (126 MHz, Chloroform-d) δ 155.34, 147.83, 146.76, 142.68, 139.64, 127.76, 124.50, 123.45, 123.19, 120.26, 120.23, 116.56, 116.20, 115.24, 115.18, 113.95, 109.61, 71.38, 55.77, 34.71, 32.05, 25.85.

Characterization of the Protected Ligand:

$^1$H NMR (500 MHz, Chloroform-d) δ 8.10 (d, J=1.9 Hz, 4H), 7.55 (d, J=3.1 Hz, 2H), 7.44 (dd, J=8.6, 1.9 Hz, 4H), 7.35-7.31 (m, 6H), 6.94 (d, J=9.0 Hz, 2H), 6.84 (dd, J=9.0, 3.1 Hz, 2H), 4.47 (s, 4H), 4.16 (d, J=5.0 Hz, 4H), 3.81 (s, 6H), 2.80 (q, J=7.1 Hz, 4H), 2.22-2.12 (m, 4H), 1.46 (s, 36H), 0.52 (t, J=7.0 Hz, 6H). $^{13}$C NMR (126 MHz, Chloroform-d) δ 153.53, 150.14, 147.42, 142.73, 139.47, 129.40, 123.90, 123.65, 123.06, 122.44, 119.40, 116.10, 115.94, 114.29, 113.64, 109.85, 96.97, 69.27, 64.70, 55.89, 34.71, 32.04, 26.46, 14.16.

Example 67: Synthesis of Procatalyst 29

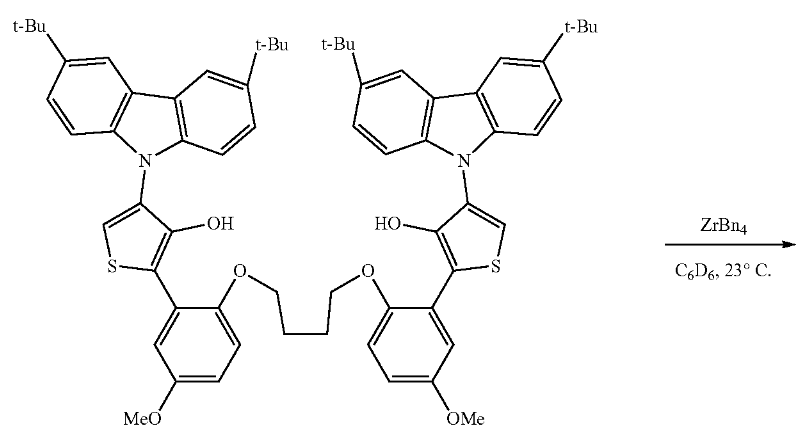

-continued

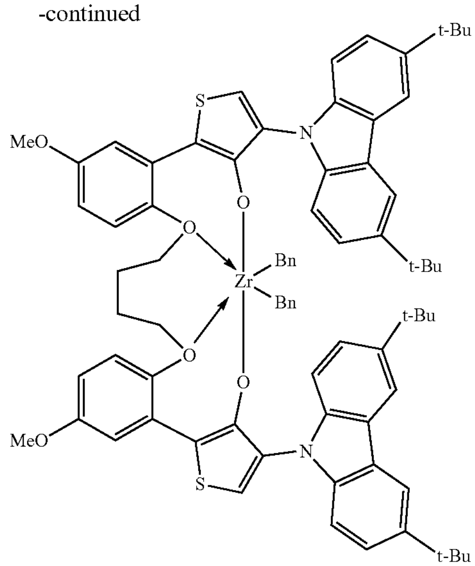

Ligand 15 was azeotropically dried using PhMe (4×10 mL) prior to use. To a clear colorless solution of the thiophene (7.4 mg, 7.02 μmol, 1.00 eq) in anhydrous $C_6D_6$ (1.25 mL) in a nitrogen filled glovebox at 23° C. was added a solution of $ZrBn_4$ (3.7 mg, 7.72 μmol, 1.10 eq) in $C_6D_6$ (0.16 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product. The same procedure can be used with PhMe as the solvent to prepare the procatalyst solution (0.0025 M or 0.005 M) which is used directly after filtration for the polymerization experiments.

$^1$H NMR (400 MHz, Benzene-$d_6$) δ 8.47 (dd, J=2.0, 0.6 Hz, 2H), 8.24 (dd, J=1.9, 0.6 Hz, 2H), 7.49 (td, J=8.6, 1.9 Hz, 4H), 7.30 (ddd, J=8.5, 5.3, 0.6 Hz, 4H), 7.08-7.03 (m, 2H), 6.96 (dtd, J=6.9, 1.4, 0.7 Hz, 2H), 6.92 (d, J=3.1 Hz, 2H), 6.84 (s, 2H), 6.78 (tt, J=7.3, 1.3 Hz, 2H), 6.45 (dd, J=9.1, 3.1 Hz, 2H), 6.31-6.26 (m, 4H), 5.04 (d, J=9.1 Hz, 2H), 3.95-3.85 (m, 2H), 3.28-3.19 (m, 2H), 3.16 (s, 6H), 1.47 (s, 18H), 1.27 (s, 18H), 1.08 (d, J=12.3 Hz, 2H), 0.88-0.74 (m, 2H), 0.58 (d, J=12.3 Hz, 2H), 0.56-0.51 (m, 2H). $^{13}$C NMR (101 MHz, Benzene-$d_6$) δ 157.39, 152.38, 149.56, 147.35, 143.13, 142.70, 139.32, 139.16, 128.21, 128.19, 128.15, 126.46, 125.20, 124.57, 124.45, 122.63, 122.35, 120.62, 117.06, 116.85, 116.29, 115.68, 115.54, 114.96, 112.51, 108.91, 81.18, 75.06, 54.73, 34.55, 34.42, 31.99, 31.72, 25.92.

Example 68: Synthesis of Procatalyst 30

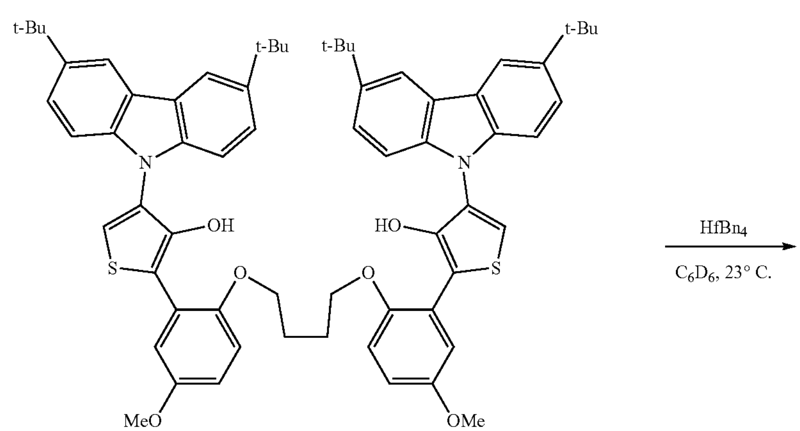

-continued

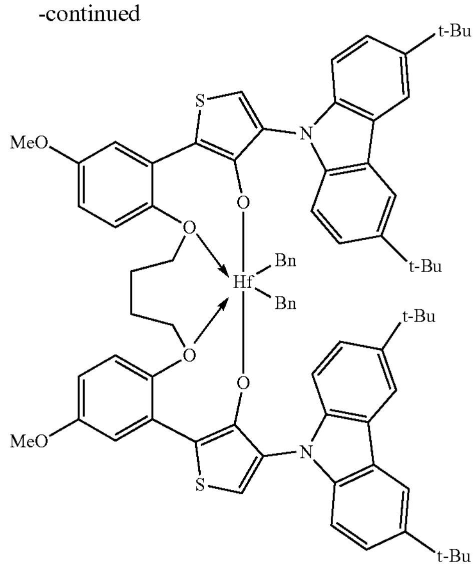

Ligand 15 was azeotropically dried using PhMe (4×10 mL) prior to use. To a clear colorless solution of the thiophene (10.2 mg, 9.68 μmol, 1.00 eq) in anhydrous $C_6D_6$ (1.70 mL) in a nitrogen filled glovebox at 23° C. was added a solution of $HfBn_4$ (5.8 mg, 10.65 μmol, 1.10 eq) in $C_6D_6$ (0.24 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^1$H NMR (500 MHz, Benzene-$d_6$) δ 8.50 (dd, J=2.0, 0.6 Hz, 2H), 8.26 (dd, J=1.9, 0.6 Hz, 2H), 7.50 (dd, J=2.5, 1.9 Hz, 2H), 7.48 (t, J=2.1 Hz, 2H), 7.29 (dd, J=8.5, 0.6 Hz, 2H), 7.23 (dd, J=8.7, 0.6 Hz, 2H), 6.99-6.95 (m, 2H), 6.93 (d, J=3.1 Hz, 2H), 6.85 (s, 2H), 6.79-6.74 (m, 2H), 6.52-6.44 (m, 4H), 6.32-6.28 (m, 4H), 5.09 (d, J=9.0 Hz, 2H), 4.02-3.92 (m, 2H), 3.33-3.25 (m, 2H), 3.17 (s, 6H), 1.48 (s, 18H), 1.29 (s, 18H), 0.92 (d, J=13.3 Hz, 2H), 0.85-0.77 (m, 2H), 0.55 (m, 2H), 0.31 (d, J=13.3 Hz, 2H). $^{13}$C NMR (126 MHz, Benzene-$d_6$) δ 157.52, 152.44, 149.28, 148.02, 143.20, 142.73, 139.32, 139.12, 129.89, 128.60, 128.57, 128.03, 127.04, 126.83, 124.63, 124.35, 122.58, 122.30, 120.69, 117.13, 116.30, 115.70, 115.48, 114.96, 112.58, 108.91, 83.01, 78.24, 54.76, 34.57, 34.43, 32.00, 31.73, 26.04.

Example 69: Synthesis of bis-4-methoxy-2-iodophenyl ether

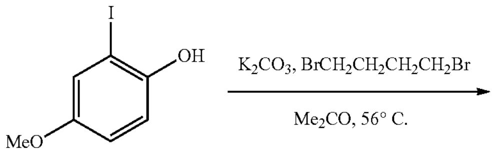

-continued

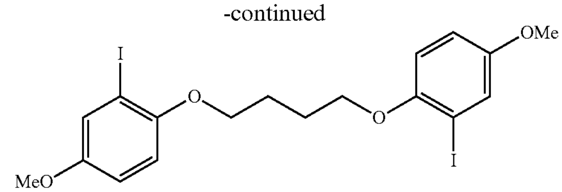

A white heterogeneous mixture of 2-iodophenol (1.890 g, 7.559 mmol, 2.00 eq), $K_2CO_3$ (3.134 g, 22.677 mmol, 6.00 eq), and 1,4-dibromobutane (0.45 mL, 3.779 mmol, 1.00 eq) in acetone (40 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with $CH_2Cl_2$ (50 mL), stirred for 2 mins, suction filtered over a pad of celite, rinsed with $CH_2Cl_2$ (4×20 mL), the resultant pale yellow filtrate was concentrated onto celite, and purified via silica gel chromatography using an ISCO chromatography purification system; 50%-100% $CH_2Cl_2$ in hexanes to afford the iodophenyl ether as a white solid (1.945 g, 3.510 mmol, 93%). NMR indicated pure product.

$^1$H NMR (500 MHz, Chloroform-d) δ 7.32 (d, J=2.9 Hz, 2H), 6.84 (dd, J=8.9, 3.0 Hz, 2H), 6.76 (d, J=8.9 Hz, 2H), 4.11-3.99 (m, 4H), 3.75 (s, 6H), 2.13-2.01 (m, 4H). $^{13}$C NMR (126 MHz, Chloroform-d) δ 154.26, 152.05, 124.61, 114.78, 113.06, 86.94, 69.58, 55.92, 26.15.

Example 70: Synthesis of 4-methoxy-2-iodophenol

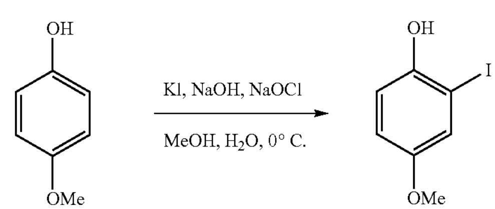 [SMILES: COc1ccc(O)cc1 ; COc1ccc(O)c(I)c1]

A clear colorless solution of the starting phenol (5.000 g, 40.277 mmol, 1.00 eq), KI (7.020 g, 42.291 mmol, 1.05 eq), and aqueous NaOH (201 mL, 201.39 mmol, 5.00 eq, 1 N) in methanol (300 mL) and water (200 mL) under nitrogen was placed in an ice bath and stirred vigorously for 1 hr, upon which precooled commercial aqueous bleach (61 mL, 42.291 mmol, 1.05 eq, 5.2% w/w) was added in a dropwise manner over 30 mins. The now dark orange mixture was stirred for 30 mins at 0° C., the mixture was removed from the ice water bath, solid $NaH_2PO_4$ (30 g) was added followed by aqueous $Na_2S_2O_3$ (200 mL) to reduce residual iodine and water (200 mL), the mixture was stirred vigorously for 10 mins, diluted with $CH_2Cl_2$ (50 mL), the biphasic dark red-orange mixture was poured into a separatory funnel, partitioned, organics were washed with aqueous $Na_2S_2O_3$ (2×50 mL), residual organics were extracted from the aqueous layer using $CH_2Cl_2$ (2×50 mL), combined, dried over solid $Na_2SO_4$, decanted, and concentrated to afford a red-brown viscous oil. NMR indicated starting phenol and observable product, albeit minor, with approx. 70:30 SM:product mixture, and there exists other adducts of decomposition. The crude mixture was dissolved in $CH_2Cl_2$, concentrated onto celite, and purified via silica gel chromatography; 25% $CH_2Cl_2$ in hexanes-100% $CH_2Cl_2$ to afford the o-iodophenol as a pale purple amorphous foam (0.877 g, 3.508 mmol, 9%) and recovered starting phenol (1.277 g, 10.287 mmol, 26%). NMR indicated pure product.

$^1H$ NMR (500 MHz, Chloroform-d) δ 7.18 (d, J=2.9 Hz, 1H), 6.90 (d, J=8.9 Hz, 1H), 6.83 (dd, J=8.9, 2.9 Hz, 1H), 5.00 (s, 1H), 3.74 (s, 3H). $^{13}C$ NMR (126 MHz, Chloroform-d) δ 153.93, 149.17, 122.66, 116.37, 115.13, 85.07, 55.99.

Example 71: Synthesis of Ligand 16

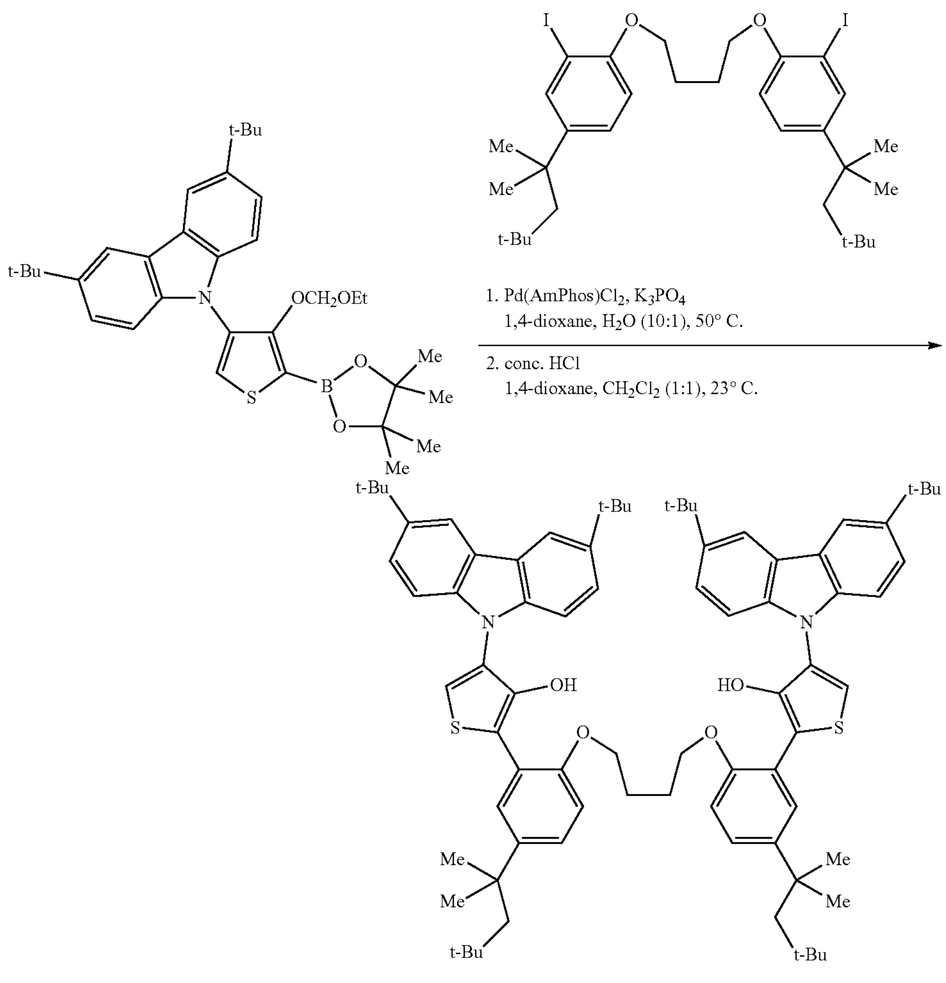

A mixture of the thiophene boropinacolate ester (0.605 g, 0.5387 mmol, 2.70 eq, 50% pure by NMR), $K_3PO_4$ (0.343 g, 1.616 mmol, 8.10 eq), $Pd(AmPhos)Cl_2$ (28.3 mg, 0.0399 mmol, 0.20 eq), and the bisphenyliodide (0.143 g, 0.2000 mmol, 1.00 eq). The mixture was evacuated, then back-filled with nitrogen, this process was repeated 3× more, then deoxygenated 1,4-dioxane (4.0 mL) and deoxygenated water (0.4 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-50% $CH_2Cl_2$ in hexanes to afford the bisthiophene as an off-white solid (0.168 g). NMR indicated product which contained minor impurities. The material was used in the subsequent deprotection without further purification.

To a solution of the impure coupled product in $CH_2Cl_2$-1,4-dioxane (8 mL, 1:1) under nitrogen at 23° C. was added conc. HCl (4 mL). The golden brown solution was stirred (500 rpm) for 20 hrs, diluted with 1N HCl (10 mL) and $CH_2Cl_2$ (10 mL), poured into separatory funnel, partitioned, organics were washed with 1N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-50% $CH_2Cl_2$ in hexanes to afford the bisthiophene as a light tan solid (80.0 mg, 0.0657 mmol, 33% two steps). NMR indicated pure product.

$^1$H NMR (400 MHz, Chloroform-d) δ 8.11 (d, J=1.9 Hz, 4H), 7.57 (d, J=2.3 Hz, 2H), 7.47 (s, 2H), 7.41 (dd, J=8.7, 1.9 Hz, 4H), 7.31 (s, 2H), 7.27-7.20 (m, 4H), 6.78 (d, J=8.6 Hz, 2H), 4.07-3.97 (m, 4H), 1.93-1.85 (m, 4H), 1.77 (s, 4H), 1.44 (s, 36H), 1.40 (s, 12H), 0.77 (s, 18H). $^{13}$C NMR (101 MHz, Chloroform-d) δ 151.42, 146.28, 144.75, 142.58, 139.67, 128.29, 127.66, 126.52, 123.39, 123.14, 121.99, 119.81, 116.16, 116.04, 113.38, 109.61, 69.95, 56.86, 38.19, 34.69, 32.41, 32.05, 31.91, 31.62, 25.90.

Example 72: Synthesis of Procatalyst 31

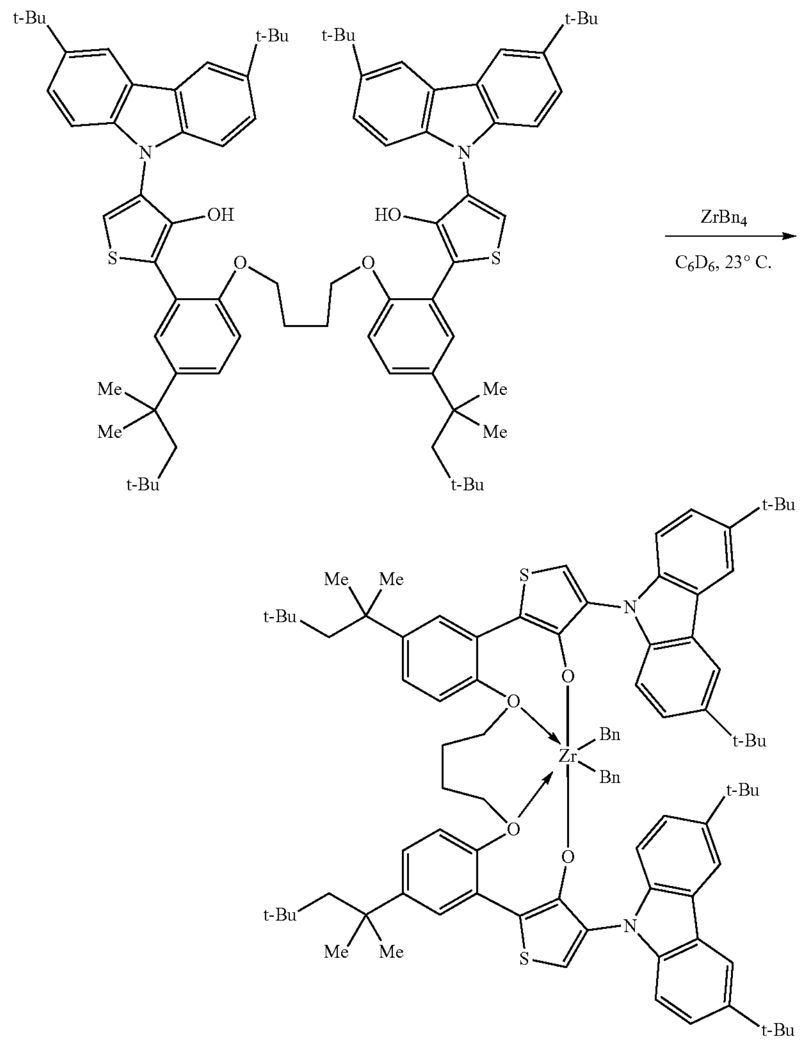

Ligand 16 was azeotropically dried using PhMe (4×10 mL) prior to use. To a clear colorless solution of the ligand (7.4 mg, 6.08 μmol, 1.00 eq) in anhydrous $C_6D_6$ (1.09 mL) in a nitrogen filled glovebox at 23° C. was added a solution of $ZrBn_4$ (3.0 mg, 6.69 μmol, 1.10 eq) in $C_6D_6$ (0.13 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^1$H NMR (400 MHz, Benzene-d$_6$) δ 8.55 (d, J=1.9 Hz, 2H), 8.15-8.11 (m, 2H), 7.57 (d, J=2.5 Hz, 2H), 7.51 (dd, J=8.6, 1.9 Hz, 2H), 7.43 (dd, J=8.7, 1.9 Hz, 2H), 7.34 (d, J=8.4 Hz, 2H), 7.21 (dd, J=8.7, 0.6 Hz, 2H), 7.09-7.04 (m, 2H), 7.03-6.97 (m, 2H), 6.98-6.94 (m, 2H), 6.84 (s, 2H), 6.86-6.81 (m, 2H), 6.24-6.17 (m, 4H), 5.17 (d, J=8.7 Hz, 2H), 4.08-3.98 (m, 2H), 3.42-3.34 (m, 2H), 1.68 (d, J=14.6 Hz, 2H), 1.57 (s, 18H), 1.51 (d, J=14.6 Hz, 2H), 1.23 (s, 18H), 1.20 (s, 6H), 1.16 (s, 6H), 1.02 (d, J=12.3 Hz, 2H), 0.89 (q, J=11.9, 10.7 Hz, 2H), 0.70 (s, 18H), 0.64-0.56 (m, 2H), 0.52 (d, J=12.3 Hz, 2H). $^{13}C$ NMR (101 MHz, Benzene-$d_6$) δ 153.93, 152.24, 148.83, 147.09, 142.92, 142.61, 139.23, 139.15, 130.55, 128.65, 128.35, 128.32, 126.79, 126.61, 124.62, 124.10, 122.79, 122.65, 122.26, 120.58, 74.94, 72.00, 56.54, 38.25, 34.66, 34.36, 32.13, 32.10, 31.71, 31.66, 30.04, 25.93.

Example 73: Synthesis of Procatalyst 32

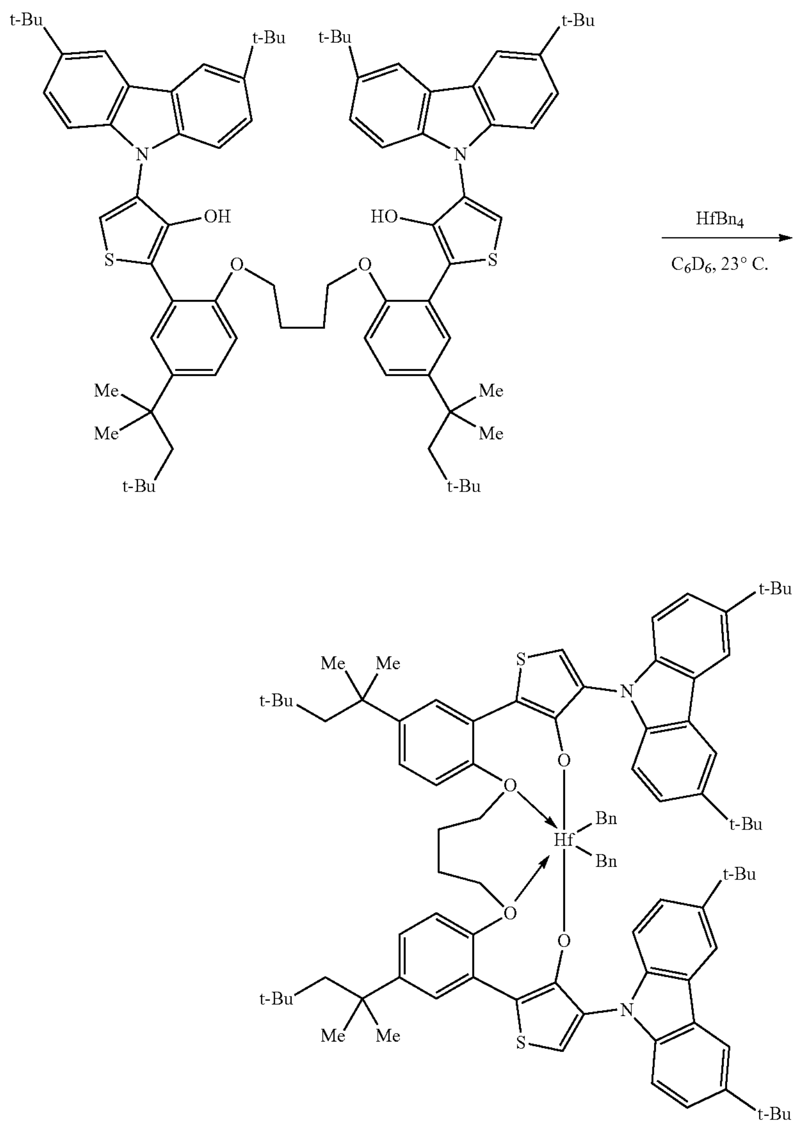

Ligand 16 was azeotropically dried using PhMe (4×10 mL) prior to use. To a clear colorless solution of the ligand (8.3 mg, 6.82 μmol, 1.00 eq) in anhydrous $C_6D_6$ (1.19 mL) in a nitrogen filled glovebox at 23° C. was added a solution of $HfBn_4$ (4.1 mg, 7.50 μmol, 1.10 eq) in $C_6D_6$ (0.17 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^{1}H$ NMR (500 MHz, Benzene-$d_6$) δ 8.57 (dd, J=1.9, 0.6 Hz, 2H), 8.15 (dd, J=2.0, 0.7 Hz, 2H), 7.58 (d, J=2.5 Hz, 2H), 7.52 (dd, J=8.5, 1.9 Hz, 2H), 7.42 (dd, J=8.7, 1.9 Hz, 2H), 7.33 (dd, J=8.5, 0.6 Hz, 2H), 7.14-7.07 (m, 6H), 7.05-7.02 (m, 2H), 6.85 (s, 2H), 6.82 (tt, J=7.3, 1.2 Hz, 2H), 6.24-6.18 (m, 4H), 5.21 (d, J=8.7 Hz, 2H), 4.15-4.06 (m, 2H), 3.50-3.41 (m, 2H), 1.69 (d, J=14.6 Hz, 2H), 1.59 (s, 18H), 1.53 (d, J=14.7 Hz, 2H), 1.25 (s, 18H), 1.22 (s, 6H), 1.17 (s, 6H), 0.92 (t, J=9.5 Hz, 2H), 0.84 (d, J=13.2 Hz, 2H), 0.72 (s, 18H), 0.59-0.51 (m, 2H), 0.27 (d, J=13.2 Hz, 2H). $^{13}C$ NMR (126 MHz, Benzene-$d_6$) δ 153.62, 152.32, 149.13, 147.76, 142.98, 142.63, 139.24, 139.11, 128.73, 128.66, 128.04, 127.05, 126.99, 126.92, 125.36, 124.67, 122.99, 122.61, 122.21, 120.63, 116.95, 116.79, 116.28, 115.61, 112.50, 108.93, 81.86, 77.99, 56.54, 38.31, 34.68, 34.37, 32.15, 32.12, 31.68, 31.65, 30.04, 26.03.

Example 74: Synthesis of Ligand 17

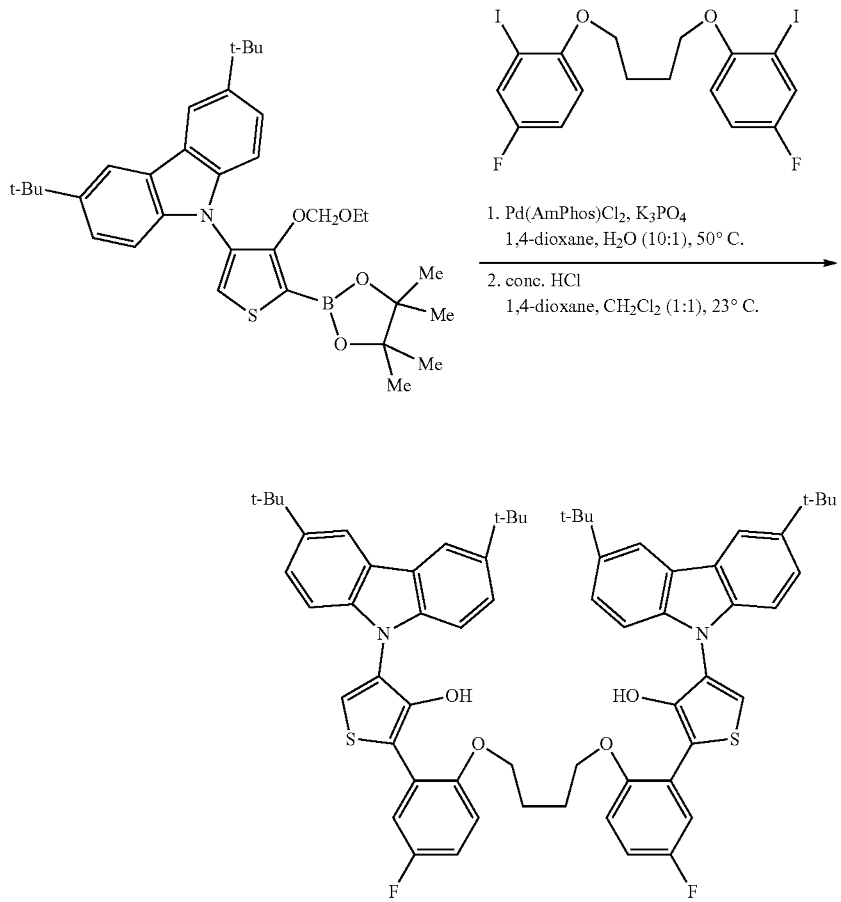

A mixture of the thiophene boropinacolate ester (0.605 g, 0.5387 mmol, 2.70 eq, 50% pure by NMR), $K_3PO_4$ (0.343 g, 1.616 mmol, 8.10 eq), Pd(AmPhos)$Cl_2$ (28.3 mg, 0.0399 mmol, 0.20 eq), and the bisphenyliodide (0.106 g, 0.1995 mmol, 1.00 eq). The mixture was evacuated, then back-filled with nitrogen, this process was repeated 3× more, then deoxygenated 1,4-dioxane (4.0 mL) and deoxygenated water (0.4 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-50% $CH_2Cl_2$ in hexanes to afford the bisthiophene as an off-white solid (0.101 g). NMR indicated product which contained minor impurities. The material was used in the subsequent deprotection without further purification.

To a solution of the impure coupled product in $CH_2Cl_2$-1,4-dioxane (6 mL, 1:1) under nitrogen at 23° C. was added conc. HCl (3 mL). The golden brown solution was stirred (500 rpm) for 20 hrs, diluted with 1N HCl (10 mL) and $CH_2Cl_2$ (10 mL), poured into separatory funnel, partitioned, organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-75% $CH_2Cl_2$ in hexanes to afford the bisthiophene as a light tan solid (52.0 mg, 0.05052 mmol, 25% two steps). NMR indicated pure product.

$^1$H NMR (400 MHz, Chloroform-d) δ 8.10 (d, J=1.9 Hz, 4H), 7.43-7.29 (m, 8H), 7.25 (d, J=10.3 Hz, 2H), 7.19 (d, J=8.6 Hz, 4H), 6.90 (td, J=8.2, 7.5, 3.0 Hz, 2H), 6.80 (dd, J=9.1, 4.6 Hz, 2H), 4.01 (d, J=4.8 Hz, 4H), 1.92-1.81 (m, 4H), 1.42 (s, 36H). $^{19}$F NMR (376 MHz, Chloroform-d) δ −120.34 (td, J=8.5, 4.7 Hz). $^{13}$C NMR (101 MHz, Chloroform-d) δ158.08 (d, J=241.4 Hz), 149.83 (d, J=2.3 Hz), 146.99, 142.85, 139.52, 127.55, 124.80 (d, J=8.6 Hz), 123.50, 123.21, 120.82, 116.56 (d, J=24.7 Hz), 116.24, 115.69 (d, J=8.8 Hz), 114.72 (d, J=23.3 Hz), 114.00 (d, J=1.8 Hz), 109.47, 70.96, 34.68, 31.99, 25.83.

Characterization of the Protected Ligand:

$^1$H NMR (400 MHz, Chloroform-d) δ 8.08 (dd, J=1.9, 0.7 Hz, 4H), 7.78 (dd, J=9.7, 2.9 Hz, 2H), 7.42 (dd, J=8.6, 1.9 Hz, 4H), 7.33 (s, 2H), 7.31-7.26 (m, 4H), 7.02-6.86 (m, 4H), 4.43 (s, 4H), 4.20-4.14 (m, 4H), 2.86 (q, J=7.0 Hz, 4H), 2.25-2.15 (m, 4H), 1.43 (s, 38H), 0.55 (t, J=7.1 Hz, 6H). $^{19}$F NMR (376 MHz, Chloroform-d) δ −123.44 (ddd, J=9.9, 7.4, 4.8 Hz).

Example 75: Synthesis of Procatalyst 33

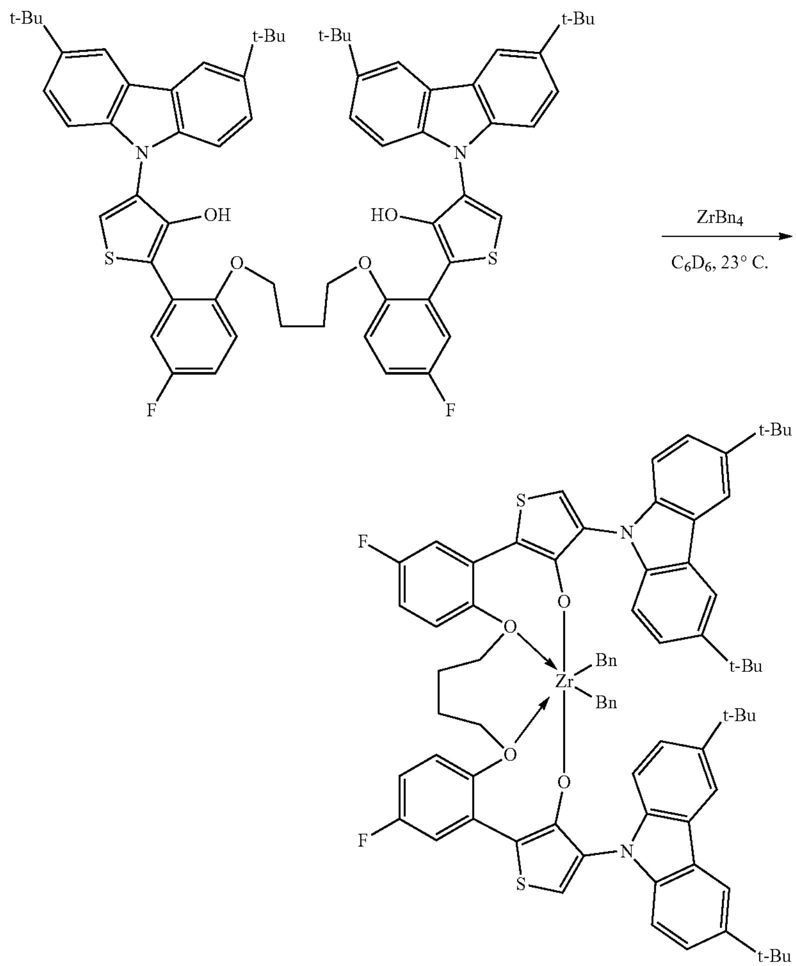

Ligand 17 was azeotropically dried using PhMe (4×10 mL) prior to use. To a clear colorless solution of the thiophene (9.2 mg, 8.94 μmol, 1.00 eq) in anhydrous $C_6D_6$ (1.61 mL) in a nitrogen filled glovebox at 23° C. was added a solution of $ZrBn_4$ (4.5 mg, 9.83 μmol, 1.10 eq) in $C_6D_6$ (0.18 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^1$H NMR (500 MHz, Benzene-$d_6$) δ 8.42 (dd, J=2.0, 0.6 Hz, 2H), 8.28 (dd, J=1.9, 0.7 Hz, 2H), 7.51 (dd, J=8.7, 1.9 Hz, 2H), 7.44 (dd, J=8.5, 1.9 Hz, 2H), 7.33 (dd, J=8.7, 0.6 Hz, 2H), 7.21 (dd, J=8.5, 0.7 Hz, 2H), 7.01-6.95 (m, 2H), 6.83 (s, 2H), 6.79-6.74 (m, 2H), 6.50 (ddd, J=9.0, 7.4, 3.2 Hz, 4H), 6.36-6.32 (m, 2H), 6.27-6.23 (m, 4H), 4.99 (dd, J=9.0, 4.8 Hz, 2H), 3.87-3.75 (m, 2H), 3.11 (dd, J=11.8, 4.6 Hz, 2H), 1.43 (s, 18H), 1.30 (s, 18H), 1.02 (d, J=12.4 Hz, 2H), 0.98-0.82 (m, 2H), 0.75-0.63 (m, 2H), 0.52 (d, J=12.3 Hz, 2H). $^{19}$F NMR (470 MHz, Benzene-$d_6$) δ −114.74-−117.39 (m). $^{13}$C NMR (126 MHz, Benzene-$d_6$) δ 159.84 (d, J=246.8 Hz), 152.62, 151.81 (d, J=2.6 Hz), 146.41, 143.19 (d, J=49.2 Hz), 139.19 (d, J=20.1 Hz), 130.56, 128.33, 128.06, 126.53, 125.18, 124.92 (d, J=8.9 Hz), 124.30 (d, J=47.3 Hz), 122.56 (d, J=38.4 Hz), 121.16, 118.06, 116.69 (d, J=47.1 Hz), 116.69, 115.98 (d, J=91.0 Hz), 115.83 (d, J=1.9 Hz), 112.30, 108.75, 74.98, 72.01, 34.52, 34.45, 31.94, 31.72, 25.71.

Example 76: Synthesis of Procatalyst 34

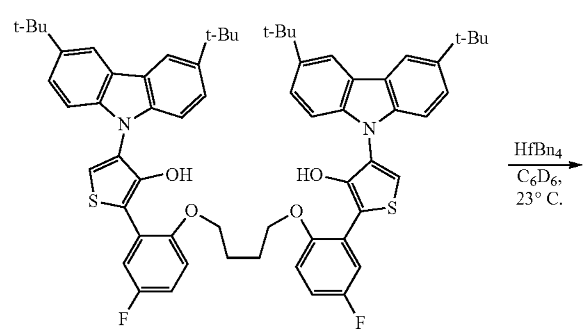

-continued

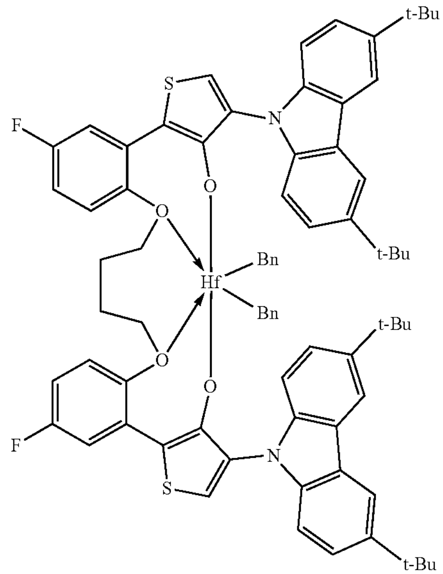

Ligand 17 was azeotropically dried using PhMe (4×10 mL) prior to use. To a clear colorless solution of the thiophene (7.7 mg, 7.48 μmol, 1.00 eq) in anhydrous $C_6D_6$ (1.37 mL) in a nitrogen filled glovebox at 23° C. was added a solution of $HfBn_4$ (4.5 mg, 8.23 μmol, 1.10 eq) in $C_6D_6$ (0.19 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^1$H NMR (500 MHz, Benzene-$d_6$) δ 8.43 (dd, J=2.0, 0.6 Hz, 2H), 8.29 (dd, J=1.9, 0.6 Hz, 2H), 7.49 (dd, J=8.7, 1.9 Hz, 2H), 7.44 (dd, J=8.5, 1.9 Hz, 2H), 7.24 (dd, J=8.7, 0.6 Hz, 2H), 7.19 (dd, J=8.5, 0.6 Hz, 2H), 7.02-6.96 (m, 2H), 6.94-6.90 (m, 2H), 6.82 (s, 2H), 6.75 (tt, J=7.5, 1.3 Hz, 2H), 6.55-6.47 (m, 4H), 6.30-6.25 (m, 4H), 5.01 (dd, J=9.0, 4.8 Hz, 2H), 3.89-3.78 (m, 2H), 3.15 (dd, J=12.4, 4.7 Hz, 2H), 1.43 (s, 18H), 1.30 (s, 18H), 0.90 (d, J=13.4 Hz, 2H), 0.73-0.62 (m, 2H), 0.49-0.40 (m, 2H), 0.24 (d, J=14.0 Hz, 2H). $^{19}$F NMR (470 MHz, Benzene-$d_6$) δ −115.11-−115.24 (m). $^{13}$C NMR (126 MHz, Benzene-$d_6$) δ 159.97 (d, J=247.4 Hz), 152.66, 151.46 (d, J=2.7 Hz), 147.32, 143.24 (d, J=55.5 Hz), 139.14 (d, J=26.6 Hz), 138.52, 130.56, 128.38 (d, J=11.1 Hz), 127.15, 126.72, 124.55, 124.35, 122.64, 122.33, 121.13, 118.09, 116.76 (d, J=23.4 Hz), 116.46 (d, J=23.3 Hz), 116.32, 115.52, 115.27, 112.43, 108.74, 82.00, 78.84, 34.52, 34.46, 31.94, 31.72, 25.86.

Example 77: Synthesis of Ligand 18

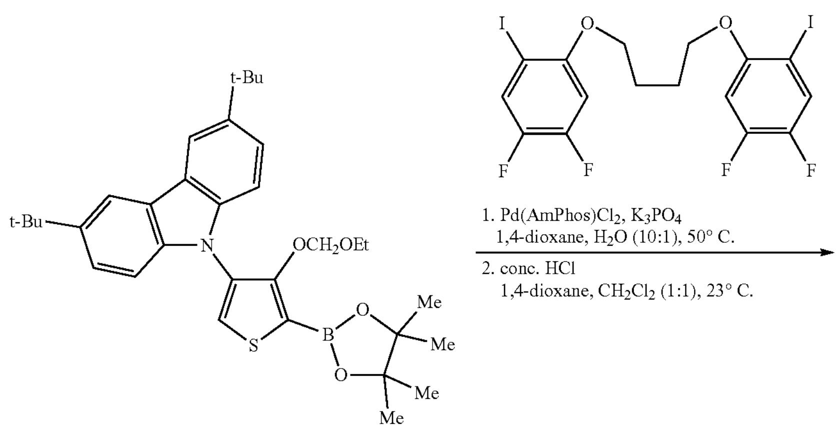

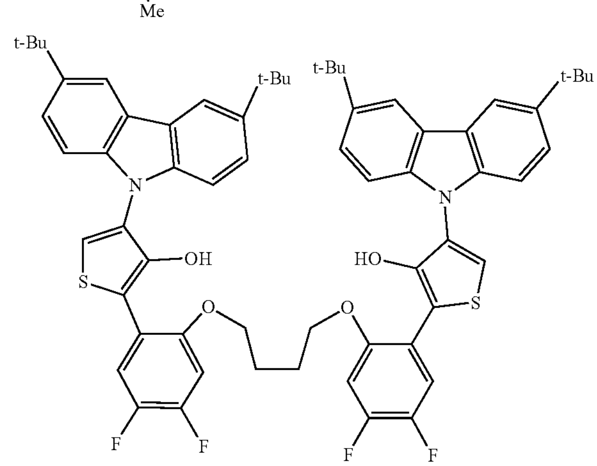

A mixture of the thiophene boropinacolate ester (0.605 g, 0.5387 mmol, 2.70 eq, 50% pure by NMR), $K_3PO_4$ (0.343 g, 1.616 mmol, 8.10 eq), Pd(AmPhos)$Cl_2$ (28.3 mg, 0.0399 mmol, 0.20 eq), and the bisphenyliodide (0.113 g, 0.1995 mmol, 1.00 eq). The mixture was evacuated, then back-filled with nitrogen, this process was repeated 3× more, then deoxygenated 1,4-dioxane (10.0 mL) and deoxygenated water (1.0 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2C_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-60% $CH_2Cl_2$ in hexanes to afford the impure bisthiophene as a pale red foam (0.154 g). NMR indicated product which contained impurities. The impure material was used in the subsequent reaction.

To a solution of the impure coupled product in $CH_2Cl_2$-1,4-dioxane (6 mL, 1:1) under nitrogen at 23° C. was added conc. HCl (3 mL). The golden brown solution was stirred (500 rpm) for 20 hrs, diluted with 1N HCl (10 mL) and $CH_2Cl_2$ (10 mL), poured into separatory funnel, partitioned, organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-75% $CH_2Cl_2$ in hexanes to afford the bisthiophene as a clear amorphous foam (0.105 g, 0.09856 mmol, 49% two steps). NMR indicated pure product.

$^1$H NMR (400 MHz, Chloroform-d) δ 8.12 (dd, J=1.9, 0.6 Hz, 4H), 7.56 (dd, J=11.4, 8.8 Hz, 2H), 7.39 (dd, J=8.6, 1.9 Hz, 4H), 7.30 (s, 2H), 7.17 (dd, J=8.6, 0.6 Hz, 4H), 6.74 (dd, J=11.4, 6.8 Hz, 2H), 6.54 (s, 2H), 4.06-3.97 (m, 4H), 1.95 (p, J=2.5 Hz, 4H), 1.42 (s, 36H). $^{19}$F NMR (376 MHz, Chloroform-d) δ −135.22 (ddd, J=22.5, 11.5, 8.8 Hz), −144.91 (ddd, J=22.2, 11.2, 6.8 Hz). $^{13}$C NMR (101 MHz, Chloroform-d) δ 150.19-149.71 (m), 149.36 (dd, J=250.5, 13.9 Hz), 146.75-144.02 (m), 146.55, 143.08, 139.43, 127.14, 123.61, 123.29, 120.52, 119.32-118.89 (m), 118.15 (d, J=20.6 Hz), 116.34, 112.97, 109.37, 103.52 (d, J=20.8 Hz), 70.59, 34.70, 31.97, 25.83.

Example 78: Synthesis of Procatalyst 35

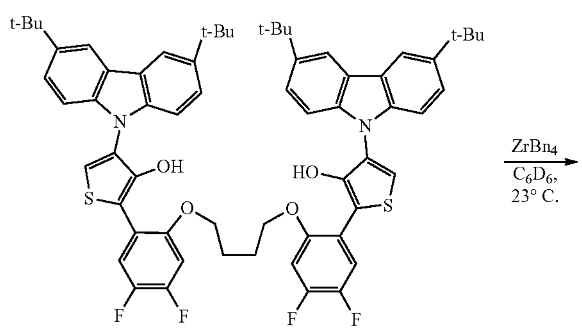

-continued

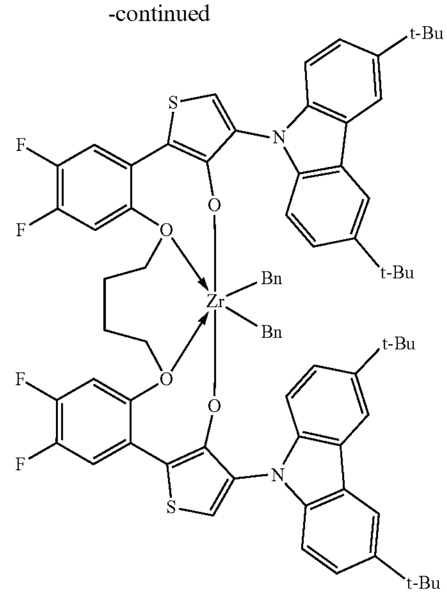

Ligand 18 was azeotropically dried using PhMe (4×10 mL) prior to use. To a clear colorless solution of the thiophene (11.2 mg, 10.51 μmol, 1.00 eq) in anhydrous $C_6D_6$ (3.78 mL) in a nitrogen filled glovebox at 23° C. was added a solution of $ZrBn_4$ (5.3 mg, 11.56 μmol, 1.10 eq) in $C_6D_6$ (0.42 mL) in a dropwise manner. After stirring (500 rpm) for 30 mins the pale golden yellow solution was filtered using a 0.20 μm PTFE submicron filter to afford the zirconium complex as a 0.0025 M solution in $C_6D_6$. NMR indicated product. The same procedure can be used with PhMe as the solvent to prepare the procatalyst solution (0.0025 M or 0.005 M) which is used directly after filtration for the polymerization experiments. Slow, gradual evaporation of the NMR solution afforded crystallization of the zirconium complex, crystals of which were evaluated using X-Ray diffraction to unambiguously confirm the structure.

$^1$H NMR (500 MHz, Benzene-d$_6$) δ 8.55 (d, J=1.9 Hz, 1H), 8.46 (d, J=1.9 Hz, 1H), 8.39 (t, J=1.3 Hz, 1H), 8.33 (dd, J=2.0, 0.7 Hz, 1H), 7.58 (d, J=1.3 Hz, 2H), 7.52 (ddd, J=8.5, 6.7, 1.9 Hz, 3H), 7.47 (dd, J=8.7, 0.7 Hz, 1H), 7.23-7.20 (m, 2H), 7.08-7.02 (m, 3H), 6.96-6.94 (m, 2H), 6.93 (s, 1H), 6.82 (s, 1H), 6.80-6.72 (m, 3H), 6.54-6.48 (m, 2H), 6.29-6.24 (m, 2H), 5.67 (dd, J=10.8, 6.9 Hz, 1H), 5.00-4.91 (m, 1H), 3.80-3.71 (m, 1H), 3.04 (dd, J=12.5, 3.7 Hz, 1H), 2.68 (dd, J=11.4, 7.2 Hz, 1H), 2.11 (d, J=10.1 Hz, 1H), 1.53 (s, 9H), 1.27 (d, J=1.2 Hz, 18H), 1.25 (s, 9H), 0.96 (d, J=12.0 Hz, 2H), 0.93-0.83 (m, 1H), 0.71-0.63 (m, 1H), 0.63-0.58 (m, 2H), 0.57-0.52 (m, 1H), 0.38-0.27 (m, 1H).

$^{19}$F NMR (470 MHz, Benzene-d$_6$) δ −131.71 (dt, J=23.0, 9.6 Hz), −134.32 (dt, J=19.7, 9.7 Hz), −136.51-−137.09 (m), −138.80 (ddd, J=22.8, 10.4, 6.9 Hz).

Example 79: Synthesis of Procatalyst 36

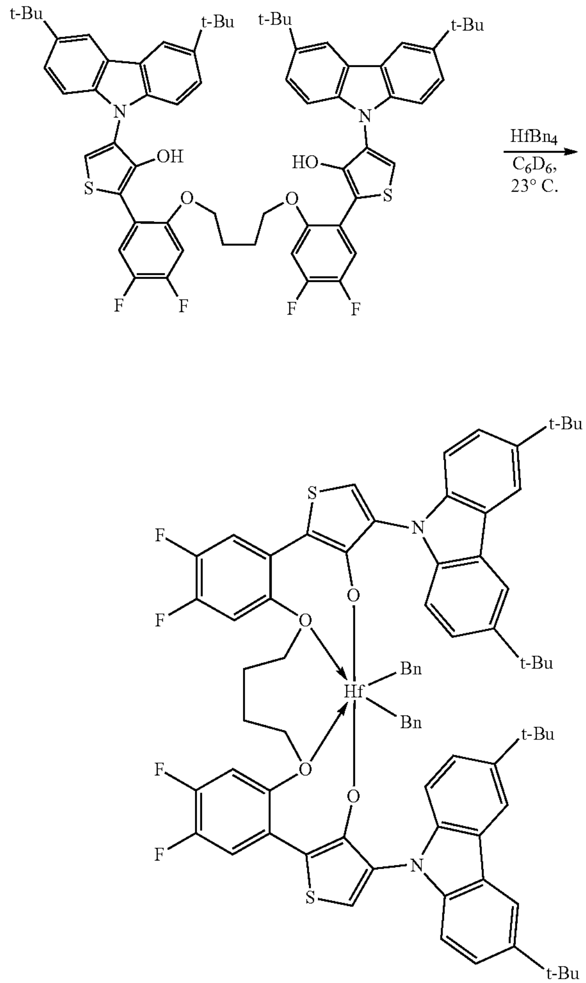

Ligand 18 was azeotropically dried using PhMe (4×10 mL) prior to use. To a clear colorless solution of the thiophene (8.6 mg, 8.07 μmol, 1.00 eq) in anhydrous $C_6D_6$ (2.85 mL) in a nitrogen filled glovebox at 23° C. was added a solution of $HfBn_4$ (4.8 mg, 8.88 μmol, 1.10 eq) in $C_6D_6$ (0.38 mL) in a dropwise manner. After stirring (500 rpm) for 30 mins the pale golden yellow solution was filtered using a 0.20 μm PTFE submicron filter to afford the hafnium complex as a 0.0025 M solution in $C_6D_6$. NMR indicated product. The same procedure can be used with PhMe as the solvent to prepare the procatalyst solution (0.0025 M) which is used directly after filtration for the polymerization experiments.

$^1$H NMR (500 MHz, Benzene-$d_6$) δ 8.57 (d, J=1.9 Hz, 2H), 8.33 (dd, J=2.0, 0.6 Hz, 2H), 7.54-7.48 (m, 4H), 7.41 (dd, J=8.7, 0.6 Hz, 2H), 7.19 (dd, J=8.4, 0.6 Hz, 2H), 6.99-6.95 (m, 2H), 6.82 (s, 2H), 6.79 (dd, J=10.5, 8.6 Hz, 2H), 6.77-6.70 (m, 2H), 6.53-6.48 (m, 2H), 6.36-6.32 (m, 4H), 4.98 (dd, J=10.5, 7.0 Hz, 2H), 3.76-3.65 (m, 2H), 3.07-2.99 (m, 2H), 1.53 (s, 18H), 1.26 (s, 18H), 1.00 (d, J=13.5 Hz, 2H), 0.67-0.58 (m, 2H), 0.52-0.43 (m, 2H), 0.37-0.31 (m, 2H). $^{19}$F NMR (470 MHz, Benzene-$d_6$) δ −131.68 (dt, J=23.1, 9.5 Hz), −138.29 (ddd, J=23.0, 10.7, 7.2 Hz).

Example 80: Synthesis of bis-4,5-difluoro-2-iodophenyl ether

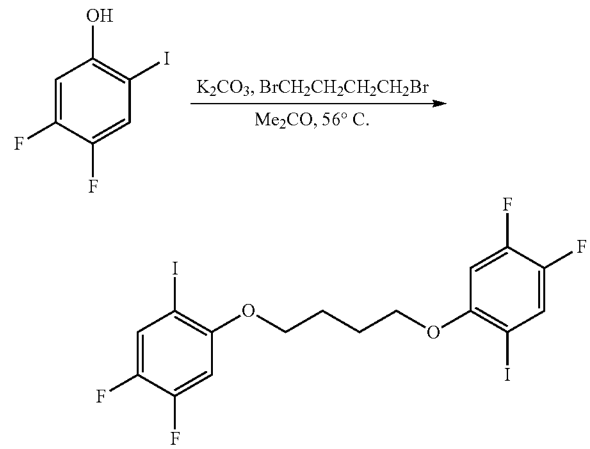

A white heterogeneous mixture of the iodophenol (5.700 g, 22.266 mmol, 2.00 eq), $K_2CO_3$ (9.232 g, 66.799 mmol, 6.00 eq), and 1,4-dibromobutane (1.33 mL, 11.133 mmol, 1.00 eq) in acetone (100 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with $CH_2Cl_2$ (50 mL), stirred vigorously (1000 rpm) for 5 mins, suction filtered over a pad of celite, rinsed with $CH_2Cl_2$ (3×25 mL), the resultant filtrate solution was concentrated onto celite, and purified via silica gel chromatography; 10% $CH_2Cl_2$ in hexanes-50% $CH_2Cl_2$ in hexanes to afford the bisiodophenyl ether as a white solid (5.798 g, 10.243 mmol, 92%). NMR indicated product.

$^1$H NMR (500 MHz, Chloroform-d) δ 7.57 (t, J=9.0 Hz, 2H), 6.67 (dd, J=11.9, 6.7 Hz, 2H), 4.05 (d, J=5.3 Hz, 4H), 2.10 (q, J=4.9, 3.7 Hz, 4H). $^{19}$F NMR (470 MHz, Chloroform-d) 8-134.17 (ddd, J=21.0, 12.1, 8.8 Hz), −145.86 (dt, J=21.0, 8.2 Hz). $^{13}$C NMR (126 MHz, Chloroform-d) δ 154.03 (dd, J=7.6, 2.4 Hz), 150.52 (dd, J=249.2, 13.5 Hz), 144.64 (dd, J=245.3, 13.1 Hz), 126.87 (d, J=20.4 Hz), 101.50 (d, J=21.5 Hz), 77.77 (dd, J=6.1, 4.0 Hz), 69.55, 25.86.

Example 81: Synthesis of 4,5-difluoro-2-iodophenol

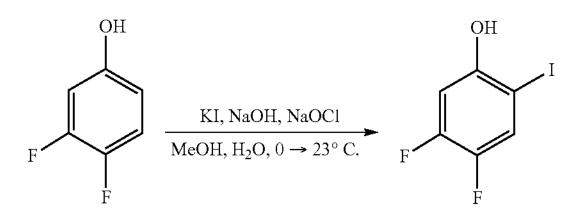 [SMILES: Oc1ccc(F)c(F)c1 ; Oc1cc(F)c(F)cc1I]

A clear colorless solution of the starting phenol (5.000 g, 38.434 mmol, 1.00 eq), KI (10.846 g, 65.337 mmol, 1.70 eq), and aqueous NaOH (65 mL, 65.337 mmol, 1.70 eq, 1 N) in methanol (200 mL) and water (50 mL) under nitrogen was placed in an ice bath and stirred vigorously (1000 rpm) for 1 hr, upon which precooled commercial aqueous bleach (84 mL, 65.337 mmol, 1.70 eq, 5.2% w/w) was added in a dropwise manner over 10 mins. The now golden yellow solution was stirred for 2 hrs at 0° C., the mixture was removed from the ice water bath, stirred at 23° C. for 4 hrs, solid $KH_2PO_4$ (25 g) was added followed by a saturated aqueous mixture $Na_2S_2O_3$ (100 mL) to reduce residual iodine, water (100 mL) was added, the mixture was stirred vigorously for 10 mins, diluted with $CH_2Cl_2$ (50 mL), the biphasic yellow mixture was poured into a separatory funnel, partitioned, organics were washed with aqueous $Na_2S_2O_3$ (2×50 mL), residual organics were extracted from the aqueous layer using $CH_2Cl_2$ (2×25 mL), combined, dried over solid $Na_2SO_4$, decanted, and concentrated onto celite, and purified via silica gel chromatography; hexanes-50% $CH_2Cl_2$ in hexanes to afford the o-iodophenol as a clear pale brown viscous oil (5.742 g, 22.431 mmol, 58%). NMR indicated pure product.

$^{1}H$ NMR (500 MHz, Chloroform-d) δ 7.45 (dd, J=9.2, 8.4 Hz, 1H), 6.86 (dd, J=11.3, 7.0 Hz, 1H), 5.16 (s, 1H). $^{19}F$ NMR (470 MHz, Chloroform-d) δ −133.85 (dp, J=20.7, 10.3, 9.5 Hz), −145.38 (tq, J=20.8, 8.2, 7.7 Hz). $^{13}C$ NMR (126 MHz, Chloroform-d) δ 151.61 (dd, J=9.9, 2.7 Hz), 151.13 (dd, J=249.5, 13.6 Hz), 144.79 (dd, J=245.8, 13.5 Hz), 125.24 (d, J=20.5 Hz), 103.94 (d, J=21.1 Hz), 76.65 (dd, J=6.6, 4.1 Hz).

Example 82: Synthesis of Ligand 19

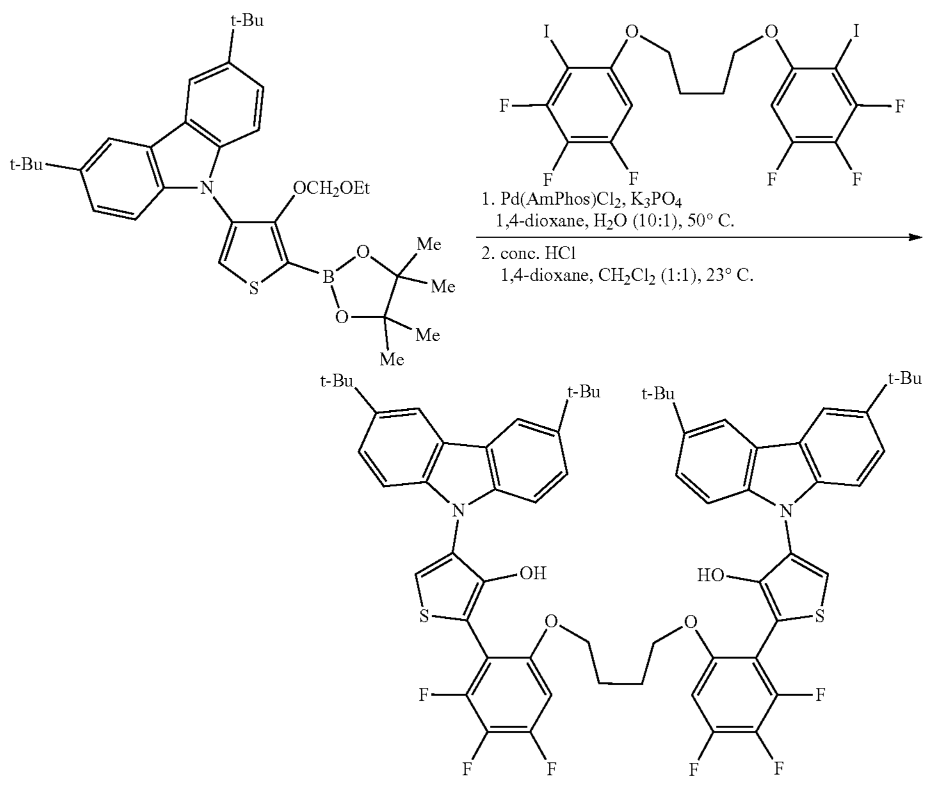

A mixture of the thiophene boropinacolate ester (0.605 g, 0.5387 mmol, 2.70 eq, 50% pure by NMR), $K_3PO_4$ (0.343 g, 1.616 mmol, 8.10 eq), Pd(AmPhos)$Cl_2$ (28.0 mg, 0.0399 mmol, 0.20 eq), and the bisphenyliodide (0.120 g, 0.1995 mmol, 1.00 eq). The mixture was evacuated, then back-filled with nitrogen, this process was repeated 3× more, then deoxygenated 1,4-dioxane (4.0 mL) and deoxygenated water (0.4 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-60% $CH_2Cl_2$ in hexanes to afford the impure bisthiophene as a golden yellow foam (0.201 g). NMR indicated product which contained impurities. The impure material was used in the subsequent reaction.

To a solution of the impure coupled product in $CH_2Cl_2$-1,4-dioxane (6 mL, 1:1) under nitrogen at 23° C. was added conc. HCl (3 mL). The golden brown solution was stirred (500 rpm) for 20 hrs, diluted with 1N HCl (10 mL) and $CH_2Cl_2$ (10 mL), poured into separatory funnel, partitioned, organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-75% $CH_2Cl_2$ in hexanes to afford the bisthiophene as a clear amorphous foam (0.107 g, 0.09716 mmol, 49% two steps). NMR indicated pure product.

$^{1}H$ NMR (500 MHz, Chloroform-d) δ 8.13 (d, J=1.9 Hz, 4H), 7.44-7.36 (m, 6H), 7.18 (d, J=8.6 Hz, 4H), 6.52 (ddd, J=11.6, 6.1, 1.9 Hz, 2H), 5.57 (s, 2H), 3.93-3.88 (m, 4H), 1.84 (q, J=2.8, 2.3 Hz, 4H), 1.44 (s, 36H). $^{19}F$ NMR (470

MHz, Chloroform-d) δ −130.70 (dd, J=22.3, 6.5 Hz), −132.47 (ddd, J=22.4, 11.5, 6.7 Hz), −167.89 (td, J=22.0, 6.2 Hz). $^{13}$C NMR (101 MHz, Chloroform-d) δ 152.20-150.50 (m), 151.18-150.88 (m), 148.81 (ddd, J=133.2, 10.8, 5.8 Hz), 147.48, 143.25, 139.32, 138.59-137.90 (m), 135.69 (dt, J=246.1, 16.1 Hz), 126.44, 123.69, 123.35, 121.40, 116.39, 109.27, 107.74 (dd, J=14.5, 3.8 Hz), 106.21, 97.67 (dd, J=21.2, 3.2 Hz), 69.89, 34.70, 31.95, 25.62.

Example 83: Synthesis of Procatalyst 37

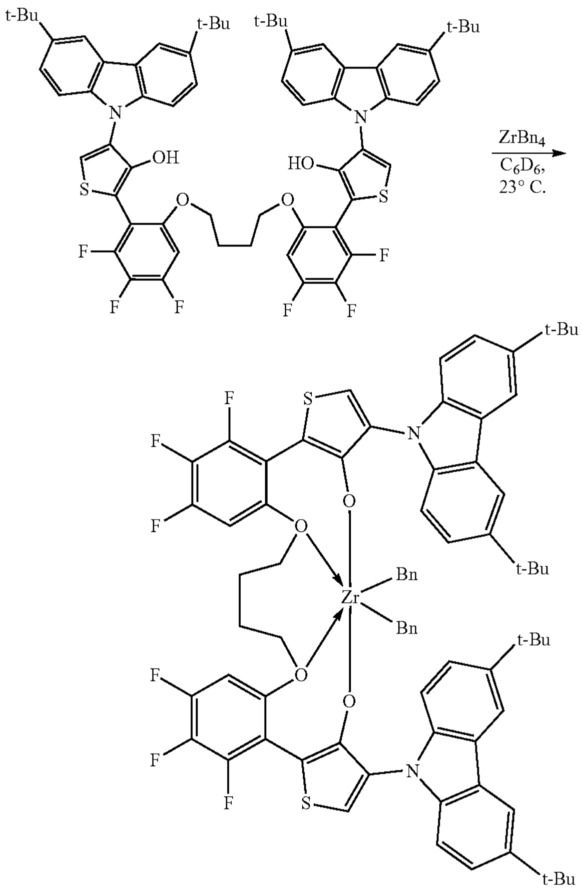

Ligand 19 was azeotropically dried using PhMe (4×10 mL) prior to use. To a clear colorless solution of the thiophene (13.6 mg, 12.35 μmol, 1.00 eq) in anhydrous $C_6D_6$ (4.44 mL) in a nitrogen filled glovebox at 23° C. was added a solution of $ZrBn_4$ (6.2 mg, 13.58 μmol, 1.10 eq) in $C_6D_6$ (0.50 mL) in a dropwise manner. After stirring (500 rpm) for 30 mins the pale golden yellow solution was filtered using a 0.20 μm PTFE submicron filter to afford the zirconium complex as a 0.0025 M solution in $C_6D_6$. NMR indicated product. The same procedure can be used with PhMe as the solvent to prepare the procatalyst solution (0.0025 M or 0.005 M) which is used directly after filtration for the polymerization experiments.

$^1$H NMR (500 MHz, Benzene-$d_6$) δ 8.53 (d, J=1.9 Hz, 2H), 8.34 (dd, J=1.8, 0.7 Hz, 2H), 7.52-7.47 (m, 4H), 7.45 (dd, J=8.7, 0.7 Hz, 2H), 7.20 (dd, J=8.5, 0.6 Hz, 2H), 6.92 (ddd, J=8.1, 7.3, 1.6 Hz, 4H), 6.89 (s, 2H), 6.74-6.70 (m, 2H), 6.24-6.21 (m, 4H), 4.65 (dd, J=10.6, 6.3 Hz, 2H), 3.71 (dd, J=12.8, 7.7 Hz, 2H), 3.04 (dd, J=11.6, 4.6 Hz, 2H), 1.53 (s, 18H), 1.26 (s, 18H), 0.78 (d, J=11.8 Hz, 2H), 0.67 (dd, J=16.2, 7.2 Hz, 2H), 0.58-0.52 (m, 2H), 0.52 (d, J=12.0 Hz, 2H). $^{19}$F NMR (470 MHz, Benzene-$d_6$) δ −130.11 (ddd, J=23.0, 10.5, 5.8 Hz), −131.31-−131.90 (m), −160.87 (td, J=23.0, 6.6 Hz).

Example 84: Synthesis of Procatalyst 38

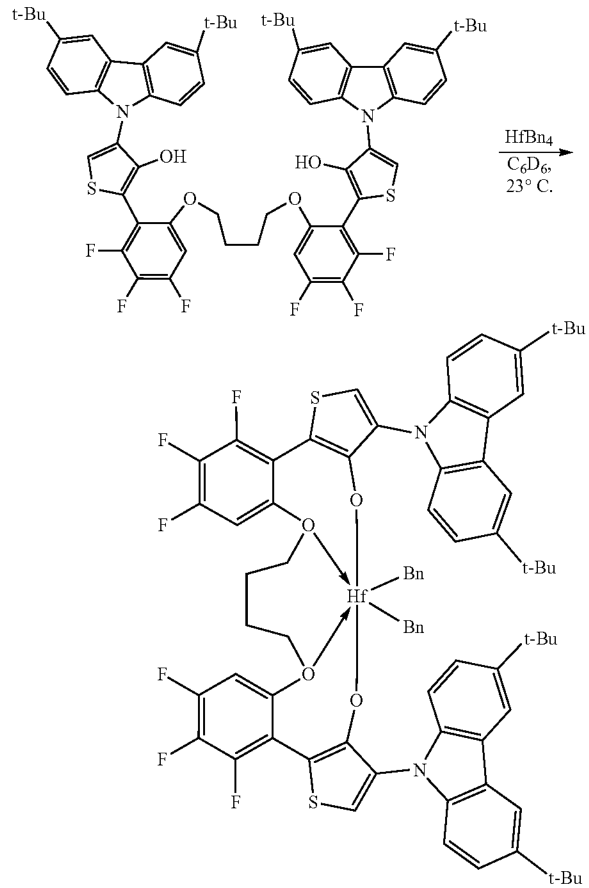

Ligand 19 was azeotropically dried using PhMe (4×10 mL) prior to use. To a clear colorless solution of the thiophene (9.6 mg, 8.72 μmol, 1.00 eq) in anhydrous $C_6D_6$ (3.07 mL) in a nitrogen filled glovebox at 23° C. was added a solution of $HfBn_4$ (5.2 mg, 9.59 μmol, 1.10 eq) in $C_6D_6$ (0.42 mL) in a dropwise manner. After stirring (500 rpm) for 30 mins the pale golden yellow solution was filtered using a 0.20 μm PTFE submicron filter to afford the hafnium complex as a 0.0025 M solution in $C_6D_6$. NMR indicated product. The same procedure can be used with PhMe as the solvent to prepare the procatalyst solution (0.0025 M) which is used directly after filtration for the polymerization experiments.

$^1$H NMR (400 MHz, Benzene-$d_6$) δ 8.53 (d, J=1.9 Hz, 2H), 8.33 (dd, J=1.8, 0.7 Hz, 2H), 7.51-7.42 (m, 6H), 7.16 (dd, J=8.5, 0.6 Hz, 2H), 7.02-6.94 (m, 6H), 6.87 (s, 2H), 6.73-6.65 (m, 2H), 6.36-6.30 (m, 4H), 4.63 (dd, J=10.6, 6.3 Hz, 2H), 3.63-3.53 (m, 2H), 2.98 (dd, J=11.5, 4.6 Hz, 2H), 1.52 (s, 18H), 1.23 (s, 18H), 0.99 (d, J=13.5 Hz, 2H), 0.65-0.53 (m, 2H), 0.51-0.44 (m, 2H), 0.31 (d, J=13.5 Hz, 2H). $^{19}$F NMR (470 MHz, Benzene-$d_6$) δ −130.09 (ddd, J=23.0, 10.6, 6.0 Hz), −131.00-−131.79 (m), −160.31 (td, J=22.8, 6.5 Hz).

Example 85: Synthesis of bis-3,4,5-trifluoro-2-iodophenyl ether

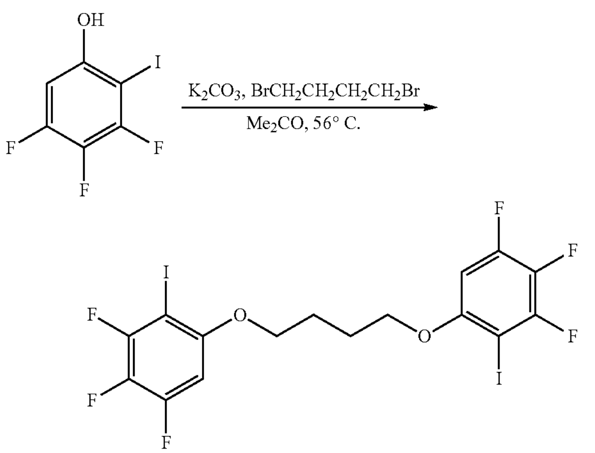

A white heterogeneous mixture of the iodophenol (5.444 g, 19.870 mmol, 2.00 eq), $K_2CO_3$ (8.238 g, 59.610 mmol, 6.00 eq), and 1,4-dibromobutane (1.10 mL, 9.935 mmol, 1.00 eq) in acetone (100 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with $CH_2Cl_2$ (50 mL), stirred vigorously (1000 rpm) for 5 mins, suction filtered over a pad of celite, rinsed with $CH_2Cl_2$ (3×25 mL), the resultant filtrate solution was concentrated onto celite, and purified via silica gel chromatography; 10% $CH_2Cl_2$ in hexanes-50% $CH_2Cl_2$ in hexanes to afford the bisiodophenyl ether as a white solid (5.086 g, mmol, 85%). NMR indicated product.

$^1$H NMR (500 MHz, Chloroform-d) δ 6.55 (ddd, J=11.8, 5.9, 2.3 Hz, 2H), 4.07 (h, J=2.6 Hz, 4H), 2.15-2.07 (m, 4H). $^{19}$F NMR (470 MHz, Chloroform-d) δ −111.26 (dd, J=23.3, 6.7 Hz), −132.95 (ddd, J=19.9, 11.8, 6.7 Hz), −166.63-−167.33 (m). $^{13}$C NMR (126 MHz, Chloroform-d) δ 153.44 (m), 152.96-152.33 (m), 150.64 (m), 134.41 (ddd, J=248.0, 17.9, 15.8 Hz), 96.35 (dd, J=22.0, 2.8 Hz), 69.51, 25.75.

Example 86: Synthesis of 3,4,5-trifluoro-2-iodophenol

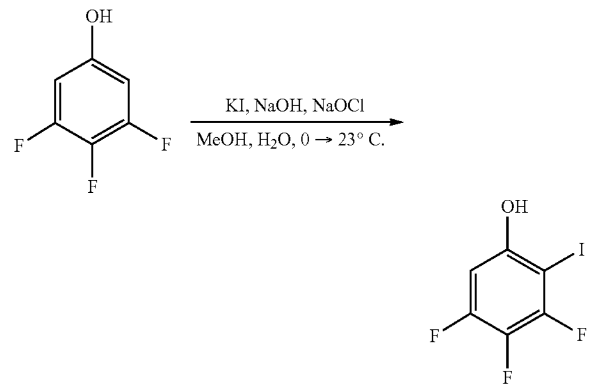

A clear colorless solution of the starting phenol (4.950 g, 33.428 mmol, 1.00 eq), KI (9.710 g, 58.500 mmol, 1.75 eq), and aqueous NaOH (100 mL, 100.30 mmol, 3.00 eq, 1 N) in methanol (150 mL) and water (200 mL) under nitrogen was placed in an ice bath and stirred vigorously (1000 rpm) for 1 hr, upon which precooled commercial aqueous bleach (84.0 mL, 58.500 mmol, 1.75 eq, 5.2% w/w) was added in a dropwise manner over 10 mins. The now golden yellow solution was stirred for 2 hrs at 0° C., the mixture was removed from the ice water bath, stirred at 23° C. for 4 hrs, solid $NaH_2PO_4$ (50 g) was added followed by a saturated aqueous mixture $Na_2S_2O_3$ (200 mL) to reduce residual iodine, water (100 mL) was added, the mixture was stirred vigorously for 10 mins, diluted with $CH_2Cl_2$ (50 mL), the biphasic yellow mixture was poured into a separatory funnel, partitioned, organics were washed with aqueous $Na_2S_2O_3$ (2×100 mL), residual organics were extracted from the aqueous layer using $CH_2Cl_2$ (2×25 mL), combined, dried over solid $Na_2SO_4$, decanted, and concentrated onto celite, and purified via silica gel chromatography; hexanes-50% $CH_2Cl_2$ in hexanes to afford the o-iodophenol as a clear colorless oil (5.444 g, 19.870 mmol, 60%). NMR indicated pure product.

$^1$H NMR (400 MHz, Chloroform-d) δ 6.80-6.63 (m, 1H), 5.33 (s, 1H). $^{19}$F NMR (376 MHz, Chloroform-d) δ −112.07 (ddd, J=22.3, 6.8, 2.6 Hz), −132.68 (ddd, J=21.1, 11.1, 6.8 Hz), −166.81 (td, J=21.7, 6.2 Hz). $^{13}$C NMR (101 MHz, Chloroform-d) δ 153.58-151.73 (m), 150.78 (dd, J=10.8, 5.5 Hz), 151.07-149.29 (m), 136.06-132.30 (m), 98.90 (ddd, J=21.8, 3.2, 1.3 Hz), 68.51 (d, J=26.4 Hz).

Example 87: Synthesis of Ligand 20

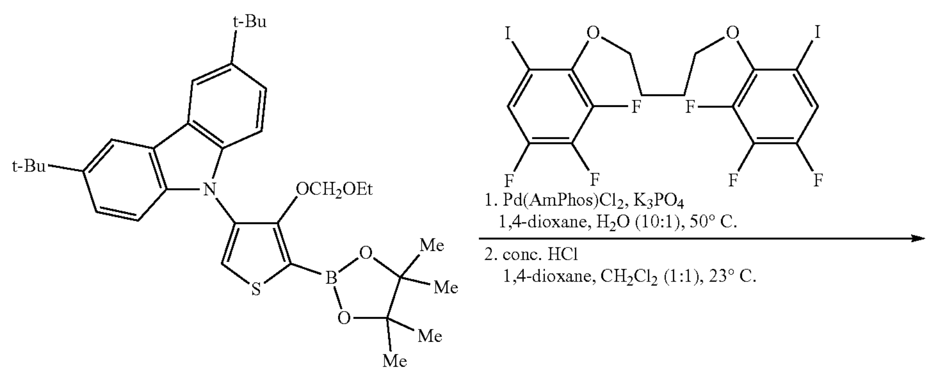

-continued

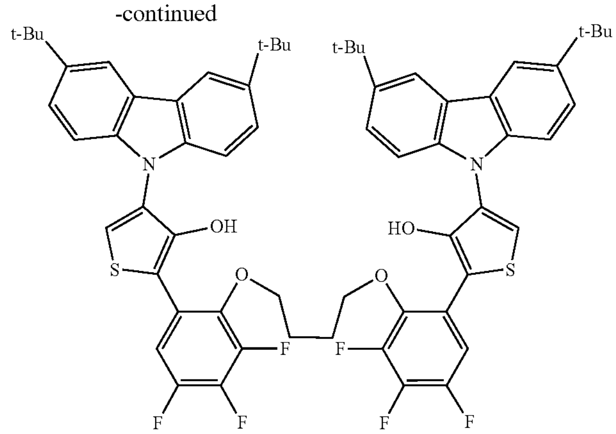

A mixture of the thiophene boropinacolate ester (1.000 g, 1.104 mmol, 2.70 eq, 62% pure by NMR), $K_3PO_4$ (0.703 g, 3.312 mmol, 8.10 eq), Pd(AmPhos)$Cl_2$ (58.0 mg, 0.0818 mmol, 0.20 eq), and the bisphenyliodide (0.246 g, 0.4089 mmol, 1.00 eq). The mixture was evacuated, then back-filled with nitrogen, this process was repeated 3× more, then deoxygenated 1,4-dioxane (8.0 mL) and deoxygenated water (0.8 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2C_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-60% $CH_2Cl_2$ in hexanes to afford the impure bisthiophene as a golden yellow foam (0.202 g). NMR indicated product which contained impurities. The impure material was used in the subsequent reaction.

To a solution of the impure coupled product in $CH_2Cl_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and $CH_2Cl_2$ (10 mL), poured into separatory funnel, partitioned, organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-75% $CH_2Cl_2$ in hexanes to afford the bisthiophene as a white foam (0.141 g, 0.1280 mmol, 31% two steps). NMR indicated pure product.

$^1$H NMR (500 MHz, Chloroform-d) δ 8.16-8.12 (m, 4H), 7.43 (ddd, J=8.7, 1.9, 0.9 Hz, 4H), 7.38 (d, J=0.9 Hz, 2H), 7.35 (ddd, J=10.6, 7.9, 2.1 Hz, 2H), 7.20 (d, J=8.6 Hz, 4H), 6.96 (d, J=1.5 Hz, 2H), 4.15-4.05 (m, 4H), 1.91 (q, J=3.2, 2.8 Hz, 4H), 1.45 (s, 36H). $^{19}$F NMR (470 MHz, Chloroform-d) δ −137.56 (ddd, J=21.7, 11.4, 3.9 Hz), −147.93 (d, J=19.3 Hz), −157.70 (td, J=20.7, 8.1 Hz). $^{13}$C NMR (126 MHz, Chloroform-d) 8148.89-146.76 (m), 147.27, 146.77-144.58 (m), 143.19, 139.52 (ddd, J=254.7, 16.3, 14.1 Hz), 139.36, 139.25 (dd, J=10.1, 3.5 Hz), 127.64, 123.67, 123.38, 123.03 (dd, J=8.0, 3.0 Hz), 121.41, 116.39, 111.90, 111.46-111.11 (m), 109.34, 75.47 (d, J=3.5 Hz), 34.72, 31.98, 26.07.

Characterization of the Protected Ligand:

$^1$H NMR (500 MHz, Chloroform-d) δ 8.10 (d, J=1.9 Hz, 4H), 7.68 (ddd, J=11.0, 8.3, 2.2 Hz, 2H), 7.45 (dd, J=8.7, 1.9 Hz, 4H), 7.40 (s, 2H), 7.27 (d, J=8.6 Hz, 4H), 4.41 (s, 4H), 4.24-4.18 (m, 4H), 2.94 (q, J=7.1 Hz, 4H), 2.13-2.02 (m, 4H), 1.45 (s, 36H), 0.64 (t, J=7.0 Hz, 6H). $^{19}$F NMR (470 MHz, Chloroform-d) δ −140.52 (ddd, J=21.6, 11.5, 2.9 Hz), −149.05 (d, J=19.7 Hz), −157.38 (td, J=20.8, 8.4 Hz).

Example 88: Synthesis of Procatalyst 39

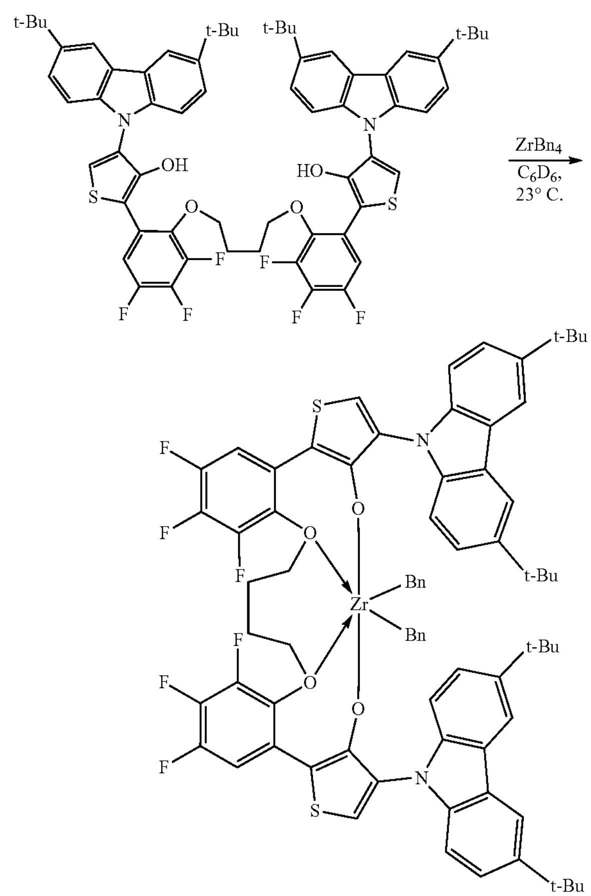

Ligand 20 was azeotropically dried using PhMe (4×10 mL) prior to use. To a clear colorless solution of the thiophene (7.4 mg, 6.72 μmol, 1.00 eq) in anhydrous $C_6D_6$ (2.42 mL) in a nitrogen filled glovebox at 23° C. was added a solution of $ZrBn_4$ (3.4 mg, 7.39 μmol, 1.10 eq) in $C_6D_6$ (0.27 mL) in a dropwise manner. After stirring (500 rpm) for 30 mins the pale golden yellow solution was filtered using a 0.20 μm PTFE submicron filter to afford the zirconium complex as a 0.0025 M solution in $C_6D_6$. NMR indicated product which exists as a mixture of rotomers. Neutralization of the complex using d-MeOH resulted in starting ligand. The same procedure can be used with PhMe as the solvent to prepare the procatalyst solution (0.0025 M or 0.005 M) which is used directly after filtration for the polymerization experiments.

$^{1}$H NMR (400 MHz, Benzene-$d_6$) δ 8.52-8.49 (m, 2H), 8.33 (dd, J=1.9, 0.7 Hz, 2H), 7.62 (dd, J=8.6, 1.9 Hz, 2H), 7.54 (dd, J=8.6, 0.7 Hz, 2H), 7.49 (dd, J=8.7, 1.9 Hz, 2H), 7.37 (dd, J=8.6, 0.6 Hz, 2H), 6.91-6.86 (m, 2H), 6.83 (s, 2H), 6.70 (t, J=7.3 Hz, 2H), 6.57-6.47 (m, 2H), 6.17-6.13 (m, 4H), 5.60-5.55 (m, 2H), 4.02-3.91 (m, 2H), 3.23-3.12 (m, 2H), 1.58 (s, 18H), 1.29 (s, 18H), 1.06 (d, J=11.5 Hz, 2H), 0.90-0.73 (m, 2H), 0.65-0.58 (m, 2H). $^{19}$F NMR (376 MHz, Benzene-$d_6$) δ −135.52 (ddd, J=22.5, 10.7, 6.3 Hz), −141.09 (d, J=20.9 Hz), −155.07 (td, J=21.2, 7.9 Hz).

Example 89: Synthesis of Procatalyst 40

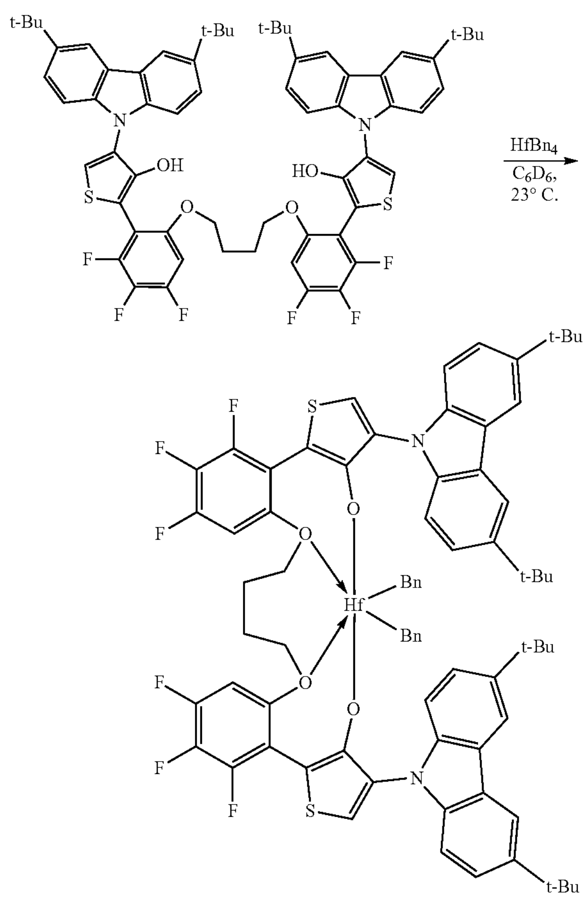

Ligand 20 was azeotropically dried using PhMe (4×10 mL) prior to use. To a clear colorless solution of the thiophene (8.8 mg, 7.99 μmol, 1.00 eq) in anhydrous $C_6D_6$ (2.82 mL) in a nitrogen filled glovebox at 23° C. was added a solution of $HfBn_4$ (4.8 mg, 8.79 μmol, 1.10 eq) in $C_6D_6$ (0.38 mL) in a dropwise manner. After stirring (500 rpm) for 30 mins the pale golden yellow solution was filtered using a 0.20 μm PTFE submicron filter to afford the hafnium complex as a 0.0025 M solution in $C_6D_6$. NMR indicated product which exists as a rotameric mixture. The same procedure can be used with PhMe as the solvent to prepare the procatalyst solution (0.0025 M) which is used directly after filtration for the polymerization experiments.

$^{1}$H NMR (400 MHz, Benzene-$d_6$) δ 8.53 (dd, J=2.0, 0.6 Hz, 2H), 8.32 (t, J=1.3 Hz, 2H), 7.61 (dd, J=8.5, 1.9 Hz, 2H), 7.48-7.45 (m, 2H), 7.35 (dd, J=8.5, 0.6 Hz, 2H), 6.98-6.93 (m, 6H), 6.83 (s, 2H), 6.74-6.66 (m, 2H), 6.57-6.49 (m, 2H), 6.25-6.19 (m, 4H), 6.08-5.98 (m, 2H), 4.00-3.91 (m, 2H), 3.20-3.11 (m, 2H), 1.58 (s, 18H), 1.32-1.27 (m, 2H), 1.28 (s, 18H), 0.83-0.76 (m, 2H), 0.76-0.68 (m, 2H), 0.58-0.46 (m, 2H). $^{19}$F NMR (376 MHz, Benzene-$d_6$) δ −134.93 (ddd, J=22.5, 10.5, 6.5 Hz), −140.74 (d, J=19.9 Hz), −154.84 (td, J=21.4, 7.9 Hz).

Example 90: Synthesis of bis-4,5,6-trifluoro-2-iodophenyl ether

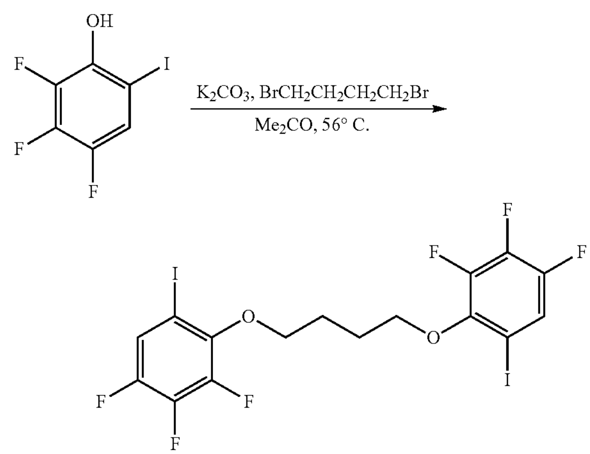

A white heterogeneous mixture of the iodophenol (1.550 g, 5.657 mmol, 2.00 eq), $K_2CO_3$ (2.346 g, 16.972 mmol, 6.00 eq), and 1,4-dibromobutane (0.34 mL, 2.829 mmol, 1.00 eq) in acetone (50 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with $CH_2Cl_2$ (50 mL), stirred vigorously (1000 rpm) for 5 mins, suction filtered over a pad of celite, rinsed with $CH_2Cl_2$ (3×25 mL), the resultant filtrate solution was concentrated onto celite, and purified via silica gel chromatography; 10% $CH_2Cl_2$ in hexanes-50% $CH_2Cl_2$ in hexanes to afford the bisiodophenyl ether as a white solid (1.410 g, 2.342 mmol, 83%). NMR indicated product.

$^{1}$H NMR (400 MHz, Chloroform-d) δ 7.38 (td, J=8.5, 2.6 Hz, 2H), 4.20-4.09 (m, 4H), 2.09 (h, J=2.7 Hz, 4H). $^{19}$F NMR (376 MHz, Chloroform-d) δ −138.88 (ddd, J=20.5, 9.0, 3.2 Hz), −146.39 (dt, J=19.7, 2.8 Hz), −155.64 (td, J=20.0, 7.9 Hz). $^{13}$C NMR (126 MHz, Chloroform-d) δ 147.31 (ddd, J=250.6, 10.6, 2.7 Hz), 144.51 (dd, J=10.0, 3.9 Hz), 144.51 (ddd, J=254.7, 11.0, 4.1 Hz), 140.78 (ddd, J=254.1, 16.0, 14.1 Hz), 120.35 (dd, J=20.2, 3.7 Hz), 82.83 (dd, J=7.7, 4.2 Hz), 74.23 (d, J=4.5 Hz), 26.72.

Example 91. Synthesis of 4,5,6-trifluoro-7-iodophenyl ether

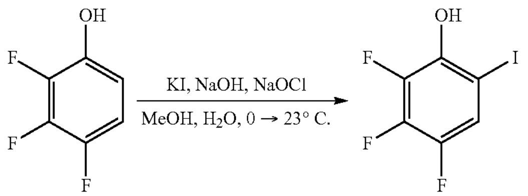 [SMILES: Oc1ccc(F)c(F)c1F ; Oc1c(I)cc(F)c(F)c1F]

A clear colorless solution of the starting phenol (4.700 g, 31.740 mmol, 1.00 eq), KI (9.221 g, 55.544 mmol, 1.75 eq), and aqueous NaOH (95.2 mL, 95.208 mmol, 3.00 eq, 1 N) in methanol (200 mL) and water (100 mL) under nitrogen was placed in an ice bath and stirred vigorously (1000 rpm) for 1 hr, upon which precooled commercial aqueous bleach (80.0 mL, 55.544 mmol, 1.75 eq, 5.2% w/w) was added in a dropwise manner over 10 mins. The now golden yellow solution was stirred for 2 hrs at 0° C., the mixture was removed from the ice water bath, stirred at 23° C. for 4 hrs, solid $KH_2PO_4$ (25 g) was added followed by a saturated aqueous mixture $Na_2S_2O_3$ (100 mL) to reduce residual iodine, water (100 mL) was added, the mixture was stirred vigorously for 10 mins, diluted with $CH_2Cl_2$ (50 mL), the biphasic yellow mixture was poured into a separatory funnel, partitioned, organics were washed with aqueous $Na_2S_2O_3$ (2×50 mL), residual organics were extracted from the aqueous layer using $CH_2C_2$ (2×25 mL), combined, dried over solid $Na_2SO_4$, decanted, and concentrated onto celite, and purified via silica gel chromatography; hexanes-50% $CH_2Cl_2$ in hexanes to afford the o-iodophenol as a clear pale yellow oil (4.202 g, 15.337 mmol, 48%). NMR indicated pure product.

$^{1}$H NMR (400 MHz, Chloroform-d) δ 7.33 (tdd, J=8.8, 2.7, 0.9 Hz, 1H), 5.37 (s, 1H). $^{19}$F NMR (376 MHz, Chloroform-d) δ −143.20 (ddd, J=21.0, 9.5, 3.8 Hz), −152.54 (dt, J=19.4, 3.4 Hz), −156.04 (td, J=20.0, 7.6 Hz). $^{13}$C NMR (101 MHz, Chloroform-d) δ 145.31 (ddd, J=247.4, 10.7, 2.4 Hz), 142.06-141.31 (m), 139.45 (ddd, J=249.4, 12.7, 3.8 Hz), 139.64-139.11 (m), 119.82 (dd, J=20.6, 4.1 Hz), 75.21 (dd, J=8.0, 4.6 Hz).

Example 92: Synthesis of Ligand 21

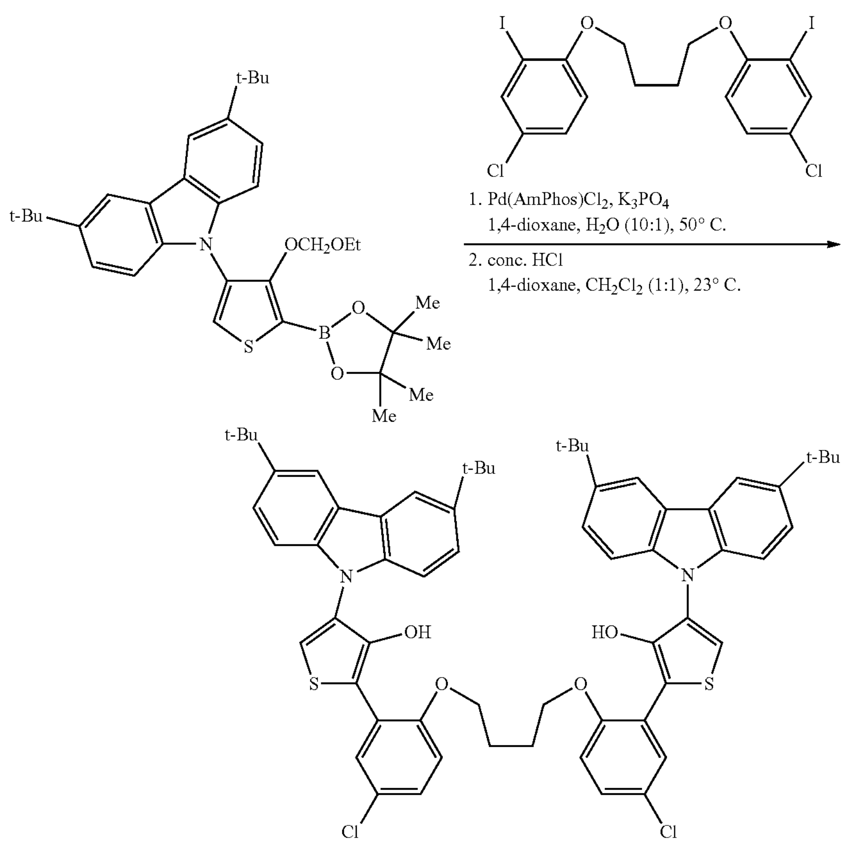

A mixture of the thiophene boropinacolate ester (1.000 g, 1.104 mmol, 2.70 eq, 62% pure by NMR), $K_3PO_4$ (0.703 g, 3.312 mmol, 8.10 eq), $Pd(AmPhos)Cl_2$ (58.0 mg, 0.0818 mmol, 0.20 eq), and the bisphenyliodide (0.230 g, 0.4089 mmol, 1.00 eq). The mixture was evacuated, then back-filled with nitrogen, this process was repeated 3× more, then deoxygenated 1,4-dioxane (8.0 mL) and deoxygenated water (0.8 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-75% $CH_2Cl_2$ in hexanes to afford the impure bisthiophene as a pale red amorphous foam (0.232 g). NMR indicated product which contained impurities. The impure material was used in the subsequent reaction.

To a solution of the impure coupled product in $CH_2Cl_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and $CH_2Cl_2$ (10 mL), poured into separatory funnel, partitioned, organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-75% $CH_2Cl_2$ in hexanes to afford the bisthiophene as a white foam (0.143 g, 0.1346 mmol, 33% two steps). NMR indicated pure product.

$^1$H NMR (500 MHz, Chloroform-d) δ 8.15 (dd, J=1.9, 0.6 Hz, 4H), 7.66 (d, J=2.6 Hz, 2H), 7.42 (dd, J=8.6, 1.9 Hz, 4H), 7.35 (s, 2H), 7.24-7.20 (m, 4H), 7.18 (dd, J=8.7, 2.6 Hz, 2H), 7.04 (s, 2H), 6.79 (d, J=8.8 Hz, 2H), 4.04 (q, J=3.6, 2.8 Hz, 4H), 1.91 (q, J=2.8, 2.4 Hz, 4H), 1.47 (s, 36H). $^{13}$C NMR (126 MHz, Chloroform-d) δ 152.34, 146.98, 142.94, 139.54, 129.92, 128.19, 127.84, 127.46, 124.63, 123.58, 123.27, 120.85, 116.30, 115.08, 113.72, 109.51, 70.29, 34.74, 32.05, 25.81.

Example 93: Synthesis of Procatalyst 41

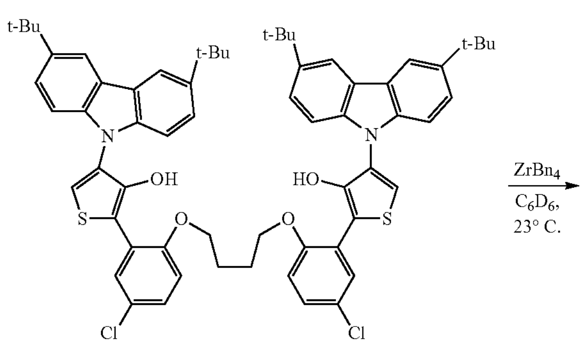

-continued

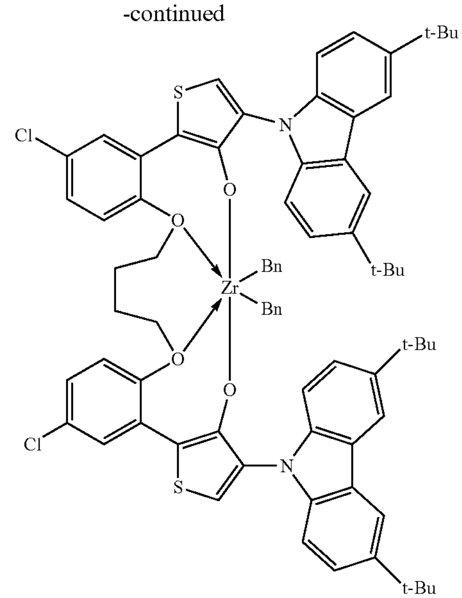

Ligand 21 was azeotropically dried using PhMe (4×10 mL) prior to use. To a clear colorless solution of the thiophene (9.2 mg, 8.66 μmol, 1.00 eq) in anhydrous $C_6D_6$ (1.55 mL) in a nitrogen filled glovebox at 23° C. was added a solution of $ZrBn_4$ (4.3 mg, 9.53 μmol, 1.10 eq) in $C_6D_6$ (0.18 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product. The same procedure can be used with PhMe as the solvent to prepare the procatalyst solution (0.0025 M or 0.005 M) which is used directly after filtration for the polymerization experiments.

$^1$H NMR (500 MHz, Benzene-d$_6$) δ 8.43 (dd, J=2.0, 0.6 Hz, 2H), 8.29 (dd, J=1.9, 0.6 Hz, 2H), 7.53-7.48 (m, 4H), 7.45 (dd, J=8.5, 1.9 Hz, 2H), 7.34 (dd, J=8.7, 0.6 Hz, 2H), 7.31 (d, J=2.6 Hz, 2H), 7.22-7.19 (m, 2H), 6.91-6.86 (m, 2H), 6.83 (dd, J=8.7, 2.7 Hz, 2H), 6.81 (s, 2H), 6.79-6.74 (m, 2H), 6.24-6.19 (m, 4H), 4.98 (d, J=8.7 Hz, 2H), 3.88-3.78 (m, 2H), 3.12 (dd, J=11.9, 4.7 Hz, 2H), 1.44 (s, 18H), 1.29 (s, 18H), 0.98 (d, J=12.3 Hz, 2H), 0.71-0.64 (m, 2H), 0.53 (d, J=12.3 Hz, 2H), 0.53-0.47 (m, 2H). $^{13}$C NMR (126 MHz, Benzene-d$_6$) δ 154.32, 152.71, 146.13, 143.43, 143.02, 139.29, 139.12, 131.33, 130.56, 130.43, 129.56, 128.90, 128.33, 126.54, 126.07, 125.16, 124.69, 124.51, 124.12, 122.73, 122.43, 121.25, 118.17, 116.44, 115.69, 115.54, 112.22, 108.73, 74.66, 72.01, 34.54, 34.46, 31.94, 31.71, 25.77.

Example 94: Synthesis of Procatalyst 42

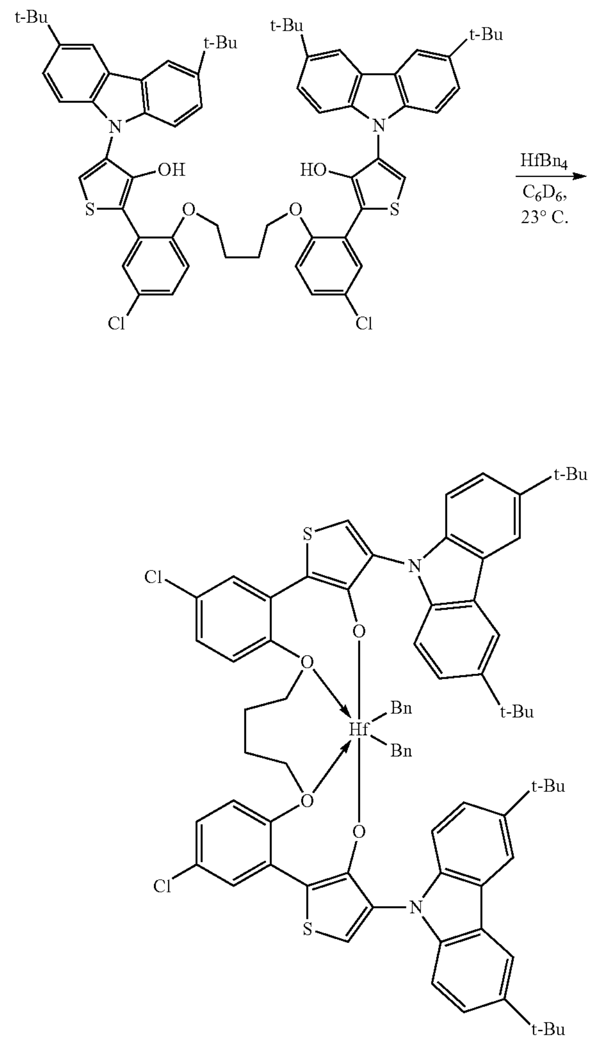

Ligand 21 was azeotropically dried using PhMe (4×10 mL) prior to use. To a clear colorless solution of the thiophene (6.8 mg, 6.40 μmol, 1.00 eq) in anhydrous $C_6D_6$ (1.12 mL) in a nitrogen filled glovebox at 23° C. was added a solution of $HfBn_4$ (3.8 mg, 7.04 μmol, 1.10 eq) in $C_6D_6$ (0.16 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product. The same procedure can be used with PhMe as the solvent to prepare the procatalyst solution (0.005 M) which is used directly after filtration for the polymerization experiments.

$^1$H NMR (400 MHz, Benzene-$d_6$) δ 8.43 (d, J=1.9 Hz, 2H), 8.28 (d, J=1.8 Hz, 2H), 7.49 (dd, J=8.7, 1.9 Hz, 2H), 7.43 (dd, J=8.6, 2.0 Hz, 2H), 7.31 (d, J=2.6 Hz, 2H), 7.24 (d, J=8.7 Hz, 2H), 7.17 (d, J=8.6 Hz, 2H), 6.98-6.93 (m, 2H), 6.92-6.87 (m, 2H), 6.83 (dd, J=8.8, 2.7 Hz, 2H), 6.79 (s, 2H), 6.73 (tt, J=7.3, 1.3 Hz, 2H), 6.27-6.22 (m, 4H), 4.96 (d, J=8.8 Hz, 2H), 3.88-3.76 (t, J=10.8 Hz, 2H), 3.19-3.06 (m, 2H), 1.43 (s, 18H), 1.28 (s, 18H), 0.89 (d, J=13.4 Hz, 2H), 0.70-0.57 (m, 2H), 0.47-0.36 (m, 2H), 0.27-0.20 (m, 2H). $^{13}$C NMR (101 MHz, Benzene-$d_6$) δ 153.93, 152.73, 147.19, 143.50, 143.04, 139.24, 139.01, 138.50, 131.61, 130.40, 129.58, 129.05, 128.32, 126.62, 124.98, 124.56, 124.34, 122.64, 122.33, 121.16, 118.13, 116.39, 115.56, 114.96, 112.37, 108.72, 82.98, 78.97, 34.53, 34.45, 31.93, 31.70, 25.93.

Example 95: Synthesis of bis-4-chloro-2-iodophenyl ether

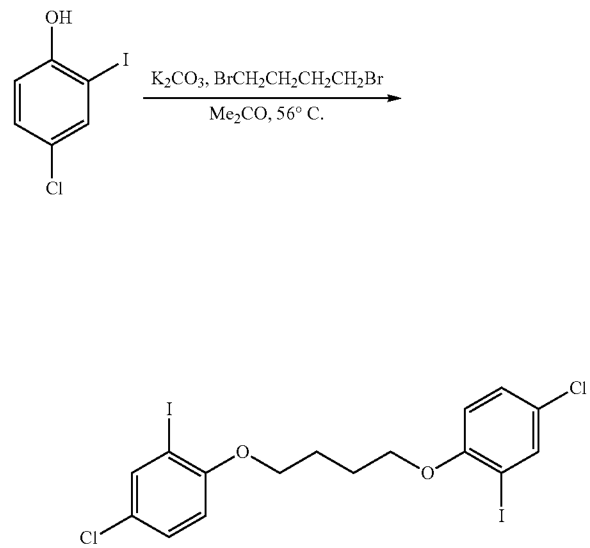

A white heterogeneous mixture of the iodophenol (1.604 g, 6.303 mmol, 2.00 eq), $K_2CO_3$ (2.613 g, 18.909 mmol, 6.00 eq), and 1,4-dibromobutane (0.38 mL, 3.151 mmol, 1.00 eq) in acetone (60 mL) equipped with a reflux condenser under nitrogen was placed in a mantle heated to 60° C., after stirring (500 rpm) for 48 hrs the white heterogeneous mixture was removed from the mantle, allowed to cool to 23° C., diluted with $CH_2Cl_2$ (50 mL), stirred vigorously (1000 rpm) for 5 mins, suction filtered over a pad of celite, rinsed with $CH_2Cl_2$ (3×25 mL), the resultant filtrate solution was concentrated onto celite, and purified via silica gel chromatography; 10% $CH_2Cl_2$ in hexanes-50% $CH_2Cl_2$ in hexanes to afford the bisiodophenyl ether as a white solid (1.712 g, 3.041 mmol, 97%). NMR indicated product.

$^1$H NMR (500 MHz, Chloroform-d) δ 7.73 (d, J=2.5 Hz, 2H), 7.27-7.23 (m, 2H), 6.73 (d, J=8.8 Hz, 2H), 4.14-4.04 (m, 4H), 2.10 (h, J=2.4 Hz, 4H). $^{13}$C NMR (126 MHz, Chloroform-d) δ 156.29, 138.50, 129.17, 126.28, 112.40, 86.72, 69.01, 25.92.

Example 96: Synthesis of Ligand 22

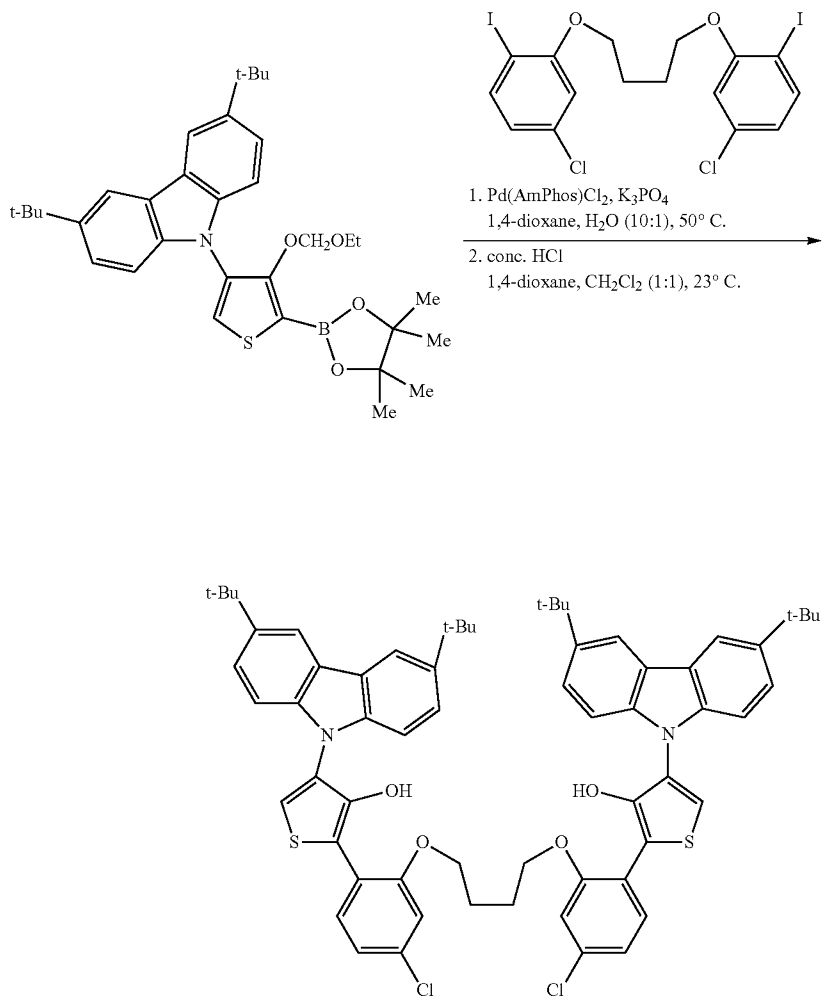

A mixture of the thiophene boropinacolate ester (1.000 g, 1.104 mmol, 2.70 eq, 62% pure by NMR), $K_3PO_4$ (0.703 g, 3.312 mmol, 8.10 eq), Pd(AmPhos)$Cl_2$ (58.0 mg, 0.0818 mmol, 0.20 eq), and the bisphenyliodide (0.230 g, 0.4089 mmol, 1.00 eq). The mixture was evacuated, then back-filled with nitrogen, this process was repeated 3× more, then deoxygenated 1,4-dioxane (8.0 mL) and deoxygenated water (0.8 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-75% $CH_2Cl_2$ in hexanes to afford the impure bisthiophene as a pale red amorphous foam (0.161 g). NMR indicated product which contained impurities. The impure material was used in the subsequent reaction.

To a solution of the impure coupled product in $CH_2Cl_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and $CH_2Cl_2$ (10 mL), poured into separatory funnel, partitioned, organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-75% $CH_2Cl_2$ in hexanes to afford the bisthiophene as a white solid (0.121 g, 0.1139 mmol, 24% two steps). NMR indicated pure product.

$^1$H NMR (500 MHz, Chloroform-d) δ 8.13 (d, J=1.9 Hz, 4H), 7.60 (d, J=8.3 Hz, 2H), 7.39 (dd, J=8.6, 1.9 Hz, 4H), 7.31 (s, 2H), 7.20 (d, J=8.6 Hz, 4H), 7.10 (dd, J=8.4, 2.0 Hz, 2H), 6.94 (d, J=2.0 Hz, 2H), 6.70 (s, 2H), 4.09-4.02 (m, 4H), 1.99-1.90 (m, 4H), 1.44 (s, 36H). $^{13}$C NMR (126 MHz, Chloroform-d) δ 154.27, 146.45, 142.91, 139.52, 133.98, 131.08, 127.26, 123.54, 123.24, 122.78, 121.45, 120.37, 116.29, 114.09, 114.02, 109.48, 69.93, 34.70, 32.01, 25.84.

Example 97: Synthesis of Procatalyst 43

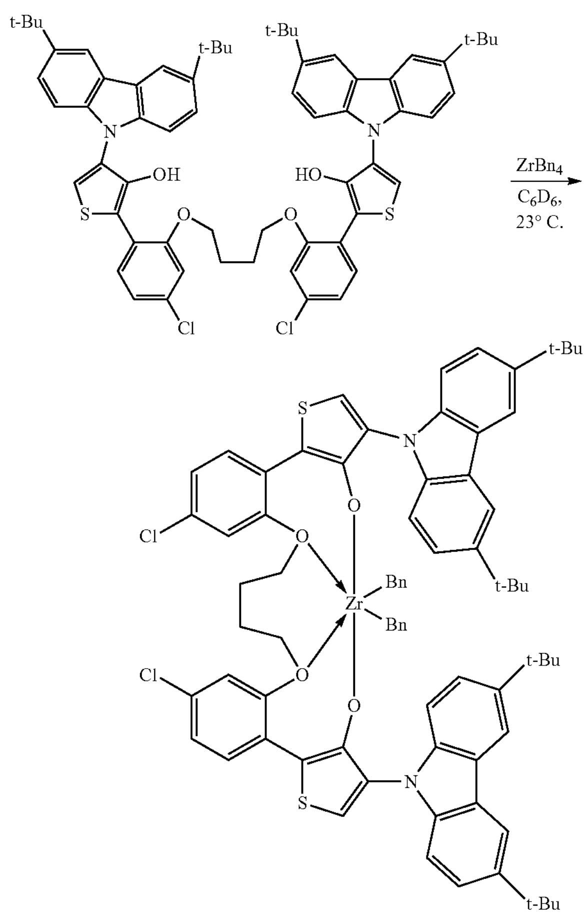

Ligand 22 was azeotropically dried using PhMe (4×10 mL) prior to use. To a clear colorless solution of the thiophene (10.7 mg, 10.10 μmol, 1.00 eq) in anhydrous $C_6D_6$ (1.82 mL) in a nitrogen filled glovebox at 23° C. was added a solution of $ZrBn_4$ (5.0 mg, 11.10 μmol, 1.10 eq) in $C_6D_6$ (0.20 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product which exists as a rotameric mixture. The same procedure can be used with PhMe as the solvent to prepare the procatalyst solution (0.0025 M or 0.005 M) which is used directly after filtration for the polymerization experiments.

$^1$H NMR (500 MHz, Benzene-$d_6$) δ 8.51-8.44 (m, 4H), 8.35-8.26 (m, 2H), 7.63-7.54 (m, 4H), 7.29-7.26 (m, 2H), 7.14 (d, J=8.3 Hz, 2H), 6.94 (s, 2H), 6.91 (dd, J=8.3, 2.1 Hz, 2H), 6.85-6.77 (m, 4H), 6.51-6.48 (m, 4H), 6.40-6.32 (m, 2H), 5.86 (d, J=2.1 Hz, 2H), 3.48-3.38 (m, 2H), 3.32 (m, 2H), 1.73 (d, J=13.1 Hz, 2H), 1.33 (s, 18H), 1.23 (s, 18H), 1.03-0.96 (m, 2H), 0.92-0.79 (m, 2H), 0.50 (d, J=13.1 Hz, 2H). $^{13}$C NMR (126 MHz, Benzene-$d_6$) δ152.92, 151.61, 146.86, 146.45, 143.89, 143.60, 143.13, 142.96, 140.01, 138.84, 138.68, 134.86, 130.56, 126.63, 126.27, 124.11, 123.99, 123.63, 123.00, 122.36, 121.39, 116.78, 115.97, 75.66, 72.03, 34.54, 34.50, 34.47, 34.41, 31.82, 31.69.

Example 98: Synthesis of Procatalyst 44

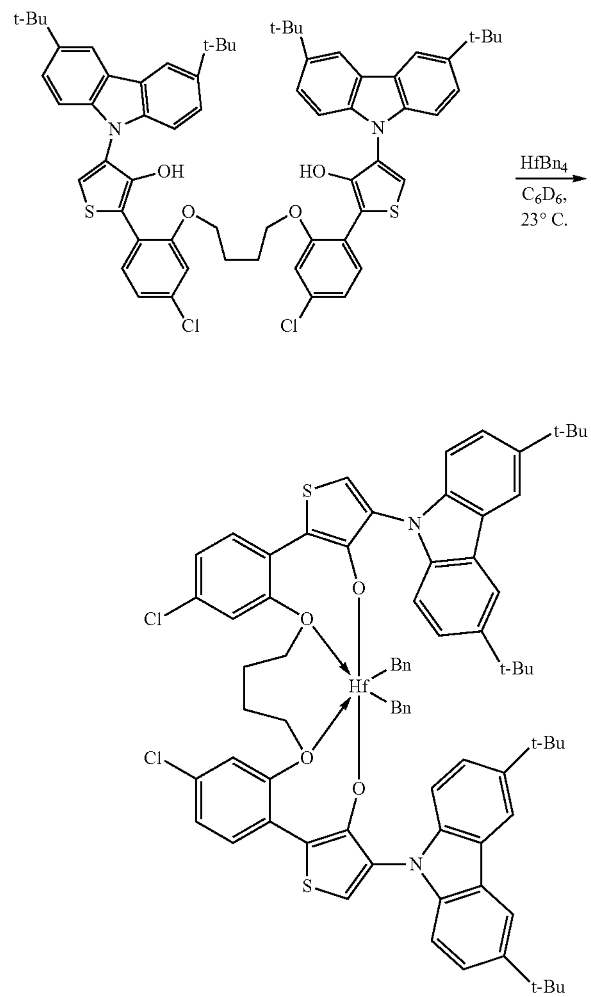

Ligand 22 was azeotropically dried using PhMe (4×10 mL) prior to use. To a clear colorless solution of the thiophene (12.0 mg, 11.30 μmol, 1.00 eq) in anhydrous $C_6D_6$ (1.99 mL) in a nitrogen filled glovebox at 23° C. was added a solution of $HfBn_4$ (6.8 mg, 12.43 μmol, 1.10 eq) in $C_6D_6$ (0.27 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product which exists as a rotameric mixture. The same procedure can be used with PhMe as the solvent to prepare the procatalyst solution (0.005 M) which is used directly after filtration for the polymerization experiments.

$^1$H NMR (400 MHz, Benzene-$d_6$) δ 8.57 (d, J=1.9 Hz, 2H), 8.43-8.38 (m, 2H), 7.60-7.43 (m, 4H), 7.18 (d, J=8.6 Hz, 2H), 6.96 (ddq, J=7.4, 1.4, 0.7 Hz, 4H), 6.91-6.85 (m, 2H), 6.81 (s, 2H), 6.82-6.79 (m, 2H), 6.75 (tt, J=7.3, 1.2 Hz, 2H), 6.66 (dd, J=8.4, 2.1 Hz, 2H), 6.50-6.45 (m, 4H), 5.54 (d, J=2.1 Hz, 2H), 3.66-3.53 (m, 2H), 2.90-2.83 (m, 2H), 1.33 (s, 18H), 1.22 (s, 18H), 1.05 (dd, J=13.4, 5.9 Hz, 2H), 0.91-0.71 (m, 2H), 0.55-0.40 (m, 2H), 0.34 (d, J=13.6 Hz, 2H).

Example 99: Synthesis of bis-5-chloro-2-iodophenyl ether

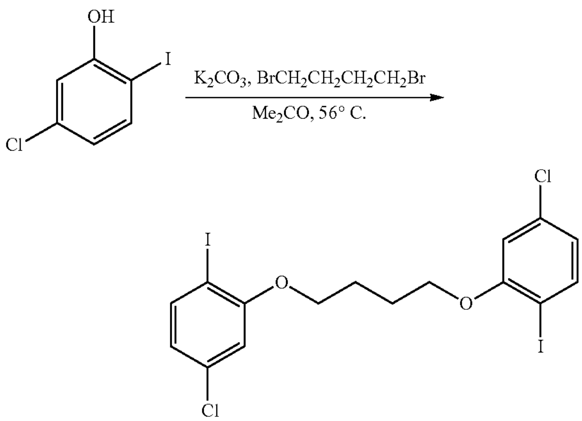

A white heterogeneous mixture of the iodophenol (2.475 g, 9.727 mmol, 2.00 eq), $K_2CO_3$ (4.033 g, 29.180 mmol, 6.00 eq), and 1,4-dibromobutane (0.58 mL, 4.864 mmol, 1.00 eq) in acetone (100 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with $CH_2Cl_2$ (50 mL), stirred vigorously (1000 rpm) for 5 mins, suction filtered over a pad of celite, rinsed with $CH_2Cl_2$ (3×25 mL), the resultant filtrate solution was concentrated onto celite, and purified via silica gel chromatography; 10% $CH_2Cl_2$ in hexanes-50% $CH_2Cl_2$ in hexanes to afford the bisiodophenyl ether as a white solid (2.456 g, 4.362 mmol, 90%). NMR indicated product.

$^1$H NMR (400 MHz, Chloroform-d) δ 7.64 (d, J=8.3 Hz, 2H), 6.79 (d, J=2.2 Hz, 2H), 6.70 (dd, J=8.3, 2.2 Hz, 2H), 4.16-4.03 (m, 4H), 2.15-2.04 (m, 4H). $^{13}$C NMR (101 MHz, Chloroform-d) δ 158.00, 139.68, 135.13, 122.49, 112.66, 83.83, 68.90, 25.86.

Example 100: Synthesis of Ligand 23

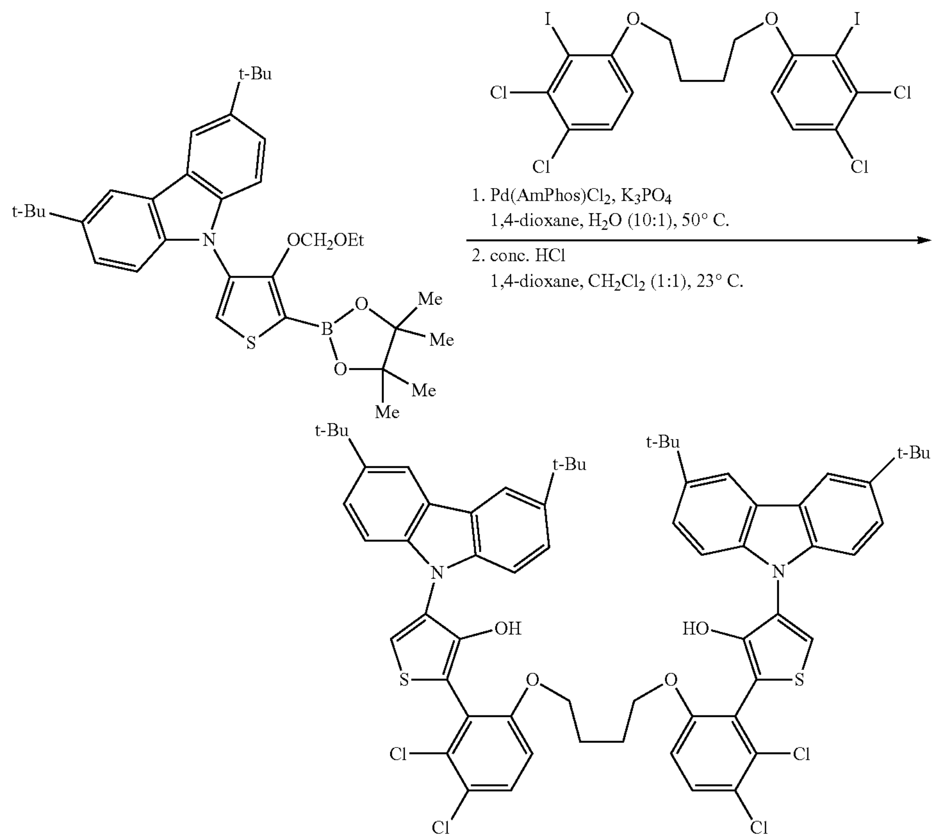

A mixture of the thiophene boropinacolate ester (1.000 g, 1.104 mmol, 2.70 eq, 62% pure by NMR), $K_3PO_4$ (0.703 g, 3.312 mmol, 8.10 eq), Pd(AmPhos)$Cl_2$ (58.0 mg, 0.0818 mmol, 0.20 eq), and the bisphenyliodide (0.258 g, 0.4089 mmol, 1.00 eq). The mixture was evacuated, then back-filled with nitrogen, this process was repeated 3× more, then deoxygenated 1,4-dioxane (8.0 mL) and deoxygenated water (0.8 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-100% $CH_2Cl_2$ in hexanes to afford the impure bisthiophene as a pale red amorphous foam (0.271 g). NMR indicated product which contained impurities. The impure material was used in the subsequent reaction.

To a solution of the impure coupled product in $CH_2Cl_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and $CH_2Cl_2$ (10 mL), poured into separatory funnel, partitioned, organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 25%-100% $CH_2Cl_2$ in hexanes to afford the bisthiophene as a white solid (0.126 g, 0.1114 mmol, 27% two steps). NMR indicated pure product.

$^1$H NMR (500 MHz, Chloroform-d) δ 8.13 (d, J=1.9 Hz, 4H), 7.41 (h, J=8.6, 7.4 Hz, 4H), 7.37 (s, 2H), 7.27 (d, J=9.4 Hz, 2H), 7.22 (d, J=8.6 Hz, 4H), 6.64 (d, J=9.0 Hz, 2H), 4.84 (s, 2H), 3.95-3.85 (m, 4H), 1.81-1.73 (m, 4H), 1.44 (s, 36H). $^{13}$C NMR (126 MHz, Chloroform-d) δ 156.55, 146.38, 143.30, 139.26, 134.56, 130.70, 125.87, 125.62, 123.84, 123.40, 122.00, 120.38, 116.38, 111.87, 111.71, 109.32, 69.13, 34.74, 32.00, 25.74.

Example 101: Synthesis of Procatalyst 45

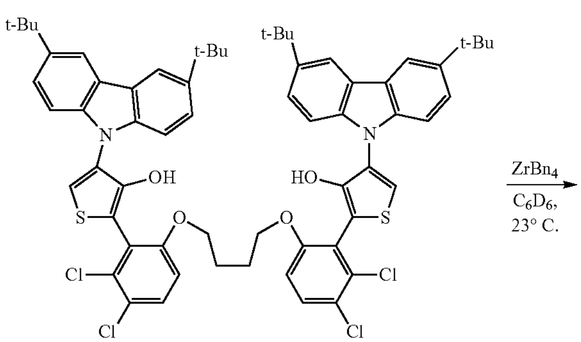

-continued

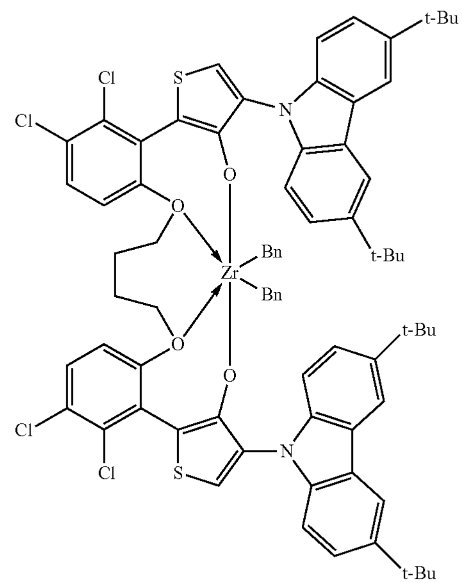

Ligand 23 was azeotropically dried using PhMe (4×10 mL) prior to use. To a clear colorless solution of the thiophene (10.3 mg, 9.11 μmol, 1.00 eq) in anhydrous $C_6D_6$ (1.64 mL) in a nitrogen filled glovebox at 23° C. was added a solution of $ZrBn_4$ (4.6 mg, 10.02 μmol, 1.10 eq) in $C_6D_6$ (0.18 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product which exists as a rotameric mixture. The same procedure can be used with PhMe as the solvent to prepare the procatalyst solution (0.0025 M or 0.005 M) which is used directly after filtration for the polymerization experiments.

$^1$H NMR (500 MHz, Benzene-$d_6$) δ 8.42 (d, J=1.9 Hz, 2H), 8.26 (d, J=1.9 Hz, 2H), 7.47 (ddd, J=8.5, 6.3, 1.9 Hz, 2H), 7.38 (d, J=8.7 Hz, 2H), 7.25 (d, J=8.5 Hz, 2H), 6.99-6.95 (m, 6H), 6.94 (s, 2H), 6.86 (d, J=8.8 Hz, 2H), 6.80 (d, J=7.4 Hz, 2H), 6.37-6.32 (m, 2H), 6.09 (m, 2H), 4.91 (d, J=8.8 Hz, 2H), 3.79 (t, J=10.1 Hz, 2H), 3.20-3.13 (m, 2H), 1.47 (s, 18H), 1.27 (s, 18H), 0.95-0.78 (m, 2H), 0.73 (d, J=11.6 Hz, 2H), 0.63-0.55 (m, 2H), 0.35 (d, J=11.7 Hz, 2H).

Example 102: Synthesis of Procatalyst 46

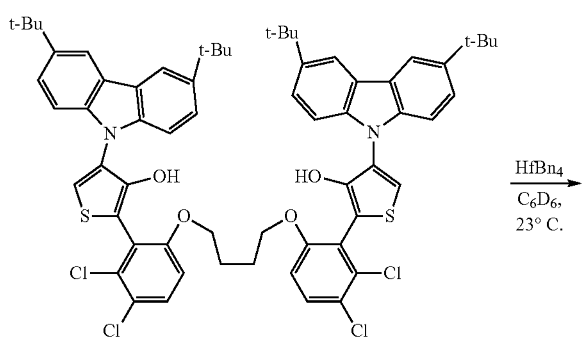

-continued

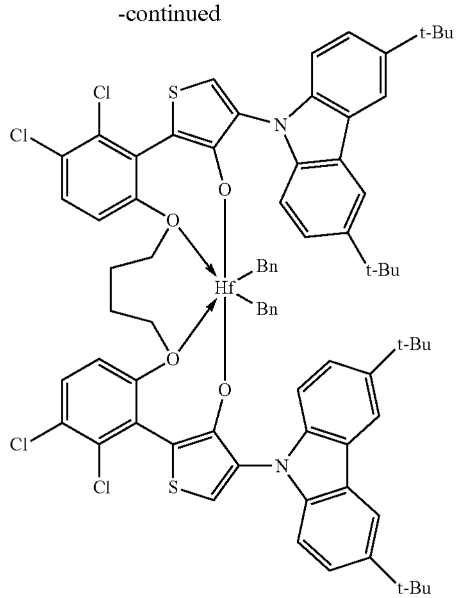

Ligand 23 was azeotropically dried using PhMe (4×10 mL) prior to use. To a clear colorless solution of the thiophene (7.6 mg, 6.72 μmol, 1.00 eq) in anhydrous $C_6D_6$ (1.18 mL) in a nitrogen filled glovebox at 23° C. was added a solution of $HfBn_4$ (4.0 mg, 7.40 μmol, 1.10 eq) in $C_6D_6$ (0.16 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product which exists as a complex rotameric mixture. The same procedure can be used with PhMe as the solvent to prepare the procatalyst solution (0.005 M) which is used directly after filtration for the polymerization experiments.

Example 103: Synthesis of bis-3,4-dichloro-2-iodophenyl ether

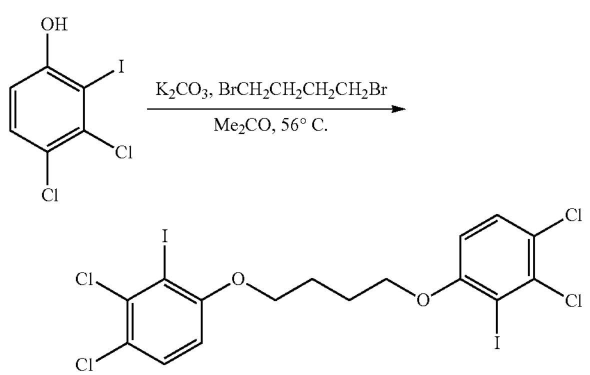

A white heterogeneous mixture of the iodophenol (4.112 g, 14.234 mmol, 2.20 eq), $K_2CO_3$ (5.902 g, 42.702 mmol, 6.60 eq), and 1,4-dibromobutane (0.77 mL, 6.470 mmol, 1.00 eq) in acetone (65 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with aqueous NaOH (100 mL, 1 N), stirred for 2 mins, suction filtered, the filtered white solid was rinsed with aqueous NaOH (2×25 mL, 1 N), then rinsed with water (2×25 mL), and cold $CH_2C_2$ (2×20 mL), the resultant filtered white solid was collected, the filtrate biphasic mixture was poured into a separatory funnel, partitioned, organics were washed with aqueous NaOH (2×25 mL), residual organics were extracted $CH_2Cl_2$ (2×25 mL), combined, dried over solid $Na_2SO_4$, concentrated, and combined with filtered solid to afford the iodophenyl ether as a white solid (3.813 g, 6.034 mmol, 93%). NMR (at 60° C. and 100° C.) indicated product.

VT NMR @ 60° C.: $^1$H NMR (400 MHz, Chloroform-d) δ 7.38 (d, J=8.8 Hz, 2H), 6.65 (d, J=8.9 Hz, 2H), 4.11 (q, J=4.3, 3.2 Hz, 4H), 2.11 (dt, J=5.4, 3.3 Hz, 4H).

VT NMR @ 100° C.: $^1$H NMR (400 MHz, DMSO-$d_6$) δ 7.54 (dd, J=8.9, 1.5 Hz, 2H), 6.96 (dd, J=8.9, 1.8 Hz, 2H), 4.16 (ddt, J=5.9, 3.6, 2.2 Hz, 4H), 1.97 (dq, J=5.9, 2.6 Hz, 4H). $^{13}$C NMR (101 MHz, DMSO-$d_6$) δ 158.69, 136.57, 130.92, 130.75, 123.17, 93.97, 70.20, 25.87.

Example 104: Synthesis of bis-4,5-dichloro-2-iodophenyl ether

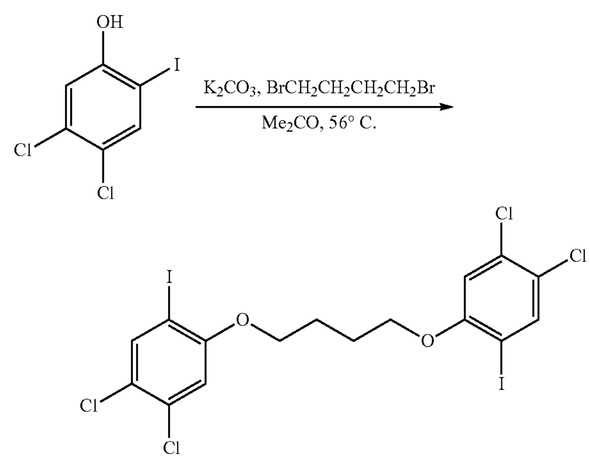

A white heterogeneous mixture of the iodophenol (2.454 g, 8.494 mmol, 2.00 eq), $K_2CO_3$ (3.522 g, 25.483 mmol, 6.00 eq), and 1,4-dibromobutane (0.50 mL, 4.247 mmol, 1.00 eq) in acetone (50 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with aqueous NaOH (100 mL, 1 N), stirred for 2 mins, suction filtered, the filtered white solid was rinsed with aqueous NaOH (2×25 mL, 1 N), then rinsed with water (2×25 mL), and cold $CH_2Cl_2$ (2×20 mL), the resultant filtered white solid was collected, the filtrate biphasic mixture was poured into a separatory funnel, partitioned, organics were washed with aqueous NaOH (2×25 mL), residual organics were extracted $CH_2Cl_2$ (2×25 mL), combined, dried over solid $Na_2SO_4$, concentrated, and combined with filtered solid to afford the iodophenyl ether as a white solid (2.272 g, 3.596 mmol, 85%). NMR (at 55° C.) indicated product.

NMR Spectra attained at 55° C.: $^1$H NMR (500 MHz, Chloroform-d) δ 7.80 (s, 2H), 6.88 (s, 2H), 4.12 (qd, J=5.6, 3.7, 3.3 Hz, 4H), 2.11 (dq, J=5.7, 2.9 Hz, 4H). $^{13}$C NMR (126 MHz, Chloroform-d) δ 156.81, 139.43, 133.07, 125.07, 113.61, 84.17, 69.50, 25.82.

Example 105: Synthesis of 4,5-dichloro-2-iodophenol & 3,4-dichloro-2-iodophenol

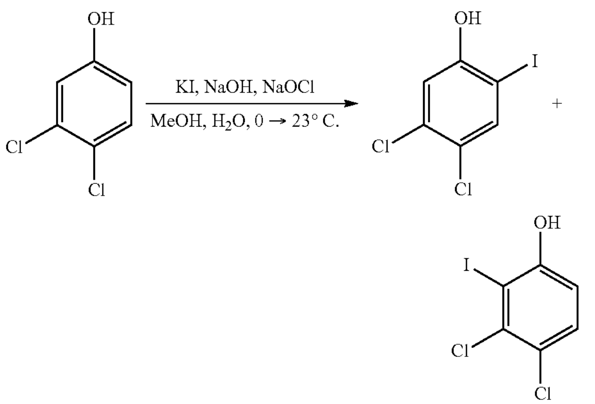

A clear colorless solution of the starting phenol (5.020 g, 30.798 mmol, 1.00 eq), KI (8.947 g, 53.896 mmol, 1.75 eq), and aqueous NaOH (92 mL, 92.394 mmol, 3.00 eq, 1 N) in methanol (250 mL) and water (125 mL) under nitrogen was placed in an ice bath and stirred vigorously (1000 rpm) for 1 hr, upon which precooled commercial aqueous bleach (77 mL, 53.896 mmol, 1.75 eq, 5.2% w/w) was added in a dropwise manner over 10 mins. The now golden yellow solution was stirred for 2 hrs at 0° C., the mixture was removed from the ice water bath, stirred at 23° C. for 4 hrs, solid $KH_2PO_4$ (25 g) was added followed by a saturated aqueous mixture $Na_2S_2O_3$ (100 mL) to reduce residual iodine, water (100 mL) was added, the mixture was stirred vigorously for 10 mins, diluted with $CH_2Cl_2$ (50 mL), the biphasic yellow mixture was poured into a separatory funnel, partitioned, organics were washed with aqueous $Na_2S_2O_3$ (2×50 mL), residual organics were extracted from the aqueous layer using $CH_2Cl_2$ (2×25 mL), combined, dried over solid $Na_2SO_4$, decanted, and concentrated onto celite, and purified via silica gel chromatography; hexanes-50% $CH_2Cl_2$ in hexanes to afford the 2-iodo-4,5-dichlorophenol as a clear pale yellow amorphous foam (2.738 g, 9.478 mmol, 31%) and the 2-iodo-3,4-dichlorophenol as a clear pale yellow foam (3.325 g, 11.509 mmol, 37%). NMR indicated pure products.

Characterization of the 2-iodo-4,5-dichlorophenol: $^1$H NMR (500 MHz, Chloroform-d) δ 7.71 (s, 1H), 7.10 (s, 1H), 5.27 (s, 1H).

Characterization of the 2-iodo-3,4-dichlorophenol: $^1$H NMR (400 MHz, Chloroform-d) δ 7.32 (d, J=8.9 Hz, 1H), 6.86 (d, J=8.8 Hz, 1H), 5.44 (s, 1H). $^{13}$C NMR (101 MHz, Chloroform-d) δ 155.15, 136.20, 130.76, 123.74, 113.74, 91.99.

Example 106: Synthesis of Ligand 24

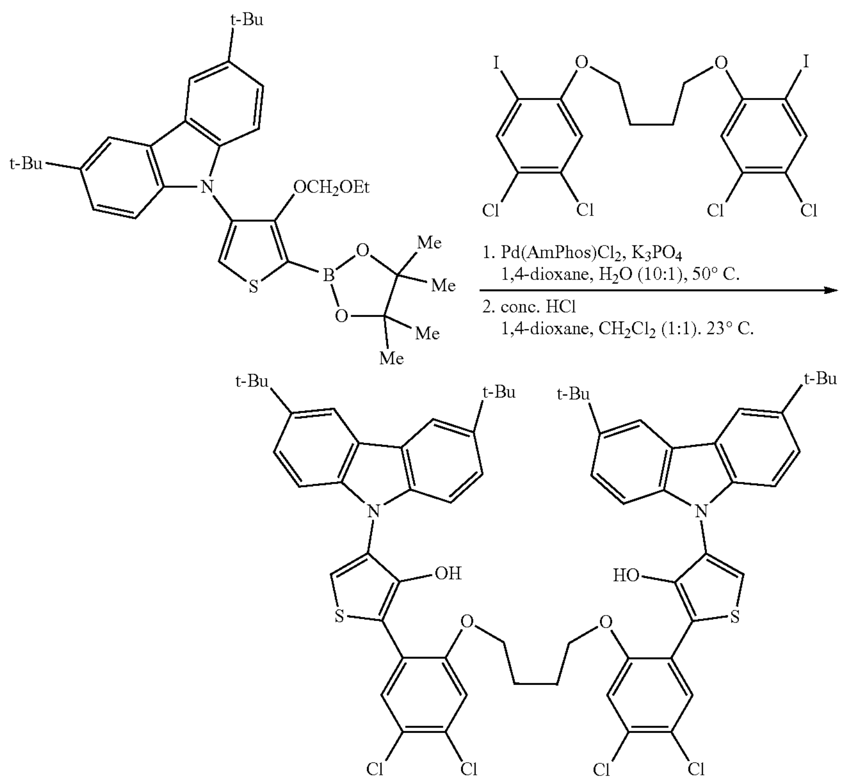

A mixture of the thiophene boropinacolate ester (1.000 g, 1.104 mmol, 2.70 eq, 62% pure by NMR), $K_3PO_4$ (0.703 g, 3.312 mmol, 8.10 eq), Pd(AmPhos)$Cl_2$ (58.0 mg, 0.0818 mmol, 0.20 eq), and the bisphenyliodide (0.258 g, 0.4089 mmol, 1.00 eq). The mixture was evacuated, then back-filled with nitrogen, this process was repeated 3× more, then deoxygenated 1,4-dioxane (8.0 mL) and deoxygenated water (0.8 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-100% $CH_2Cl_2$ in hexanes to afford the impure bisthiophene as a pale red amorphous foam (0.212 g). NMR indicated product which contained impurities. The impure material was used in the subsequent reaction.

To a solution of the impure coupled product in $CH_2Cl_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and $CH_2Cl_2$ (10 mL), poured into separatory funnel, partitioned, organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 25%-100% $CH_2Cl_2$ in hexanes to afford the bisthiophene as a white solid (0.113 g, 0.0999 mmol, 24% two steps). NMR indicated pure product.

$^1H$ NMR (500 MHz, Chloroform-d) δ 8.13 (d, J=1.9 Hz, 4H), 7.85 (s, 2H), 7.40 (dd, J=8.6, 1.9 Hz, 4H), 7.32 (s, 2H), 7.18 (d, J=8.6 Hz, 4H), 7.03 (s, 2H), 6.46 (s, 2H), 4.11-4.05 (m, 4H), 2.04-1.96 (m, 4H), 1.44 (s, 36H). $^{13}C$ NMR (126 MHz, Chloroform-d) δ 152.71, 146.95, 143.16, 139.40, 131.51, 130.92, 127.07, 125.84, 123.68, 123.34, 122.96, 120.92, 116.36, 115.20, 112.57, 109.39, 70.17, 34.72, 32.00, 25.85.

Example 107: Synthesis of Procatalyst 47

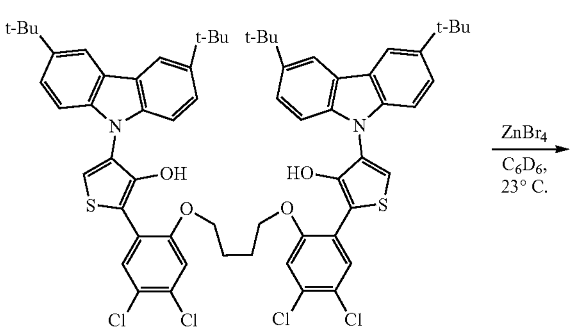

-continued

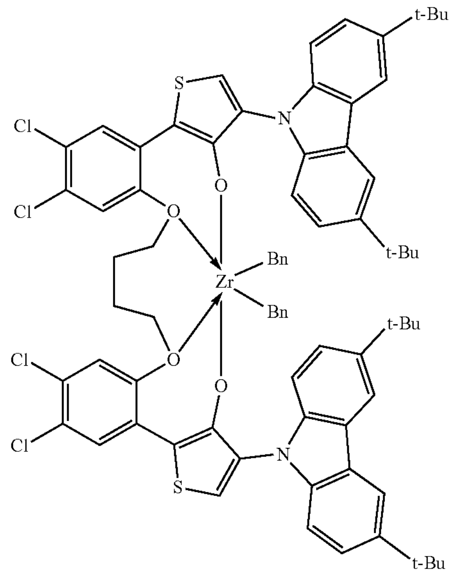

Ligand 24 was azeotropically dried using PhMe (4×10 mL) prior to use. To a clear colorless solution of the thiophene (8.8 mg, 7.78 μmol, 1.00 eq) in anhydrous $C_6D_6$ (1.40 mL) in a nitrogen filled glovebox at 23° C. was added a solution of $ZrBn_4$ (3.9 mg, 8.56 μmol, 1.10 eq) in $C_6D_6$ (0.16 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product which exists as a rotameric mixture. The same procedure can be used with PhMe as the solvent to prepare the procatalyst solution (0.0025 M or 0.005 M) which is used directly after filtration for the polymerization experiments.

$^1H$ NMR (500 MHz, Benzene-$d_6$) δ 8.54 (dd, J=1.9, 0.7 Hz, 2H), 8.42 (dd, J=1.8, 0.8 Hz, 2H), 7.62-7.56 (m, 4H), 7.47 (dd, J=8.6, 1.9 Hz, 2H), 7.18 (dd, J=8.5, 0.7 Hz, 2H), 6.99-6.96 (m, 6H), 6.94-6.90 (m, 2H), 6.77 (s, 2H), 6.38-6.32 (m, 4H), 5.58 (s, 2H), 3.58-3.50 (m, 2H), 2.85-2.79 (m, 2H), 1.48 (s, 18H), 1.30 (s, 18H), 0.92-0.83 (m, 2H), 0.72 (d, 2H), 0.59-0.54 (m, 4H).

Example 108: Synthesis of Procatalyst 48

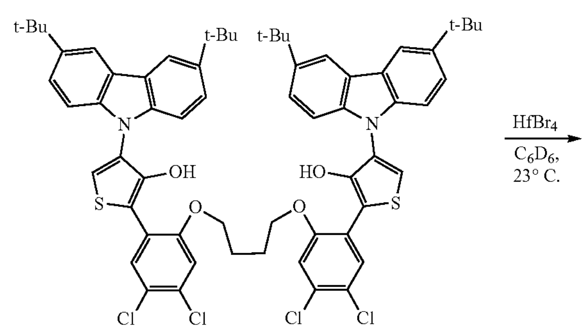

-continued

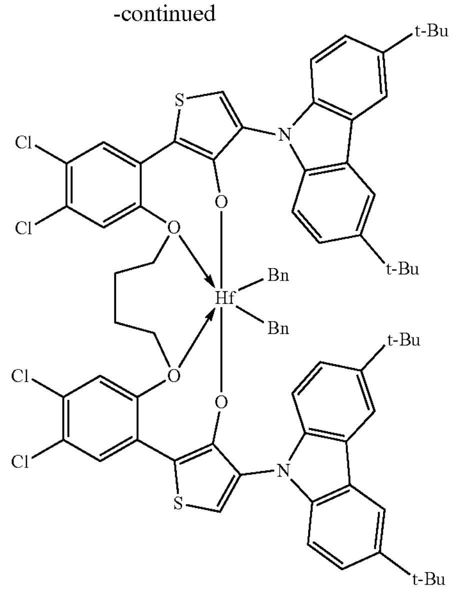

Ligand 24 was azeotropically dried using PhMe (4×10 mL) prior to use. To a clear colorless solution of the thiophene (8.0 mg, 7.07 μmol, 1.00 eq) in anhydrous $C_6D_6$ (1.24 mL) in a nitrogen filled glovebox at 23° C. was added a solution of $HfBn_4$ (4.2 mg, 7.78 μmol, 1.10 eq) in $C_6D_6$ (0.17 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product which exists as a rotameric mixture. The same procedure can be used with PhMe as the solvent to prepare the procatalyst solution (0.005 M) which is used directly after filtration for the polymerization experiments.

$^1$H NMR (500 MHz, Benzene-$d_6$) δ 8.56 (dd, J=2.0, 0.6 Hz, 2H), 8.44 (dd, J=1.7, 0.8 Hz, 2H), 7.62-7.53 (m, 4H), 7.46 (dd, J=8.6, 1.9 Hz, 2H), 7.16-7.13 (m, 2H), 6.99-6.84 (m, 4H), 6.77 (s, 2H), 6.52-6.47 (m, 6H), 6.42 (dd, J=8.1, 1.3 Hz, 2H), 5.60 (s, 2H), 3.55-3.45 (m, 2H), 2.83-2.77 (m, 2H), 1.48 (s, 18H), 1.30 (s, 18H), 1.06-0.98 (m, 2H), 0.55-0.48 (m, 4H), 0.45 (d, J=13.7 Hz, 2H).

Example 109: Synthesis of Ligand 25

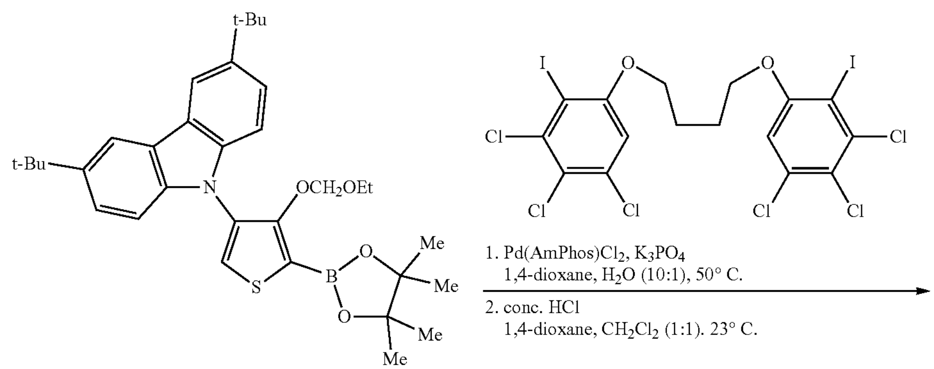

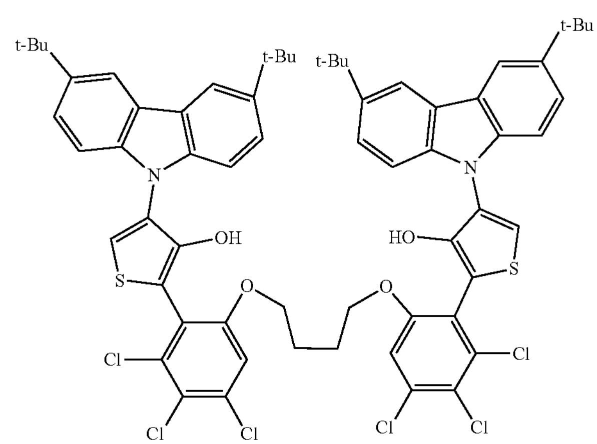

A mixture of the thiophene boropinacolate ester (2.017 g, 2.586 mmol, 3.00 eq, 72% pure by NMR), $K_3PO_4$ (1.647 g, 7.758 mmol, 9.00 eq), Pd(AmPhos)$Cl_2$ (122.0 mg, 0.1724 mmol, 0.20 eq), and the bisphenyliodide (0.604 g, 0.8620 mmol, 1.00 eq). The mixture was evacuated, then back-filled with nitrogen, this process was repeated 3× more, then deoxygenated 1,4-dioxane (17.0 mL) and deoxygenated water (1.7 mL) were added sequentially via syringe. The mixture was then placed in a mantle heated to 50° C. After stirring vigorously (1000 rpm) for 40 hrs, the black mixture was removed from the mantle, allowed to cool gradually to 23° C., suction filtered over a pad of silica gel, washed with $CH_2Cl_2$ (4×20 mL), the clear black filtrate was concentrated, residual 1,4-dioxane was azeotropically removed using toluene (2×10 mL) via rotary evaporation, the black mixture was then suspended in $CH_2Cl_2$ (20 mL), suction filtered over a pad of silica gel, rinsed with $CH_2Cl_2$ (4×20 mL), the black filtrate was then concentrated onto celite, and purified via silica gel chromatography via an ISCO chromatography purification system; 10%-50% $CH_2Cl_2$ in hexanes to afford the bisthiophene as a red amorphous oil (0.162 g). NMR indicated product which exists as a mixture of rotomers, and contains minor impurities. The material was used in the subsequent reaction without further purification To a solution of the impure coupled product in $CH_2Cl_2$-1,4-dioxane (10 mL, 1:1) under nitrogen at 23° C. was added conc. HCl (5 mL). The golden brown solution was stirred (500 rpm) for 20 hrs, diluted with 1N HCl (10 mL) and $CH_2Cl_2$ (10 mL), poured into separatory funnel, partitioned, organics were washed with 1 N HCl (1×10 mL), residual organics were extracted from the aqueous using $CH_2Cl_2$ (2×10 mL), combined, dried over solid $Na_2SO_4$, decanted, concentrated onto celite, and purified via silica gel chromatography via an ISCO chromatography purification system; 10%-75% $CH_2Cl_2$ in hexanes to afford the bisthiophene as a light tan solid (0.115 g, 0.09583 mmol, 11% two steps). NMR indicated pure product.

$^1$H NMR (500 MHz, Chloroform-d) δ 8.13 (d, J=1.9 Hz, 4H), 7.44-7.38 (m, 4H), 7.39 (s, 2H), 7.21 (d, J=8.6 Hz, 4H), 6.98 (s, 2H), 3.96-3.91 (m, 4H), 1.85-1.80 (m, 4H), 1.44 (s, 36H). $^{13}$C NMR (126 MHz, Chloroform-d) δ 156.24, 146.49, 143.49, 139.20, 136.25, 134.68, 125.81, 124.47, 123.91, 123.49, 120.80, 120.64, 116.49, 112.77, 110.93, 109.20, 69.04, 34.75, 31.98, 25.60.

Example 110: Synthesis of Procatalyst 49

-continued

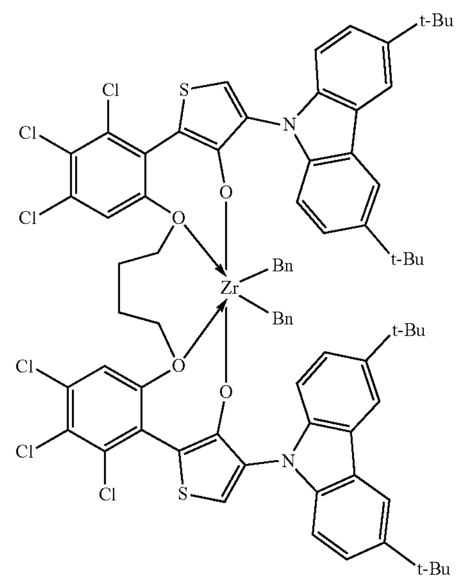

Ligand 25 was azeotropically dried using PhMe (4×10 mL) prior to use. To a clear colorless solution of the thiophene (10.2 mg, 8.50 μmol, 1.00 eq) in anhydrous $C_6D_6$ (1.53 mL) in a nitrogen filled glovebox at 23° C. was added a solution of $ZrBn_4$ (4.3 mg, 9.35 μmol, 1.10 eq) in $C_6D_6$ (0.17 mL) in a dropwise manner. After stirring (500 rpm) for 30 mins the pale golden yellow solution was filtered using a 0.20 μm PTFE submicron filter to afford the zirconium complex as a 0.005 M solution in $C_6D_6$. NMR indicated product which exists as a rotameric mixture. The same procedure can be used with PhMe as the solvent to prepare the procatalyst solution (0.0025 M or 0.005 M) which is used directly after filtration for the polymerization experiments.

$^1$H NMR (400 MHz, Benzene-d$_6$) δ 8.48 (d, J=1.9 Hz, 2H), 8.36 (d, J=1.8 Hz, 2H), 7.59 (d, J=8.7 Hz, 2H), 7.50 (ddd, J=8.8, 3.8, 1.9 Hz, 4H), 7.23 (d, J=8.6 Hz, 2H), 6.98-6.94 (m, 4H), 6.89 (s, 2H), 6.74 (t, J=7.3 Hz, 2H), 6.27-6.21 (m, 4H), 5.41 (s, 2H), 3.60-3.50 (m, 2H), 2.97-2.90 (m, 2H), 1.49 (s, 18H), 1.28 (s, 18H), 1.16 (d, J=13.9 Hz, 2H), 0.90-0.80 (m, 2H), 0.68-0.60 (m, 2H).

Example 111: Synthesis of Procatalyst 50

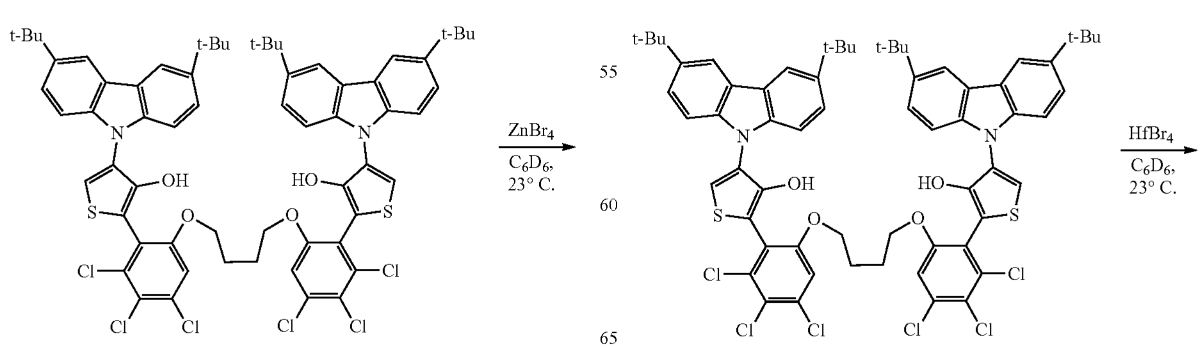

-continued

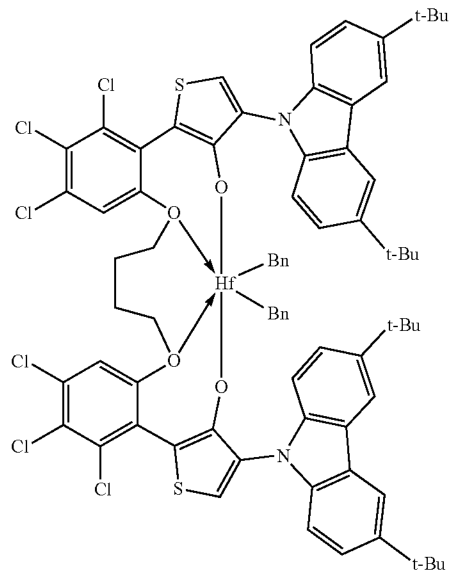

-continued

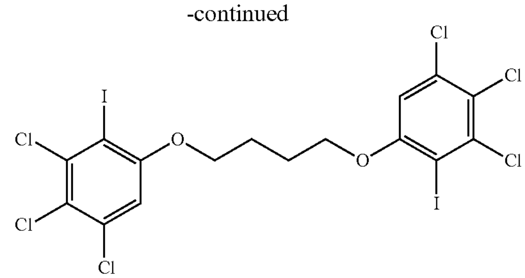

Ligand 25 was azeotropically dried using PhMe (4×10 mL) prior to use. To a clear colorless solution of the thiophene (8.0 mg, 6.67 μmol, 1.00 eq) in anhydrous $C_6D_6$ (1.17 mL) in a nitrogen filled glovebox at 23° C. was added a solution of $HfBn_4$ (4.0 mg, 7.33 μmol, 1.10 eq) in $C_6D_6$ (0.16 mL) in a dropwise manner. After stirring (500 rpm) for 30 mins the pale golden yellow solution was filtered using a 0.20 μm PTFE submicron filter to afford the hafnium complex as a 0.005 M solution in $C_6D_6$. NMR indicated product which exists as a rotameric mixture. The same procedure can be used with PhMe as the solvent to prepare the procatalyst solution (0.005 M) which is used directly after filtration for the polymerization experiments.

$^1$H NMR (400 MHz, Benzene-$d_6$) δ 8.51 (d, J=1.9 Hz, 2H), 8.39 (d, J=1.8 Hz, 2H), 7.61 (d, J=9.0 Hz, 2H), 7.50 (ddd, J=21.9, 8.7, 1.9 Hz, 4H), 7.19 (d, J=8.6 Hz, 2H), 6.98-6.94 (m, 4H), 6.90 (s, 2H), 6.75 (t, J=7.5 Hz, 2H), 6.41-6.36 (m, 4H), 5.31 (s, 2H), 3.43-3.35 (m, 2H), 2.87-2.79 (m, 2H), 1.49 (s, 18H), 1.29 (s, 18H), 1.06 (d, J=14.1 Hz, 2H), 0.95-0.82 (m, 2H), 0.59-0.48 (m, 2H), 0.41 (d, J=14.0 Hz, 2H).

Example 112: Synthesis of bis-3,4,5-trichloro-2-iodophenyl ether

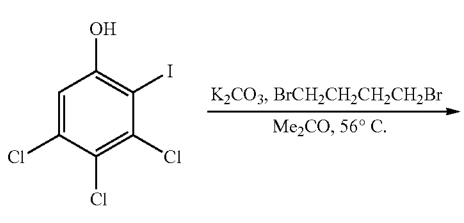

A white heterogeneous mixture of the iodophenol (1.315 g, 4.067 mmol, 2.00 eq), $K_2CO_3$ (1.686 g, 12.201 mmol, 6.00 eq), and 1,4-dibromobutane (0.24 mL, 2.034 mmol, 1.00 eq) in acetone (50 mL) equipped with a reflux condenser under nitrogen was placed in a mantle heated to 60° C., after stirring (500 rpm) for 36 hrs the white heterogeneous mixture was removed from the mantle, allowed to cool to 23° C., diluted with aqueous NaOH (100 mL, 1 N), stirred for 2 mins, suction filtered, the filtered white solid was rinsed with aqueous NaOH (2×25 mL, 1 N), then rinsed with water (2×25 mL), and cold $CH_2Cl_2$ (2×20 mL), the resultant filtered white solid was collected, the filtrate biphasic mixture was poured into a separatory funnel, partitioned, organics were washed with aqueous NaOH (2×25 mL), residual organics were extracted $CH_2Cl_2$ (2×25 mL), combined, dried over solid $Na_2SO_4$, concentrated, and combined with filtered solid to afford the iodophenyl ether as a white solid (1.300 g, 1.855 mmol, 91%). NMR (at 60° C.) indicated product.

NMR Spectra attained at 60° C.: $^1$H NMR (500 MHz, Chloroform-d) δ 6.87 (s, 2H), 4.21-4.08 (m, 4H), 2.13 (dq, J=5.3, 3.4, 2.7 Hz, 4H). $^{13}$C NMR (126 MHz, Chloroform-d) δ 157.26, 139.11, 134.26, 123.39, 111.64, 91.01, 69.80, 25.82.

Example 113: Synthesis of 3,4,5-trichlorophenol-2-iodophenol

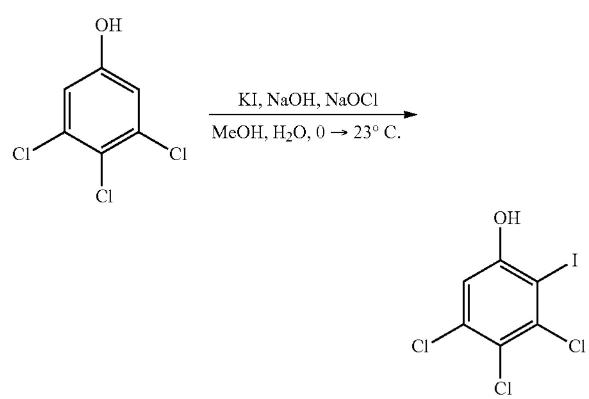

A clear colorless solution of the starting phenol (3.600 g, 18.233 mmol, 1.00 eq), KI (5.297 g, 31.909 mmol, 1.75 eq), and aqueous NaOH (55.0 mL, 54.699 mmol, 3.00 eq, 1 N) in methanol (100 mL) and water (100 mL) under nitrogen was placed in an ice bath and stirred vigorously (1000 rpm) for 1 hr, upon which precooled commercial aqueous bleach (46.0 mL, 31.909 mmol, 1.75 eq, 5.2% w/w) was added in a dropwise manner over 10 mins. The now pale opaque yellow mixture was stirred for 2 hrs at 0° C., the mixture was removed from the ice water bath, stirred at 23° C. for 4 hrs, solid $NaH_2PO_4$ (10 g) was added followed by a saturated aqueous mixture $Na_2S_2O_3$ (100 mL) to reduce residual iodine, water (100 mL) was added, the mixture was stirred vigorously for 10 mins, diluted with $CH_2Cl_2$ (50 mL), the biphasic yellow mixture was poured into a separatory funnel, partitioned, organics were washed with aqueous $Na_2S_2O_3$ (2×50 mL), residual organics were extracted from the aqueous layer using $CH_2Cl_2$ (2×25 mL), combined, dried over solid $Na_2SO_4$, decanted, and concentrated onto celite, and purified via silica gel chromatography; 35% $CH_2C_2$ in hexanes-100% $CH_2C_2$ in hexanes to afford the o-iodophenol as a white solid (1.497 g, 4.630 mmol, 25%) and recovered starting phenol as a white solid (2.544 g, 12.885 mmol, 71%). NMR indicated pure product.

$^1$H NMR (500 MHz, Chloroform-d) δ 7.11 (s, 1H), 5.52 (s, 1H).

Example 114: Polymers Yielded from Procatalysts

Catalyst activity (in terms of quench time and polymer yield) and resulting polymer characteristics were assessed for Procatalysts 1-50. The polymerization reactions were carried out in a parallel polymerization reactor (PPR).

The olefin polymerization reactions were carried out initially in a parallel polymerization reactor (PPR) using either isolated metal complexes (See experimental examples) or in situ generated complexes (Ligand (L-1 to L-25) and $ZrBn_4$ or $HfBn_4$ in a 1:1 mixture prepared 30 mins before the polymerization experiments).

Catalyst activity (assessed by quench time) and resulting polymer characteristics were assessed for Procatalysts 1-50 using a parallel pressure reactor (PPR) initially without diethyl zinc (DEZ) at 110° C., and then with three different loading of DEZ added (0, 1, and 6 μmol) at 110° C. The activator was $[HNMe(C_{18}H_{37})_2][B(C_6F_5)_4]$ in amounts of 1.5 molar equivalents and the scavenger was MMAO-3A in amounts of 500 nmoles. The quench times were measured based on the time at which the reaction reached 50 or 70 psi propylene uptake or after 1800 seconds, whichever is first, and then the polymerizations were quenched with CO to destroy the catalyst and end the experiment.

TABLE 1

Polypropylene Polymerization Data from PPR Experiments

| Procatalyst No. | Temp. (° C.) | Loading (nmoles) | Quench Time (seconds) | Yield (mg) | Mw (g/mol) | PDI (Mw/Mn) | $T_M$ (° C.) |
|---|---|---|---|---|---|---|---|
| Procatalyst 1 | 110 | 100 | 1,801 | 107 | 191,711 | 10.8 | 119.1 |
| Procatalyst 2 | 110 | 100 | 1,801 | 62 | 36,327 | 4.2 | N.D. |
| Procatalyst 3 | 110 | 100 | 514 | 173 | 19,503 | 4.1 | 70.5 |
| Procatalyst 4 | 110 | 100 | 255 | 146 | 100,053 | 3.0 | 102.2 |
| Procatalyst 5 | 110 | 100 | 51 | 366 | 50,148 | 3.8 | 71.3 |
| Procatalyst 6 | 110 | 100 | 79 | 351 | 247,367 | 3.4 | 95.2 |
| Procatalyst 7 | 110 | 100 | 1,801 | 118 | 273,624 | 15.9 | 91.2 |
| Procatalyst 8 | 110 | 100 | 1,801 | 55 | 66,423 | 9.4 | 105.5 |
| Procatalyst 9 | 110 | 100 | 168 | 188 | 64,626 | 3.0 | 97.3 |
| Procatalyst 10 | 110 | 100 | 758 | 214 | 116,874 | 3.3 | 77.5 |
| Procatalyst 11 | 110 | 100 | 55 | 379 | 48,373 | 4.9 | 101.1 |
| Procatalyst 12 | 110 | 100 | 55 | 475 | 157,871 | 3.8 | 74.4 |
| Procatalyst 13 | 110 | 100 | 245 | 183 | 106,074 | 11.2 | 95.8 |
| Procatalyst 14 | 110 | 100 | 391 | 229 | 103,411 | 3.3 | 92.8 |
| Procatalyst 15 | 110 | 50 | 1,802 | 109 | 39,560 | 5.3 | 143.7 |
| | 110 | 100 | 322 | 180 | 34,849 | 3.9 | N.D. |
| Procatalyst 16 | 110 | 50 | 1,802 | 67 | 55,726 | 3.8 | 71.7 |
| | 110 | 100 | 931 | 145 | 53,957 | 4.2 | 71.1 |
| Procatalyst 17 | 110 | 50 | 171 | 239 | 62,308 | 3.0 | 74.5 |
| | 110 | 100 | 110 | 280 | 65,223 | 3.3 | 73.0 |
| Procatalyst 18 | 110 | 50 | 1,351 | 154 | 230,978 | 3.1 | 87.0 |
| | 110 | 100 | 193 | 260 | 223,425 | 3.1 | 84.8 |
| Procatalyst 19 | 110 | 50 | 70 | 224 | 31,141 | 3.1 | 71.1 |
| | 110 | 100 | 59 | 251 | 29,184 | 3.0 | 70.2 |
| Procatalyst 20 | 110 | 50 | 216 | 172 | 286,665 | 4.2 | 99.0 |
| | 110 | 100 | 104 | 260 | 239,119 | 3.9 | 98.3 |
| Procatalyst 21 | 110 | 50 | 58 | 385 | 41,358 | 3.0 | 95.3 |
| | 110 | 100 | 51 | 380 | 40,278 | 3.2 | 95.7 |
| Procatalyst 22 | 110 | 50 | 156 | 322 | 322,200 | 3.1 | 118.3 |
| | 110 | 100 | 95 | 406 | 285,107 | 3.2 | 111.6 |
| Procatalyst 23 | 110 | 50 | 87 | 253 | 148,988 | 7.2 | 103.3 |
| | 110 | 100 | 70 | 297 | 198,443 | 9.2 | 105.8 |
| Procatalyst 24 | 110 | 50 | 115 | 310 | 344,334 | 3.1 | 112.6 |
| | 110 | 100 | 87 | 378 | 333,778 | 3.1 | 111.5 |
| Procatalyst 25 | 110 | 50 | 90 | 235 | 74,513 | 11.2 | 70.3 |
| | 110 | 100 | 55 | 341 | 71,728 | 11.0 | 69.9 |
| Procatalyst 26 | 110 | 50 | 80 | 334 | 249,588 | 3.5 | 108.9 |
| | 110 | 100 | 57 | 357 | 205,604 | 3.8 | 106.0 |
| Procatalyst 27 | 110 | 50 | 93 | 333 | 24,291 | 3.3 | 74.8 |
| | 110 | 100 | 54 | 464 | 24,305 | 3.4 | 76.3 |
| Procatalyst 28 | 110 | 50 | 138 | 540 | 222,017 | 3.6 | 102.0 |
| | 110 | 100 | 76 | 570 | 198,881 | 3.4 | 108.4 |
| Procatalyst 29 | 110 | 50 | 47 | 265 | 86,426 | 3.2 | 98.7 |
| | 110 | 100 | 33 | 304 | 81,926 | 3.3 | 99.1 |
| Procatalyst 30 | 110 | 50 | 93 | 296 | 379,690 | 3.5 | 110.4 |
| | 110 | 100 | 62 | 319 | 342,668 | 4.3 | 106.3 |
| Procatalyst 32 | 110 | 50 | 73 | 355 | 363,527 | 3.0 | 124.4 |
| | 110 | 100 | 55 | 386 | 320,496 | 4.2 | 123.3 |

TABLE 1-continued

| Polypropylene Polymerization Data from PPR Experiments | | | | | | | |
|---|---|---|---|---|---|---|---|
| Procatalyst No. | Temp. (° C.) | Loading (nmoles) | Quench Time (seconds) | Yield (mg) | Mw (g/mol) | PDI (Mw/Mn) | $T_M$ (° C.) |
| Procatalyst 33 | 110 | 50 | 54 | 260 | 66,389 | 3.0 | 99.4 |
| | 110 | 100 | 43 | 308 | 68,771 | 3.3 | 98.3 |
| Procatalyst 34 | 110 | 50 | 189 | 251 | 425,210 | 3.5 | 123.4 |
| | 110 | 100 | 89 | 390 | 343,266 | 3.2 | 116.6 |
| Procatalyst 35 | 110 | 50 | 78 | 222 | 111,123 | 4.1 | 86.4 |
| | 110 | 100 | 52 | 275 | 83,066 | 3.3 | 81.9 |
| Procatalyst 36 | 110 | 50 | 1,152 | 126 | 461,173 | 3.6 | 121.8 |
| | 110 | 100 | 158 | 411 | 395,355 | 3.2 | 120.7 |
| Procatalyst 37 | 110 | 50 | 99 | 218 | 72,824 | 2.8 | 102.0 |
| | 110 | 100 | 60 | 282 | 73,781 | 3.0 | 84.2 |
| Procatalyst 38 | 110 | 50 | 1,802 | 32 | 389,406 | 5.1 | 82.1 |
| | 110 | 100 | 273 | 403 | 481,012 | 3.4 | 85.5 |
| Procatalyst 39 | 110 | 100 | 1,800 | 36 | 35,224 | 9.1 | 120.6 |
| Procatalyst 40 | 110 | 100 | 1,801 | 29 | 78,498 | 3.4 | 81.9 |
| Procatalyst 41 | 110 | 50 | 58 | 252 | 65,638 | 3.6 | 85.8 |
| | 110 | 100 | 45 | 268 | 63,737 | 3.8 | 97.5 |
| Procatalyst 42 | 110 | 50 | 135 | 334 | 366,105 | 3.7 | 80.9 |
| | 110 | 100 | 83 | 396 | 304,882 | 3.2 | 84.0 |
| Procatalyst 43 | 110 | 50 | 99 | 236 | 272,897 | 3.2 | 97.2 |
| | 110 | 100 | 95 | 290 | 285,837 | 3.6 | 99.9 |
| Procatalyst 44 | 110 | 50 | 290 | 206 | 793,635 | 3.1 | 138.0 |
| | 110 | 100 | 125 | 253 | 672,111 | 2.9 | 137.9 |
| Procatalyst 45 | 110 | 100 | 38 | 362 | 46,193 | 4.7 | 98.7 |
| Procatalyst 46 | 110 | 100 | 96 | 484 | 206,361 | 3.6 | 128.7 |
| Procatalyst 47 | 110 | 100 | 76 | 220 | 145,994 | 3.0 | 102.4 |
| Procatalyst 48 | 110 | 100 | 309 | 321 | 484,587 | 3.2 | 121.9 |
| Procatalyst 49 | 110 | 100 | 71 | 335 | 121,010 | 3.1 | 99.5 |
| Procatalyst 50 | 110 | 100 | 296 | 433 | 594,745 | 3.4 | 120.8 |

The catalyst activity varied for each procatalyst, as reported in Table 1. The variation in catalyst activity may have been based on the functional group substitution pattern on the group ortho to the hydroxyanion and/or the substituents on the neutral, non-anionic phenyl ether donor or the linking bridge unit. In Table 1, the activity was assessed by the quench times in the PPR where the lower, or faster the quench times, the higher the activity of the catalyst.

The procatalysts having higher activity were then run in PPR with different loadings of DEZ (0, 1, and 6 μmol) to evaluate the catalyst's propensity to undergo chain transfer with a chain transfer agent (CSA) to make polypropylene olefin block copolymers (OBC's). The procatalysts having a higher activity than the other procatalysts. Polymer data for these trials is provided in Table 2.

TABLE 2

| Propylene Polymerization Data from PPR Experiments with diethyl zinc as the chain transfer agent. | | | | | | | |
|---|---|---|---|---|---|---|---|
| Procatalyst No. | Loading (nmoles) | $Et_2Zn$ (μmoles) | Quench Time (seconds) | Yield (mg) | Mw (g/mol) | PDI (Mw/Mn) | $T_M$ (° C.) |
| Procatalyst 5 | 50 | 0 | 40 | 292 | 44,724 | 3.5 | 72.1 |
| | 50 | 1 | 43 | 270 | 36,356 | 3.1 | 73.5 |
| | 50 | 6 | 46 | 248 | 29,314 | 3.8 | 71.6 |
| Procatalyst 6 | 50 | 0 | 69 | 298 | 274,432 | 3.9 | 96.5 |
| | 50 | 1 | 75 | 246 | 184,085 | 4.7 | 93.7 |
| | 50 | 6 | 166 | 190 | 86,899 | 6.2 | 100.7 |
| Procatalyst 11 | 50 | 0 | 52 | 253 | 65,303 | 6.3 | 105.2 |
| | 50 | 1 | 62 | 258 | 50,071 | 5.3 | 104.6 |
| | 50 | 6 | 61 | 236 | 36,785 | 5.4 | 95.8 |
| Procatalyst 12 | 50 | 0 | 57 | 407 | 176,296 | 3.2 | 73.9 |
| | 50 | 1 | 74 | 373 | 146,121 | 3.6 | 73.7 |
| | 50 | 6 | 124 | 288 | 94,224 | 5.1 | 74.4 |
| Procatlyst 17 | 100 | 0 | 73 | 281 | 57,144 | 3.0 | 74.3 |
| | 100 | 1 | 75 | 253 | 46,688 | 2.8 | 74.9 |
| | 100 | 6 | 95 | 255 | 38,699 | 3.3 | 73.1 |
| Procatlyst 19 | 100 | 0 | 35 | 278 | 28,431 | 2.9 | 71.1 |
| | 100 | 1 | 37 | 253 | 27,067 | 3.0 | 69.8 |
| | 100 | 6 | 39 | 262 | 20,460 | 2.9 | 67.8 |
| Procatlyst 20 | 100 | 0 | 57 | 320 | 204,109 | 3.9 | 98.5 |
| | 100 | 1 | 61 | 280 | 163,820 | 3.7 | 100.0 |
| | 100 | 6 | 88 | 283 | 90,749 | 5.4 | 100.1 |

TABLE 2-continued

Propylene Polymerization Data from PPR Experiments with diethyl zinc as the chain transfer agent.

| Procatalyst No. | Loading (nmoles) | $Et_2Zn$ (μmoles) | Quench Time (seconds) | Yield (mg) | Mw (g/mol) | PDI (Mw/Mn) | $T_M$ (° C.) |
|---|---|---|---|---|---|---|---|
| Procatlyst 21 | 100 | 0 | 31 | 383 | 36,509 | 2.8 | 101.9 |
| | 100 | 1 | 30 | 365 | 35,294 | 2.8 | 102.8 |
| | 100 | 6 | 33 | 377 | 26,883 | 3.0 | 94.5 |
| Procatlyst 22 | 100 | 0 | 50 | 430 | 251,773 | 3.9 | 109.3 |
| | 100 | 1 | 56 | 439 | 232,359 | 4.1 | 112.8 |
| | 100 | 6 | 75 | 493 | 161,610 | 5.8 | 111.2 |
| Procatlyst 23 | 100 | 0 | 36 | 322 | 107,982 | 5.5 | 106.6 |
| | 100 | 1 | 39 | 323 | 122,784 | 6.8 | 102.7 |
| | 100 | 6 | 39 | 316 | 70,424 | 6.1 | 100.4 |
| Procatlyst 24 | 100 | 0 | 50 | 330 | 276,684 | 3.5 | 106.7 |
| | 100 | 1 | 55 | 465 | 221,329 | 3.7 | 108.6 |
| | 100 | 6 | 80 | 406 | 152,027 | 6.0 | 112.3 |
| Procatlyst 25 | 50 | 0 | 73 | 308 | 82,404 | 12.0 | 69.7 |
| | 50 | 1 | 78 | 263 | 56,329 | 8.8 | 70.2 |
| | 50 | 6 | 91 | 234 | 28,178 | 5.3 | 69.0 |
| Procatlyst 26 | 50 | 0 | 64 | 391 | 212,711 | 3.4 | 109.1 |
| | 50 | 1 | 84 | 335 | 154,273 | 3.4 | 109.4 |
| | 50 | 6 | 1,801 | 76 | 37,066 | 3.4 | 110.9 |
| Procatlyst 27 | 100 | 0 | 49 | 497 | 18,488 | 2.7 | 76.2 |
| | 100 | 1 | 52 | 438 | 18,127 | 2.7 | 77.1 |
| | 100 | 6 | 61 | 402 | 16,322 | 2.7 | 79.3 |
| Procatlyst 28 | 100 | 0 | 68 | 619 | 182,969 | 3.4 | 105.5 |
| | 100 | 1 | 434 | 152 | 159,715 | 5.1 | 103.2 |
| | 100 | 6 | 1,801 | 27 | 22,946 | 3.4 | 95.7 |
| Procatlyst 29 | 50 | 0 | 45 | 306 | 79,618 | 3.0 | 98.3 |
| | 50 | 1 | 40 | 267 | 76,187 | 3.6 | 101.0 |
| | 50 | 6 | 61 | 236 | 40,525 | 3.6 | 98.5 |
| Procatlyst 30 | 100 | 0 | 52 | 305 | 308,806 | 4.3 | 105.7 |
| | 100 | 1 | 58 | 359 | 232,256 | 3.8 | 108.2 |
| | 100 | 6 | 65 | 342 | 134,092 | 5.9 | 105.9 |
| Procatlyst 32 | 50 | 0 | 70 | 320 | 337,063 | 3.1 | 120.0 |
| | 50 | 1 | 89 | 317 | 262,228 | 3.8 | 127.0 |
| | 50 | 6 | 259 | 235 | 135,049 | 7.0 | 126.5 |
| Procatlyst 33 | 50 | 0 | 51 | 274 | 65,109 | 3.0 | 99.8 |
| | 50 | 1 | 62 | 249 | 54,412 | 2.9 | 100.5 |
| | 50 | 6 | 73 | 251 | 36,190 | 3.3 | 97.7 |
| Procatlyst 34 | 100 | 0 | 96 | 325 | 344,185 | 3.1 | 117.0 |
| | 100 | 1 | 314 | 232 | 259,782 | 4.3 | 120.8 |
| | 100 | 6 | 1,801 | 113 | 51,901 | 4.5 | 118.7 |
| Procatlyst 35 | 100 | 0 | 51 | 273 | 82,515 | 3.3 | 100.8 |
| | 100 | 1 | 57 | 277 | 71,014 | 3.3 | 100.4 |
| | 100 | 6 | 69 | 248 | 41,399 | 3.5 | 99.4 |
| Procatlyst 36 | 100 | 0 | 196 | 311 | 438,122 | 3.0 | 122.8 |
| | 100 | 1 | 1,002 | 134 | 258,322 | 4.1 | 125.6 |
| | 100 | 6 | 1,800 | 18 | N.D. | N.D. | N.D. |
| Procatlyst 37 | 100 | 0 | 51 | 334 | 83,560 | 3.6 | 103.8 |
| | 100 | 1 | 66 | 362 | 57,545 | 2.8 | 102.9 |
| | 100 | 6 | 108 | 275 | 37,242 | 2.8 | 99.9 |
| Procatlyst 41 | 100 | 0 | 44 | 292 | 61,840 | 3.5 | 93.0 |
| | 100 | 1 | 49 | 263 | 62,169 | 4.0 | 94.1 |
| | 100 | 6 | 51 | 288 | 36,829 | 3.7 | 90.8 |
| Procatlyst 42 | 100 | 0 | 80 | 372 | 321,198 | 3.5 | 112.3 |
| | 100 | 1 | 93 | 352 | 252,960 | 3.7 | 115.7 |
| | 100 | 6 | 1,801 | 62 | 28,595 | 3.5 | 120.8 |
| Procatlyst 43 | 100 | 0 | 72 | 359 | 229,867 | 3.1 | 107.4 |
| | 100 | 1 | 69 | 296 | 215,192 | 3.9 | 107.0 |
| | 100 | 6 | 66 | 296 | 90,249 | 4.8 | 103.3 |
| Procatlyst 44 | 100 | 0 | 114 | 275 | 670,518 | 3.3 | 123.7 |
| | 100 | 1 | 130 | 234 | 377,128 | 5.2 | 125.8 |
| | 100 | 6 | 1,801 | 32 | 23,158 | 5.2 | 121.9 |
| Procatlyst 45 | 100 | 0 | 38 | 362 | 46,193 | 4.7 | 98.7 |
| | 100 | 1 | 45 | 339 | 21,888 | 2.7 | 98.7 |
| | 100 | 6 | 66 | 283 | 18,077 | 2.8 | 97.2 |
| Procatlyst 46 | 100 | 0 | 96 | 462 | 228,465 | 3.7 | 128.3 |
| | 100 | 1 | 912 | 167 | 80,553 | 3.6 | 129.6 |
| | 100 | 6 | 17 | N.D. | N.D. | N.D. | N.D. |
| Procatlyst 47 | 100 | 0 | 76 | 210 | 135,650 | 3.2 | 103.1 |
| | 100 | 1 | 82 | 227 | 94,264 | 3.2 | 102.5 |
| | 100 | 6 | 94 | 195 | 38,320 | 4.0 | 103.2 |

TABLE 2-continued

Propylene Polymerization Data from PPR Experiments with diethyl zinc as the chain transfer agent.

| Procatalyst No. | Loading (nmoles) | $Et_2Zn$ (μmoles) | Quench Time (seconds) | Yield (mg) | Mw (g/mol) | PDI (Mw/Mn) | $T_M$ (° C.) |
|---|---|---|---|---|---|---|---|
| Procatlyst 48 | 100 | 0 | 237 | 340 | 486,910 | 3.0 | 121.6 |
| | 100 | 1 | 978 | 152 | 208,657 | 4.9 | 122.4 |
| | 100 | 6 | 1,802 | 21 | 15,302 | 3.7 | 146.6 |
| Procatalyst 49 | 100 | 0 | 68 | 317 | 132,982 | 3.1 | 99.6 |
| | 100 | 1 | 83 | 262 | 88,960 | 2.9 | 101.0 |
| | 100 | 6 | 922 | 106 | 31,916 | 3.4 | 98.3 |
| Procatlyst 50 | 100 | 0 | 296 | 433 | 594,745 | 3.4 | 120.8 |
| | 100 | 1 | 1,801 | 28 | 107,751 | 3.0 | 106.2 |
| | 100 | 6 | 1,800 | 7 | N.D. | N.D. | N.D. |

In the trials reported in Table 2, polypropylene was produced at 110° C. with varying amounts of diethylene zinc (DEZ or $Et_2Zn$), a chain shuttling transfer agent. DEZ was added in amounts of 1 or 6 moles. A decrease in molecular weight was observed as the amount of DEZ increased. The decrease in molecular weight as a function of the amount of DEZ indicates that these catalysts have a high sensitivity to chain transfer agents and rapidly undergo chain transfer with these agents. Specifically, the procatalysts Procatalyst 12, Procatalyst 20, Procatalyst 25, Procatalyst 26, Procatalyst 28, Procatalyst 30, Procatalyst 34, Procatalyst 42, and Procatalyst 44 have the largest decreases in polymer molecular weight with increasing DEZ. The largest decreases in polymer molecular weight suggests these catalysts have the highest chain transfer rates which is indicated in Table 3.

Chain Shuttling Activity

A catalyst's chain transfer ability is initially evaluated by running a campaign in which the level of chain transfer or shuttling agent (CSA) is varied to observe the depression in molecular weight and narrowing of the PDI expected for a shuttling catalyst. The molecular weight of the polymer generated by catalysts with potential to be good chain shuttlers will be more sensitive to the addition of CSA than the polymer molecular weight generated by poorer shuttling catalysts. The Mayo equation (Equation 1) describes how a chain transfer agent decreases the number average chain length ($\overline{X_n}$) from the native number average chain length ($\overline{X_{n0}}$) where no chain transfer agent is present. Equation 2 defines a chain transfer or chain shuttling constant, Ca, as the ratio of chain transfer and propagation rate constants. Equation 3 describes the expected $M_n$ of a polymerization. $M_{no}$ is the native molecular weight of the catalyst in the absence of chain shuttling agent and $M_n$ is the molecular weight that is observed with chain shuttling agent ($M_n$=$M_{no}$ with no chain shuttling agent).

$$\frac{1}{\overline{X}_n} = \frac{1}{\overline{X}_{n0}} + \frac{k_{tr}[\text{chain transfer agent}]}{k_p[\text{monomer}]} \quad \text{Equation 1}$$

$$Ca = \frac{k_{tr}}{k_p} \quad \text{Equation 2}$$

$$\frac{1}{Mn} = \frac{1}{Mn_0} + Ca\frac{[CSA]}{[\text{monomer}] \times 42} \quad \text{Equation 3}$$

TABLE 3

Calculated chain transfer constants (Ca) from PPR experiments with DEZ.

| Procatalyst No. | Ca | PDI (0, 1, 6 μmol DEZ) |
|---|---|---|
| 5 | 1.9 | 3.5, 3.1, 3.8 |
| 6 | 2.3 | 3.9, 4.7, 6.2 |
| 11 | 1.9 | 6.3, 5.3, 5.4 |
| 12 | 1.8 | 3.2, 3.6, 5.1 |
| 17 | 1.2 | 3.0, 2.8, 3.3 |
| 19 | 1.4 | 2.9, 3.0, 2.9 |
| 20 | 1.1 | 3.9, 3.7, 5.4 |
| 21 | 1.1 | 2.8, 2.8, 3.0 |
| 22 | 0.8 | 3.9, 4.1, 5.8 |
| 23 | 1.2 | 5.5, 6.8, 6.1 |
| 24 | 0.8 | 3.5, 3.7, 6.0 |
| 25 | 1.3 | 12.0, 8.8, 5.3 |
| 26 | 1.5 | 3.4, 3.4, 3.4 |
| 27 | 0.6 | 2.7, 2.7, 2.7 |
| 28 | 3.7 | 3.4, 5.1, 3.4 |
| 29 | 1.4 | 3.0, 3.6, 3.6 |
| 30 | 0.9 | 4.3, 3.8, 5.9 |
| 32 | 1.8 | 3.1, 3.8, 7.0 |
| 33 | 1.6 | 3.0, 2.9, 3.3 |
| 34 | 1.6 | 3.1, 4.3, 4.5 |
| 35 | 1.6 | 3.3, 3.3, 3.5 |
| 36 | 2.3 | 3.0, 4.1, N.D. |
| 37 | 1.1 | 3.6, 2.8, 2.8 |
| 41 | 1.5 | 3.5, 4.0, 3.7 |
| 42 | 1.6 | 3.5, 3.7, 3.5 |
| 43 | 1.4 | 3.1, 3.9, 4.8 |
| 44 | 2.1 | 3.3, 5.2, 5.2 |
| 45 | 1.7 | 4.7, 2.7, 2.7 |
| 46 | 3.5 | 3.7, 3.6, N.D. |
| 47 | 3.6 | 3.2, 3.2, 4.0 |
| 48 | 5.2 | 3.0, 4.9, 3.7 |
| 49 | 2.8 | 3.1, 2.9, 3.4 |
| 50 | 5.6 | 3.4, 3.0, N.D. |

A narrowing or minimal change in the PDI is evidence that the procatalysts possibly undergo reversible chain transfer with a CSA. In contrast, a broadening in PDI would indicate that there was an irreversible chain transfer. A decrease in or a sustained relatively narrow PDI was observed for a majority of these procatalysts as the amount of DEZ as increased. In these preliminary PPR experiments, procatalysts Procatalyst 6, Procatalyst 22, Procatalyst 23, Procatalyst 24, Procatalyst 32, and Procatalyst 48 have a large increase in PDI as the amounts of DEZ were increased, which indicated that there was an irreversible chain transfer with DEZ.

The procatalysts are capable of producing polypropylene based polymers with a range of molecular weights as well as tacticity, which is indicated by the measured $T_M$.

The invention claimed is:

1. A polymerization process comprising:

contacting propylene and one or more $(C_4\text{-}C_{12})\alpha$-olefins in a reactor including a catalyst system, the catalyst system comprising a chain transfer or chain shuttling agent and a metal-ligand complex according to formula (I):

(I)

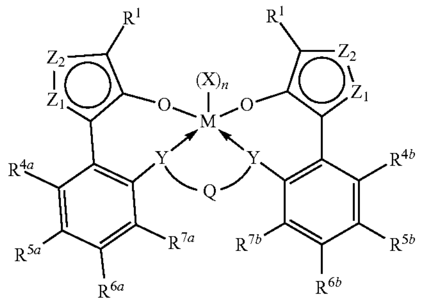

where:

M is a metal chosen from titanium, zirconium, or hafnium, the metal having a formal oxidation state of +2, +3, or +4;

each X is a monodentate or bidentate ligand independently chosen from unsaturated $(C_2\text{-}C_{20})$hydrocarbon, unsaturated $(C_2\text{-}C_{50})$heterohydrocarbon, $(C_1\text{-}C_{50})$hydrocarbyl, $(C_6\text{-}C_{50})$aryl, $(C_6\text{-}C_{50})$heteroaryl, cyclopentadienyl, substituted cyclopentadienyl, $(C_4\text{-}C_{12})$diene, halogen, —$OR^C$, —$N(R^N)_2$, and —$NCOR^C$;

n is 1 or 2;

each Y is —O—;

each $R^1$ is independently selected from the group consisting of —H, $(C_1\text{-}C_{40})$hydrocarbyl, $(C_1\text{-}C_{40})$heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C{=}N$—, $R^CC(O)O$—, $R^COC(O)$—, $R^CC(O)N(R)$—, $(R^C)_2NC(O)$—, halogen, radicals having formula (II), radicals having formula (III), and radicals having formula (IV):

(II)

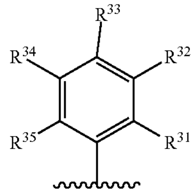

(III)

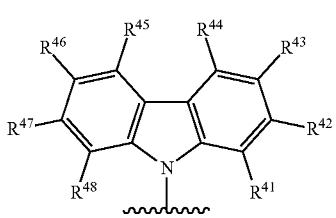

-continued (IV)

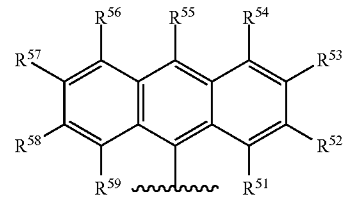

where each of $R^{31\text{-}35}$, $R^{41\text{-}48}$, and $R^{51\text{-}59}$ is independently chosen from $(C_1\text{-}C_{40})$ hydrocarbyl, $(C_1\text{-}C_{40})$ heterohydrocarbyl, —$Si(R^C)_3$, —$Ge(R^C)_3$, —$P(R^P)_2$, —$N(R^N)_2$, —$OR^C$, halogen, or —H, provided at least one $R^1$ in formula (I) is a radical having formula (II), a radical having formula (III), or a radical having formula (IV);

Q is $(C_1\text{-}C_{12})$alkylene, or $(C_1\text{-}C_{12})$heteroalkylene;

each $z_1$ is sulfur, oxygen, —$N(R^Z)$—, and each $z_2$ is —$C(R^Z)$—, where $R^Z$ is $(C_1\text{-}C_8)$alkyl or —H;

$R^{4a}$, $R^{5a}$, $R^{6a}$, $R^{7a}$, $R^{4b}$, $R^{5b}$, $R^{6b}$, and $R^{7b}$ are independently chosen from $(C_1\text{-}C_{50})$hydrocarbyl, $(C_1\text{-}C_{50})$heterohydrocarbyl, $(C_6\text{-}C_{50})$aryl, $(C_4\text{-}C_{50})$heteroaryl, —$Si(R^C)_3$, —$OR^C$, —CN, —$CF_3$, halogen, and —H, in which optionally $R^{4a}$ and $R^{5a}$, or $R^{5a}$ and $R^{6a}$, or $R^{6a}$ and $R^{7a}$, or $R^{4b}$ and $R^{5b}$, or $R^{5b}$ and $R^{6b}$, or $R^{6b}$ and $R^{76}$ may be covalently connected to form an aromatic ring or a non-aromatic ring;

each $R^C$, $R^N$, $R^Z$ and $R^P$ in formula (I) is independently selected from the group consisting of $(C_1\text{-}C_{20})$hydrocarbyl, $(C_1\text{-}C_{20})$heterohydrocarbyl, and —H.

2. The polymerization process of claim 1, wherein the catalyst system further comprises one or more cocatalysts.

3. The polymerization process of claim 1, wherein each $R^1$ is a radical having formula (III), in which:

(1) $R^{42}$ and $R^{47}$ are independently chosen from $(C_1\text{-}C_{20})$alkyl, —$Si(R^C)_3$, —$CF_3$, or halogen, and $R^{43}$ and $R^{46}$ are —H; or (2) $R^{43}$ and $R^{46}$ are independently chosen from $(C_1\text{-}C_{20})$alkyl, $(C_6\text{-}C_{40})$aryl, $(C_5\text{-}C_{40})$heteroaryl, —$Si(R^C)_3$, —$CF_3$, or halogen, and $R^{42}$ and $R^{47}$ are —H.

4. The polymerization process of claim 1, wherein each $R^1$ is a radical having formula (IV), in which at least one of $R^{51\text{-}59}$ is chosen from $(C_1\text{-}C_{40})$hydrocarbyl, $(C_1\text{-}C_{40})$heterohydrocarbyl, —$Si(R^C)_3$, —$OR^C$, —$SR^C$, —$NO_2$, —CN, —$CF_3$, or halogen.

5. The polymerization process of claim 1 wherein each $R^1$ is a radical having formula (IV), in which at least one of $R^{53}$, $R^{55}$, and $R^{57}$ is $(C_1\text{-}C_{40})$hydrocarbyl, $(C_1\text{-}C_{40})$heterohydrocarbyl, —$Si(R^C)_3$, —$OR^C$, —$SR^C$, —$NO_2$, —CN, —$CF_3$, or halogen.

6. The polymerization process of claim 1, wherein each $R^1$ is a radical having formula (II).

7. The polymerization process of claim 1, wherein each $R^1$ is a radical having formula (II), and wherein $R^{32}$ and $R^{34}$ are independently $(C_1\text{-}C_{40})$hydrocarbyl, $(C_1\text{-}C_{40})$heterohydrocarbyl, —$Si(R^C)_3$, —$OR^C$, —$SR^C$, —$NO_2$, —CN, —$CF_3$, or halogen.

8. The polymerization process of claim 1, wherein each $R^1$ is a radical having formula (II), and wherein $R^{32}$ and $R^{34}$ are independently $(C_1\text{-}C_{20})$alkyl, substituted $(C_6\text{-}C_{20})$aryl, or unsubstituted $(C_6\text{-}C_{20})$aryl.

9. The polymerization process of claim 1, wherein each $R^1$ is a radical having formula (II), and wherein $R^{32}$ and $R^{34}$ are independently tert-butyl, phenyl, 3,5-di(tert-butyl)phenyl, 2,4,6-trimethylphenyl, or 2,4,6-tri(iso-propyl)phenyl.

10. The polymerization process of claim 1, wherein the reactor has a reactor temperature of 140° C. or greater.

11. The polymerization process of claim 1, wherein the polymer process further comprises a solution polymerization, and the solution polymerization takes place at a pressure from 10 psi to 2000 psi.

12. The polymerization process of claim 1, wherein the chain transfer or chain shuttling agent is diethyl zinc.

* * * * *